United States Patent
Yamamoto et al.

(10) Patent No.: US 10,914,987 B2
(45) Date of Patent: Feb. 9, 2021

(54) COMPLEX AND OPTICAL ELEMENT

(71) Applicants: Kyoto University, Kyoto (JP); KYUSHU UNIVERSITY, NATIONAL UNIVERSITY CORPORATION, Fukuoka (JP); Sharp Kabushiki Kaisha, Sakai (JP); DIC Corporation, Tokyo (JP)

(72) Inventors: Jun Yamamoto, Kyoto (JP); Masumi Yamashita, Kyoto (JP); Waki Sakatsuji, Kyoto (JP); Yoichi Takanishi, Kyoto (JP); Shogo Kato, Kyoto (JP); Hirotsugu Kikuchi, Fukuoka (JP); Yasushi Okumura, Fukuoka (JP); Hiroki Higuchi, Fukuoka (JP); Rijeesh Kizhakidathazhath, Fukuoka (JP); Takahito Kanzaki, Fukuoka (JP); Yudai Kawashima, Fukuoka (JP); Gimpei Machida, Fukuoka (JP); Hiroya Nishikawa, Fukuoka (JP); Koichi Miyachi, Sakai (JP); Kiyoshi Minoura, Sakai (JP); Isa Nishiyama, Kitaadachi-gun (JP)

(73) Assignees: KYOTO UNIVERSITY, Kyoto (JP); KYUSHU UNIVERSITY, NAT'L UNIVERSITY CORPORATION, Fukuoka (JP); SHARP KABUSHIKI KAISHA, Sakai (JP); DIC CORPORATION, Tokyo (JP)

( * ) Notice: Subject to any disclaimer, the term of this patent is extended or adjusted under 35 U.S.C. 154(b) by 443 days.

(21) Appl. No.: 15/754,982

(22) PCT Filed: Aug. 26, 2016

(86) PCT No.: PCT/JP2016/074992
§ 371 (c)(1),
(2) Date: Feb. 23, 2018

(87) PCT Pub. No.: WO2017/034023
PCT Pub. Date: Mar. 2, 2017

(65) Prior Publication Data
US 2020/0241336 A1    Jul. 30, 2020

(30) Foreign Application Priority Data
Aug. 27, 2015 (JP) ................................. 2015-168368
Feb. 12, 2016 (JP) ................................. 2016-025256

(51) Int. Cl.
*G02F 1/1337* (2006.01)
*G02F 1/1343* (2006.01)
*G02F 1/137* (2006.01)

(52) U.S. Cl.
CPC ............ *G02F 1/1337* (2013.01); *G02F 1/137* (2013.01); *G02F 1/134363* (2013.01);
(Continued)

(58) Field of Classification Search
CPC ..................................................... G02F 1/1337
See application file for complete search history.

(56) References Cited

U.S. PATENT DOCUMENTS

2003/0203130 A1* 10/2003 Geisow ............ G02F 1/133711
428/1.2
2008/0308768 A1 12/2008 Klasen-Memmer et al.
(Continued)

FOREIGN PATENT DOCUMENTS

JP   2008-505235 A   2/2008
JP   2015-063684 A   4/2015

OTHER PUBLICATIONS

Cho et al., Structural consideration of the additive effects on the electro-optical properties of commercial nematic liquid crystal materials, Proceedings of SPIE, 2004, vol. 5289, pp. 227-235, ISSN:0277786X, cited in ISR (9 pages).
(Continued)

*Primary Examiner* — Edmond C Lau
(74) *Attorney, Agent, or Firm* — Westerman, Hattori, Daniels & Adrian, LLP

(57) ABSTRACT

A complex (10) includes a liquid crystal component (13) and a support (11, 12) of the liquid crystal component (13), in which a lubricating interface derivation region (16) is formed between the liquid crystal component (13) and the support (11, 12). An optical element includes a pair of substrates (11, 12) having electrodes (18, 19) on at least one substrate (11), and a liquid crystal component (13) with which a space between the pair of substrates (11, 12) is filled, in which a lubricating interface derivation region (16) is formed between the pair of substrates (11, 12) and the liquid crystal component (13). It is preferable that the lubricating interface deriving agent (14) is present in the lubricating interface derivation region.

25 Claims, 13 Drawing Sheets

(52) U.S. Cl.
CPC .............. *G02F 2001/13775* (2013.01); *G02F 2001/13793* (2013.01); *G02F 2001/134372* (2013.01)

(56) References Cited

U.S. PATENT DOCUMENTS

| | | | |
|---|---|---|---|
| 2010/0091231 A1* | 4/2010 | Nishimura | ........ G02F 1/134363 349/139 |
| 2016/0083652 A1* | 3/2016 | Zhang | ..................... G02F 1/137 252/299.5 |

OTHER PUBLICATIONS

International Search Report dated Nov. 22, 2016, issued in counterpart International Application No. PCT/JP2016/074992, w/English translation (3 pages).

* cited by examiner

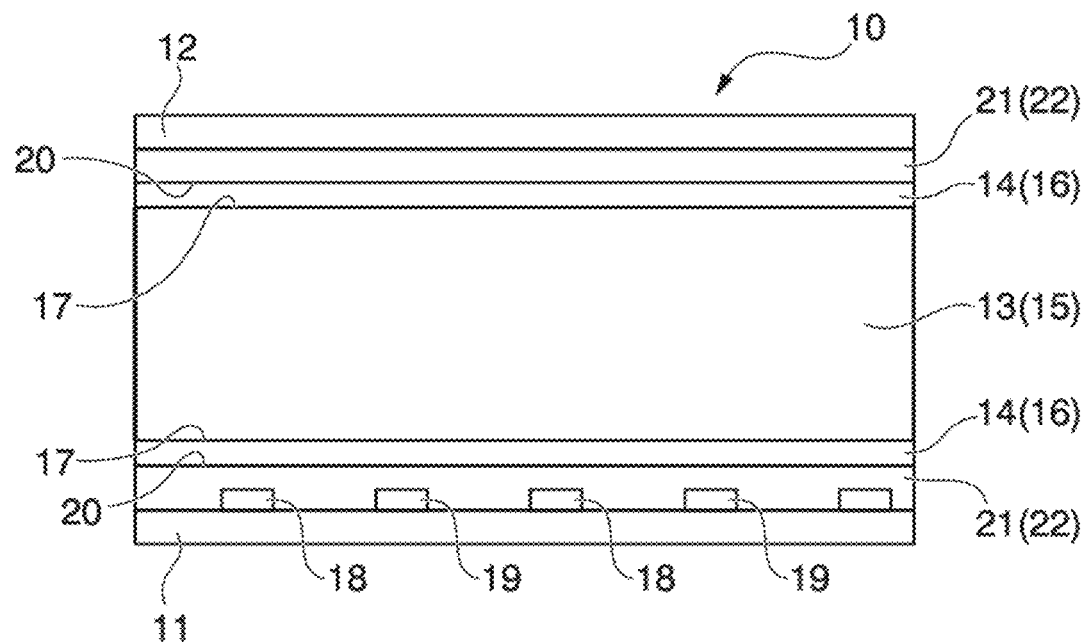
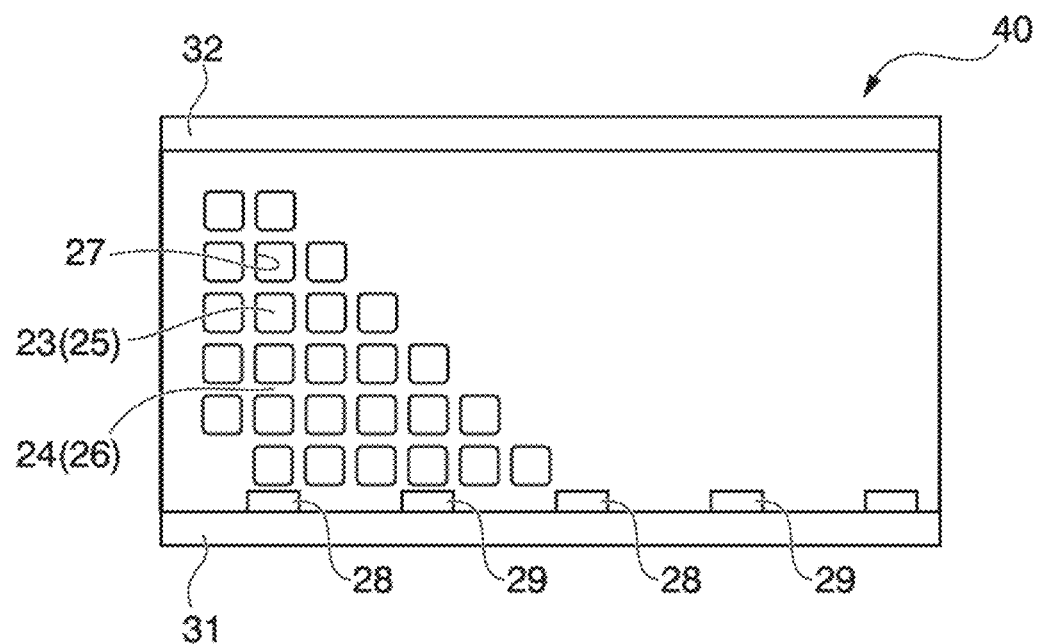

(LEFT: WHEN VOLTAGE IS NOT APPLIED, RIGHT: WHEN VOLTAGE IS APPLIED)

BLACK DISPLAY

WHITE DISPLAY

COMPLEX AND OPTICAL ELEMENT

TECHNICAL FIELD

The present invention relates to a complex and an optical element.

BACKGROUND ART

A "liquid crystal" is currently used in various fields including clocks, calculators, various measuring instruments, automobile panels, word processors, electronic organizers, printers, computers, televisions, clocks, advertisement display boards and the like. Such a "liquid crystal" generally refers to a phase having both liquid flowability and crystal anisotropy, and is classified into a nematic liquid crystal, a smectic liquid crystal, and a cholesteric liquid crystal from a molecular arrangement pattern. For example, the nematic liquid crystal is used for a liquid crystal display element (a so-called liquid crystal display) of a twisted nematic (TN) type, a super twisted nematic (STN) type, a vertical alignment (VA) type using a thin film transistor (TFT), an in-plane switching (IPS) type, or a fringe field switching (FFS) type, and is widely distributed in the market.

In addition, currently, from the viewpoint of 3D compatibility or reduction of load on peripheral devices or apparatuses, improvement of high-speed responsiveness and low-voltage drivability of the liquid crystal is an important development subject. Acceleration of the nematic liquid crystal has been studied with the improvement of physical properties thereof and the improvement of panels until now, and in addition to the nematic liquid crystal, acceleration of other types of liquid crystal has been actively developed. As the liquid crystal other than the nematic liquid crystal, which enables the high-speed responsiveness, a ferroelectric liquid crystal (FLC), currently, a liquid crystal exhibiting an optically isotropic liquid crystal phase (an optically isotropic phase) such as a blue phase, a biaxial liquid crystal, and the like have been known.

Even with the liquid crystals described above, when a liquid crystal is applied to a display device such as a television, in a case where a video is displayed on the display device, high-speed switching of color change is required, and thus the high-speed responsiveness properties of the liquid crystal are emphasized by all means. In addition, from the viewpoint of energy saving, it is also important to drive the liquid crystal at low voltage.

CITATION LIST

Patent Literature

[Patent Document 1] Published Japanese Translation No. 2008-505235 of the PCT International Publication

SUMMARY OF INVENTION

Technical Problem

An object of the present invention is to provide an optical element which is excellent in low-voltage drivability.

Solution to Problem

The present invention includes the following aspects.

(1) A complex including a liquid crystal component and a support of the liquid crystal component, in which a lubricating interface derivation region is formed between the liquid crystal component and the support.

(2) The complex according to the above (1), in which the support is a pair of substrates having an electrode on at least one substrate, a polymer structure present in the liquid crystal component, and at least one of the group consisting of a polymer structure and a polymer thin film which complements a defective region of the liquid crystal.

(3) The complex according to the above (1) or (2), in which an interface between the liquid crystal component and the lubricating interface derivation region forms a slippery interface.

(4) The complex according to any one of the above (1) to (3) further including a lubricating interface deriving agent in the lubricating interface derivation region.

(5) The complex according to the above (4), in which the lubricating interface deriving agent is a compound having one of the group consisting of a polar group, a polymerizable compound, a polymer compound, and an ionic liquid.

(6) The complex according to the above (5), in which the lubricating interface deriving agent is the polymer compound, and the polymer compound has at least one of two or three or more kinds of alkyl groups having different chain lengths, a mesogenic group, and a photoisomerizable group.

(7) An optical element including a pair of substrates having an electrode on at least one substrate, and a liquid crystal component with which a space between the pair of substrates is filled, in which a lubricating interface derivation region is formed between the pair of substrates and the liquid crystal component.

(8) The optical element according to the above (7), further including a lubricating interface deriving agent in the lubricating interface derivation region.

(9) The optical element according to the above (7), in which an interface between the liquid crystal component and the lubricating interface derivation region forms a slippery interface.

(10) The optical element according to the above (8), in which the lubricating interface deriving agent is a compound having one of the group consisting of a polar group, a polymerizable compound, a polymer compound, and an ionic liquid.

(11) The optical element according to the above (10), in which the polymer compound has at least one of two or three or more kinds of alkyl groups having different chain lengths, a mesogenic group, and a photoisomerizable group.

(12) The optical element according to the above (8), in which the liquid crystal component and the lubricating interface deriving agent develop a phase separation structure, the liquid crystal component forms a liquid crystal phase, and the lubricating interface deriving agent forms a liquid phase.

(13) The optical element according to the above (8), in which the lubricating interface deriving agent is unevenly distributed in the vicinity of at least one surface of insides of the pair of substrates so as to form a liquid phase.

(14) The optical element according to the above (8), in which an inside of at least one of the pair of substrates is covered with a coating film formed of a polymer compound component having good affinity with respect to the lubricating interface deriving agent, and the lubricating interface deriving agent is unevenly distributed in the vicinity of the coating film so as to form a liquid phase.

(15) The optical element according to the above (12), in which the liquid crystal phase is a nematic liquid crystal phase.

(16) The optical element according to the above (8), in which the liquid crystal component forms an optically isotropic liquid crystal phase stabilized by a network formed of a polymer compound component and the lubricating interface deriving agent is unevenly distributed in the vicinity of the surface of the network so as to form a liquid phase.

(17) The optical element according to the above (8), in which the liquid crystal component forms an optically isotropic liquid crystal phase having a double twist cylinder structure, and the lubricating interface deriving agent is unevenly distributed in a disclination between the double twist cylinder structures to form a liquid phase.

(18) The optical element according to the above (16) or (17), in which the liquid crystal component exhibits optical isotropy when no electric field is applied and exhibits optical anisotropy when an electric field is applied.

(19) The optical element according to any one of the above (16) to (18), in which the liquid crystal component exhibits a cholesteric blue phase.

(20) The optical element according to the above (8), in which the liquid crystal component and the lubricating interface deriving agent self-organize so as to develop a phase separation structure.

(21) The optical element according to any one of the above (7) to (20), further including a first electrode and a second electrode which are provided on a substrate side facing the one substrate, in which an electric field is generated between the first electrode and the second electrode.

(22) The optical element according to the above (21), in which the first electrode and the second electrode generate an in-plane electric field between the pair of substrates.

(23) The optical element according to the above (21), in which the first electrode and the second electrode generate a fringe electric field between the pair of substrates.

(24) The optical element according to any one of the above (21) to (23), further including a third electrode, in which electric fields are generated in a plurality of directions.

(25) The optical element according to the above (24), further including a fourth electrode, in which electric fields are generated in a plurality of directions.

Advantageous Effects of Invention

The optical element of the present invention has an action of causing the lubricating interface deriving agent to reduce a threshold value of a driving external field when the liquid crystal component responds by change of an external field of an external electric field or an external magnetic field, and is excellent in the low-voltage drivability.

BRIEF DESCRIPTION OF DRAWINGS

FIG. 1 is a schematic sectional view showing an example of an optical element in a first embodiment of the present invention.

FIG. 2 is a schematic sectional view showing an example of an optical element in a second embodiment of the present invention.

DESCRIPTION OF EMBODIMENTS

Figure 3:
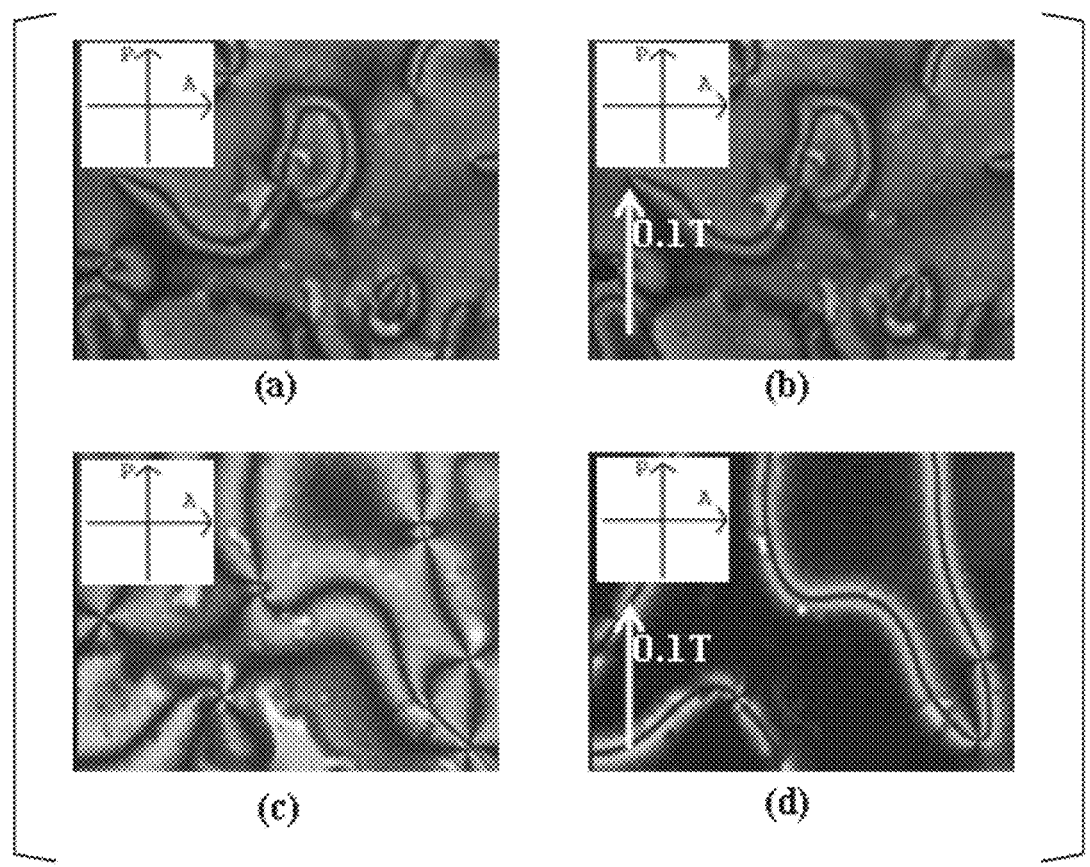
FIG. 3 is a polarizing microscopic photograph showing a state of observing a change in alignment when an external magnetic field is applied at two temperatures of low temperature (a, b) and high temperature (c, d).

Hereinafter, a first embodiment of a complex according to the present invention will be described with reference to drawings.

FIG. 1 is a schematic sectional view showing a complex 10 in the embodiment.

The invention according to the embodiment is the complex 10 including a pair of substrates 11 and 12 having electrodes 18 and 19 on at least one substrate 11, and a liquid crystal component 13 with which a space between the pair of substrates 11 and 12 is filled, in which a lubricating interface derivation region 16 is formed between the pair of substrates 11 and 12 and the liquid crystal component 13. The complex 10 may be an optical element. It is preferable that the invention according to the embodiment has a lubricating interface deriving agent 14 in the lubricating interface derivation region 16. In the invention according to the embodiment, it is preferable that an interface between the liquid crystal component 13 and the lubricating interface derivation region 16 forms a slippery interface 17. It is preferable that the lubricating interface deriving agent 14 is a compound having a polar group, a polymerizable compound, a polymer compound, or an ionic liquid. It is preferable that the polymer compound has at least one of two or three or more kinds of alkyl groups having different chain lengths, a mesogenic group, and a photoisomerizable group. It is preferable that the liquid crystal component 13 and the lubricating interface deriving agent 14 develop a phase separation structure, the liquid crystal component 13 forms a liquid crystal phase 15, and the lubricating interface deriving agent 14 forms a liquid phase in the lubricating interface derivation region 16. The lubricating interface deriving agent 14 may form a gel layer having lower order than that of the liquid crystal phase 15 in the lubricating interface derivation region 16.

In the present specification, the lubricating interface derivation region means a region deriving a lubricating interface, and a region having a lower order than that of the liquid crystal phase.

The lubricating interface derivation region may be a lubricating interface derivation liquid region. The lubricating interface derivation liquid region means a region which is a liquid phase among the lubricating interface derivation regions.

The lubricating interface derivation region is not limited to the lubricating interface derivation liquid region (liquid phase), and may be a region where a gel layer is formed, a region with a low order parameter (degree of alignment order), a region with reduced clearing points, an ordered region including partially disordered regions, and a region including regions with high mobility.

These regions preferably include a lubricating interface deriving agent, may be formed of only the lubricating interface deriving agent, and may be the lubricating interface deriving agent and the liquid crystal component. Further, the lubricating interface deriving agent may be included in the liquid crystal, may be separately introduced from the liquid crystal, may be included in the support in advance, and may be chemically modified so as to be bonded to the support.

The invention according to the embodiment is an optical element including a pair of substrates 11 and 12 having electrodes 18 and 19 on at least one substrate 11, a liquid crystal component 13 with which the space between the pair of substrates 11 and 12 is filled, and a lubricating interface deriving agent 14, in which the liquid crystal component 13 and the lubricating interface deriving agent 14 develop the phase separation structure, and the liquid crystal component 13 forms a liquid crystal phase 15, the lubricating interface deriving agent 14 forms a liquid phase, and the interface between the liquid crystal phase 15 and the liquid phase forms a slippery interface 17 when the liquid crystal component 13 responds by change of an external field of an external electric field or an external magnetic field. FIG. 1 shows a case where the slippery interface 17 is formed on both sides of the pair of substrates 11 and 12, but regarding the optical element in the embodiment, for example, an embodiment in which the slippery interface 17 is only formed on the side of one substrate 11 having the electrodes 18 and 19, and the slippery interface 17 is not formed on the side of the other substrate 12 having no electrode may be employed.

The complex 10 of FIG. 1 includes the liquid crystal component 13 in the embodiment and supports 11 and 12 of the liquid crystal component 13, and the lubricating interface derivation region 16 is formed between the liquid crystal component 13 and the supports 11 and 12. The complex 10 may be an optical element.

In the complex, the supports 11 and 12 may be a pair of substrates having the electrodes 18 and 19 on at least one substrate, and may be a polymer thin film. In the complex, it is preferable that the interface between the liquid crystal component 13 and the lubricating interface derivation region 16 forms the slippery interface 17. It is preferable that the complex has the lubricating interface deriving agent 14 in the lubricating interface derivation region 16. In the complex, it is preferable that the lubricating interface deriving agent 14 is a compound having a polar group, a polymerizable compound, a polymer compound, or an ionic liquid. It is preferable that the lubricating interface deriving agent 14 is the polymer compound, and the polymer compound has at least one of two or three or more kinds of alkyl groups having different chain lengths, a mesogenic group, and a photoisomerizable group.

In the present specification, the slippery interface means an easily slidable interface which is formed between a liquid crystal phase and a liquid phase.

Every interface in contact with the liquid crystal may be a slippery interface, or a part of the interface may be slippery. In order to make a part of the interface a slippery interface, one interface of the discontinuous interface may be a slippery interface at the interface in contact with the liquid crystal, or a part of the continuous interface in contact with the liquid crystal may be a slippery interface. In even those cases, as a method of realizing the slippery of the interface being in contact with the liquid crystal, the lubricating interface derivation region may be formed of only the lubricating interface deriving agent, the lubricating interface derivation region may be formed of the lubricating interface deriving agent and the liquid crystal component. Further, the lubricating interface deriving agent may be included in the liquid crystal in advance, the lubricating interface deriving agent may be separately introduced from the liquid crystal, the lubricating interface deriving agent may be included in the support in advance, and the lubricating interface deriving agent may be chemically modified so as to be bonded to the support. In order to make one interface of the discontinuous interface a slippery interface at the interface in contact with the liquid crystal, it is preferable to make the properties of the interfaces of the two substrates different from each other by the above method.

Also, a part of the region of one of the discontinuous interfaces may be set as a slippery interface. When a part of the interface is set as the slippery interface, while preserving the anchoring of the liquid crystal and the interface to some extent, it is possible to develop the effect of the slippery interface in which the liquid crystal molecule becomes more responsive to the external field. As a result, it is possible to obtain the response by the small external field force (low electric field in a case of the electric field) due to the liquid crystal molecule becoming more responsive, and a function such as high-speed responsiveness corresponding to the external field at high speed while preserving the force to restore the original alignment by an elastic force of the liquid crystal after removing the external field. The balance between alignment resilience derived from the elastic force and the responsiveness due to the slippery of the interface can be achieved by changing the proportion of the slippery of the interface. For example, in a case where the strong alignment resilience is desired, the proportion of the slippery of the interface may be decreased and in a case where it is desirable to respond with a low electric field, the proportion of the slippery of the interface may be increased.

The optical element of the embodiment has an action of causing the lubricating interface deriving agent to reduce a threshold value of the driving external field by the interface between the liquid crystal phase 15 and the lubricating interface derivation region 16, which forms the slippery interface 17 when the liquid crystal component 13 responds by change of an external field of an external electric field or an external magnetic field, and is excellent in the low-voltage drivability.

The lubricating interface deriving agent 14 may be unevenly distributed in the vicinity of at least one surface 20 of the insides of the pair of substrates 11 and 12 so as to form a liquid phase. At this time, it is preferable that the lubricating interface deriving agent 14 has good affinity with respect to at least one surface of insides of the pair of substrates 11 and 12. It is possible to appropriately select the combination of the properties of the liquid crystal component 13, the lubricating interface deriving agent 14, and the surface 20 on the inside of the pair of substrates 11 and 12 such that the lubricating interface deriving agent 14 is unevenly distributed in the vicinity of the surface 20 on the inside of the pair of substrates 11 and 12 when the liquid crystal component 13 and the lubricating interface deriving agent 14 self-organize so as to develop a phase separation structure.

When the lubricating interface deriving agent has good affinity with respect to the surface on the inside of the substrate, a high concentration region of the lubricating interface deriving agent is spontaneously realized in the vicinity of the surface on the inside of the substrate. In addition, it is preferable that the lubricating interface deriving agent has sufficient affinity with respect to the liquid crystal component forming a liquid crystal phase in order to secure wettability and temperature stability. When the affinity with respect to the liquid crystal component is weak, the liquid crystal component is excluded from the liquid crystal phase, and the interface has "vertical alignment", or a "DeWet state (interfacial tension is high and gathers in a droplet shape)", and thus it is not possible to form a preferable slippery interface. With sufficient affinity with respect to the liquid crystal component, the slippery interface can be formed.

The lubricating interface deriving agent has good affinity with respect to the surface on the inside of the substrate and has sufficient affinity with respect to the liquid crystal component, thereby making it possible to form a slippery interface.

In general, the above two conditions do not match, which may be a subtle condition, but this can be achieved, for example, by using a compound similar to a surfactant. A compound which has a functional group having good affinity with respect to the surface on the inside of the substrate on one of the molecules, and has a functional group having sufficient affinity with respect to the liquid crystal component on the other one of the molecules can be used as a lubricating interface deriving agent.

For example, the inside of at least one of the pair of substrates 11 and 12 is covered with a coating film 22 which is formed of the polymer compound component 21 having good affinity with respect to the lubricating interface deriving agent 14 and thereby the lubricating interface deriving agent 14 is unevenly distributed in the vicinity of the coating film 22 to form a liquid phase when the liquid crystal component 13 and the lubricating interface deriving agent 14 self-organize so as to develop a phase separation structure.

The lubricating interface deriving agent can be used in a state of spontaneous phase separation or can be used in a state prescribed to preserve the state of the spontaneous phase separation. As a method of preserving the state of the spontaneous phase separation, there is a method of forming a polymer by introducing a polymerizable functional group into a lubricating interface deriving agent and then polymerizing in the phase separation state. Forming the polymer is effective for preserving the position of the lubricating interface deriving agent, forming a three-dimensional network structure with the polymer formed by introducing a plurality of polymerizable groups into the lubricating interface deriving agent is effective for preserving, and forming a local gel state with the polymer interacting with surrounding liquid crystal molecule is also effective for preserving.

Alternatively, it is possible to maintain the lubricating interface deriving agent in the vicinity of the interface by polymerizing the interface having a polymerizable functional group as the interface in contact with the liquid crystal in a state where the lubricating interface deriving agent is phase-separated, and if the polymerizable functional group is introduced also in the lubricating interface deriving agent, it is possible to maintain the lubricating interface deriving agent in the vicinity of the interface by the reaction with the polymerizable functional group present in the interface in contact with the liquid crystal. As the interface having a polymerizable functional group, an interface to which a compound having a polymerizable functional group is chemically or physically bonded, and an interface which is altered to produce a polymerizable functional group.

Even in this case, forming the three-dimensional network structure with the formed polymer is effective for preserving, and forming the local gel state with the polymer interacting with surrounding liquid crystal molecule is also effective for preserving.

As the substrates 11 and 12, it is preferable to use a glass substrate. In a case where the glass substrate is used, when the lubricating interface deriving agent has a polar group, the affinity with the glass substrate becomes high, and thus it is likely to be unevenly distributed in the vicinity of the glass surface, and an alignment film can be made unnecessary.

As the substrates 11 and 12, it is possible to use a polymer film. This is the same effect in the case where the surface of the glass substrate is covered with a polymer. In a case where a polymer film or the coating film 22 formed of the polymer compound component 21 are materials having a polar group, it is preferable to use a lubricating interface deriving agent having a polar group as described below. In this case, the polar group of the polymer film or the coating film 22 and the polar group of the lubricating interface deriving agent may be the same as or different from each other.

Further, a material having a structure similar to that of a monomer component of the polymer used in the polymer film or the coating film 22 is preferably used as the lubricating interface deriving agent.

In a case where a polymer of a monomer having polymerizable groups (a broken line represents a bond to another organic group, R's independently represent a hydrogen atom or an alkyl group having 1 to 5 carbon atoms.) represented by Formulae (III-1) to (III-17) is one component of the polymer film or the coating film 22, examples of the lubricating interface deriving agent include the same monomers having the same polymerizable groups, a polymer of the monomers, or a monomer analogue compound in which all or some of the C=C bonds in the polymerizable group are substituted with C—C bonds.

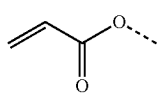

(III-1)

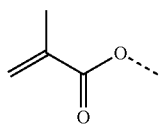

(III-2)

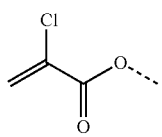

(III-3)

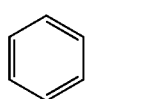

(III-4)

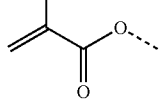

(III-5)

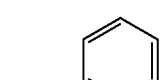

(III-6)

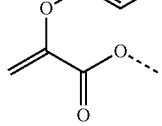

(III-7)

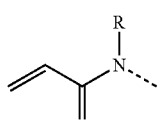

(III-8)

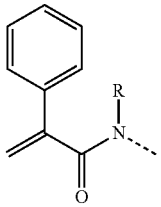

(III-9)

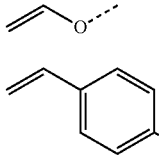

(III-10)

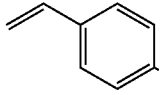

(III-11)

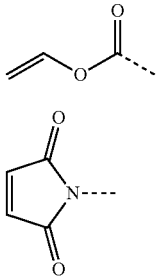

(III-12)

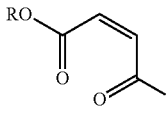

(III-13)

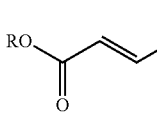

(III-14)

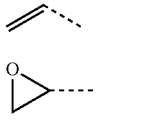

(III-15)

(III-16)

(III-17)

In the embodiment, it is important that an interface having good affinity with respect to the lubricating interface deriving agent 14 is provided on the inside of at least one of the pair of substrates 11 and 12, and with this, it is possible that the lubricating interface deriving agent 14 is unevenly distributed in the vicinity of the coating film 22 to form a liquid phase.

In addition, when the liquid crystal component 13 and the lubricating interface deriving agent 14 develop the phase separation structure, and the liquid crystal component 13 forms a liquid crystal phase 15, and the lubricating interface deriving agent 14 forms a liquid phase, the liquid phase may be a phase formed of the lubricating interface deriving agent 14, or may be a phase formed of the liquid crystal component 13 and the lubricating interface deriving agent 14, and from the aspect that the width of the combination of the preferable properties of the liquid crystal component 13, the lubricating interface deriving agent 14, and the surface 20 on the inside of the pair of substrates 11 and 12, the liquid phase is preferably a phase formed of the liquid crystal component 13 and the lubricating interface deriving agent 14.

In the embodiment, the liquid crystal phase 15 may be preferably a nematic liquid crystal phase. In addition, in the vicinity of the liquid crystal phase 15 side of an interface between the liquid crystal phase 15 and the liquid phase, a constituent molecule of the nematic liquid crystal is preferably horizontally aligned.

In the embodiment, the liquid crystal phase 15 may be preferably a nematic liquid crystal phase. In addition, in the vicinity of the liquid crystal phase 15 side of an interface between the liquid crystal phase 15 and the liquid phase, a constituent molecule of the nematic liquid crystal is preferably horizontally aligned.

In the optical element of the embodiment, it is possible to employ a configuration in which a first electrode 18 and a second electrode 19 are provided on a facing substrate 12 side in one substrate 11, and an electric field is generated between the first electrode 18 and the second electrode 19.

In the optical element of the embodiment, it is possible to employ a configuration in which the first electrode 18 and the second electrode 19 generate an in-plane electric field between the pair of substrates 11 and 12.

"Liquid Crystal Component 13"

In the embodiment, the space between the pair of the substrates is filled with the liquid crystal component 13 and the lubricating interface deriving agent, and the phase separation structure is developed so as to form a liquid crystal phase.

The liquid crystal component 13 in the embodiment is preferably at least one kind selected from the group consisting of a nematic liquid crystal, a cholesteric liquid crystal, and a smectic liquid crystal, and is preferably at least one kind selected from the group consisting of nematic liquid crystal composition, a cholesteric liquid crystal composition, and a smectic liquid crystal composition.

In the present invention, it is preferable that the liquid crystal component exhibits a liquid crystal phase at room temperature.

In the present invention, it is preferable that the clearing point of the liquid crystal component is equal to or higher than 60° C.

In the present invention, the liquid crystal component may contain at least two or more kinds of the liquid crystalline compounds.

In the optical element of the present invention, as the liquid crystalline compound used in the liquid crystal component, it is preferable to contain a compound represented by General Formula (LC).

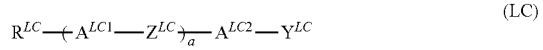
(LC)

(In General Formula (LC), $R^{LC}$ represents an alkyl group having 1 to 15 carbon atoms, one or two or more $CH_2$ groups in the alkyl group may be substituted with —O—, —CH=CH—, —CO—, —OCO—, —COO—, or —C≡C—, and one or two or more hydrogen atoms of the alkyl group may be optionally substituted with a halogen atom such that the oxygen atom is not directly adjacent. $A^{LC1}$ and $A^{LC2}$ each independently represent a group selected from the group consisting of (a) a trans-1,4-cyclohexylene group (one $CH_2$ or two or more non-adjacent $CH_2$'s present in this group may be substituted with an oxygen atom or a sulfur atom), (b) a 1,4-phenylene group (one CH group or two or more non-adjacent CH groups present in this group may be substituted with a nitrogen atom), and (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chroman-2,6-diyl group, one or two or more hydrogen atoms included in the group (a), the group (b), or the group (c) each may be substituted with F, Cl, $CF_3$, or $OCF_3$, $Z^{LC}$ represent a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —$(N^+(O^+)N)$—, —COO—, or —OCO—, $Y^{LC}$ represents a hydrogen atom, a fluorine atom, a chlorine atom, a cyano group, and an alkyl group having 1 to 15 carbon atoms, one or two or more $CH_2$ groups in the alkyl group may be substituted with —O—, —CH=CH—, —CO—, —OCO—, —COO—, —C≡C—, —$CF_2O$—, or —$OCF_2$— such that the oxygen atom is not directly adjacent, and one or two or more hydrogen atoms of the alkyl group may be optionally substituted with a halogen atom, and a represents an integer in a range of 1 to 4, in a case where a represents 2, 3, or 4, a plurality of $A^{LC1}$'s are present, the plurality of $A^{LC1}$'s may be the same as or different from each other, and in a case where a plurality of $Z^{LC}$'s are present, the plurality of $Z^{LC}$'s may be the same as or different from each other.)

A compound represented by General Formula (LC) is preferably one or two or more kinds of compounds selected from the groups consisting of the compounds represented by General Formula (LC1) and General Formula (LC2),

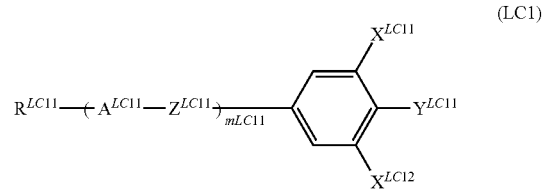
(LC1)

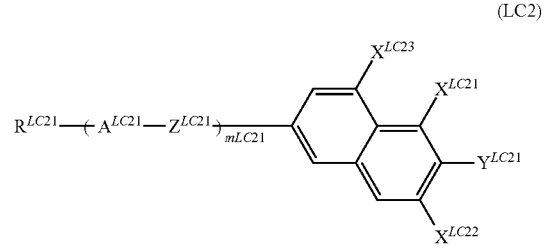
(LC2)

(in the formula, $R^{LC11}$ and $R^{LC21}$ each independently represent an alkyl group having 1 to 15 carbon atoms, one or two or more $CH_2$ groups in the alkyl group may be substituted with —O—, —CH=CH—, —CO—, —OCO—, —COO—, or —C≡C— such that oxygen atom is not directly adjacent, one or two or more hydrogen atoms of the alkyl group may be optionally substituted with a halogen atom, and $A^{LC11}$ and $A^{LC21}$ each independently represent any one of the following structures,

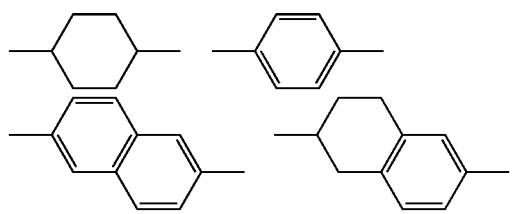

-continued

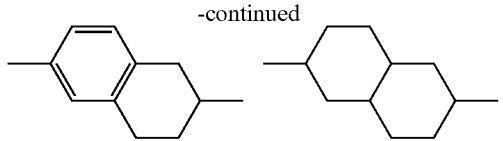

(in the structure, one or two or more $CH_2$ groups in a cyclohexylene group may be substituted with an oxygen atom, one or two or more CH groups in a 1,4-phenylene group may be substituted with a nitrogen atom, and one or two or more hydrogen atoms in the structure may be substituted with F, Cl, $CF_3$, or $OCF_3$), $X^{LC11}$, $X^{LC12}$, and $X^{LC21}$ to $X^{LC23}$ each independently represent a hydrogen atom, Cl, F, $CF_3$, or $OCF_3$, $Y^{LC11}$ and $Y^{LC21}$ each independently represent a hydrogen atom, Cl, F, CN, $CF_3$, $OCH_2F$, $OCHF_2$, or $OCF_3$, $Z^{LC11}$ and $Z^{LC21}$ each independently represent a single bond, —CH═CH—, —CF═CF—, —C≡C—, —$CH_2CH_2$—, —$(CH_2)_4$—, —$OCH_2$—, —$CH_2O$—, —$OCF_2$—, —$CF_2O$—, —COO—, or —OCO—, $m^{LC11}$ and $m^{LC21}$ each independently represent an integer in a range of 1 to 4, and in a case where a plurality of $A^{LC11}$'s, $A^{LC21}$'s, $Z^{LC11}$'s, and $Z^{LC2}$'s are present, those may be the same as or different from each other.).

$R^{LC11}$ and $R^{LC21}$ are each independently preferably an alkyl group having 1 to 7 carbon atoms, an alkoxy group having 1 to 7 carbon atoms, and an alkenyl group having 2 to 7 carbon atoms, are more preferably an alkyl group having 1 to 5 carbon atoms, an alkoxy group having 1 to 5 carbon atoms, and an alkenyl group having 2 to 5 carbon atoms, are still more preferably in a linear shape, and are most preferably an alkenyl group represented by the following structures.

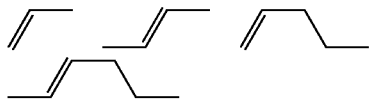

(In the formula, bounding to the ring structure is performed at a right end.)

$A^{LC11}$ and $A^{LC21}$ are each independently preferably the following structures.

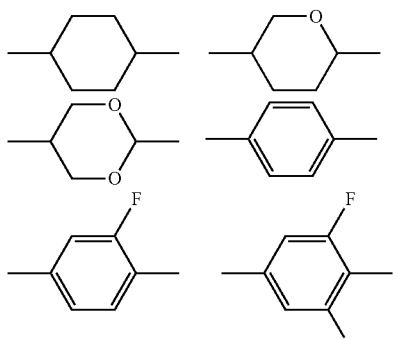

$Y^{LC11}$ and $Y^{LC21}$ are each independently preferably F, CN, $CF_3$, or $OCF_3$, are preferably F or $OCF_3$, and are particularly preferably F.

$Z^{LC11}$ and $Z^{LC21}$ are preferably a single bond, —$CH_2CH_2$—, —COO—, —OCO—, —$OCH_2$—, —$CH_2O$—, —$OCF_2$— or —$CF_2O$—, are a single bond, are preferably —$CH_2CH_2$—, —$OCH_2$—, —$OCF_2$—, or —$CF_2O$—, a single bond, and are more preferably —$OCH_2$— or —$CF_2O$—.

$m^{LC11}$ and $m^{LC21}$ are preferably 1, 2, or 3, is preferably 1 or 2 in a case where importance is attached to storage stability and response speed at low temperature, and is preferably 2 or 3 in order to improve the upper limit value of the nematic phase upper limit temperature.

In addition, a compound represented by General Formula (LC) is preferably one or two or more kinds of compounds selected from the groups consisting of the compounds represented by General Formula (LC3) to General Formula (LC5),

(LC3)

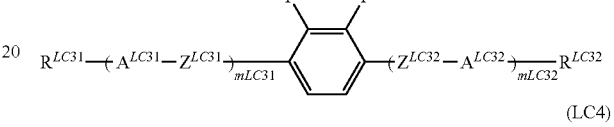
(LC4)

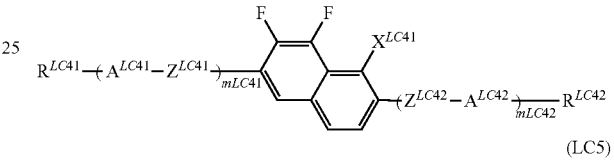
(LC5)

(In the formula, $R^{LC31}$, $R^{LC32}$, $R^{LC41}$, $R^{LC42}$, $R^{LC51}$, and $R^{LC52}$ each independently represent an alkyl group having 1 to 15 carbon atoms, one or two or more $CH_2$ groups in the alkyl group may be substituted with —O—, —CH═CH—, —CO—, —OCO—, —COO—, or —C≡C— such that oxygen atom is not directly adjacent, one or two or more hydrogen atoms of the alkyl group may be optionally substituted with a halogen atom, and $A^{LC31}$, $A^{LC32}$, $A^{LC41}$, $A^{LC42}$, $A^{LC51}$, and $A^{LC52}$ each independently represent any one of the following structures,

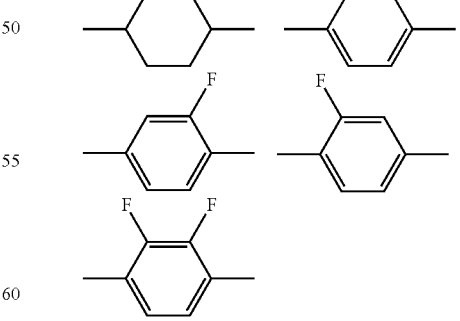

(In the structure, one or two or more $CH_2$ groups in a cyclohexylene group may be substituted with an oxygen atom, one or two or more CH groups in a 1,4-phenylene group may be substituted with a nitrogen atom, and one or two or more hydrogen atoms in the structure may be substituted with Cl, $CF_3$, or $OCF_3$), $Z^{LC31}$, $Z^{LC32}$, $Z^{LC41}$, $Z^{LC42}$, $Z^{LC51}$ and $Z^{LC52}$ each independently represent a single bond, —CH=CH—, —C≡C—, —$CH_2CH_2$—, —$(CH_2)_4$—, —COO—, —$OCH_2$—, —$CH_2O$—, —$OCF_2$—, or —$CF_2O$—, $Z^5$ represents a $CH_2$ group or an oxygen atom, $X^{LC41}$ represents a hydrogen atom or a fluorine atom, $m^{LC31}$, $m^{LC32}$, $m^{LC41}$, $m^{LC42}$, $m^{LC51}$, and $m^{LC52}$ each independently represent 0 to 3, $m^{LC31}+m^{LC32}$, $m^{LC41}+m^{LC42}$, and $m^{LC51}+m^{LC52}$ are 1, 2, or 3, in a case where $A^{LC31}$ to $A^{LC52}$, and $Z^{LC31}$ to $Z^{LC52}$ are present in plural, these may be the same as or different from each other.).

$R^{LC31}$ to $R^{LC52}$ each independently preferably represent an alkyl group having 1 to 7 carbon atoms, an alkoxy group having 1 to 7 carbon atoms, and an alkenyl group having 2 to 7 carbon atoms, and most preferably represent the following structures as an alkenyl group.

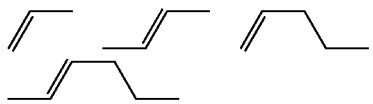

(In the formula, bounding to the ring structure is performed at a right end.)

$A^{LC31}$ to $A^{LC52}$ are each independently preferably the following structures.

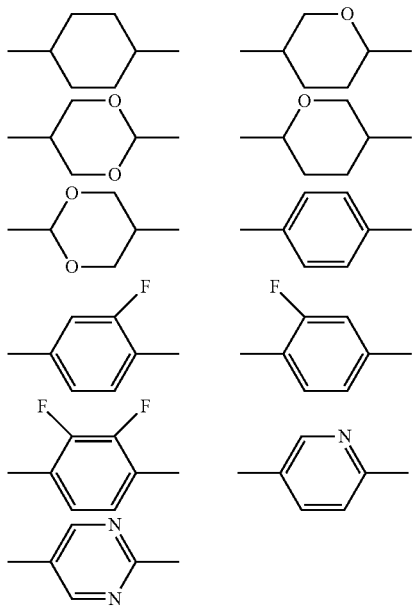

$Z^{LC31}$ to $Z^{LC52}$ each independently preferably a single bond, —$CH_2O$—, —COO—, —OCO—, —$CH_2CH_2$—, —$CF_2O$—, —$OCF_2$—, or —$OCH_2$—.

The compound represented by General Formula (LC) is preferably a liquid crystal composition containing one or two kinds of the compound represented by General Formula (LC6).

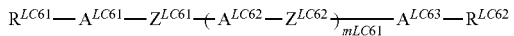

(LC6)

(in the formula, $R^{LC61}$ and $R^{LC62}$ each independently represent an alkyl group having 1 to 15 carbon atoms, one or two or more $CH_2$ groups in the alkyl group may be substituted with —O—, —CH=CH—, —CO—, —OCO—, —COO—, or —C— such that oxygen atom is not directly adjacent, one or two or more hydrogen atoms of the alkyl group may be optionally substituted with a halogen atom, and $A^{LC61}$ to $A^{LC63}$ each independently represent any one of the following structures,

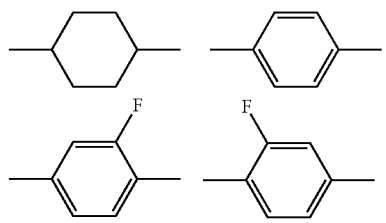

(In the structure, one or two or more $CH_2CH_2$ groups in a cyclohexylene group may be substituted with —CH=CH—, —$CF_2O$—, or —$OCF_2$—, one or two or more CH groups in a 1,4-phenylene group may be substituted with a nitrogen atom), $Z^{LC61}$ and $Z^{LC62}$ each independently represent a single bond, —CH=CH—, —C≡C—, —$CH_2CH_2$—, —$(CH_2)_4$—, —COO—, —$OCH_2$—, —$CH_2O$—, —$OCF_2$—, or —$CF_2O$—, mLC61 represents 0 to 3. Here, the compounds represented by General Formula (LC1) to General Formula (LC6) are excluded).

The compound represented by General Formula (LC) is more preferably one or two or more kinds of compounds selected from the group consisting of the compounds represented by General Formula (LC6) ($R^{LC61}$ and $R^{LC62}$ each independently preferably represent an alkyl group having 1 to 7 carbon atoms, an alkoxy group having 1 to 7 carbon atoms, and an alkenyl group having 2 to 7 carbon atoms, and most preferably represent the following structures as an alkenyl group,

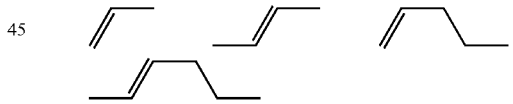

(In the formula, bounding to the ring structure is performed at a right end.)

$A^{LC61}$ to $A^{LC63}$ each independently preferably represent the following structures.

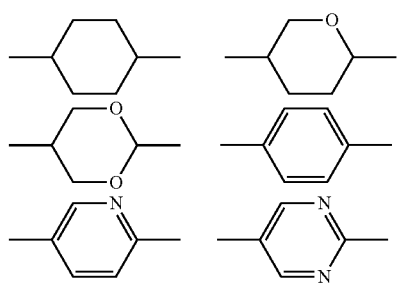

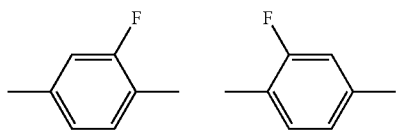

$Z^{LC61}$ and $Z^{LC62}$ are each independently preferably a single bond, —CH$_2$CH$_2$—, —COO—, —OCH$_2$—, —CH$_2$O—, —OCF$_2$—, or —CF$_2$O—.

(LC6-a)
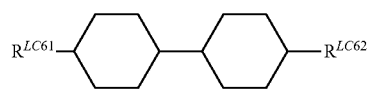

(LC6-b)
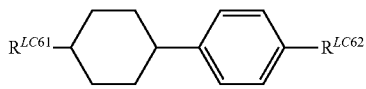

(LC6-c)
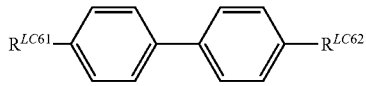

(LC6-d)
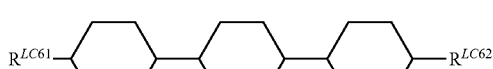

(LC6-e)
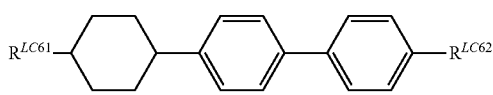

(LC6-f)
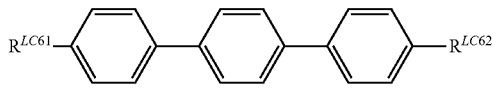

(LC6-g)
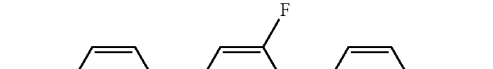

(LC6-h)

(LC6-i)
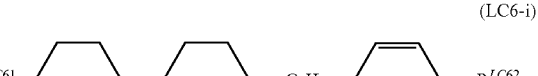

(LC6-j)
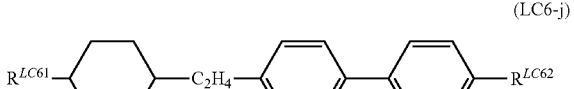

(LC6-k)
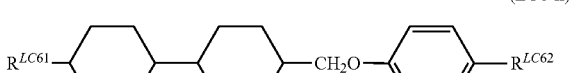

(LC6-l)
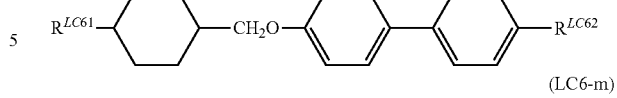

(LC6-m)
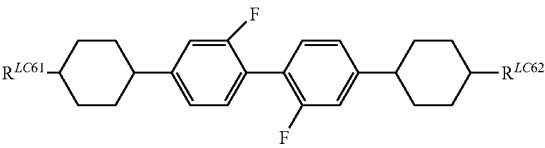

(in the formula, $R^{LC16}$ and $R^{LC62}$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.)).

The liquid crystal component used in the present invention may be formed of a liquid crystal compound, may be formed of a liquid crystal composition, may contain a liquid crystal compound or a liquid crystal composition, and may form a nematic liquid crystal composition, a blue phase containing at least one kind of chiral compound or a polymer-stabilized blue phase in which the blue phase is stabilized by the network formed of the polymer compound component 41, or an optically isotropic liquid crystal phase as other phases.

"Lubricating Interface Deriving Agent"

The lubricating interface deriving agent is a component that derives the forming of the lubricating interface derivation region. In the present invention, the space between the pair of substrates is filled with the lubricating interface deriving agent, and the phase separation structure is developed with the liquid crystal component so as to form a lubricating interface derivation region. The space between the pair of substrates is filled with the lubricating interface deriving agent, and the phase separation structure is developed with the liquid crystal component so as to form a liquid phase. The liquid phase may be formed by only the lubricating interface deriving agent, and the liquid phase may be formed by the lubricating interface deriving agent and the liquid crystal component as well. In the optical element of the present invention, the interface between a liquid crystal phase formed of the liquid crystal component and a liquid phase formed of the lubricating interface deriving agent functions as a slippery interface when the liquid crystal component responds by change of an external field of an external electric field or an external magnetic field.

The lubricating interface derivation region is formed in the vicinity of the liquid crystal phase, and the interface between the liquid crystal phase and the lubricating interface derivation region forms the slippery interface. The lubricating interface derivation region develops, for example, as a low order phase or a disordered phase. Examples of the low order phase include a gel layer, and examples of the disordered phase include a liquid phase. It is preferable that the lubricating interface deriving agent has sufficient affinity with respect to the liquid crystal component forming a liquid crystal phase in order to secure wettability and temperature stability. When the affinity with respect to the liquid crystal component is weak, the liquid crystal component is excluded from the liquid crystal phase, and the interface has "vertical alignment", or a "DeWet state (interfacial tension is high and gathers in a droplet shape)", and thus it is not possible to form a preferable slippery interface. With sufficient affinity with respect to the liquid crystal component, a slippery interface can be formed.

The lubricating interface deriving agent may or may not have a polar group.

As described above, the lubricating interface deriving agent having a polar group has high affinity with respect to the glass substrate surface, and is unevenly distributed in the vicinity of the glass substrate surface.

The polar group means a group having charge bias or a group which induces charge bias in an atom adjacent to the aforementioned group, and specifically a group having an atom with different electronegativity in the molecular structure of the group, or a group having an atom with different electronegativity from that of the adjacent atom in the group.

Examples of the polar group having a lubricating interface deriving agent include the following examples.

A halogen group, and preferably a chloro group or a fluoro group

A halogen-containing group, and preferably a fluoro-, chloro-, bromo- or iodo-alkyl group, particularly, a fluoro- or chloro-alkyl group An oxygen-containing group, and preferably an ester group, an ether group, a hydroxy group, a carbonyl group, a ketone group, an aldehyde group, a carbonic acid ester group, a carboxylate group, a carboxyl group, a carboxyl ester, particularly preferably an ester, an ether, a hydroxy group, and a carbonyl group A nitrogen-containing group, and preferably a carboxamide group, an amino group, an imine group, an amide group, an imide group, an azide group, an azo group, a cyanate group, an isocyanate group, a nitrate group, a nitrile group, an isonitrile group, a nitrosooxy group, a nitro group, a nitroso group, and a pyridyl group A sulfur-containing group, and preferably a sulfhydryl group, a sulfide group, a disulfide group, a sulfinyl group, a sulfonyl group, a sulfino group, a sulfo group, a thiocyanate group, an isothiocyanate group, and a carbonothioyl group A phosphorus-containing group, and preferably a phosphino group, a phosphono group, and a phosphate group A group containing cation, anion, and salt The lubricating interface deriving agent may be (1) a low molecular compound, may be (2) a polymer compound, and (3) an ionic liquid. The lubricating interface deriving agent may be used alone, or two or more kinds thereof may be used.

In a case where the lubricating interface deriving agent is a low molecular compound, it is required to have the performance of performing the phase separation from the liquid crystal component, and thus it is better not to exhibit the properties as a liquid crystal.

In addition, the lubricating interface deriving agent may be different molecular structure from the liquid crystal material. Specifically, the lubricating interface deriving agent does not have a ring structure in the molecular structure of the low molecular compound, or may have one. Examples of the ring structure include the same structure as the ring structure in the description of the liquid crystal component 13, or in the description of the liquid crystal component 23. In addition, in a case where the lubricating interface deriving agent has two or more ring structures, the ring structures may be at positions which are sufficiently separated from each other by a spacer group or a connector, and as a result, it is preferable that two or more ring structures have a structure different from the core structure having 2 to 4 six-membered rings in the central portion of the molecular structure of the liquid crystal material.

In a case where the lubricating interface deriving agent is a polymer compound, the same structure as that of the molecule compound becomes one desired example. In a case where the lubricating interface deriving agent is a copolymer, at least one or more monomer components may have the same structure as that of the low molecular compound. Alternatively, in a case where the lubricating interface deriving agent is a polymer compound and the liquid crystal component is a low molecular compound, it can be used as long as it causes phase separation due to a difference in molecular weight without exhibiting the same structure as that of the low molecular compound.

(1) Low Molecular Lubricating Interface Deriving Agent

Examples of the low molecular compound (including an oligomer) which can be used as the lubricating interface deriving agent include the following (1-1) to (1-19).

(1-1)

$CH_2=CH(-R^3)-COO-R^2$ ($R^2$ is an alkyl group having C1 to C20, and $R^3$ is a hydrogen atom or a methyl group)

(1-2)

$R^{11}-CH(-R^3)-COO-R^2$ ($R^{11}$ is a hydrogen atom or an alkyl group having C1 to C20, $R^2$ is an alkyl group C1 to C20, and $R^3$ is a hydrogen atom or an alkyl group. Here, $R^{11}+R^3$ is C1 to C20. $R^{11}$, $R^2$, and $R^3$ may be the same as or different from each other.)

(1-3)

Those obtained by substituting a part or the entire alkyl chain of the compound represented by (1-1) or (1-2) with a polyalkylene oxide group such as a polyethylene oxide group or a polypropylene oxide group Examples of PEG-based acrylate include a compound represented by the following formula.

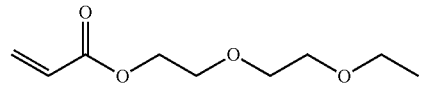

16] 2-(2-Ethoxyethoxy)ethyl Acrylate (1-4)

A modified acrylate monomer other than the compounds described in (1-4), and a modified methacrylate monomer (1-4-1) Modified Acrylate Monomer Examples of a modified acrylate monomer, a modified diacrylate monomer, and a modified triacrylate monomer are as follows.

2-acryloyloxyethyl phthalate, 2-acryloyloxyethyl-2-hydroxyethyl phthalate, 2-acryloyloxyethyl hexahydrophthalate, 2-acryloyloxypropyl phthalate, 2-ethyl-2-butyl-propanediol acrylate, 2,2-diethyl-propanediol acrylate, 2-ethylhexyl acrylate, 2-ethylhexyl carbitol acrylate, 2-hydroxybutyl acrylate, 2-hydroxyethyl acrylate, 2-hydroxypropyl acrylate, 2-methoxyethyl acrylate, trimethylpropane triacrylate, 2-propenoic acid 10-hydroxydecyl, 3-methoxybutyl acrylate, 4-hydroxybutyl acrylate, acrylic acid dimer, fatty acid epoxy acrylate, fatty acid monoacrylate, ECH-modified allyl acrylate, benzyl acrylate, butanediol monoacrylate, butoxyethyl acrylate, caprolactone acrylate, cetyl acrylate, EO-modified cresol acrylate, cyclohexyl acrylate, dicyclopentanyl acrylate, dicyclopentenyl acrylate, dicyclopentenyloxyethyl acrylate, diethylene glycol monoethyl ether acrylate, dimethylaminoethyl acrylate, dimethylol dicyclopentane diacrylate, dipropylene glycol acrylate, ethoxydiethylene glycol acrylate, ethoxylated phenyl acrylate, isoamyl acrylate, isobornyl acrylate, isobutyl acrylate, isodecyl acrylate, isooctyl acrylate, isostearyl acrylate, isomyristyl acrylate, lauroxy polyethylene glycol acrylate, lauryl acrylate, methoxypropylene glycol acrylate, methoxy tripropylene glycol acrylate, methoxy polyethylene glycol acrylate, methoxytriethylene glycol acrylate, neopentyl glycol benzoate acrylate, nonylphenoxyethylene glycol acrylate, nonylphenoxy polyethylene glycol acrylate (n=2), nonylphenoxy polyethylene glycol acrylate (n=4), nonylphenoxy polyethylene glycol acrylate (n=8), nonylphenoxy polyethylene glycol acrylate (n=16 to 17), nonylphenoxy polypropylene glycol acrylate, octafluoropentyl acrylate, octoxypolyethylene glycol-propylene glycol acrylate, octyl/decyl acrylate, paracumyl phenoxy ethylene glycol acrylate, perfluorooctylethyl acrylate, ECH-modified phenoxy acrylate, phenoxydiethylene glycol acrylate, phenoxyethyl acrylate, phenoxy hexaethylene glycol acrylate, phenoxytetraethylene glycol acrylate, poly(ethylene glycol-tetramethylene glycol) acrylate, poly(propylene glycol-tetramethylene glycol) acrylate, stearoxy polyethylene glycol acrylate, EO-modified succinic acid acrylate, t-butyl cyclohexyl acrylate, tetrafluoropropyl acrylate, tetrahydrofurfuryl acrylate, caprolactone-modified tetrahydrofurfuryl acrylate, tribromophenyl acrylate, EO-modified tribromophenyl acrylate, trifluoroethyl acrylate, urethane monoacrylate, β-carboxyethyl acrylate, ω-carboxy-polycaprolactone monoacrylate, diacrylated isocyanurate, 1,3 butylene glycol diacrylate, 1,4-butanediol diacrylate, EO-modified 1,6-hexanediol diacrylate, 1,6-hexanediol diacrylate, ECH-modified 1,6-hexanediol diacrylate, allyloxy polyethylene glycol acrylate, 1,9-nonanediol diacrylate, EO-modified bisphenol A diacrylate (m+n=3), EO-modified bisphenol A diacrylate (m+n=4), EO-modified bisphenol A diacrylate (m+n=7), EO-modified bisphenol A diacrylate (m+n=10), PO-modified bisphenol A diacrylate (m+n=4), modified bisphenol A diacrylate (Ebecryl 150, prepared by Daicel Corporation), 2-methyl-1,4-phenylene-bis[4-[3-(acryloyloxy) propyloxy] benzoate], EO-PO-modified bisphenol A diacrylate, PO-tetramethylene oxide-modified bisphenol A diacrylate, bisphenol A-diepoxy acrylate, EO-modified bisphenol F diacrylate, diethylene glycol diacrylate, epoxy acrylate (bisphenol A type, Mw=520), epoxy acrylate (bisphenol A type, Mw=460), epoxy acrylate (PO-modified bisphenol A type, Mw=810), epoxy acrylate (bisphenol A type, Mw=560), epoxy acrylate (bisphenol F type, Mw=500), epoxy acrylate (bisphenol A type, Mw=510), epoxy acrylate (bisphenol A type, Mw=1950), epoxy acrylate (bisphenol A type, Mw=1100), epoxy acrylate (bisphenol A type, Mw=480), epoxy acrylate (bisphenol A type, Mw=520), epoxy acrylate (soybean oil modified type). ECH-modified hexahydrophthalic acid diacrylate, hydroxyvivaic acid neopentyl glycol diacrylate, neopentyl glycol diacrylate, EO-modified neopentyl glycol diacrylate, PO-modified neopentyl glycol diacrylate, caprolactone-modified hydroxyvaporic acid ester neopentyl glycol diacrylate (m+n=2), caprolactone-modified hydroxyvaporic acid ester neopentyl glycol diacrylate (m+n=4), hydroxyvivaic acid ester neopentyl glycol diacrylate (m+n=4), stearic acid-modified pentaerythritol diacrylate, ECH-modified phthalic acid diacrylate, poly(ethylene glycol-tetramethylene glycol) diacrylate, poly(propylene glycol-tetramethylene glycol) diacrylate, polyester acrylate, polyethylene glycol diacrylate (n=4), polyethylene glycol diacrylate (n=6), polyethylene glycol diacrylate (n=9), polyethylene glycol diacrylate (n=13 or 14), polyethylene glycol-polypropylene glycol-polyethylene glycol diacrylate, polypropylene glycol diacrylate (n=4), polypropylene glycol diacrylate (n=7), polypropylene glycol diacrylate (n=12), polytetramethylene glycol diacrylate, ECH-modified polypropylene glycol diacrylate (n=1), ECH-modified polypropylene glycol diacrylate (n=3), ECH-modified polypropylene glycol diacrylate (n=11), PO-modified bisphenol A diglycidyl ether diacrylate, silicone diacrylate, triethylene glycol diacrylate, tetraethylene glycol diacrylate, tricyclodecanedimethanol acrylate, neopentyl glycol-modified trimethylolpropane diacrylate, tripropylene glycol acrylate, EO-modified tripropylene glycol diacrylate, triglycerol diacrylate, dipropylene glycol diacrylate, zinc diacrylate, ECH-modified glycerol triacrylate, EO-modified glycerol triacrylate, PO-modified glycerol triacrylate, pentaerythritol triacrylate, EO-modified phosphoric acid triacrylate, trimethylolpropane triacrylate, caprolactone-modified trimethylolpropane triacrylate, HPA-modified trimethylolpropane triacrylate, EO-modified trimethylolpropane triacrylate (1+m+n=3), EO-modified trimethylolpropane triacrylate (1+m+n=6), EO-modified trimethylolpropane triacrylate (1+m+n=9), EO-modified trimethylolpropane triacrylate (1+m+n=15), EO-modified trimethylolpropane triacrylate (1+m+n=20), PO-modified trimethylolpropane triacrylate (1+m+n=3), PO-modified trimethylolpropane triacrylate (1+m+n=6), trimethylolpropane benzoate acrylate, tris(acryloxyethyl) isocyanurate, alkoxy-modified trimethylolpropane triacrylate, dipentaerythritol hexaacrylate, caprolactone-modified dipentaerythritol hexaacrylate (m=1, a=2, b=3, prepared by Nippon Kayaku Co., Ltd.), caprolactone-modified dipentaerythritol hexaacrylate (m=1, A=3, b=3, prepared by Nippon Kayaku Co., Ltd.), caprolactone-modified dipentaerythritol hexaacrylate (m=1, A=3, b=0, prepared by Nippon Kayaku Co., Ltd.), dipentaerythritol hydroxypentaacrylate, dipentaerythritol penta and hexaacrylate (prepared by Toagosei Company, Limited), dipentaerythritol penta and hexaacrylate-based polyfunctional monomer mixed material, alkyl-modified dipentaerythritol pentaacrylate, dipentaerythritol polyacrylate (Mw=570), alkyl-modified dipentaerythritol triacrylate, trimethylolpropane tetraacrylate, epoxy acrylate (bisphenol A type, Mw=920), epoxy acrylate (phosphoric acid modified type, Mw=560), pentaerythritol acrylate mixed ester, pentaerythritol ethoxytetraacrylate, pentaerythritol tetraacrylate, silicone hexaacrylate, lactone-modified flexible acrylate (Mw=344), lactone-modified flexible acrylate (Mw=230), lactone-modified flexible acrylate (Mw=458), aminoacrylate (Ebecryl P115, prepared by Daicel Corporation), aminoacrylate (Ebecryl 7100, prepared by Daicel Corporation), 4-acryloyl morpholine, imide acrylate, imide acrylate (Aronix TO-1534, prepared by Toagosei Company, Limited), imide acrylate (Aronix TO-1429, prepared by Toagosei Company, Limited), imide acrylate (Aronix TO-1428, prepared by Toagosei Company, Limited), and 3-(trimethoxysilyl) propyl acrylate.

(1-4-2) Modified Methacrylate Monomer

Examples of a modified methacrylate monomer, a modified dimethacrylate monomer, and a modified trimethacrylate monomer are as follows.

1,3-butylene glycol dimethacrylate, 2-ethylhexyl methacrylate, 2-hydroxy-3-acroyloxypropyl methacrylate, 2-hydroxy-3-methacryloyloxypropylmethylammonium chloride, 2-hydroxybutyl methacrylate, 2-hydroxyethyl methacrylate, 2-hydroxypropyl methacrylate, 3-chloro-2-hydroxypropyl methacrylate, alkyl methacrylate (n=12 to 13) (prepared by KYOEISHA CHEMICAL Co., LTD), alkyl methacrylate (n=12 to 15) (prepared by KYOEISHA CHEMICAL Co., LTD), alkyl methacrylate (n=12 to 18) (prepared by KYOEISHA CHEMICAL Co., LTD), alkyl methacrylate (n=18 to 24) (prepared by KYOEISHA CHEMICAL Co., LTD), allyl methacrylate, benzyl methacrylate, butoxyethyl methacrylate, butyl methacrylate, cyclohexyl methacrylate, dicyclopentanyl methacrylate, dicyclopentenyloxyethyl methacrylate, diethyl aminoethyl methacrylate, dimethyl aminoethyl methacrylate quaternary, dimethyl aminoethyl methacrylate, lactone-modified flexible methacrylate (Mw=472), lactone-modified flexible methacrylate (Mw=244), lactone-modified flexible methacrylate (Mw=358), glycerol methacrylate, glycerol polymethacrylate, glycidyl methacrylate, hexafluoropropyl methacrylate, isobornyl methacrylate, isobutyl methacrylate, isodecyl methacrylate, lauroxy polyethylene glycol methacrylate, lauryl methacrylate, methacrylic acid, methoxydiethylene glycol methacrylate, methoxytriethylene glycol methacrylate, methoxytetraethylene glycol methacrylate, methoxy polyethylene glycol methacrylate (n=8 or 9), methoxy polyethylene glycol methacrylate (n=23 or 30), methoxy polyethylene glycol methacrylate (n=50 to 60), methoxy polyethylene glycol methacrylate (n=8 or 9), nonylphenoxy poly(ethylene glycol-propylene glycol) methacrylate (m=5, n=2), nonylphenoxy polyethylene glycol methacrylate, nonylphenoxy polypropylene glycol methacrylate, octafluoropentyl methacrylate, octoxypolyethylene glycol-propylene glycol methacrylate, pentamethylpiperidyldimyl methacrylate, perfluorooctyl methacrylate, phenoxyethyl methacrylate, EO-modified phosphoric acid methacrylate, EO-PO-modified phthalic acid methacrylate, EO-modified phthalic acid methacrylate, polyethylene glycol-polypropylene glycol methacrylate, poly(ethylene glycol-tetramethylene glycol) methacrylate, poly(propylene glycol-tetramethylene glycol) methacrylate, polyethylene glycol methacrylate (n=3 to 20), polyethylene glycol methacrylate (n=6), polypropylene glycol methacrylate (n=5), polypropylene glycol methacrylate (n=5 to 6), polypropylene glycol methacrylate (n=6), polypropylene glycol methacrylate (n=9, 13, or 16), isostearyl methacrylate, EO-modified succinic acid methacrylate, t-butyl cyclohexyl methacrylate, tetrafluoropropyl methacrylate, tetrahydrofurfuryl methacrylate, tetramethyl piperidyl methacrylate, tribromophenyl methacrylate, tribromophenyl methacrylate, trifluoroethyl methacrylate, zinc methacrylate, γ-methacryloxytrimethoxysilane, polyethylene glycol methacrylate (n=2 to 8, prepared by NOF Corporation), 1,4-butanediol methacrylate, 1,6-hexanediol methacrylate, 1,9-nonanediol methacrylate, 1,10-decanediol methacrylate, allyloxy polyethylene glycol methacrylate, EO-modified bisphenol A dimethacrylate (m+n=2), EO-modified bisphenol A dimethacrylate (m+n=2 or 6), EO-modified bisphenol A dimethacrylate (m+n=4), EO-modified bisphenol A dimethacrylate (m+n=7), EO-nmodified bisphenol A dimetbacrylate (m+n=10), EO-modified bisphenol A dimethacrylate (m+n=30), EO-PO-modified bisphenol A dimethacrylate, EO-PO-modified (block type) bisphenol A dimethacrylate, PO-tetramethylene oxide-modified bisphenol A dimethacrylate, PO-modified bisphenol A dimethacrylate, diethylene glycol dimethacrylate, ethylene glycol dimethacrylate, ECH-modified ethylene glycol dimethacrylate, glycerol acrylate methacrylate, glycerol dimethacrylate, neopentyl glycol dimethacrylate, ECH-modified phenoxydimethacrylate, EO-modified phosphoric acid dimethacrylate, polytetramethylene glycol dimethacrylate, poly(ethylene glycol-tetramethylene glycol) dimethacrylate, poly(propylene glycol-tetramethylene glycol) dimethacrylate, polyethylene glycol dimethacrylate (n=4, Mw=330), polyethylene glycol dimethacrylate (n=9, Mw=550), polyethylene glycol 600 dimethacrylate (n=13 or 14, Mw=736), polyethylene glycol dimethacrylate (n=23, Mw=736), ECH-modified polyethylene glycol dimethacrylate (n=2), ECH-modified polyethylene glycol dimethacrylate (n=9), polyethylene glycol-polypropylene glycol-polyethylene glycol dimethacrylate, polypropylene glycol dimethacrylate (n=4), polypropylene glycol dimethacrylate (n=9), PO-modified bisphenol A diglycidyl ether dimethacrylate, triethylene glycol dimethacrylate, tetraethylene glycol dimethacrylate, zinc dimethacrylate, EO-modified phosphoric acid dimethacrylate, EO-modified tetrabromobisphenol A dimethacrylate, trimethylolpropane trimethacrylate, HPA-modified trimethylolpropane trimethacrylate, phosphorus-containing methacrylic acid ester (New Frontier S-510, prepared by DKS Co. Ltd.), phosphorus-containing epoxy methacrylate (New Frontier S-23A, prepared by DKS Co. Ltd.), siloxane methacrylate represented by the following formula,

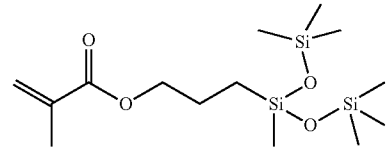 [SMILES: C=C(C)C(=O)OCCC[Si](C)(O[Si](C)(C)C)O[Si](C)(C)C]

tetravalent polymerizable siloxane methacrylate represented by the following formula.

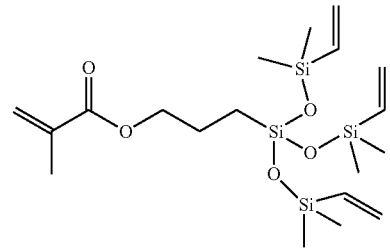 [SMILES: C=C[Si](C)(C)O[Si](CCCOC(=O)C(=C)C)(O[Si](C)(C)C=C)O[Si](C)(C)C=C]

(1-5)

Those obtained by substituting at least one of one or two or more $CH_2=C(-R^3)-$ groups ($R^3$ is a hydrogen atom or an alkyl group) of the compounds described in (1-4) with a $R^{11}-CH(-R^3)-$ group ($R^{11}$ is a hydrogen atom or an alkyl group having C1 to C20, and $R^3$ is a hydrogen atom or an alkyl group. Here, $R^{11}+R^3$ is C1 to C20. $R^{11}$ and $R^3$ may be the same as or different from each other.).

(1-6)

As the (meth)acrylate having two or more hydroxyl groups, the following compounds are exemplary examples. Examples thereof include diglycidyl ether of a dihydric alcohol such as propylene glycol, butanediol, pentanediol, hexanediol, diethylene glycol, dipropylene glycol, triethylene glycol, tripropylene glycol, tetraethylene glycol, polyethylene glycol, polypropylene glycol, neopentyl glycol, neopentyl glycol hydroxypivalate, bisphenol A, and ethoxylated bisphenol A;

an epoxy acrylate compound obtained by adding (meth)acrylic acid to an epoxy compound such as triglycidyl ether of a trihydric alcohol such as trimethylol propane, ethoxylated trimethylol propane, propoxylated trimethylol propane, and glycerin, pentaerythritol tri(meth)acrylate, dipentaerythritol penta(meth)acrylate, glycerin di(meth)acrylate, trimethylolpropane di(meth)acrylate, and ditrimethylolpropane tri(meth)acrylate, and as a compound derived from an epoxy resin and a carboxylic acid, a (meth)acrylic acid adduct of glycidyl (meth)acrylate, alcohol di(meth)acrylate having a hydroxyl residue such as trimethylolpropane di(meth)acrylate, ethoxylated trimethylolpropane di(meth)acrylate, propoxylated trimethylolpropane di(meth)acrylate, tris-2-hydroxyethyl isocyanurate di(meth)acrylate, glycerin di(meth)acrylate, alcoholic polyfunctional (meth) acrylate having a hydroxyl residue such as pentaerythritol di(meth)acrylate, dipentaerythritol di(meth)acrylate, ditrimethylolpropane di(meth)acrylate, pentaerythritol tri(meth)acrylate, dipentaerythritol tri(meth)acrylate, trimethylolpropane tri(meth)acrylate, dipentaerythritol tetra(meth)acrylate, ditrimethylolpropane tetra(meth)acrylate, dipentaerythritol hexa(meth)acrylate, and ditrimethylolpropane hexa(meth)acrylate, (meth)acrylate obtained by adding a (meth)acrylic acid to an epoxy compound such as a polyhydric phenol having at least one aromatic ring or a polyglycidyl ether of an alkylene oxide adduct thereof, and alicyclic epoxy acrylate of hydrogenated type of aromatic epoxy acrylate.

Here, as the polyhydric phenol, a bisphenol compound such as bisphenol A, bisphenol F, and bisphenol S, and an alkylene oxide adduct of the bisphenol compound, phenol novolaks, cresol novolaks, and the like can be used.

(1-7)

Those obtained by substituting one or two or more hydroxyl groups among the compounds described in (1-6) with a hydrogen atom (1-8)

Those obtained by substituting at least one of one or two or more $CH_2$—$C(-R^3)$— groups of the compounds described in (1-6) or (1-7) with a $R^{11}$—$CH(-R^3)$— group ($R^{11}$ is a hydrogen atom or an alkyl group having C1 to C20, and $R^3$ is a hydrogen atom or an alkyl group. Here, $R^{11}+R^3$ is C1 to C20. $R^{11}$ and $R^3$ may be the same as or different from each other.)

(1-9)

Examples of the (meth)acrylate having a carboxyl group are as follows.

Regarding (meth)acrylate having a carboxyl group, the hydrophilic nature of the carboxyl group is sufficiently high, and thus the number of the carboxyl groups per molecule is not particularly limited, and one or two or more carboxyl groups may be used.

However, as the number of the carboxyl groups increases, the solubility in solvents becomes worse and the crystallization of the compound also increases. Therefore, it is preferable that the number of the carboxyl groups is small as far as the resistance to adhesion members or solvents does not deteriorate. In particular, in a case of a compound having a carboxyl group directly bonded to an aromatic ring, the number of the carboxyl groups per molecule is particularly preferably equal to or less than 2.

Specific examples thereof include a compound having at least one (meth)acryloyl group in a carboxy group and one molecule, such as 2-(meth)acryloyloxyethyl hexahydrophthalate, 2-acryloyloxyethyl phthalate, 2-methacryloyloxyethyl phthalate, EO-modified succinic acid acrylate, a compound obtained by adding an acid anhydride such as phthalic anhydride to a hydroxyl group-containing vinyl monomer such as 2-hydroxyethyl (meth) acrylate, and a benzoic acid derivative substituted with an alkyl (oxy) group having a (meth)acryloyloxy group introduced to a terminal thereof. The number of the substituents may be one or more, and the number of the substituents is preferably in a range of 1 to 3 in terms of ease of synthesis. In addition, in a case where a plurality of the substituents are introduced, it is preferable to select a position that lowers the symmetry of the molecule as a substitution position from the aspect that the crystallization is not excessively increased. Specific examples thereof include a 2-(ω-(meth)acryloyloxyalkyl (oxy)) benzoic acid, a 2,3-di(ω-(meth)acryloyloxyalkyl (oxy)) benzoic acid, a 2,4-di(ω-(meth)acryloyloxyalkyl (oxy)) benzoic acid, a 2,5-di(ω-(meth)acryloyloxyalkyl (oxy)) benzoic acid, a 3-(ω-(meth)acryloyloxyalkyl (oxy)) benzoic acid, a 3,4-di(ω-(meth)acryloyloxyalkyl (oxy)) benzoic acid, and a 4-(ω-(meth)acryloyloxyalkyl (oxy)) benzoic acid, which have the number of methylene groups of the alkyl chain in a range of 1 to 14. Particularly, the number of the methylene groups is more preferably in a range of 2 to 10.

(1-10)

Those obtained by substituting at least one of one or two or more $CH_2$—$C(-R^3)$— groups of the compound described in (1-9) with a $R^1$—$CH(-R^3)$— group ($R^{11}$ is a hydrogen atom or an alkyl group having C1 to C20, and $R^3$ is a hydrogen atom or an alkyl group. Here, $R^{11}+R^3$ is C1 to C20. $R^{11}$ and $R^3$ may be the same as or different from each other.)

(1-11)

A compound having two or more epoxy groups.

Examples thereof include a diglycidyl ether compound of aliphatic polyol such as ethylene glycol, hexanediol, neopentyl glycol, trimethylol propane, trimethylolethane, glycerin, pentaerythritol, sorbitol, and hydrogenated bisphenol A; a polyglycidyl ether compound of aromatic polyol bisphenol A, bisphenol F, bisphenol S, dihydroxyphenyl ether, dihydroxybenzophenone, a cresol formaldehyde resin, phenol formaldehyde, a naphthol phenyl aldehyde resin, methylene bisaniline, dihydroxynaphthalene, a naphthol dimer, tetramethyl biphenol, resorcin, hydroquinone, and catechol; a polyglycidyl ether compound of a polyether polyol such as polyethylene glycol, polypropylene glycol, and polytetraethylene glycol.

Examples thereof further include a polyglycidyl ether compound of tris(2-hydroxyethyl) isocyanurate; a polyglycidyl ether compound of an aliphatic or aromatic polycarboxylic acid such as an adipic acid, a butanetetracarboxylic acid, a propanetricarboxylic acid, a phthalic acid, a terephthalic acid, and a trimellitic acid, a bisepoxide compound of a hydrocarbon-based diene such as butadiene, hexadiene, octadiene, dodecadiene, cyclooctadiene, α-pinene, and vinylcyclohexene; and an alicyclic polyepoxy compound such as bis(3,4-epoxycyclohexylmethyl) adipate, and 3,4-epoxycyclohexylmethyl-3,4-epoxycyclohexyl carboxylate.

These epoxy compounds may be used alone or two or more kinds thereof may be used in combination.

In addition, the molecular weight and other physical properties of these epoxy compounds are also not particularly limited, but those having the molecular weight in a range of 100 to 3000 are usually used in terms of easy blending.

(1-12)

A compound obtained by substituting one of the compound described in (1-11), or one or more epoxy groups with C=C or C—C under the condition that at least one or more epoxy groups remain.

(1-13)

A monomer compound which can be used as the lubricating interface deriving agent may be a monomer represented by P—R (P is a polymerizable group, R is a linear or branched alkyl group having 1 to 0 carbon atoms, and the non-adjacent —CH$_2$— in the alkyl group may be substituted with —COO—, —OCO—, —CO—, —CH=CH—, —C≡C—, —O—, and —CH(O)CH—). Examples of the polymerizable group of P include a polymerizable group represented by Formulae (III-1) to (III-17).

With a monomer having an alkyl chain having different lengths which belongs to the kinds of (1-13), the interface in contact with the liquid crystal component becomes uneven with unevenness, the liquid crystal compound becomes low order in the vicinity, and the liquid crystal phase cannot be maintained, and thus a slippery interface can be formed.

(1-14)

As monomer compound which can be used as a lubricating interface deriving agent, a monomer represented by P-Sp-Zm (P is a polymerizable group, Sp is a spacer group, and a Zm is a mesogenic group) may be used. Examples of the polymerizable group of P include a polymerizable group represented by Formulae (III-1) to (III-17). Examples of a spacer group of Sp include the same divalent group as Sp, described later. Examples of a mesogenic group of Zm include a mesogenic group of the following formula.

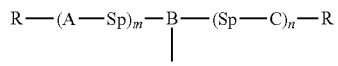

(R's are each independently a hydrogen atom, an alkyl group or a halogen atom, the hydrogen atom in the alkyl group may be substituted with a halogen atom, the hydrogen atom in the alkyl group may be substituted with a halogen atom, the non-adjacent —CH$_2$— in the alkyl group may be substituted with —COO—, —OCO—, —CO—, —CH=CH—, —C≡C—, —O—, and —CH(O)CH—, A and C are each independently a divalent cyclic group, B is a trivalent cyclic group, A, B, and C may have a substituent, Sp each independently a spacer group, and m and n each independently an integer in a range of 0 to 5)

A monomer having a mesogenic group which belongs to the kinds of (1-14) is connected to the main chain via a spacer group in meta or ortho as in the above trivalent cyclic group of B. On the other hand, since ordinary liquid crystal molecules emphasize linearity, the ring structure is connected at the para position. With this, the instability of the liquid crystal phase occurs, and slippery interface can be formed.

(1-15)

As monomer compound which can be used as a lubricating interface deriving agent, a monomer represented by P-Sp-Zp (P is a polymerizable group, Sp is a spacer group, and Zp represents a photoisomerizable group) may be used. Examples of the polymerizable group of P include a polymerizable group represented by Formulae (III-1) to (III-17). Examples of a spacer group of Sp include the same divalent group as Sp, described later. Examples of a photoisomerizable group of Zp include a group having an azobenzene structure. Specific examples of a group having an azobenzene structure include a divalent group represented by General Formula (P-a-1) to General Formula (P-d-8). Examples of Zp include a divalent group represented by General Formula (P-e-7) in addition to the above-described examples.

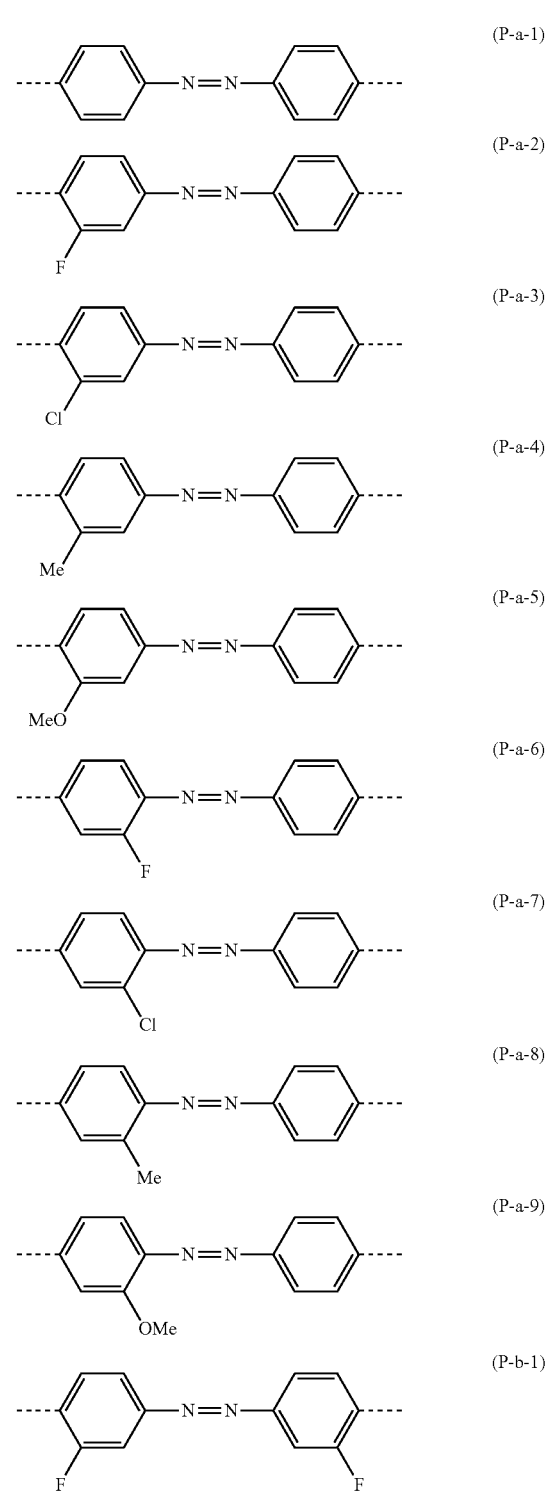

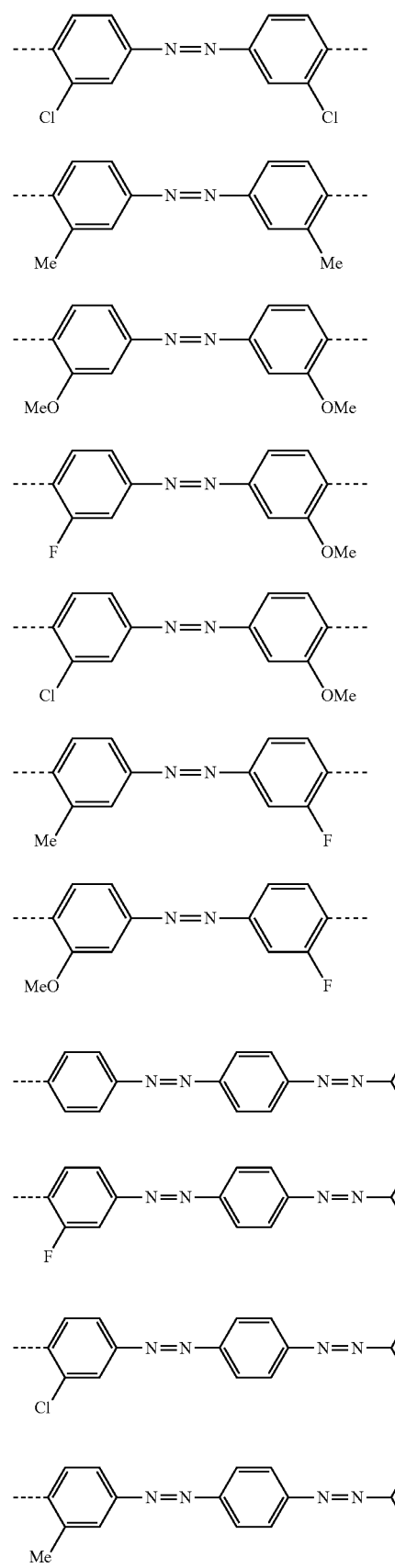
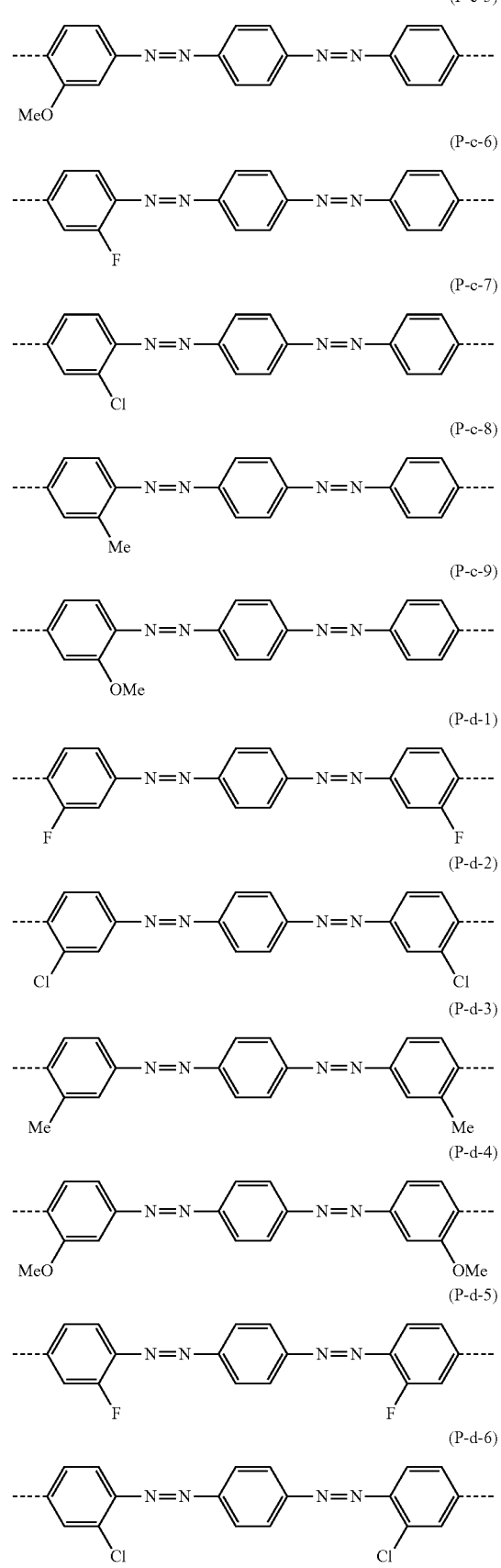

(P-d-7)
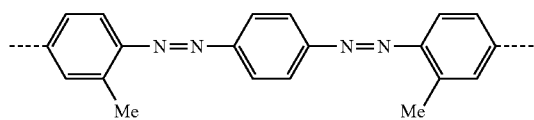

(P-d-8)
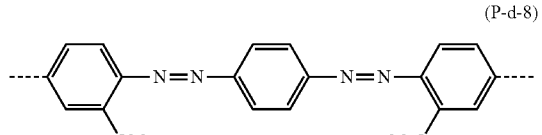

(P-e-1)
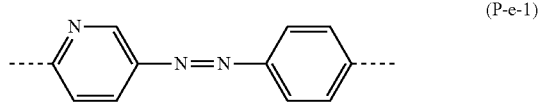

(P-e-2)
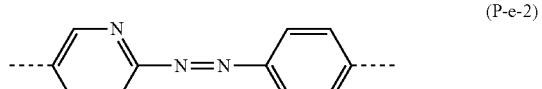

(P-e-3)
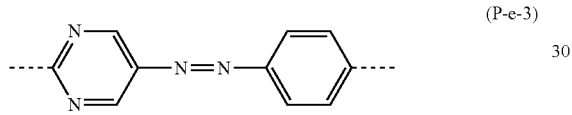

(P-e-4)
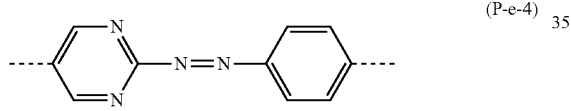

(P-e-5)
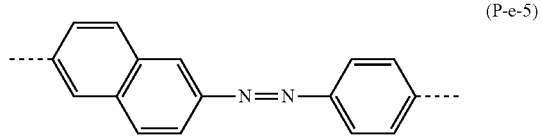

(P-e-6)
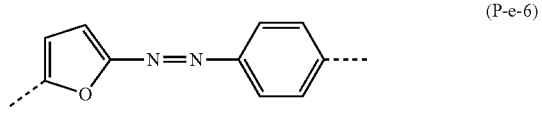

(P-e-7)
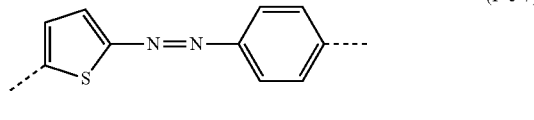

By photoisomerization of cis-trans of the azobenzene structure, it is possible to disturb the alignment order of liquid crystals so as to form a slippery interface. For this reason, it is possible to control the slippery state by irradiating UV of the wavelength to be photoisomerized. Thus, partial control can be performed.

(1-16)
Fluorine-based lubricant, fluorine-based monomer, and fluorine-based surfactant Examples of the fluorine-based lubricant include the following matters.

FC-40
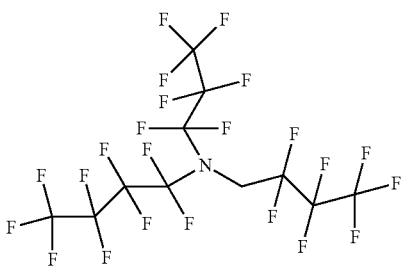

Examples of the fluorine-based monomer include the following matters.

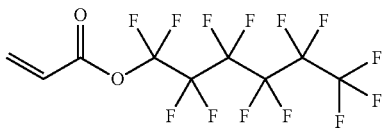 [SMILES: C=CC(=O)OC(F)(F)C(F)(F)C(F)(F)C(F)(F)C(F)(F)C(F)(F)F]

3,3,4,4,5,5,6,6,7,7,8,8,8-Tridecafluorooctyl Acrylate

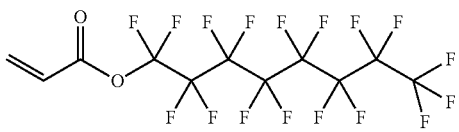 [SMILES: C=CC(=O)OC(F)(F)C(F)(F)C(F)(F)C(F)(F)C(F)(F)C(F)(F)C(F)(F)C(F)(F)F]

3,3,4,4,5,5,6,6,7,7,8,8,8,9,9,10,10-Tridecafluorooctyl Acrylate

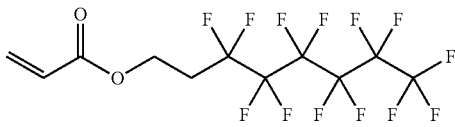 [SMILES: C=CC(=O)OCCC(F)(F)C(F)(F)C(F)(F)C(F)(F)C(F)(F)C(F)(F)F]

3,3,4,4,5,5,6,6,7,7,8,8,8-Tridecafluorooctyl Acrylate

Examples of the fluorine-based surfactant include the following matters.

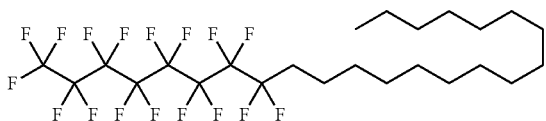 [SMILES: CCCCCCCCCCCCCCCCC(F)(F)C(F)(F)C(F)(F)C(F)(F)C(F)(F)C(F)(F)C(F)(F)C(F)(F)F]

1,1,1,2,2,3,3,4,4,5,5,6,6,7,7,8,8-Heptadecafluorotetastacosane

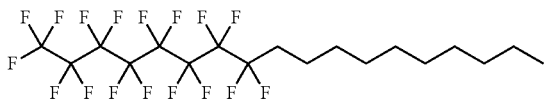 [SMILES: CCCCCCCCCCC(F)(F)C(F)(F)C(F)(F)C(F)(F)C(F)(F)C(F)(F)C(F)(F)C(F)(F)F]

1,1,1,2,2,3,3,4,4,5,5,6,6,7,7,8,8-Heptadecafluorooctadecane (1-17)
Examples of a PEG-based lubricant include hexaethylene glycol dimethyl ether, tetraethylene glycol dimethyl ether, triethylene glycol dimethyl ether, and dipropylene glycol dimethyl ether.

Examples of a PEG-based surfactant include hexaethylene glycol dimethyl ether, tetraethylene glycol dimethyl ether, triethylene glycol dimethyl ether, and dipropylene glycol dimethyl ether.

(1-18)
Examples of an amide-based lubricant include N,N-dimethyl methanamide, N,N-dimethyl dodecanamide, N,N'-diacetyl-1,6-diaminohexane, and N-palmitoyl isopropylamide.

(1-19)
Exemplary examples of specific compounds will be described in (1-1) to (1-15).

methyl (meth)acrylate, ethyl (meth)acrylate, 2-hydroxyethyl acrylate, propyl (meth)acrylate, 2-hydroxypropyl (meth)acrylate, butyl (meth)acrylate, tert-butyl (meth)acrylate, tridecyl (meth)acrylate, isobutyl (meth)acrylate, 4-hydroxybutyl (meth)acrylate, 2-hydroxybutyl (meth)acrylate, octyl (meth)acrylate, 2-ethylhexyl (meth)acrylate, dodecyl (meth)acrylate, stearyl (meth)acrylate, cetyl (meth)acrylate, behenyl (meth)acrylate, cyclohexyl (meth)acrylate, dicyclopentanyloxyl ethyl (meth)acrylate, isobornyloxyl ethyl (meth)acrylate, isobornyl (meth)acrylate, adamantyl (meth)acrylate, dimethyl adamantyl (meth)acrylate, dicyclopentanyl (meth)acrylate, dicyclopentenyl (meth)acrylate, methoxyethyl (meth)acrylate, ethyl carbitol (meth)acrylate, tetrahydrofurfuryl (meth)acrylate, benzyl (meth)acrylate, phenoxyethyl (meth)acrylate, 2-phenoxydiethylene glycol (meth)acrylate, 2-hydroxy-3-phenoxyethyl (meth)acrylate, (2-methyl-2-ethyl-1,3-dioxolan-4-yl) methyl (meth)acrylate, (3-ethyloxetane-3-yl) methyl (meth)acrylate, o-phenyl phenol ethoxy (meth)acrylate, dimethylamino (meth)acrylate, diethylamino (meth)acrylate, 2,2,3,3-pentafluoropropyl (meth)acrylate, 2,2,3,4,4,4-hexafluorobutyl (meth)acrylate, 2,2,3,3,4,4,4-heptafluorobutyl (meth)acrylate, 2-(perfluorobutyl) ethyl (meth)acrylate, 2-(perfluorohexyl) ethyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H-1-(trifluoromethyl) trifluoroethyl (meth)acrylate, 1H,1H,3H-hexafluorobutyl (meth)acrylate, 1,2,2,2-tetrafluoro-1-(trifluoromethyl) ethyl (meth)acrylate, 1H,1H-pentadecafluorooctyl (meth)acrylate, 1H,1H,2H,2H-tridecafluorooctyl (meth)acrylate, monovalent epoxy (meth)acrylate such as 2-(meth)acryloyloxyethyl phthalate, 2-(meth)acryloyloxyethyl hexahydrophthalate, and glycidyl (meth)acrylate, 2-(meth)acryloyloxyethyl phosphate, mono (meth)acrylate such as 4-acryloyl morpholine, dimethyl (meth)acrylamide, dimethyl aminopropyl (meth)acrylamide, iropropyl (meth)acrylamide, diethyl (meth)acrylamide, hydroxyethyl (meth)acrylamide, N-dodecyl (meth)acrylamide, and N-acryloyloxyethyl hexahydrophthalimide, diacrylate such as 1,4-butanediol di(meth)acrylate, 1,6-hexanediol di(meth)acrylate, 1,9-nonanediol di(meth)acrylate, neopentyl diol di(meth)acrylate, polyethylene glycol (meth)acrylate, polypropylene glycol (meth)acrylate (n=6), polypropylene glycol (meth)acrylate (n=9), polypropylene glycol (meth)acrylate (n=13), tripropylene glycol di(meth)acrylate, ethylene glycol di(meth)acrylate, diethylene glycol di(meth)acrylate, triethylene glycol di(meth)acrylate, ethylene oxide-modified bisphenol A di(meth)acrylate, tricyclodecanedimethanol di(meth)acrylate, 9,9-bis [4-(2-acryloyloxyethoxy) phenyl]fluorene, glycerin di(meth)acrylate, 2-hydroxy-3-acryloyloxypropyl methacrylate, an acrylic acid adduct of 1,6-hexanediol diglycidyl ether, and an acrylic acid adduct of 1,4-butanediol diglycidyl ether, tri(meth)acrylate such as trimethylolpropane tri(meth)acrylate, ethoxylated isocyanuric acid triacrylate, pentaerythritol tri(meth)acrylate, and ε-caprolactone-modified tris-(2-acryloyloxyethyl) isocyanurate, tetra(meth)acrylate such as pentaerythritol tetra(meth)acrylate, and ditrimethylolpropane tetra(meth)acrylate, an epoxy compound such as dipentaerythritol hexa(meth)acrylate, oligomer type (meth)acrylate, various urethane acrylates, various macromonomers, ethylene glycol diglycidyl ether, diethylene glycol diglycidyl ether, propylene glycol diglycidyl ether, neopentyl glycol diglycidyl ether, 1,6-hexanediol diglycidyl ether, glycerin diglycidyl ether, and bisphenol A diglycidyl ether, ester compounds such as ethyl laurate and tridecyl acetate, a polyalkylene oxide such as polyethylene glycol, propylene glycol (the number of carbon atoms of an alkylene group is preferably in a range of 2 to 20), maleimide, 1,2-bis(maleimido) ethane, maleimidomethyl maleimide ethyl ether, bis(maleimide) methyl ether, bis(maleimidomethoxy) methane, 4-propanoyl morpholine, 4-nonanoyl morpholine, 2-ethyl-1-morpholin-4-yl-hexan-1-one, methyl 12-tridecinate, and sebacic acid monoethyl ester.

(2) High Molecular Lubricating Interface Deriving Agent

Examples of the polymer compounds which can be used as a lubricating interface deriving agent include the following polymer compounds described in the following (2-1) to (2-5).

(2-1)
(1) Homopolymer for those having a polymerizable group, block, random, or alternating copolymer which has polymer in a part of high molecule, among the exemplary examples of compounds for the low molecular lubricating interface deriving agent Those obtained by polymerizing monomers corresponding to each of the compounds described in (1-1) to (1-15) may be a single homopolymer, a copolymer obtained by copolymerizing a plurality of monomers belonging to the kinds of (1-1) to (1-15), and a copolymer obtained by copolymerizing a plurality of kinds of monomers. For example, two or three or more monomers belonging to the kinds of (1-13) may be copolymerized, two or three or more monomers belonging to the kinds of (1-14) may be copolymerized, two, three, or four or more monomers belonging to the kinds of (1-14) may be copolymerized, two or three or more monomers belonging to the kinds of (1-15).

When two or three or more monomers belonging to the kinds of (1-13) are copolymerized, it is possible to obtain a polymer compound having two or three or more long-chain alkyl side chains.

When a monomer having a mesogenic group which belongs to the kinds of (1-14) is polymerized, it is possible to obtain a polymer compound having a mesogenic group at a side chain.

When a monomer having a photoisomerizable group which belongs to the kinds of (1-15) is polymerized, it is possible to obtain a polymer compound having a photoisomerizable group at a side chain.

(2-2)

Polyethylene glycol, polyalkylene oxide such as propylene glycol (the number of carbon atoms of an alkylene group is preferably in a range of 2 to 20)

(2-3)

Block, random, or alternating copolymer which has one or more polyalkylene oxides such as polyethylene glycol and propylene glycol (the number of carbon atoms of an alkylene group is preferably in a range of 2 to 20) in a part of high molecule.

(2-4)

Those having side chain type liquid crystal component as one component of copolymer of compounds described in (2-1) or (2-3). The liquid crystal structure of the side chain type liquid crystal component is obtained by directly bonding the structure of the liquid crystal which is already an exemplary example to the polymerizable group, or via a spacer group such as an alkylene group.

(2-5)

High molecule having the following groups at a side chain or a main chain.

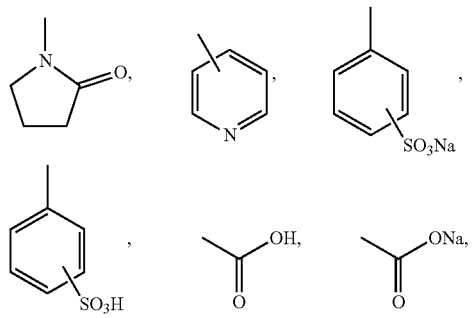

Examples of the polymer having an amide group include polyvinyl pyrrolidone and polyacrylamide.

In addition, examples of the polymer having a pyridyl group include poly(2-vinylpyridine), poly(4-vinylpyridine), a 2-vinylpyridinestyrene copolymer, a 4-vinylpyridine/styrene copolymer, and a 4-vinylpyridine/methacrylate copolymer.

In addition, examples of the polymer having a sulfo group include a poly(vinylsulfonic acid) and sodium salt thereof, and a poly(p-styrene sulfonic acid) and sodium salt thereof.

Further, examples of the polymer having a carboxy group include a polyacrylic acid or a sodium salt thereof a polymethacrylic acid or a sodium salt thereof, an acrylic acid/acrylamide copolymer or a sodium salt thereof, an acrylic acid/maleic acid copolymer or a sodium salt thereof, an ethylene/acrylic acid copolymer, an acrylonitrile/acrylic acid copolymer, a polymaleic acid, a styrene/maleic acid copolymer or a sodium salt thereof, an isobutylene/maleic acid copolymer or a sodium salt thereof, a styrene sulfonic acid/maleic acid copolymer or a sodium salt thereof, a methyl vinyl ether/maleic acid copolymer, and a vinyl chloride/vinyl acetate/maleic acid copolymer.

(3) Ionic Liquid

As an ionic liquid which can be used as a lubricating interface deriving agent, a known ionic liquid can be used without particular limitation. Here, the ionic liquid refers to a liquid among ionic compounds formed of an anion moiety and a cation moiety. Specifically, the melting point of the ionic liquid is preferably equal to or lower than 100° C., is more preferably equal to or lower than 60° C., is still more preferably equal to or lower than 30° C., and is particularly preferably a liquid at room temperature.

Examples of the cation moiety of the ionic liquid which can be used as a lubricating interface deriving agent include an imidazolium cation, an ammonium cation, a pyridinium cation, a pyrrolidinium cation, a piperidinium cation, and a phosphonium cation. The cation moiety of the ionic liquid is preferably an imidazolium cation.

Examples of the imidazolium cation include 1-hexadecyl-3-methyl imidazolium (C16), 1-butyl-3-methyl imidazolium (C6), 1-dodecyl-3-methyl imidazolium, 1-hexyl-3-methyl imidazolium, 1-(2-(acryloyloxy) ethyl)-3-ethyl imidazolium, 1-methyl imidazolium, 1-methyl-3-ethyl imidazolium, 1-methyl-3-butyl imidazolium, 1-ethyl-3-methyl imidazolium, 1-butyl-3-methyl imidazolium, 1-benzyl-3-methyl imidazolium, 1,3-dimethyl imidazolium, 1,3-diethyl imidazolium, 1,2,3-trimethyl imidazolium, 1,3,4-trimethyl imidazolium, 1-ethyl-2,3-dimethyl imidazolium, 1-ethyl-3,4-dimethyl imidazolium, 1-ethyl-3,5-dimethyl imidazolium, 2-ethyl-1,3-dimethyl imidazolium, 4-ethyl-1,3-dimethyl imidazolium, 1,2-diethyl-3-methyl imidazolium, 1,4-diethyl-3-methyl imidazolium, 1,5-diethyl-3-methyl imidazolium, 1,3-diethyl-2-methyl imidazolium, and 1,3-diethyl-4-methyl imidazolium.

Examples of the imidazolium cation further include 1,2,3-triethyl imidazolium, 1,3,4-triethyl imidazolium, 1,2,3,4-tetramethyl imidazolium, 1-ethyl-2,3,4-trimethyl imidazolium, 1-ethyl-2,3,5-trimethyl imidazolium, 1-ethyl-3,4,5-trimethyl imidazolium, 2-ethyl-1,3,4-trimethyl imidazolium, 4-ethyl-1,2,3-trimethyl imidazolium, 1,2-diethyl-3,4-dimethyl imidazolium, 1,3-diethyl-2,4-dimethyl imidazolium, 1,4-diethyl-2,3-dimethyl imidazolium, 2,4-diethyl-1,3-dimethyl imidazolium, 4,5-diethyl-1,3-dimethyl imidazolium, 1,2,3-triethyl-4-methyl imidazolium, 1,2,4-triethyl-3-methyl imidazolium, 1,2,5-triethyl-3-methyl imidazolium, 1,3,4-triethyl-2-methyl imidazolium, 1,3,4-triethyl-5-methyl imidazolium, 1,4,5-triethyl-3-methyl imidazolium, 1,2,3,4,5-pentamethyl imidazolium, and 1-methyl-3-propyl imidazolium.

Examples of the ammonium cation include tetramethyl ammonium, tetraethyl ammonium, tetrapropyl ammonium, tetrabutyl ammonium, tetrapentyl ammonium, tetrahexyl ammonium, tetraheptyl ammonium, tetraoctyl ammonium, tetranonyl ammonium, tetradecyl ammonium, tetradodecyl ammonium, ethyl trimethyl ammonium, diethyl dimethyl ammonium, triethyl methyl ammonium, trimethyl propyl ammonium, trimethyl isopropyl ammonium, ethyl dimethyl propyl ammonium, ethyl dimethyl isopropyl ammonium, diethyl methyl propyl ammonium, diethyl methyl isopropyl ammonium, dimethyl dipropyl ammonium, dimethyl propyl isopropyl ammonium, dimethyl diisopropyl ammonium, triethyl propyl ammonium, and butyl trimethyl ammonium.

Examples of the ammonium cation further include isobutyl trimethyl ammonium, tert-butyl trimethyl ammonium, triethyl isopropyl ammonium, ethyl methyl dipropyl ammonium, ethyl methyl diisopropyl ammonium, butyl ethyl dimethyl ammonium, isobutyl ethyl dimethyl ammonium, tert-butyl ethyl dimethyl ammonium, diethyl dipropyl ammonium, diethyl propyl diisopropyl ammonium, diethyl diisopropyl ammonium, methyl tripropyl ammonium, methyl dipropyl isopropyl ammonium, methyl propyl diisopropyl ammonium, butyl triethyl ammonium, isobutyl triethyl ammonium, tert-butyl triethyl ammonium, dibutyl dimethyl ammonium diisobutyl dimethyl ammonium, di-tert-butyl dimethyl ammonium, butyl isobutyl dimethyl ammonium, butyl-tert-butyl dimethyl ammonium, isobutyl-tert-butyl dimethyl ammonium, and trioctyl methyl ammonium.

Examples of the pyridinium cation include 1-methyl pyridinium, 1-ethyl pyridinium, 1-propyl pyridinium, 1-butyl pyridinium, 1-pentyl pyridinium, 1-hexyl pyridinium, 1-heptyl pyridinium, 1-octyl pyridinium, 1-nonyl pyridinium, 1-decyl pyridinium, 1,2-dimethyl pyridinium, 1,3-dimethyl pyridinium, 1,4-dimethyl pyridinium, 1-ethyl-2-methyl pyridinium, 2-ethyl-1-methyl pyridinium, 1-ethyl-3-methyl pyridinium, 3-ethyl-1-methyl pyridinium, 1-ethyl-4-methyl pyridinium, 4-ethyl-1-methyl pyridinium, 1,2-diethyl pyridinium, 1,3-diethyl pyridinium, 1,4-diethyl pyridinium, 1,2,3-trimethyl pyridinium, 1,2,4-trimethyl pyridinium, 1,3,4-trimethyl pyridinium, 1,3,5-trimethyl pyridinium, 1,2,5-trimethyl pyridinium, 1,2,6-trimethyl pyridinium, 1-ethyl-2,3-dimethyl pyridinium, 1-ethyl-2,4-dimethyl pyridinium, 1-ethyl-2,5-dimethyl pyridinium, 1-ethyl-2,6-dimethyl pyridinium, and 1-ethyl-3,4-dimethyl pyridinium.

Examples of the pyridinium cation further include 1-ethyl-3,5-dimethyl pyridinium, 2-ethyl-1,3-dimethyl pyridinium, 2-ethyl-1,4-dimethyl pyridinium, 2-ethyl-1,5-dimethyl pyridinium, 2-ethyl-1,6-dimethyl pyridinium, 3-ethyl-1,2-dimethyl pyridinium, 3-ethyl-1,4-dimethyl pyridinium, 3-ethyl-1,5-dimethyl pyridinium, 3-ethyl-1,6-dimethyl pyridinium, 4-ethyl-1,2-dimethyl pyridinium, 4-ethyl-1,3-dimethyl pyridinium, 1,2-diethyl-3-methyl pyridinium, 1,2-diethyl-4-methyl pyridinium, 1,2-diethyl-5-methyl pyridinium, 1,2-diethyl-6-methyl pyridinium, 1,3-diethyl-2-methyl pyridinium, 1,3-diethyl-4-methyl pyridinium, 1,3-diethyl-5-methyl pyridinium, 1,3-diethyl-6-methyl pyridinium, 1,4-diethyl-2-methyl pyridinium, 1,4-diethyl-3-methyl pyridinium, 2,3-diethyl-1-methyl pyridinium, 2,4-diethyl-1-methyl pyridinium, 2,5-diethyl-1-methyl pyridinium, 2,6-diethyl-1-methyl pyridinium, and 3,4-diethyl-1-methyl pyridinium.

Examples of the pyrrolidinium cation include 1,1-dimethyl pyrrolidinium, 1-ethyl-1-methyl pyrrolidinium, 1,1-diethyl pyrrolidinium, 1,2-trimethyl pyrrolidinium, 1,1,3-trimethyl pyrrolidinium, 1-ethyl-1,2-dimethyl pyrrolidinium, 1-ethyl-1,3-dimethyl pyrrolidinium, 2-ethyl-1,1-dimethyl pyrrolidinium, 3-ethyl-1,1-dimethyl pyrrolidinium, 1,1-diethyl-2-methyl pyrrolidinium, 1,1-diethyl-3-methyl pyrrolidinium, 1,2-diethyl-1-methyl pyrrolidinium, 1,3-diethyl-1-methyl pyrrolidinium, 1,1,2-triethyl pyrrolidinium, 1,1,3-triethyl pyrrolidinium, 1,1,2,2-tetramethyl pyrrolidinium, 1,1,2,3-tetramethyl pyrrolidinium, 1,1,2,4-tetramethyl pyrrolidinium, 1,1,2,5-tetramethyl pyrrolidinium, 1,1,3,4-tetramethyl pyrrolidinium, 1,1,3,3-tetramethyl pyrrolidinium, 1,1-dimethyl pyrrolidium, and 1-ethyl-1-methylpyrrolidium.

Examples of the piperidinium cation include 1,1-dimethyl piperidinium, 1-ethyl-1-methyl piperidinium, 1,1-diethyl piperidinium, 1,1,2-trimethyl piperidinium, 1,1,3-trimethyl piperidinium, 1,1,4-trimethyl piperidinium, 1,1,2,2-tetramethyl piperidinium, 1,1,2,3-tetramethyl piperidinium, 1,1,2,4-tetramethyl piperidinium, 1,1,2,5-tetramethyl piperidinium, 1,1,2,6-tetramethyl piperidinium, 1,1,3,3-tetramethyl piperidinium, 1,1,3,4-tetramethyl piperidinium, 1,1,3,5-tetramethyl piperidinium, 1-ethyl-1,2-dimethyl piperidinium, 1-ethyl-1,3-dimethyl piperidinium, 1-ethyl-,4-dimethyl piperidinium, 1-ethyl-1,2,3-trimethyl piperidinium, 1-ethyl-1,2,4-trimethyl piperidinium, 1-ethyl-1,2,5-trimethyl piperidinium, 1-ethyl-1,2,6-trimethyl piperidinium, 1-ethyl-1,3,4-trimethyl piperidinium, 1-ethyl-1,3,5-trimethyl piperidinium, 1,1-diethyl-2-methyl piperidinium, 1,1-diethyl-3-methyl piperidinium, and 1,1-diethyl-4-methyl piperidinium.

Examples of the piperidinium cation further include 1,1-diethyl-2,3-dimethyl piperidinium, 1,1-diethyl-2,4-dimethyl piperidinium, 1,1-diethyl-2,5-dimethyl piperidinium, 1,1-diethyl-2,6-dimethyl piperidinium, 1,1-diethyl-3,4-dimethyl piperidinium, 1,1-diethyl-3,5-dimethyl piperidinium, 2-ethyl-1,1,3-trimethyl piperidinium, 2-ethyl-1,1,4-trimethyl piperidinium, 2-ethyl-1,1,5-trimethyl piperidinium, 2-ethyl-1,1,6-trimethyl piperidinium, 3-ethyl-1,1,2-trimethyl piperidinium, 3-ethyl-1,1,4-trimethyl piperidinium, 3-ethyl-1,1,5-trimethyl piperidinium, 3-ethyl-1,1,6-trimethyl piperidinium, 4-ethyl-1,1,2-trimethyl piperidinium, 4-ethyl-1,1,3-trimethyl piperidinium, 1,2-diethyl-1,3-dimethyl piperidinium, 1-ethyl-1,2,4-trimethyl piperidinium, 1,2-diethyl-1,5-dimethyl piperidinium, 1,2-diethyl-1,6-dimethyl piperidinium, 1,3-diethyl-1,5-dimethyl piperidinium, 1,3-diethyl-1,4-dimethyl piperidinium, 1,3-diethyl-1,5-dimethyl piperidinium, 1,3-diethyl-1,6-dimethyl piperidinium, and 1,4-diethyl-1,2-dimethyl piperidinium.

Examples of the phosphonium cation include tetramethyl phosphonium, tetraethyl phosphonium, tetrapropyl phosphonium, tetrabutyl phosphonium, tetrapentyl phosphonium, tetrahexyl phosphonium, tetraheptyl phosphonium, tetraoctyl phosphonium, tetranonyl phosphonium, tetradecyl phosphonium, tetraphenyl phosphonium, tributyl octyl phosphonium, tributyl nonyl phosphonium, tributyl decyl phosphonium, tributyl undecyl phosphonium, tributyl dodecyl phosphonium, tributyl tridecyl phosphonium, tributyl tetradecyl phosphonium, tributyl pentadecyl phosphonium, tributyl hexadecyl phosphonium, tributyl heptadecyl phosphonium, tributyl octadecyl phosphonium, tributyl nonadecyl phosphonium, tributyl eicosyl phosphonium, tripentyl octyl phosphonium, tripentyl nonyl phosphonium, tripentyl decyl phosphonium, tripentyl dodecyl phosphonium, tripentyl dodecyl phosphonium tripentyl tridecyl phosphonium, tripentyl tetradecyl phosphonium, tripentyl pentadecyl phosphonium, tripentyl hexadecyl phosphonium, tripentyl heptadecyl phosphonium, tripentyl octadecyl phosphonium, tripentyl nonadecyl phosphonium, tripentyl eicosyl phosphonium, trihexyloctyl phosphonium, and trihexyl nonyl phosphonium.

Examples of anion moieties of ionic liquid that can be used as a lubricating interface deriving agent include halogen (fluorine, chlorine, bromine, and iodine), bis(trifluoromethane sulfonyl) imide, bis(fluoromethane sulfonyl) imide, tetrafluoroborate, hexafluorophosphate, and trifluoromethanesulfonate.

Examples of the ionic liquid that can be used as a lubricating interface deriving agent include 1-dodecyl-3-methyl imidazolium=hexafluorophosphate (C16), 1-hexyl-3-methyl imidazolium-hexafluorophosphate (C6), 1-(2-(acryloyloxy)ethyl)-3-ethyl imidazolium=hexafluorophosphate, 1-methyl imidazolium=hexafluorophosphate, 1-methyl-3-ethyl imidazolium=hexafluorophosphate, 1-methyl-3-butyl imidazolium=hexafluorophosphate, 1-ethyl-3-methyl imidazolium=hexafluorophosphate, 1-butyl-3-methyl imidazolium=hexafluorophosphphate, and 1-benzyl-3-methyl imidazolium=hexafluorophosphate.

Examples of the ionic liquid that can be used as a lubricating interface deriving agent further include 1-dodecyl-3-methyl imidazolium=tetrafluoroborate (C16), 1-hexyl-3-methyl imidazolium=tetrafluoroborate (C6), 1-(2-(acryloyloxy) ethyl)-3-ethyl imidazolium=tetrafluoroborate, 1-methyl imidazolium=tetrafluoroborate, 1-methyl-3-ethyl imidazolium=tetrafluoroborate, 1-methyl-3-butyl imidazolium-=tetrafluoroborate, 1-ethyl-3-methyl imidazolium=tetrafluoroborate, 1-butyl-3-methyl imidazolium=tetrafluoroborate, 1-benzyl-3-methyl imidazolium=tetrafluoroborate, trioctyl methyl ammonium=bistrifluoromethane sulfonylimide, trimethyl propyl ammonium=bistrifluoromethane sulfonylimide, dimethyl ethyl[2-(2-methoxyethoxy) ethyl] ammonium=bistrifluoromethane sulfonylimide, diethyl methyl(2-methoxyethyl) ammonium=bistrifluoromethane sulfonylimide, diethyl methyl(2-methoxyethyl) ammonium=tetrafluorophosphate, dimethyl ethyl[2-(2-methoxyethoxy) ethyl] ammonium=tetrafluorophosphate, and diethyl methyl(2-methoxyethyl) ammonium=hexafluorophosphate. As the ionic liquid, imidazolium-based ionic liquid is preferable.

The optical element of the first embodiment can be manufactured by filling a space between the pair of substrates having an electrode at least one substrate with a mixed material of the liquid crystal component and the lubricating interface deriving agent, and by gradually raising the temperature from a state where the entire cell is in a liquid crystal phase to develop a phase separation structure. That is, it is possible to develop the slippery interface between the liquid phase and the liquid crystal phase.

The space between the pair of substrates is filled with a mixed material, cooling is performed such that the entire cell becomes a liquid crystal phase, and then the temperature is gradually raised so as to develop the liquid phase on the interface. As a more appropriate method, heating is performed once to make an isotropic phase before the above-described temperature control, cooling is performed such that the entire cell becomes a liquid crystal phase, and then the temperature is raised so as to develop the liquid phase on the interface, thereby forming a more uniform slippery interface. As a result, it is possible to temporarily remove (reset) the orientation of the liquid crystal phase which has been adsorbed in an inappropriate direction when liquid crystal is first injected into the cell.

The amount of the lubricating interface deriving agent in the mixed material is preferably in a range of 0.5% to 15% by mass, is more preferably in a range of 0.8% to 10% by mass, and is still more preferably in a range of 1.0% to 8% by mass.

Hereinafter, a second embodiment of a complex according to the present invention will be described with reference to drawings.

FIG. 2 is a schematic sectional view showing a complex 40 in the embodiment.

The invention according to the embodiment is the complex 40 including a pair of substrates 31 and 32 having an electrodes 28 and 29 on at least one substrate 31, and a liquid crystal component 23 with which a space between the pair of substrates 31 and 32 is filled, in which a lubricating interface derivation region 26 is formed between the pair of substrates 31 and 32 and the liquid crystal component 23. The complex 40 may be an optical element. It is preferable that the invention according to the embodiment has a lubricating interface deriving agent 24 in the lubricating interface derivation region 26. In the invention according to the embodiment, it is preferable that an interface between the liquid crystal component 23 and the lubricating interface derivation region 26 forms a slippery interface 27. It is preferable that the lubricating interface deriving agent 24 is a compound having a polar group, a polymerizable compound, a polymer compound, or an ionic liquid. It is preferable that the polymer compound has at least one of two or three or more kinds of alkyl groups having different chain lengths, a mesogenic group, and a photoisomerizable group. It is preferable that the liquid crystal component 23 and the lubricating interface deriving agent 24 develop a phase separation structure, the liquid crystal component 23 forms a liquid crystal phase 25, and the lubricating interface deriving agent 24 forms a liquid phase in the lubricating interface derivation region 26. The lubricating interface deriving agent 24 may form a gel layer having lower order than that of the liquid crystal phase in the lubricating interface derivation region 26.

The invention according to the embodiment is an optical element including a pair of substrates 31 and 32 having electrodes 28 and 29 on at least one substrate 31, a liquid crystal component 23 with which the space between the pair of substrates 31 and 32 is filled, and a lubricating interface deriving agent 24, in which the liquid crystal component 23 and the lubricating interface deriving agent 24 develop the phase separation structure, and the liquid crystal component 23 forms an optically isotropic liquid crystal phase 25 stabilized by a network formed of a polymer compound component 41, the lubricating interface deriving agent 24 is unevenly distributed in the vicinity of the surface of the network so as to form a liquid phase, and the interface between the liquid crystal phase 25 and the liquid phase forms a slippery interface 27 when the liquid crystal component 23 responds by change of an external field of an external electric field or an external magnetic field. It is preferable that the lubricating interface deriving agent 24 has good affinity with respect to the polymer compound component 41.

The complex 40 of FIG. 2 includes the liquid crystal component 23 in the embodiment and supports (not shown) of the liquid crystal component 23, and the lubricating interface derivation region 26 is formed between the liquid crystal component 23 and the supports (not shown). The complex 40 may be an optical element.

In the complex, the support (not shown) may be a polymer structure present in the liquid crystal component 23, and may be a polymer structure that replenishes defective regions of the liquid crystal. In the complex, it is preferable that the interface between the liquid crystal component 23 and the lubricating interface derivation region 26 forms the slippery interface 27. It is preferable that the complex has the lubricating interface deriving agent 24 in the lubricating interface derivation region 26. In the complex, it is preferable that the lubricating interface deriving agent 24 is a compound having a polar group, a polymerizable compound, a polymer compound, or an ionic liquid. It is preferable that the lubricating interface deriving agent 24 is the polymer compound, and the polymer compound has at least one of two or three or more kinds of alkyl groups having different chain lengths, a mesogenic group, and a photoisomerizable group.

As the lubricating interface deriving agent in the embodiment, the above-described lubricating interface deriving agent is an exemplary example.

When the lubricating interface deriving agent has good affinity with respect to the surface of the polymer network, a high concentration region of the lubricating interface deriving agent is spontaneously realized in the vicinity of the surface of the polymer network. In addition, it is preferable that the lubricating interface deriving agent has sufficient affinity with respect to the liquid crystal component forming a liquid crystal phase in order to secure wettability and temperature stability. When the affinity with respect to the liquid crystal component is weak, the liquid crystal component is excluded from the liquid crystal phase, and the interface has "vertical alignment", or a "DeWet state (interfacial tension is high and gathers in a droplet shape)", and thus it is not possible to form a preferable slippery interface. With sufficient affinity with respect to the liquid crystal component, the slippery interface can be formed. The lubricating interface deriving agent has good affinity with respect to the surface of the polymer network and has sufficient affinity with respect to the liquid crystal component, thereby making it possible to form a slippery interface.

In general, the above two conditions do not match, which may be a subtle condition, but this can be achieved, for example, by using a compound similar to a surfactant. A compound which has a functional group having good affinity with respect to the surface of the polymer network on one of the molecules, and has a functional group having sufficient affinity with respect to the liquid crystal component on the other one of the molecules can be used as a lubricating interface deriving agent.

Here, the liquid crystal component forms the optically isotropic liquid crystal phase 25 stabilized by the network formed of a polymer compound component, and a polymer stabilizing the optically isotropic liquid crystal phase (blue phase) is cross-linked, and thus uncross-linked polymer which can be dissolved in the liquid crystal can be a lubricating interface deriving agent. From the viewpoint of the driving force that the strain of the director and the gradient of alignment order attract the polymer to the disclination, the larger the molecular weight, the easier it gathers to the disclination in the blue phase. When the molecular weight is excessively large, it adsorbs to the surface of the stabilized polymer, but in a case of a polymer with an appropriate molecular weight (oligomer), it successfully concentrates in the vicinity of the interface so as to form a slippery interface.

The amount for the concentration on the interface, that is, the concentration profile is determined by the balance with 1) affinity with a polymer stabilizing a blue phase, 2) force at which disclination attracts foreign matter, and 3) action of diffusing separately by thermal motion (entropy), and 2) and 3) strongly depend on the molecular weight of the lubricating interface deriving agent.

The degree of polymerization in a case where the lubricating interface deriving agent is an oligomer or a polymer, the content thereof is preferably in a range of 2 to 300 mer, is more preferably in a range of 4 to 200 mer, and is particularly preferably in a range of 5 to 100 mer, and the weight average molecular weight thereof is preferably in a range of 150 to 30000, is more preferably in a range of 1000 to 20000, and is particularly preferably in a range of 2000 to 12000.

In the embodiment, it is possible to employ a configuration in which the liquid crystal component 23 and the lubricating interface deriving agent 24 self-organize so as to develop a phase separation structure, and the optically isotropic liquid crystal phase 25 stabilized by the network formed of the polymer compound component 41 is formed.

In the embodiment, a network which has the surface having good affinity with respect to the lubricating interface deriving agent 24, and is formed of the polymer compound component 41 is preferably provided, and with this, it is possible that the lubricating interface deriving agent 24 is unevenly distributed in the vicinity of the surface of the network formed of the polymer compound component 41 to form a liquid phase.

The optical element of the present invention has an action of causing the lubricating interface deriving agent to reduce a threshold value of the driving external field by the interface between the liquid crystal phase 25 and the liquid phase, which forms the slippery interface 17 when the liquid crystal component 23 responds by change of an external field of an external electric field or an external magnetic field, and is excellent in the low-voltage drivability.

The liquid crystal component 23 may form an optically isotropic liquid crystal phase 25 having a double twist cylinder structure, and the lubricating interface deriving agent 24 is unevenly distributed in a disclination between the double twist cylinder structures to form a liquid phase.

It is possible to appropriately select the combination of the liquid crystal component 23 and the lubricating interface deriving agent 24 such that the lubricating interface deriving agent 24 is unevenly distributed in a disclination between the double twist cylinder structures when the liquid crystal component 23 and the lubricating interface deriving agent 24 self-organize so as to develop a phase separation structure.

In addition, it is possible to employ a configuration in which the liquid crystal component 23 exhibits optical isotropy when no electric field is applied and exhibits optical anisotropy when an electric field is applied. As compared with a method of rotating the optical anisotropic optical axis by the application of the conventional electric field, it is possible to obtain an optical element that does not require an aligning treatment based on a reversible swing method of optical isotropy (birefringence zero)-anisotropy (finite birefringence), and a reduction in manufacturing cost can be expected. In addition, it is possible to realize the excellent viewing angle properties by providing the optical axis in the substrate plane as a transverse electric field type.

In the optical element of the embodiment, it is possible to employ a configuration in which the first electrode 28 and the second electrode 29 are provided on the facing substrate 32 side in one substrate 31, and an electric field is generated between the first electrode 28 and the second electrode 29.

In the optical element of the embodiment, it is possible to employ a configuration in which the first electrode 28 and the second electrode 29 generate an in-plane electric field between the pair of substrates 31 and 32.

"Liquid Crystal Component 23"

In the embodiment, the space between the pair of the substrates is filled with the liquid crystal component 23 and the lubricating interface deriving agent, and the phase separation structure is developed so as to form a liquid crystal phase.

It is possible to employ a configuration in which the liquid crystal component 23 in the embodiment exhibits a cholesteric blue phase and a smectic blue phase.

The liquid crystal component 23 in the embodiment may be a nematic liquid crystal composition containing a compound represented by General Formula (LC).

The liquid crystal component 23 in the embodiment may form a nematic liquid crystal composition containing a compound represented by General Formula (LC), a blue phase containing at least one kind of chiral compound or a polymer-stabilized blue phase in which the blue phase is stabilized by the network formed of the polymer compound component 41, or the optically isotropic liquid crystal phase 25 as other phases.

With a chiral compound contained, a twisted alignment is induced to the nematic liquid crystal composition, and a liquid crystal composition developing the cholesteric phase or the blue phase having a desired pitch can be obtained.

Here, the pitch indicates the length of one cycle of a helical structure of the liquid crystal molecule. As the additional amount (% by mass) of the chiral compound to the nematic liquid crystal composition is increased, the pitch (μm) is decreased. Particularly when the concentration of the additional amount of chiral compound is as low as 1% to several % by mass, it is known that the relationship that the additional amount of chiral compound and the product of pitch are constant is well established, Helical Twisting Power (HTP) (1/μm) with the reciprocal of that is used as an evaluation parameter of the force inducing twisted alignment inherent to the optically active compound. In the following formula. "P" is the pitch (μm), and "C" is the added amount (mass %) of the chiral compound.

$$HTP = 1/(P \times 0.01C)$$

[Chiral Compound]

The chiral compound may be any one of a compound having an asymmetric atom, a compound having axial asymmetry, and a compound having plane asymmetry. In addition, the chiral compound may have a polymerizable group, and a polymerizable group.

As the chiral compound containing in the blue phase in the embodiment or the polymer-stabilized blue phase in which the blue phase is stabilized by the network formed of the polymer compound component 41, or the optically isotropic liquid crystal phase 25 as other phases, a compound having an asymmetric atom or a compound with axial asymmetry is preferable, and a compound having an asymmetric atom is particularly preferable. Examples of the compound having an asymmetric atom include a compound with an asymmetric carbon in side chain part, a compound with an asymmetric carbon in a ring structure part, and a compound having asymmetric carbons in both parts. In the compound having an asymmetric atom, when the asymmetric atom is an asymmetric carbon atom, a compound in which the stereo inversion hardly occurs is preferable, and a heteroatom may be an asymmetric atom. The asymmetric atom may be introduced to a portion of the chain structure, and may be introduced to a portion of the cyclic structure. As the chiral compound containing in the blue phase in the embodiment or the polymer-stabilized blue phase in which the blue phase is stabilized by the network formed of the polymer compound component 41, or the optically isotropic liquid crystal phase 25 as other phases, in a case where a strong spiral induction is required, a compound with the axial asymmetry is preferable.

<Compound Having Asymmetric Atom>

As the compound having an asymmetric atom, specifically, a compound represented by General Formula (Ch-I) is preferably used.

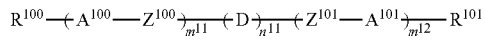

(Ch-I)

(In General Formula (Ch-I), $R^{100}$ and $R^{101}$ each independently represent a hydrogen atom, a cyano group, $-NO_2$, a halogen atom, $-OCN$, $-SCN$, $-SF_5$, a chiral, or achiral alkyl group having 1 to 30 carbon atoms (one or two or more methylene groups which are not adjacent to each other in the alkyl group each independently may be substituted with $-O-$, $-S-$, $-NH-$, $-N(CH_3)-$, $-CO-$, $-COO-$, $-OCO-$, $-OCO-O-$, $-S-CO-$, $-CO-S-$, $-CH=CH-$, $-CF_2-$, $-CF=CH-$, $-CH=CF-$, $-CF=CF-$, or $C\equiv C-$ such that oxygen atoms or sulfur atoms are not directly bonded to each other, one or two or more hydrogen atoms in the alkyl group each independently may be substituted with a halogen atom, or a cyano group), a polymerizable group, or a chiral group having a ring structure, and when $n^{11}$ is 0, at least one of $R^{100}$ and $R^{101}$ is a chiral alkyl group, $Z^{100}$ and $Z^{101}$ each independently represent $-O-$, $-S-$, $-CO-$, $-COO-$, $-OCO-$, $-O-COO-$, $-CO-N(R^{105})-$, $-N(R^{05})-CO-$, $-OCH_2-$, $-CH_2O-$, $-SCH_2-$, $-CH_2S-$, $-CF_2O-$, $-OCF_2-$, $-CF_2S-$, $-SCF_2-$, $-CH_2CH_2-$, $-CF_2CH_2-$, $-CH_2CF_2-$, $-CF_2CF_2-$, $-CH=CH-$, $-CF=CH-$, $-CH=CF-$, $-CF=CF-$, $-C\equiv C-$, $-CH=CH-COO-$, $-OCO-CH=CH-$, or a single bond, $A^{100}$ and $A^{101}$ each independently represent (a') a trans-1,4-cyclohexylene group (one methylene group present or two or more non-adjacent methylene groups in the group each independently may be substituted with an oxygen atom or a sulfur atom), (b') a 1,4-phenylene group (one $-CH=$ or two or more non-adjacent $-CH=$'s present in these groups may be substituted with a nitrogen atom), or (c') a 1,4-cyclohexenylene group, a 1,4-bicyclo[2.2.2]octylene group, indane-2,5-diyl, a naphthalene-2,6-diyl group, a decahydronaphthalene-2,6-diyl group, and a 1,2,3,4-tetrahydronaphthalene-2,6-diyl group (one methylene group or two or more non-adjacent methylene groups present in these groups each independently may be substituted with an oxygen atom or a sulfur atom, and one $-CH=$ or two or more non-adjacent $-CH=$'s present in these groups may be substituted with a nitrogen atom), in a case where a plurality of $A^{100}$'s or $A^{101}$'s are present, those may be the same as or may be different from each other, $n^{11}$ represents 0 or 1, and when $n^{11}$ represents 0, $m^{12}$ represents 0, and $m^{11}$ represents 0, 1, 2, 3, 4, or 5, and when $n^{11}$ represents 1, $m^{11}$ and $m^{12}$ each independently represent 0, 1, 2, 3, 4, or 5, D represents a divalent group represented by Formulas (D1) to (D4) (in Formulae (D1) to (D4), asterisk (*) represents a chiral carbon atom, each of which is bonded to $Z^{101}$ (or, $R^{100}$) or $Z^{101}$ (or $R^{101}$) in a portion with a black circle)).

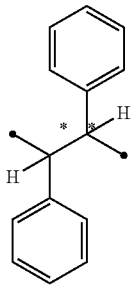

(D1)

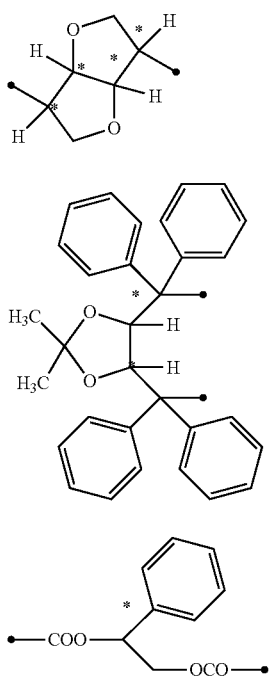

(D2)

(D3)

(D4)

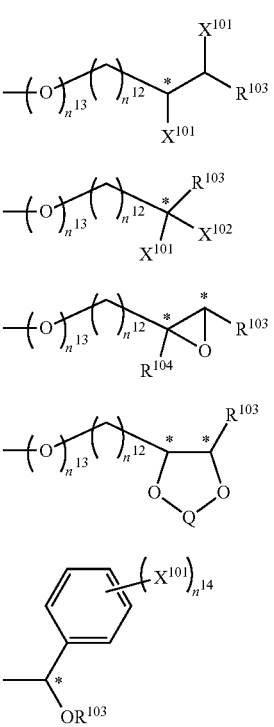

(Rb)

(Rc)

(Rd)

(Re)

(Rf)

(Rg)

(Rh)

(Ri)

(Rj)

(Rk)

In General Formula (Ch-I), $R^{100}$ and $R^{101}$ each independently represent a hydrogen atom, a cyano group, —$NO_2$, a halogen atom, —OCN, —SCN, —$SF_5$, a chiral, or achiral alkyl group having 1 to 30 carbon atoms, a polymerizable group, or a chiral group having a ring structure. When $n^{11}$ is 0, at least one of $R^{100}$ and $R^{101}$ is a chiral alkyl group.

In a case where $R^{100}$ or $R^{101}$ in General Formula (Ch-1) is a chiral or achiral alkyl group having 1 to 30 carbon atoms, one or two or more methylene groups (—$CH_2$—) which are not adjacent to each other in the alkyl group each independently may be substituted with —O—, —S—, —NH—, —N($CH_3$)—, —CO—, —COO—, —OCO—, —OCO—O—, —S—CO—, —CO—S—, —CH=CH—, —$CF_2$—, —CF=CH—, —CH=CF—, —CF=CF—, or C≡C— such that oxygen atoms or sulfur atoms are not directly bonded to each other, and one or two or more hydrogen atoms in the alkyl group each independently may be substituted with a halogen atom, or a cyano group. In addition, the alkyl group may be a linear group, a branched group, or a group having a ring structure.

As a chiral alkyl group, groups represented by General Formulae (Ra) to (Rk) are preferable. The asterisk (*) in General Formulae (Ra) to (Rk) represents a chiral carbon atom. In a case where $R^{100}$ or $R^{101}$ is a group described above, a left end is bonded to each of $A^{100}$ (or, D or $Z^{101}$) or $A^{101}$ (or, D or $Z^{100}$).

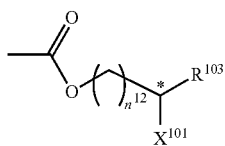

(Ra)

In General Formulae (Ra) to (Rk), $R^{103}$ and $R^{104}$ each independently represent a linear or branched alkyl group having 1 to 12 carbon atoms, or a hydrogen atom. Here, in General Formulae (Ra), (Rb), (Rd), (Re), (Rf), (Rg), (Ri), and (Rj), $R^{103}$ is a linear or branched alkyl group having 1 to 10 carbon atoms such that a carbon atom (a position with *) to which $R^{103}$ is bonded is an asymmetric atom. One or two or more methylene groups in the alkyl group each independently may be substituted with —O—, —S—, —NH—, —N(CH$_3$)—, —CO—, —CO—O—, —O—CO—, —O—CO—O—, —S—CO—, —CO—S—, —O—SO$_2$—, —SO$_2$—O—, —CH=CH—, —C≡C—, a cyclopropylene group, or —Si(CH$_3$)$_2$— such that oxygen atoms or sulfur atoms are not directly bonded to each other, and one alkyl group or one or more hydrogen atoms each independently may be substituted with a halogen atom (for example, a fluorine atom, a chlorine atom, and bromine atom) or a cyano group. In addition, the alkyl group may have a polymerizable group. Examples of the polymerizable group include a vinyl group, an allyl group, and a (meth) acryloyl group.

As $R^{103}$ in General Formulae (Ra) to (Rj), a linear or branched alkyl group having 1 to 12 carbon atoms in which a methylene group or a hydrogen atom is not substituted with (that is, unsubstituted) another group is preferable, a unsubstituted linear or branched alkyl group having 1 to 8 carbon atoms is more preferable, and an unsubstituted linear alkyl group having 1 to 6 carbon atoms is still more preferable.

As $R^{104}$ in General Formula (Rd) or (Ri), a unsubstituted hydrogen atom or a linear or branched alkyl group having 1 to 5 carbon atoms is preferable, a unsubstituted hydrogen atom or a linear alkyl group having 1 to 3 carbon atoms is more preferable, a hydrogen atom or a methyl group is still more preferable.

In General Formulae (Ra) to (Rk), $n^{12}$ is an integer in a range of 0 to 20, is preferably an integer in a range of 0 to 10, is more preferably an integer in a range of 0 to 5, and is still more preferably 0.

In General Formulae (Ra) to (Rk), $n^{13}$ is 0 or 1.

In addition, in General Formula (Rk), $n^{14}$ is an integer in a range of 0 to 5.

In General Formulae (Ra) to (Rk), $X^{101}$ and $X^{102}$ are each independently a halogen atom (a fluorine atom, a chlorine atom, a bromine atom, an iodine atom), a cyano group, a phenyl group (one or two or more arbitrary hydrogen atoms of the phenyl group each independently may be substituted with a halogen atom, a methyl group, a methoxy group, a trifluoromethyl group (—CF$_3$), and a trifluoromethoxy group (—OCF$_3$)), an alkyl group having 1 to 6 carbon atoms, an alkoxy group having 1 to 6 carbon atoms, a trifluoromethyl group, or a trifluoromethoxy group. Here, in General Formulae (Ra), (Rb), (Rc), (Rf), (Rg), and (Rh), $X^{101}$ and $R^{103}$ are different groups from each other such that a carbon atom (a position with *) to which $X^{101}$ is bonded is an asymmetric atom. In addition, in General Formulae (Rc) and (Re), $X^{101}$ and $X^{102}$ are different groups from each other such that a carbon atom (a position with *) to which $X^{101}$ is bonded is an asymmetric atom.

$X^{101}$ and $X^{102}$ in General Formulae (Ra), (Rb), (Rc), (Rf), (Rg), (Rh), and (Rk) are each independently preferably a halogen atom, a phenyl group (one or two or more arbitrary hydrogen atoms of the phenyl group each independently may be substituted with a halogen atom, a methyl group, a methoxy group, a trifluoromethyl group, and a trifluoromethoxy group), a methyl group, a methoxy group, a trifluoromethyl group, or a trifluoromethoxy group. Among them, $X^{101}$ and $X^{102}$ in General Formulae (Ra), (Rb), (Rc), (Rf), (Rg), and (Rh) are each independently more preferably a phenyl group (one or two or more arbitrary hydrogen atoms of the phenyl group each independently may be substituted with a halogen atom, a methyl group, a methoxy group, a trifluoromethyl group, and a trifluoromethoxy group), and are still more preferably an unsubstituted phenyl group. Further, $X^{101}$ in General Formula (Rk) is more preferably a halogen atom, a cyano group, alkyl group, an alkoxy group, a trifluoromethyl group, or a trifluoromethoxy group, and is still more preferably a halogen atom, a methyl group, a trifluoromethyl group, or a trifluoromethoxy group.

In General Formulae (Re) and (Rj), Q is a divalent hydrocarbon group. In addition, the divalent hydrocarbon group may be a linear group, a branched group, or a group having a cyclic structure. In addition, the number of carbon atoms of the divalent hydrocarbon group is preferably in a range of 1 to 16, is more preferably in a range of 1 to 10, and is still more preferably in a range of 1 to 6. As the divalent hydrocarbon group, in one carbon atom, groups which are each single-bonded to two oxygen atoms in General Formulae (Re) and (Rj) are preferable. In this case, in General Formulae (Re) and (Rj), two carbon atoms with an asterisk, two oxygen atoms respectively bonded to them, and one carbon atom in Q form a five-membered ring. Specifically, a methylene group which is unsubstituted or substituted with one or two hydrogen atoms with a hydrocarbon group, a cyclopropylidene group, a cyclobutylidene group, a cyclopentylidene group, and a cyclohexylidene group are preferable, and a methylene group, an isopropylidene group, and a cyclohexylidene group are more preferable.

As the groups represented by General Formulae (Ra) to (Rk), a group represented by General Formula (Ra) or General Formula (Rf) is preferable. As the group represented by General Formula (Ra), in General Formula (Ra), a group in which $n^{12}$ is an integer in a range of 0 to 5, $X^{101}$ is a phenyl group (one or two or more arbitrary hydrogen atoms of the phenyl group each independently may be substituted with a halogen atom, a methyl group, a methoxy group, a trifluoromethyl group, or a trifluoromethoxy group), $R^{103}$ is an unsubstituted linear or branched alkyl group having 1 to 6 carbon atoms is preferable, and a group in which $n^{12}$ is an integer in a range of 0 to 5, $X^{101}$ is an unsubstituted phenyl group, and $R^{103}$ is an unsubstituted linear or branched alkyl group having 1 to 6 carbon atoms is more preferable.

As the group represented by General Formula (Rf), in General Formula (Rf), a group in which in which $n^{12}$ is an integer in a range of 0 to 5, $n^{13}$ is 0 or 1, $X^{103}$ is a halogen atom, a methyl group, or a trifluoromethyl group, and $R^{103}$ is an unsubstituted linear alkyl group having 2 to 12 carbon atoms is more preferable.

As $R^{100}$ or $R^{101}$ of the compound represented by General Formula (Ch-I), particularly, groups represented by Formulae (Ra-1) to (Ra-3) or General Formulae (Rf-1) to (Rf-3) are preferable. In a case where $R^{100}$ or $R^{101}$ is a group described above, the left end is bonded to each of $A^{100}$ (or, D or $Z^{101}$) or $A^{101}$ (or, D or $Z^{100}$). In addition, an asterisk represents a chiral carbon atom.

(Ra-1)

(Ra-2)

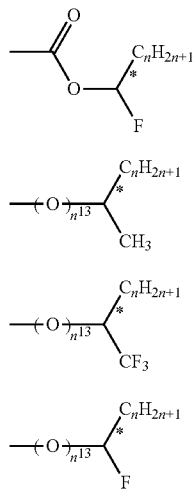

(Ra-3)
(Rf-1)
(Rf-2)
(Rf-3)

In General Formulae (Rf-1) to (Rf-3), $n^{13}$ represents 0 or 1. In addition, in General Formulae (Ra-1) to (Ra-3), and (Rf-1) to (Rf-3), n represents an integer in a range of 2 to 12. In General Formulae (Ra-1) to (Ra-3), and (Rf-1) to (Rf-3), n is preferably an integer in a range of 3 to 8, and is more preferably in a range of 4, 5, or 6.

In a case where $R^{100}$ or $R^{101}$ in General Formula (Ch-I) is a polymerizable group, as the polymerizable group, a group having a structure represented by any one of Formulae (R-1) to (R-16) is preferable. A right end in a case of the groups represented by Formulae (R-1) to (R-14), and (R-16), and a left end in a case of the group represented by Formula (R-15) is bonded to each of $A^{100}$ (or, D or $Z^{101}$) or $A^{101}$ (or, D or $Z^{100}$).

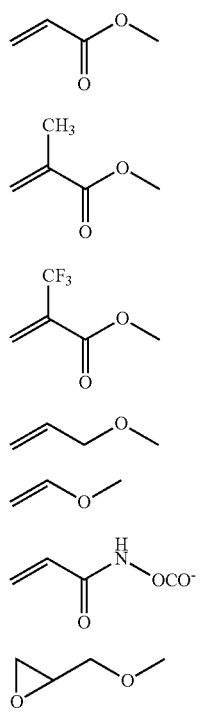

(R-1)
(R-2)
(R-3)
(R-4)
(R-5)
(R-6)
(R-7)

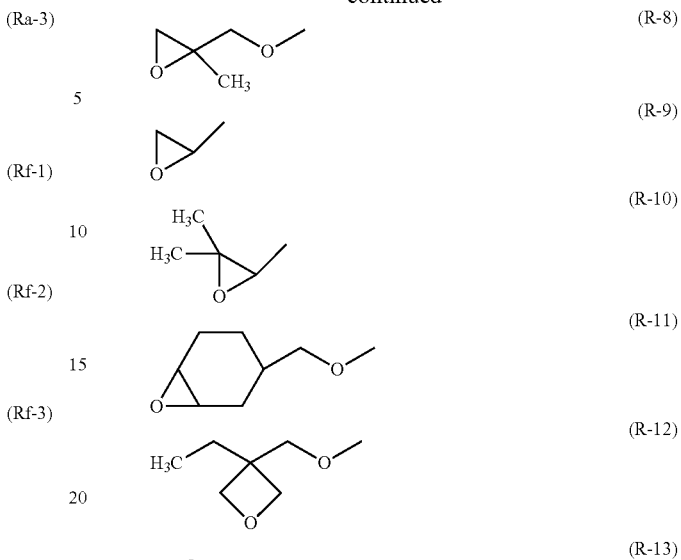

(R-8)
(R-9)
(R-10)
(R-11)
(R-12)
(R-13)
(R-14)
(R-15)
(R-16)

These polymerizable groups are cured by radical polymerization, radical addition polymerization, cationic polymerization, or anionic polymerization. Particularly, in a case where ultraviolet polymerization is performed as a polymerization method, the group represented by Formula (R-1), Formula (R-2), Formula (R-4), Formula (R-5), Formula (R-7), Formula (R-11), Formula (R-13), Formula (R-15), or Formula (R-16) is preferable, the group represented by Formula (R-1), Formula (R-2), Formula (R-7), Formula (R-11), Formula (R-13), or Formula (R-16) is more preferable, and the group represented by Formula (R-1), Formula (R-2), or Formula (R-16) is still more preferable.

In a case where $R^{100}$ or $R^{101}$ in General Formula (Ch-I) is a chiral group including a ring structure, the ring structure of the group may be aromatic or aliphatic. Examples of the ring structure which can be obtained by an alkyl group include a simple ring structure, a condensed ring structure, and a spiro (spirocyclic) ring structure, and one or two or more heteroatoms contain contained.

In General Formula (Ch-I), $Z^{100}$ and $Z^{101}$ each independently represent —O—, —S—, —CO—, —COO—, —OCO—, —O—COO—, —CO—N($R^{105}$)—, —N($R^{105}$)—CO—, —OCH$_2$—, —CH$_2$O—, —SCH$_2$—, —CH$_2$S—, —CF$_2$O—, —OCF$_2$—, —CF$_2$S—, —SCF$_2$, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—COO—, —OCO—CH=CH—, or a single bond. Here, $R^{10o}$ of —CO—N($R^{105}$)— or —N($R^{105}$)—CO— represent a linear or branched alkyl group having 1 to 12 carbon atoms, is preferably a linear or branched alkyl group having 1 to 6 carbon atoms, and is more preferably a linear alkyl group 1 to 4 carbon atoms. In a case where $m^{11}$ is an integer of 2 or more, and a plurality of $Z^{100}$'s are present in one molecule, those may be the same as or may be different from each other. Similarly, in a case where $m^{12}$ is an integer of 2 or more, and a plurality of $Z^{101}$'s are present in one molecule, those may be the same as or may be different from each other. As the compound represented by General Formula (Ch-I), $Z^{100}$ and $Z^{101}$ each independently are preferably —CF$_2$O—, —OCF$_2$—, —CF$_2$CF$_2$—, —CF=CF—, —COO—, —OCO—, —CH$_2$—CH$_2$—, —C≡C—, or a single bond.

In General Formula (Ch-I), $A^{100}$ and $A^{101}$ each independently represent the following (A') group, (B') group, or (C') group. In a case where $m^{11}$ is an integer of 2 or more, and a plurality of $A^{100}$'s are present in one molecule, those may be the same as or may be different from each other. Similarly, in a case where $m^{12}$ is an integer of 2 or more, and a plurality of $A^{101}$'s are present in one molecule, those may be the same as or may be different from each other.

(a') a trans-1,4-cyclohexylene group (one methylene group present or two or more non-adjacent methylene groups in the group each independently may be substituted with an oxygen atom or a sulfur atom)

(b') a 1,4-phenylene group (one —CH= or two or more non-adjacent —CH='s present in these groups may be substituted with a nitrogen atom)

(c') a 1,4-cyclohexenylene group, a 1,4-bicyclo[2.2.2]octylene group, indane-2,5-diyl, a naphthalene-2,6-diyl group, a decahydronaphthalene-2,6-diyl group, and a 1,2,3,4-tetrahydronaphthalene-2,6-diyl group (one methylene group or two or more non-adjacent methylene groups present in these groups each independently may be substituted with an oxygen atom or a sulfur atom, and one —CH= or two or more non-adjacent —CH='s present in these groups may be substituted with a nitrogen atom)

The (a') group, the (b') group, and the (c') group may be unsubstituted groups, or one or two or more hydrogen atoms in the groups each independently may be substituted with a halogen atom, a cyano group, a nitro group, an alkyl group having 1 to 7 carbon atoms (one or two or more hydrogen atoms in the alkyl group each independently may be substituted with a fluorine atom or a chlorine atom), an alkoxy group having 1 to 7 carbon atoms (one or two or more hydrogen atoms in the alkoxy group each independently may be substituted with a fluorine atom or a chlorine atom), an alkyl carbonyl group having 1 to 7 carbon atoms (one or two or more hydrogen atoms in the alkyl carbonyl group each independently may be substituted with a fluorine atom or a chlorine atom), or an alkoxycarbonyl group having 1 to 7 carbon atoms (one or two or more hydrogen atoms in the alkoxycarbonyl group each independently may be substituted with a fluorine atom or a chlorine atom).

As $A^{100}$ and $A^{100}$ of the compound represented by General Formula (Ch-I), the (a') group or the (b') group is preferable, an unsubstituted trans-1,4-cyclohexylene group, an unsubstituted 1,4-phenylene group, a trans-1,4-cyclohexylene group in which one or two or more hydrogen atoms each independently may be substituted with a fluorine atom, a chlorine atom, a cyano group, alkyl group having 1 to 4 carbon atoms, an alkoxy group having 1 to 4 carbon atoms, an alkyl carbonyl group having 1 to 4 carbon atoms, or an alkoxycarbonyl group having 1 to 4 carbon atoms, or a 1,4-phenylene group in which in which one or two or more hydrogen atoms each independently may be substituted with a fluorine atom, a chlorine atom, a cyano group, an alkyl group having 1 to 4 carbon atoms, an alkoxy group having 1 to 4 carbon atoms, an alkyl carbonyl group having 1 to 4 carbon atoms, or an alkoxycarbonyl group having 1 to 4 carbon atoms is more preferable, an unsubstituted trans-1,4-cyclohexylene group or an unsubstituted 1,4-phenylene group is still more preferable, and an unsubstituted 1,4-phenylene group is even more preferable.

In General Formula (Ch-I), $n^{11}$ represents 0 or 1.

When $n^{11}$ is 0, $m^{12}$ is 0, and $m^{11}$ is 0, 1, 2, 3, 4, or 5. When $n^{11}$ and $m^{12}$ are 0, $m^{11}$ is preferably 1, 2, 3, or 4, and is more preferably 1, 2, or 3.

When $n^{11}$ is 1, $m^{11}$ and $m^{12}$ are each independently 0, 1, 2, 3, 4, or 5, and are preferably 1, 2, 3, or 4, and more preferably 1, 2, or 3. When $n^{11}$ is 1, $m^{11}$ and $m^{12}$ may be different from each other, but are preferably the same as each other.

In General Formula (Ch-I), D is a divalent group represented by Formulae (D1) to (D4).

In Formulae (D1) to (D4), the aforementioned group is bonded to each of $Z^{101}$ (or, $R^{100}$) or $Z^{101}$ (or, $R^{100}$) in a portion with a black circle.

In the group represented by the above (D1), (D3), or (D4), one or two or more arbitrary hydrogen atoms of a benzene ring each independently may be substituted with a halogen atom (F, Cl, Br, I), an alkyl group having 1 to 20 carbon atoms, or an alkoxy group having 1 to 20 carbon atoms. In an alkyl group having 1 to 20 carbon atoms or an alkoxy group which may a substituent of a hydrogen atom in a benzene ring, one or two or more hydrogen atoms in the group may be substituted with a fluorine atom, one or two or more methylene groups in the group each independently may be substituted with —O—, —S—, —COO—, —OCO—, —CF$_2$—, —CF=CH—, —CH=CF—, —CF=CF—, or —C≡C— such that oxygen atoms or sulfur atoms are not directly bonded to each other.

Among compounds represented by General Formula (Ch-I), regarding the compound in which $n^{11}$ is 0, it is preferable that the remaining partial structures excluding both $R^{100}$ and $R^{101}$ at both ends of the compound are structures represented by General Formulae (b1) to (b13). In the structures represented by General Formulae (b1) to (b13), any one of both ends is bonded to $R^{100}$, and the other remaining end is bonded to $R^{101}$. Here, in the compound having such structures, at least one of $R^{100}$ and $R^{101}$ is a chiral alkyl group.

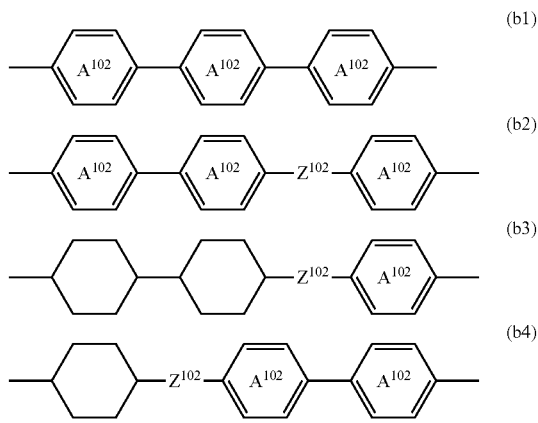

-continued (b5)
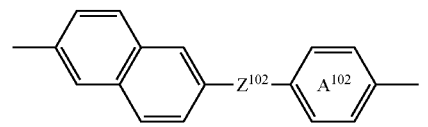

(b6)
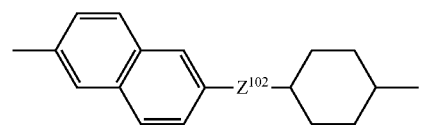

(b7)
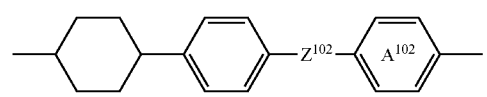

(b8)
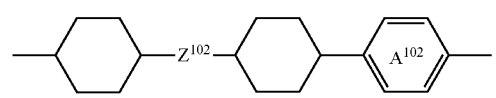

(b9)
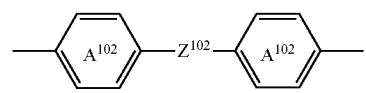

(b10)
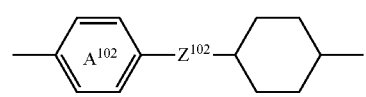

(b11)
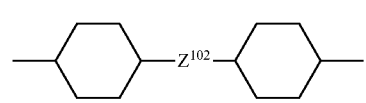

(b12)
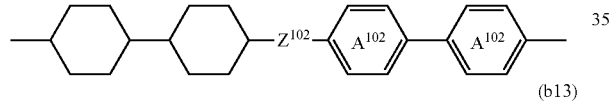

(b13)
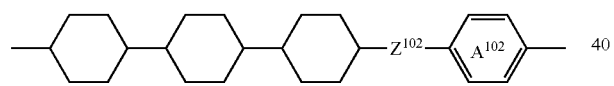

In General Formulae (b1) to (b13), $Z^{102}$ is the same as $Z^{100}$ and $Z^{101}$ in General Formula (Ch-I).

In addition, in General Formulae (b1) to (b13), $A^{102}$ is a 1,4-phenylene group (one —CH= or two or more non-adjacent —CH='s present in the group may be substituted with a nitrogen atom, and one or two or more arbitrary hydrogen atoms in the group each independently may be substituted with a halogen atom, a methyl group, a methoxy group, a trifluoromethyl group, or a trifluoromethoxy group). By substituting —CH= or a hydrogen atom in the 1,4-phenylene group, it is possible to control the deterioration of crystallization and the direction and magnitude of dielectric anisotropy regarding the liquid crystal composition including the compound.

From the viewpoint of the reliability, the ring structure in $A^{102}$ is preferably a compound which is a benzene ring (that is, a compound which is a group in which —CH= present in the 1,4-phenylene group is not substituted with a nitrogen atom) rather than a compound which is a heterocyclic ring such as a pyridine ring and a pyrimidine ring (that is, a compound which is a group obtained by substituting one —CH= or two or more non-adjacent —CH='s present in the 1,4-phenylene group with a nitrogen atom). On the other hand, from the viewpoint that the dielectric anisotropy is made large, the ring structure in $A^{102}$ is a compound which is a heterocyclic ring such as a pyridine ring and a pyrimidine ring rather than a compound which is a benzene ring. A compound having a hydrocarbon ring such as a benzene ring or a cyclohexane ring has relatively low polarizability possessed by the compound; whereas a compound having a heterocyclic ring such as a pyridine ring and a pyrimidine ring has relatively large polarizability possessed by the compound, makes the crystallization deteriorated so as to stabilize the liquid crystallization, and thus is preferably used.

Among the compounds represented by General Formula (Ch-1), as a compound in which $n^{11}$ and $m^{12}$ are 0, compounds represented by General Formulae (Ch-I-1) to (Ch-I-30) are preferable. In General Formulae (Ch-I-1) to (Ch-I-30), $R^{100}$, $R^{101}$, and $Z^{100}$ represent the same meaning of $R^{100}$, $R^{101}$, and $Z^{100}$ in General Formula (Ch-I), and at least one of $R^{100}$ and $R^{101}$ represents a chiral alkyl group, $L^{100}$ to $L^{105}$ each independently represent a hydrogen atom or a fluorine atom.

(Ch-I-1)
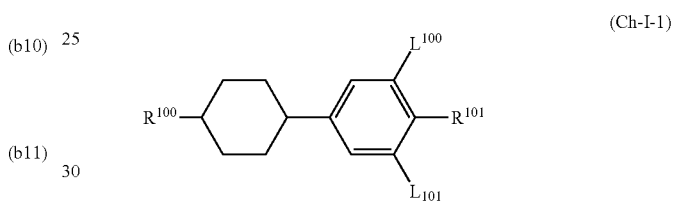

(Ch-I-2)
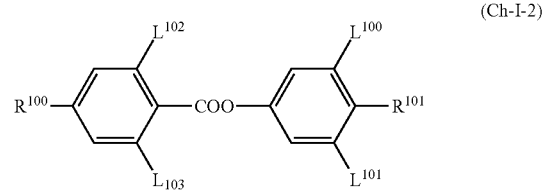

(Ch-I-3)
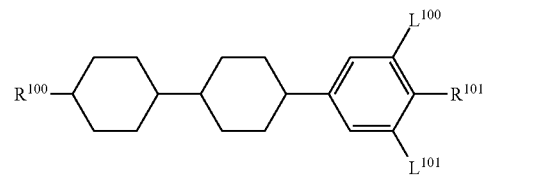

(Ch-I-4)
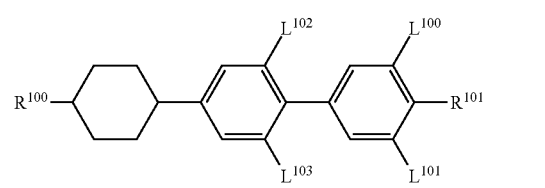

(Ch-I-5)
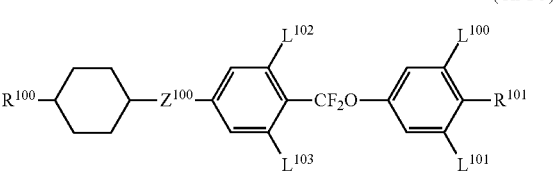

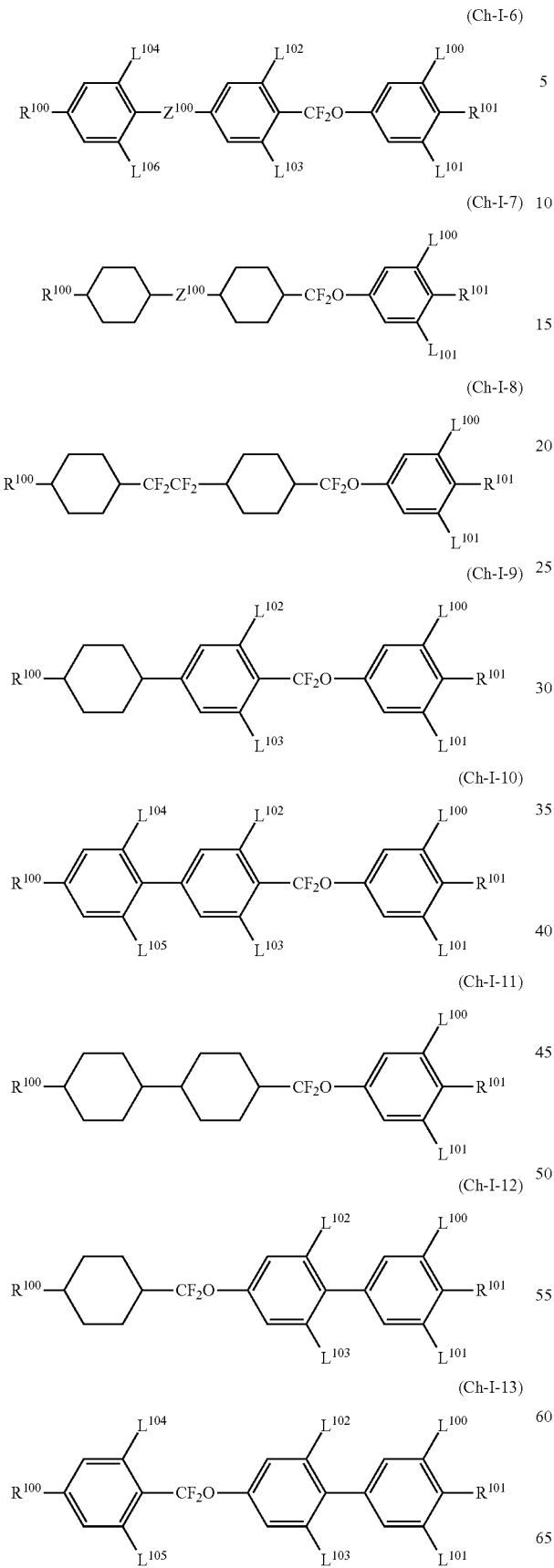

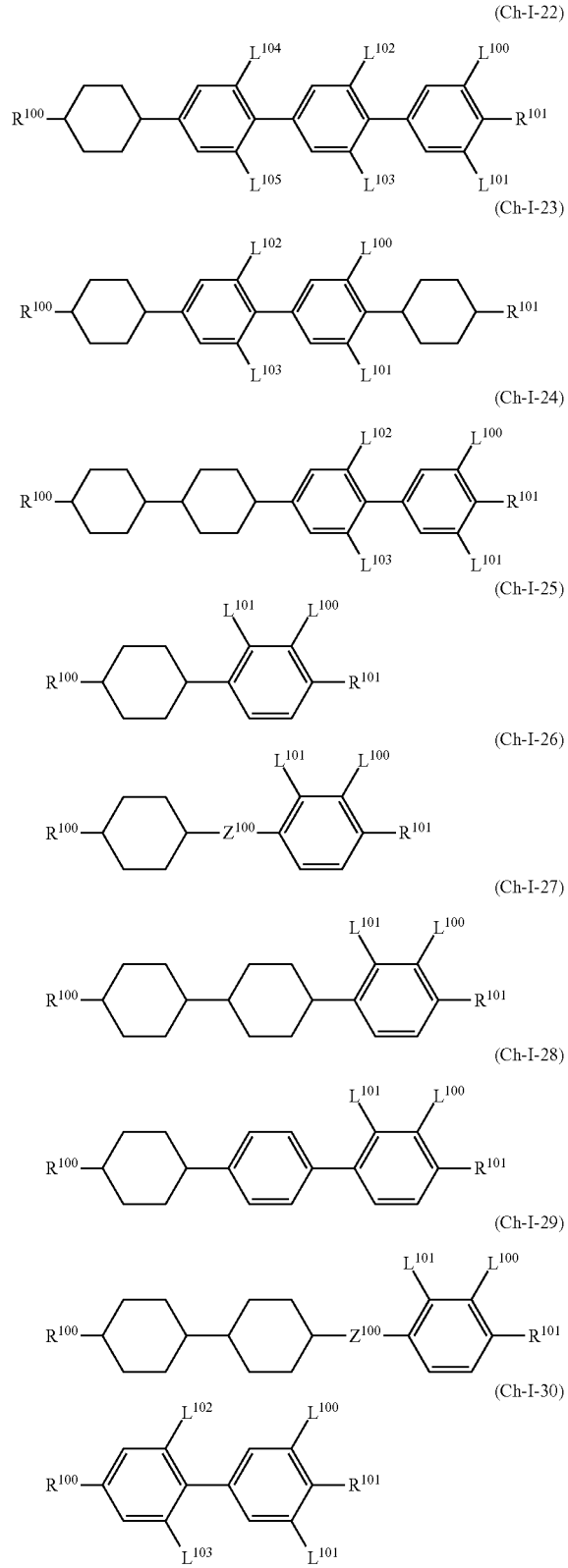

(Ch-I-22)
(Ch-I-23)
(Ch-I-24)
(Ch-I-25)
(Ch-I-26)
(Ch-I-27)
(Ch-I-28)
(Ch-I-29)
(Ch-I-30)

As the compounds represented by General Formulae (Ch-I-1) to (Ch-I-30), one or both of $R^{20}$ and $R^{101}$ are preferably a compound which is a group represented by any one of General Formulae (Ra) to (Rk), and one or both of $R^{100}$ and $R^{101}$ is more preferably a compound which is a group represented by Formulae (Ra-1) to (Ra-3) or General Formulae (Rf-1) to (Rf-3). As a compound which is a group in which any one of $R^{100}$ and $R^{101}$ is represented by any one of General Formulae (Ra) to (Rk), a compound in which the other one of $R^{100}$ and $R^{101}$ is a chiral or achiral alkyl group having 1 to 30 carbon atoms (one or two or more methylene groups which are not adjacent to each other in the alkyl group each independently may be substituted with —O—, —S—, —NH—, —N(CH$_3$)—, —CO—, —COO—, —OCO—, —OCO—O—, —S—CO—, —CO—S—, —CH=CH—, —CF$_2$—, —CF=CH—, —CH=CF—, —CF=CF—, or C≡C—, and one or two or more hydrogen atoms in the group each independently may be substituted with a halogen atom or a cyano group) is preferable, and a compound which is an alkyl group having 1 to 16 carbon atoms, an alkoxy group having 1 to 16 carbon atoms, an alkenyl group having 2 to 16 carbon atoms, or an alkenyloxy group having 2 to 16 carbon atoms is more preferable.

The blue phase in the embodiment, the polymer-stabilized blue phase in which the blue phase is stabilized by the network formed of the polymer compound component 41, and the optically isotropic liquid crystal phase as other phases preferably include at least one kind of the compound represented by any one of General Formulae (Ch-I-1) to (Ch-I-30), and more preferably include the compound represented by General Formula (Ch-I-30). As the compound represented by General Formula (Ch-I-30), specifically, compounds represented by General Formulae (Ch-1-30-1) to (Ch-I-30-6) (in the formula, $n^{13}$ represents 0 or 1, n represents an integer in a range of 2 to 12, $R^{102}$ represents an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, and $L^{100}$ to $L^{105}$ each independently represent a hydrogen atom or a fluorine atom). In General Formulae (Ch-I-30-1) to (Ch-I-30-6), $R^{102}$ is an alkyl group having 1 to 6 carbon atoms, an alkoxy group having 1 to 6 carbon atoms, an alkenyl group having 2 to 6 carbon atoms, or an alkenyloxy group having 2 to 6 carbon atoms.

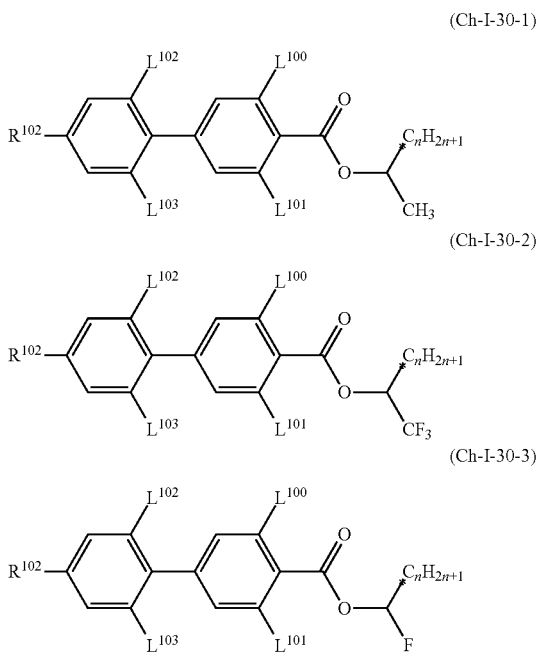

(Ch-I-30-1)
(Ch-I-30-2)
(Ch-I-30-3)

(Ch-I-30-4)

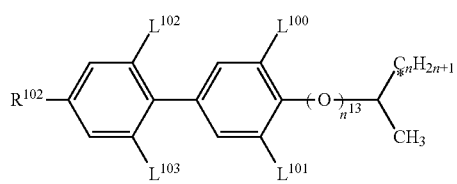

(Ch-I-30-6)

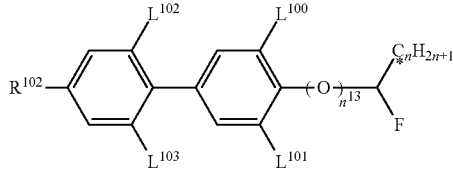

(Ch-I-30-5)

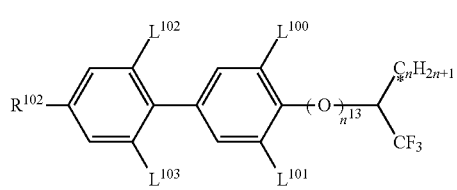

In a case where $n^{11}$ is 1, the compound represented by General Formula (Ch-I) has a structure having an asymmetric carbon in a ring structure part. In this case, the compound represented by General Formula (Ch-I) is preferably a compound in which D is Formula (D2) or (D4), and is more preferably a compound in which D is Formula (D4). As the compound in which D is Formula (D2), compounds represented by General Formulae (K2-1) to (K2-8) are preferable, and the compound in which D is Formula (D4), compounds represented by General Formulae (K3-1) to (K3-6). In General Formulae (K2-1) to (K2-8) and (K3-1) to (K3-6), an asterisk (*) represents a chiral carbon atom.

(K2-1)

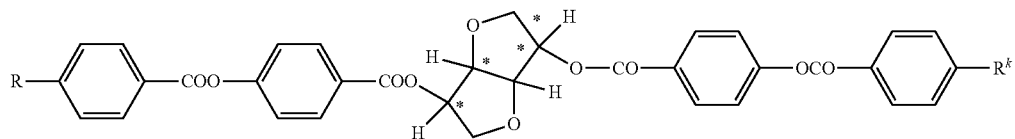

(K2-2)

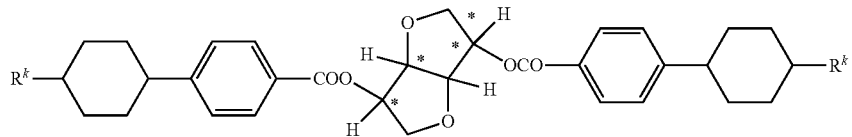

(K2-3)

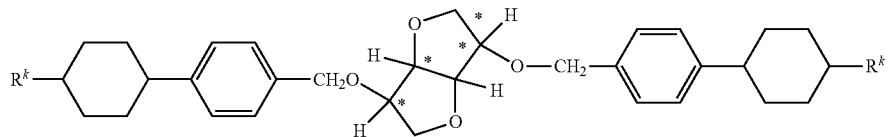

(K2-4)

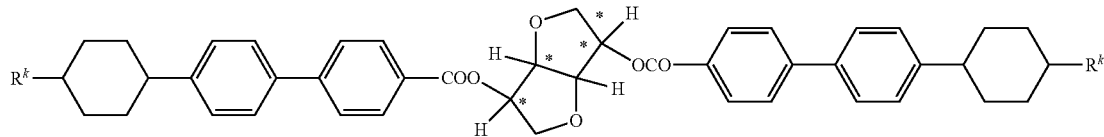

(K2-5)

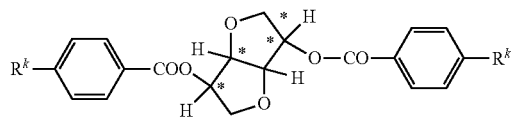

(K2-6)

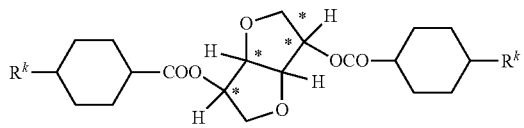

(K2-7)

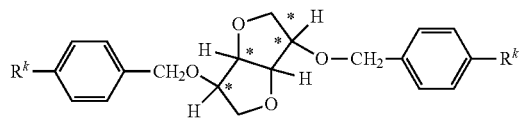

(K2-8)

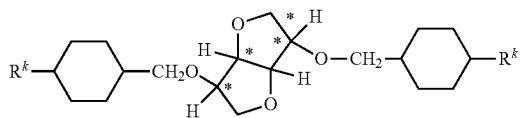

-continued

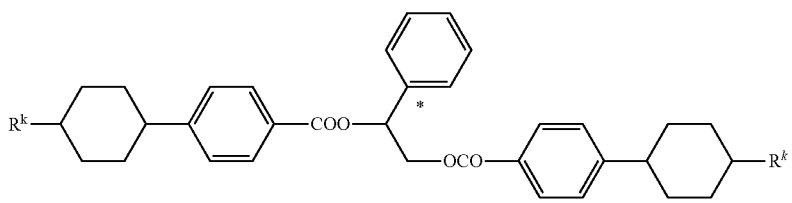
(K3-1)

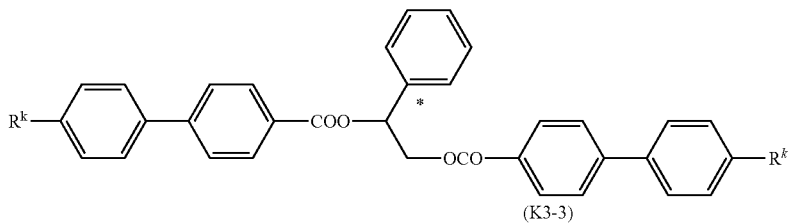
(K3-2)

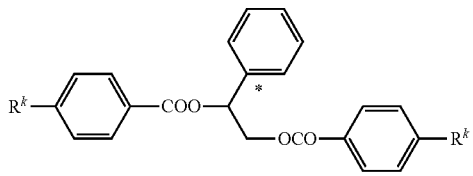
(K3-3)

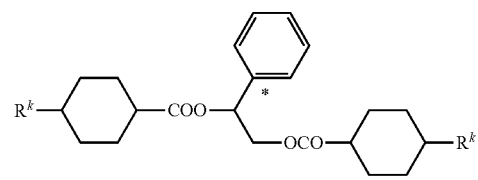
(K3-4)

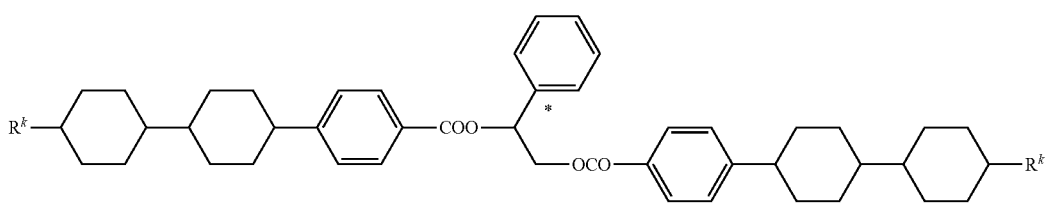
(K3-5)

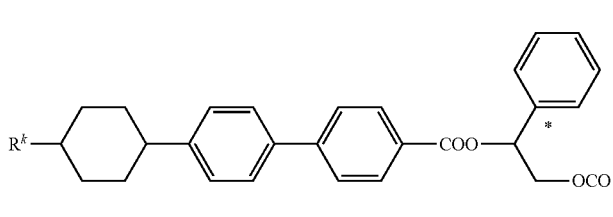
(K3-6)

In General Formula (K2-1) to (K2-8), (K3-1) to (K3-6). $R^k$'s each independently represent the same meaning as $R^{100}$ and $R^{101}$ in General Formula (Ch-I). As the chiral compound used in the blue phase in the embodiment or the polymer-stabilized blue phase in which the blue phase is stabilized by the network formed of the polymer compound component 41, or the optically isotropic liquid crystal phase as other phases, among the compounds represented by General Formulae (K2-1) to (K2-8) or (K3-1) to (K3-6), $R^k$'s are each independently preferably a compound which is a chiral or achiral alkyl group having 1 to 30 carbon atoms (one or two or more methylene groups which are not adjacent to each other in the alkyl group each independently may be substituted with —O—, —S—, —NH—, —N(CH$_3$)—, —CO—, —COO—, —OCO—, —OCO—O—, —S—CO—, —CO—S—, —CH=CH—, —CF$_2$—, —CF=CH—, —CH=CF—, —CF=CF—, or C≡C—, one or two or more hydrogen atoms in the alkyl group each independently may be substituted with a halogen atom or a cyano group), is more preferably a compound which is an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, and is still more preferably an alkyl group having 3 to 10 carbon atoms, an alkoxy group having 3 to 10 carbon atoms, an alkenyl group having 3 to 10 carbon atoms, or an alkenyloxy group having 3 to 10 carbon atoms.

<Compound with Axial Asymmetry>

As a compound with axial asymmetry, specifically, a compound represented by General Formula (IV-1), (IV-2), (IV-3) or (IV-4) is preferable.

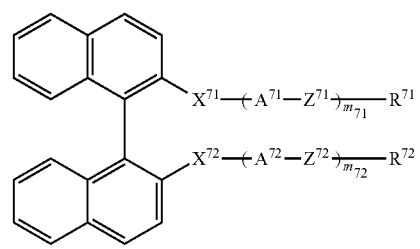
(IV-1)

-continued

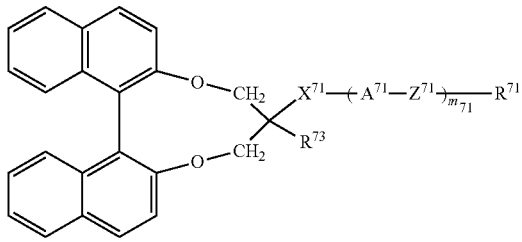

(IV-2)

In the compound represented by General Formula (IV-1) or (IV-2), a bond connecting α-positions of two naphthalene rings is an axis of the axial asymmetry.

In General Formulae (IV-1) and (IV-2), $R^{71}$ and $R^{72}$ each independently represent a hydrogen atom, a halogen atom, a cyano group, an isocyanate group, an isothiocyanate group, or an alkyl group having 1 to 20 carbon atoms. One or two or more arbitrary methylene groups in the alkyl group each independently may be substituted with —O—, —S—, —COO—, —OCO—, —CH═CH—, —CF═CF—, or —C≡C— such that an oxygen atom and a sulfur atom are not directly bonded to each other. Further, one or two or more arbitrary hydrogen atoms in the alkyl group may be substituted with a halogen atom. As the compound represented by General Formula (IV-1) or (IV-2), $R^{71}$ and $R^{72}$ are each independently preferably an alkyl group having 1 to 20 carbon atoms which is unsubstituted or may have a substituent, more preferably an unsubstituted alkyl group having 1 to 20 carbon atoms, and still more an unsubstituted alkyl group having 1 to 6 carbon atoms.

In General Formulae (IV-1) and (IV-2), $A^{71}$ and $A^{72}$ each independently represent an aromatic or non-aromatic three-, six-, or eight-membered ring or a condensed ring having 9 or more carbon atoms. One or two or more arbitrary hydrogen atoms in such ring structures each independently may be substituted with a halogen atom, an alkyl group having 1 to 3 carbon atoms, or a haloalkyl group having 1 to 3 carbon atoms. In addition, one or two or more arbitrary methylene groups which are not adjacent to each other in the ring structure each independently may be substituted with —O—, —S—, or —NH—, and one or two or more arbitrary —CH═'s which are not adjacent to each other in the ring structure each independently may be substituted with —N═. In a case where $m_{71}$ is an integer of 2 or more, and a plurality of $A^{71}$'s are present in one molecule, those may be the same as or may be different from each other. Similarly, in a case where $m_{72}$ is an integer of 2 or more, and a plurality of $A^{72}$'s are present in one molecule, those may be the same as or may be different from each other.

As the compound represented by General Formula (IV-1) or (V-2), $A^{71}$ and $A^{72}$ are each independently preferably a 1,4-phenylene group, a trans-1,4-cyclohexylene group, a pyridine-2,5-diyl group, a pyrimidine-2,5-diyl group, and a naphthalene-2,6-diyl group. A group in which one or two or more hydrogen atoms among those groups are each independently substituted with a halogen atom, an alkyl group having 1 to 3 carbon atoms, or a haloalkyl group having 1 to 3 carbon atoms is also preferable. Among them, a 1,4-phenylene group in which one or two or more hydrogen atoms may be substituted with a fluorine atom, or a trans-1,4-cyclohexylene group is more preferable, and an unsubstituted 1,4-phenylene group or an unsubstituted trans-1,4-cyclohexylene group is still more preferable.

In General Formulae (IV-1) and (IV-2), $Z^{71}$ and $Z^{72}$ each independently represent a single bond or an alkylene group having 1 to 8 carbon atoms. One or two or more arbitrary methylene groups in the alkylene group each independently may be substituted with —O—, —S—, —COO—, —OCO—, —CSO—, —OCS—, —N═N—, —CH═N—, —N═CH—, —N(O)═N—, —N═N(O)—, —CH═CH—, —CF═CF—, or —C≡C— such that an oxygen atom and a sulfur atom are not directly bonded to each other. In addition, one or two or more arbitrary hydrogen atoms in the alkylene group may be substituted with a halogen atom. In a case where $m_{71}$ is an integer of 2 or more, and a plurality of $Z^{71}$'s are present in one molecule, those may be the same as or may be different from each other. Similarly, in a case where $m_{72}$ is an integer of 2 or more, and a plurality of $Z^{72}$'s are present in one molecule, those may be the same as or may be different from each other.

As the compound represented by General Formula (IV-1) or (IV-2), $Z^{71}$ and $Z^{72}$ are each independently preferably a single bond, an unsubstituted alkylene group having 1 to 4 carbon atoms, —COO—, —OCO—, —CH═CH—, or —C≡C—, more preferably a single bond, —CH$_2$—, —CH$_2$CH$_2$—, —COO—, —OCO—, —CH═CH—, or —C≡C—, and still more preferably a single bond, —COO—, or —OCO—.

In General Formulae (IV-1) and (IV-2), $X^{71}$ and $X^{72}$ each independently represent a single bond, —COO—, —OCO—, —CH$_2$O—, —OCH$_2$—, —CF$_2$O—, —OCF$_2$—, or —CH$_2$CH$_2$—. As the compound represented by General Formula (IV-1) or (IV-2), $X^{71}$ and $X^{72}$ are each independently preferably a single bond, —COO—, —OCO—, —CH$_2$O—, —OCH$_2$—, or —CH$_2$CH$_2$—, and is more preferably a single bond, —COO—, or —OCO—.

In General Formula (IV-2), $R^{73}$ represents a hydrogen atom, a halogen atom, or —X$^{71}$-(A$^{71}$-Z$^{71}$)m$_{71}$-R$^{71}$.

In General Formulae (IV-1) and (IV-2), $m_{71}$ and $m_{72}$ each independently represent an integer in a range of 1 to 4. Here, in General Formula (IV-2), in a case where $R^{73}$ is —X$^{71}$-(A$^{71}$-Z$^{71}$)m$_{71}$-R$^{71}$, any one of two $m_{71}$'s may be 0. As the compound represented by General Formula (IV-1) or (IV-2), $m_{71}$ and $m_{72}$ are each independently preferably 2 or 3, and are more preferably 2.

(IV-3)

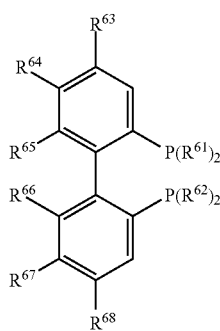

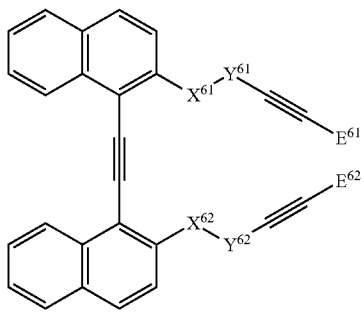

(IV-4)

In the compound represented by General Formula (IV-3), a single bond connecting two benzene rings is an axis of the axial asymmetry, and in the compound represented by General Formula (IV-4), a bond connecting α-positions of two naphthalene rings is an axis of the axial asymmetry.

In General Formula (IV-3), $R^{61}$ and $R^{62}$ each independently represent a phenyl group in which one or two or more arbitrary hydrogen atoms each independently may be substituted with an alkyl group, an alkoxyl group, or a halogen atom, a cyclopentyl group, or a cyclohexyl group. An alkyl group or an alkoxyl group which is substituted with hydrogen atom in the phenyl group is preferably a linear or branched group having 1 to 6 carbon atoms, and is more preferably a linear or branched group having 1 to 3 carbon atoms.

In General Formula (IV-3), $R^{63}$, $R^{64}$, $R^{65}$, $R^{66}$, $R^{67}$, and $R^{68}$ each independently represent a hydrogen atom, an alkyl group, an alkoxyl group, an acyloxy group, a halogen atom, a haloalkyl group, or a dialkylamino group. Two of $R^{63}$, $R^{64}$, and $R^{65}$ in General Formula (IV-3) may form a methylene chain which may have a substituent, or a mono- or polymethylenedioxy group which may have a substituent, and two of $R^{66}$, $R^{67}$, and $R^{68}$ may form a methylene chain which may have a substituent, or a mono- or polymethylenedioxy group which may have a substituent. Here, a case where $R^{65}$ and $R^{66}$ are hydrogen atoms is excluded.

In General Formula (IV-4), at least any one of $X^{61}$ and $Y^{61}$ and $X^{62}$ and $Y^{62}$ is present, $X^{61}$, $X^{62}$, $Y^{61}$, and $Y^{62}$ each independently represent any one of $CH_2$, $C=O$, O, N, S, P, B, and Si. In a case where $X^{61}$, $X^{62}$, $Y^{61}$, or $Y^{62}$ is N, P, B, or Si, it may be bonded to a substituent such as an alkyl group, an alkoxy group, and an acyl group so as to satisfy the required valence.

In General Formula (IV-4), $E^{61}$ and $E^{62}$ each independently represent a hydrogen atom, an alkyl group, an aryl group, an allyl group, a benzyl group, an alkenyl group, an alkynyl group, an alkyl ether group, an alkyl ester group, an alkyl ketone group, a heterocyclic group, or derivatives thereof.

As the chiral compound containing in the blue phase in the embodiment or the polymer-stabilized blue phase in which the blue phase is stabilized by the network formed of the polymer compound component 41, or the optically isotropic liquid crystal phase as other phases, in a case where a strong spiral induction is required, a compound represented by General Formula (IV-1) or (IV-2) is particularly preferable.

As the compound represented by General Formula (IV-1), specifically, compounds represented by General Formulae (K4-1) to (K4-12) are preferable, compounds represented by General Formulae (K4-1) to (K4-6) are more preferable, and compounds represented by General Formulae (K4-3) to (K4-6) are still more preferable. In the compounds represented by General Formulae (K4-1) to (K4-12), a bond connecting α-positions of two naphthalene rings is an axis of the axial asymmetry.

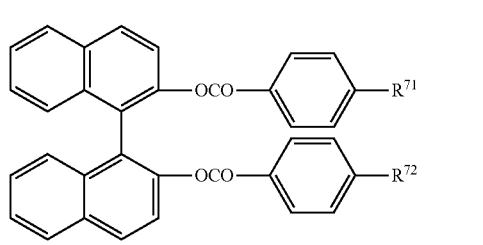

(K4-1) (K4-2)

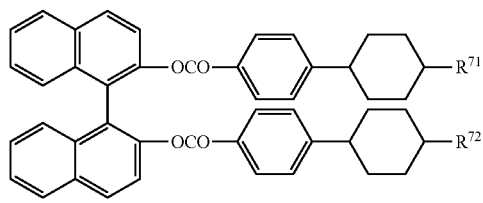

(K4-3) (K4-4)

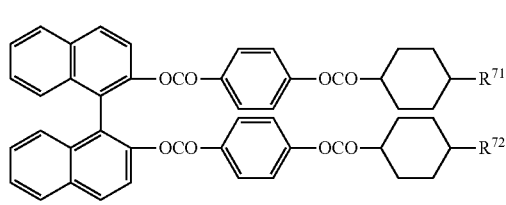

(K4-5) (K4-6)

-continued

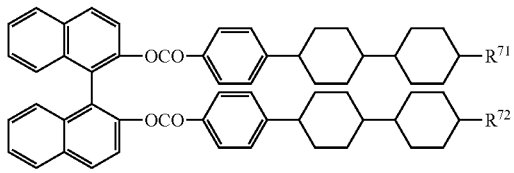
(K4-7)

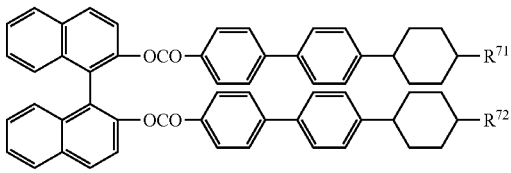
(K4-8)

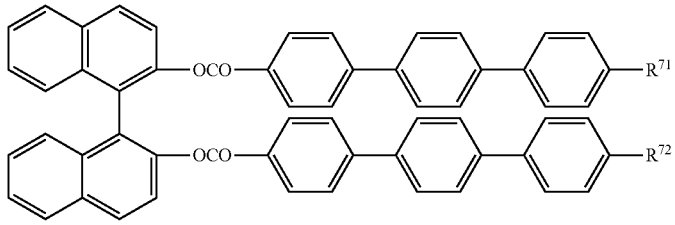
(K4-9)

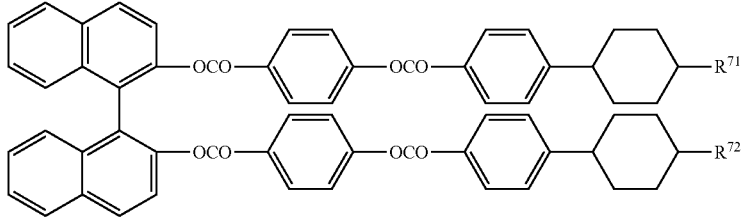
(K4-10)

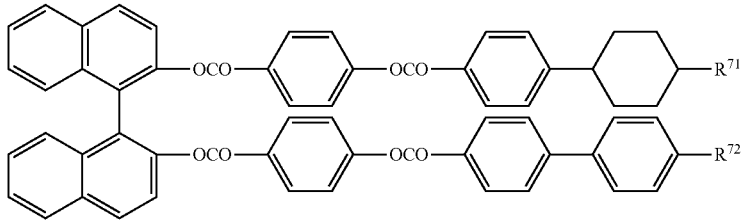
(K4-11)

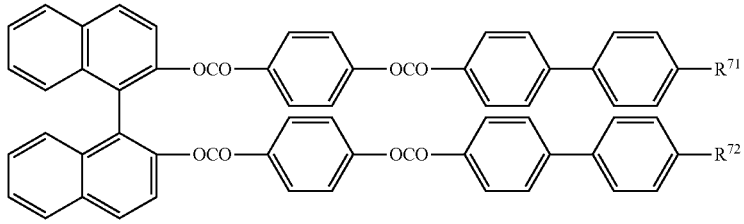
(K4-12)

In General Formulae (K4-1) to (K4-12), $R^{71}$ and $R^{72}$ represent the same meaning as that of $R^{71}$ and $R^{72}$ in General Formula (IV-1). As the chiral compound used in the blue phase in the embodiment or the polymer-stabilized blue phase in which the blue phase is stabilized by the network formed of the polymer compound component 41, or the optically isotropic liquid crystal phase as other phases, among the compounds represented by General Formulae (K4-1) to (K4-12), $R^{71}$ and $R^{72}$ are each independently preferably a compound which is an alkyl group having 1 to 20 carbon atoms which may be unsubstituted or have a substituent, more preferably a compound which is an unsubstituted alkyl group having 1 to 20 carbon atoms, and still more preferably a compound which is an unsubstituted alkyl group having 1 to 6 carbon atoms.

As the compound represented by General Formula (IV-2), specifically, the compounds represented by General Formulae (K5-1) to (K5-3) are exemplary examples. In the compounds represented by General Formulae (K5-1) to (K5-3), a bond connecting α-positions of two naphthalene rings is an axis of the axial asymmetry.

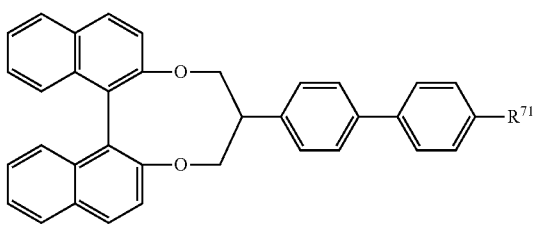
(K5-1)

(K5-2)

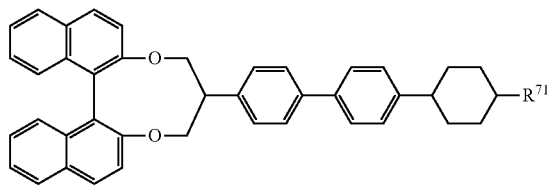

(IV-5)

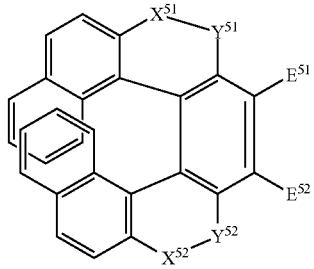

(K5-3)

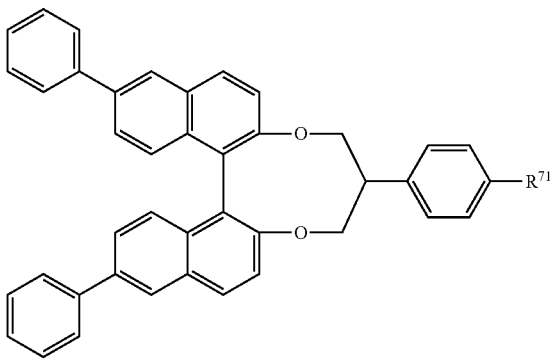

In General Formulae (K5-1) to (K5-3), $R^{71}$ represents the same meaning as that of $R^{71}$ in General Formula (IV-2). As the chiral compound used in the blue phase in the embodiment or the polymer-stabilized blue phase in which the blue phase is stabilized by the network formed of the polymer compound component 41, or the optically isotropic liquid crystal phase as other phases, among the compounds represented by General Formulae (K5-1) to (K5-3), $R^{71}$ is preferably a compound which is an alkyl group having 1 to 20 carbon atoms in which one or two or more arbitrary hydrogen atoms may be substituted with a halogen atom, an alkenyl group having 1 to 20 carbon atoms in which one or two or more arbitrary hydrogen atoms may be substituted with a halogen atom, an alkoxy group having 1 to 19 carbon atoms in which one or two or more arbitrary hydrogen atoms may be substituted with a halogen atom, or an alkyl group having 1 to 19 carbon atoms in which one or two or more arbitrary hydrogen atoms may be substituted with a halogen atom, is more preferably a compound which is an unsubstituted alkyl group having 1 to 20 carbon atoms, and is still more preferably a compound which is unsubstituted alkyl group having 1 to 6 carbon atoms.

<Compound Having Plane Asymmetry>

As the compound having plane asymmetry, a helicene derivative represented by General Formula (IV-5) is an exemplary example. In such a helicene derivative, since it is impossible to freely convert an anteroposterior relationship of the rings overlapping in the front and the rear, and thus a case where the ring has a rightward helical structure and a case where the ring has a leftward spiral structure are distinguished so as to develop the chirality.

In General Formula (IV-5), at least any one of $X^{51}$ and $Y^{51}$, and $X^{52}$ and $Y^{52}$ is present, $X^{51}$, $X^{52}$, $Y^{51}$, and $Y^{52}$ each independently represent any one of $CH_2$, C=O, O, N, S, P, B. and Si. In a case where $X^{51}$, $X^{52}$, $Y^{51}$, or $Y^{52}$ is N, P, B, or Si, it may be bonded to a substituent such as an alkyl group, an alkoxy group, and an acyl group so as to satisfy the required valence.

In General Formula (IV-5), $E^{51}$ and $E^{52}$ each independently represent a hydrogen atom, an alkyl group, an aryl group, an allyl group, a benzyl group, an alkenyl group, an alkynyl group, an alkyl ether group, an alkyl ester group, an alkyl ketone group, a heterocyclic group, or derivatives thereof.

The blue phase in the embodiment or the polymer-stabilized blue phase in which the blue phase is stabilized by the network formed of the polymer compound component 41, or the optically isotropic liquid crystal phase as other phases may contain only one kind of the chiral compound, and the combination of two or more kinds of the chiral compound is preferably used. It is possible to obtain an optically isotropic liquid crystal phase having the desired physical properties by combining various kinds of chiral compounds with different structures and physical properties.

As the chiral compound used in the optically isotropic liquid crystal phase in the embodiment, a chiral compound having relatively large spiral induction is preferable. The compound having the large spiral induction can reduce the additional amount required to achieve a desired pitch (for example, a pitch at 25° C. is in a range of 0.01 to 1 μm, is preferably in a range of 0.05 to 0.5 μm, and is more preferably in a range of 0.1 to 0.4 μm) of the helical structure of the nematic liquid crystal composition to which the chiral compound is added.

Since the blue phase in the embodiment or the polymer-stabilized blue phase in which the blue phase is stabilized by the network formed of the polymer compound component 41, or the optically isotropic liquid crystal phase as other phases is more likely to develop the optically isotropic phase, it is preferable to use at least one kind of chiral compound having negative temperature dependence of the spiral induction when added to the liquid crystal composition (that is, the spiral induction becomes large as the temperature rises). Particularly, in order to produce an optically isotropic liquid crystal phase that can develop a blue phase III in a state of not coexisting with any one of a blue phase I, a blue phase II, and a liquid phase in a very wide temperature range (for example, a temperature width of 2° C. or higher) which is not conventionally present, it is preferable to use a combination of one or two or more kinds of chiral compounds having positive temperature dependence of the spiral induction, and one or two or more kinds of chiral compounds having negative temperature dependence of the spiral induction.

In the blue phase in the embodiment or the polymer-stabilized blue phase in which the blue phase is stabilized by the network formed of the polymer compound component 41, or the optically isotropic liquid crystal phase as other phases, the chiral compound preferably include at least one kind selected from the group consisting of the compounds represented by General Formulae (Ch-I-1) to (Ch-I-30), the compounds represented by General Formulae (K2-1) to (K2-8), the compounds represented by General Formulae (K3-1) to (K3-6), the compounds represented by (K4-1) to (K4-12), and the compound represented by General Formulae (K5-1) to (K5-3), more preferably include a combination of two or more kinds selected from the group consisting of the above compounds, and still more preferably include a combination of at least one kind of the chiral compound having positive temperature dependence of the spiral induction, and at least one kind of the chiral compound having negative temperature dependence of the spiral induction, from the group consisting of the above compounds. Among them, it is preferable to include two kinds or more selected from the group consisting of the compound represented by General Formula (Ch-I-30), the compounds represented by General Formulae (K3-1) to (K3-6), and the compounds represented by General Formulae (K4-1) to (K4-12), and it is more preferable to include at least the compound represented by any one of General Formulae (Ch-I-30-1) to (Ch-I-30-6) and the compound represented by any one of General Formulae (K4-3) to (K4-6).

The amount of the chiral compound in the blue phase in the embodiment or the polymer-stabilized blue phase in which the blue phase is stabilized by the network formed of the polymer compound component 41, or the optically isotropic liquid crystal phase as other phases is not particularly limited as long as the content is sufficient such that the pitch of the nematic liquid crystal composition to be used can be within a desired range, and is appropriately adjusted in consideration of the kinds of the nematic liquid crystal compositions, the kinds of the chiral compounds (particularly, polarizability), and the combination thereof. The amount of the chiral compound in the optically isotropic liquid crystal phase in the embodiment can be in a range of 1 to 45 parts by mass, and can be preferably in a range of 3 to 30 parts by mass, with respect to the nematic liquid crystal composition of 100 parts by mass.

[Polymerizable Compound]

The polymer-stabilized blue phase in the embodiment includes a polymer obtained by polymerizing at least one polymerizable compound in addition to the nematic liquid crystal composition and the chiral compound. The liquid crystal composition which develops the optically isotropic phase obtained by containing the chiral compound in the nematic liquid crystal composition is obtained and is further stabilized by adding a polymer to the liquid crystal composition, and thereby it is possible to develop an optically isotropic phase, particularly a blue phase within a wider temperature range.

The polymer-stabilized blue phase in the embodiment can be prepared by polymerizing a compound having a polymerizable group in a polymerizable compound-containing liquid crystal composition after preparing the polymerizable compound-containing liquid crystal composition obtained by mixing the nematic liquid crystal composition, the chiral compound, the polymerizable compound, and the lubricating interface deriving agent. It is preferable that the polymerization is performed at a temperature region which is a blue phase.

The polymerizable compound used in forming the polymer may be used alone or two or more kinds thereof may be used. Here, the polymerizable compound means a compound at least one polymerizable group in the molecule. As the polymerizable group, a group consisting of structures represented by Formulae (R-1) to (R-16) is preferable. In addition, the polymerizable compound used in the forming of the polymer may be a photopolymerizable compound, and may be a thermal polymerizable compound. From the viewpoint that the polymerization reaction can be relatively easily performed, a polymerizable compound which can be polymerized by a photopolymerizing reaction is preferable.

Depending on the structure, the polymerizable compound can be classified into a polymerizable compound (mesogenic (liquid crystallization) polymerizable compound) having a ring structure such as a cyclohexane skeleton and a benzene skeleton (a mesogenic group), and a polymerizable compound (non-mesogenic (non-liquid crystallization) polymerizable compound) having no mesogenic group.

<Mesogenic Polymerizable Compound>

The mesogenic polymerizable compound is preferably a compound represented by General Formula (PC1).

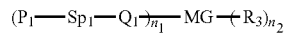

(PC1)

In General Formula (PC1), $P_1$ represents a polymerizable group. As $P_1$, a group consisting of structures represented by Formulae (R-1) to (R-16) is preferable.

In General Formula (PC1), $Sp_1$ represents a spacer group having 0 to 20 carbon atoms. The spacer group is not particularly limited as long as it is a divalent group having 0 to 20 carbon atoms, and may be a group having an atom other than the carbon atom. In addition, the spacer group may be a linear group, may be a branched group, and may have a ring structure. Examples of the spacer group include a single bond, an alkylene group having 1 to 20 carbon atoms, an alkenylene group having 1 to 20 carbon atoms, and an arylene group having 1 to 20 carbon atoms. One or two or more non-adjacent methylene groups in the alkylene group or the alkenylene group each independently may be substituted with —O—, —S—, —NH—, —N(CH$_3$)—, —CO—, —COO—, —OCO—, —OCOO—, —SCO—, —COS—, or —C≡C— such that an oxygen atom and a sulfur atom are not directly bonded to each other. In addition, one or two or more hydrogen atoms in the alkylene group or alkenylene group each independently may be substituted with a halogen atom or a cyano group. As the compound represented by General Formula (PC1), $Sp_t$ is preferably a single bond, an alkylene group having 1 to 16 carbon atoms which is unsubstituted or has a substituent, or an alkenylene group having 1 to 16 carbon atoms which is unsubstituted or has a substituent, and is more preferably a single bond, an unsubstituted alkylene group, or a substituted alkenylene group.

In General Formula (PC1), Q, represents a single bond. —O—, —OCH$_2$—, —OCH$_2$—, —C$_2$H$_4$—, —COO—, —OCO—, —CH═CH—, —CO—, —OCOO—, —NH—, —NHCOO—, —OCONH—, —OCOCH$_2$—, —CH$_2$OCO—, —COOCH$_2$—, —CH$_2$COO—, —CH═CH—COO—, —OCO—CH═CH—, —CH═CH—OCO—, —COO—CH═CH—, —CH═CCH$_3$—COO—, —COO—CCH$_3$═CH—, —COOC$_2$H$_4$—, —OCOC$_2$H$_4$—, —C$_2$H$_4$CO—, —C$_2$H$_4$COO—, —C≡C—, —CF$_2$O—, or —OCF$_2$—. As the compound represented by General Formula (PC1). $Q_1$ is preferably a single bond, —O—, —OCH$_2$—, —OCH$_2$—, —C$_2$H$_4$—, —COO—, —OCO—, —CH=CH—, —OCOCH$_2$—, —CH$_2$OCO—, —COOCH$_2$—, —CH$_2$COO—, —CH=CH—COO—, —OCO—CH=CH—, —CH=CH—OCO—, —COO—CH=CH—, —COOC$_2$H$_4$—, —OCOC$_2$H$_4$—, —C$_2$H$_4$OCO—, —C$_2$H$_4$COO—, —C≡C—, —CF$_2$O—, and —OCF$_2$—, is more preferably —O—, —OCH$_2$—, —CH$_2$O—, —COO—, —OCO—, —C$_2$H$_4$—, —C≡C— and a single bond from the viewpoint of ease of manufacture and the liquid crystal alignment property, and is particularly preferably —OCH$_2$—, —CH$_2$O—, —COO—, —OCO—, and a single bond.

In General Formula (PC1), $R_3$ represents a hydrogen atom, a halogen atom, a cyano group, an alkyl group having 1 to 25 carbon atoms (one or two or more methylene groups in the alkyl group each independently may be substituted with —O—, —S—, —NH—, —N(CH$_3$)—, —CO—, —COO—, —OCO—, —OCOO—, —SCO—, —COS—, or —C≡C— such that oxygen atoms are not directly bonded to each other), or P$_2$—Sp$_2$-Q$_2$- (in the formula, P$_2$, Sp$_2$, and Q$_2$ each represent the same meaning as P$_1$. Sp, and Q$_1$). Here, in a case where $R_3$ is P$_2$—Sp$_2$-Q$_2$-. P$_1$ and P$_2$, Sp$_1$ and Sp$_2$. Q$_1$ and Q$_2$ in one molecule each may be the same as or different from each other.

In General Formula (PC1), $n_1$ and $n_2$ each independently represent 1, 2, or 3. In a case where $n_1$ is 1, and $R_3$ has no polymerizable group, the compound represented by General Formula (PC1) is a monofunctional polymerizable compound. On the other hand, in a case where $n_1$ is 2 or 3, or in a case where $R_3$ has a polymerizable group, the compound represented by General Formula (PC1) is a polyfunctional polymerizable compound having two or more polymerizable groups.

In General Formula (PC1), MG represents a mesogenic group. The mesogenic group is a functional group having rigidity for developing the liquid crystallization, and typically, it has a ring structure such as a cyclohexane skeleton and a benzene skeleton. The mesogenic group may be any of groups constituting mesogenic sites possessed by known liquid crystalline molecules, and is preferably a group represented by General Formula (MG-1).

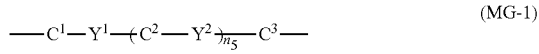

(MG-1)

In General Formula (MG-1). $C^1$ and $C^3$ each independently represent a 1,4-phenylene group, a 1,3,4-benzenetriyl group, a 1,2,4-benzenetriyl group, a benzene-1,2,4,5-tetrayl group, a benzene-1,2,3,4-tetrayl group, a 1,4-cyclohexylene group, a 1,3,4-cyclohexanetriyl group, a 1,2,4-cyclohexanetriyl group, a cyclohexane-1,2,3,4-tetrayl group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2) octylene group, a 2,6-naphthylene group, a naphthalene-2,5,6-triyl group, a naphthalene-2,3,6-triyl group, a naphthalene-2,6,7-triyl group, a naphthalene-2,5,6,7-tetrayl group, a naphthalene-1,2,5,6-tetrayl group, a naphthalene-2,3,6,7-tetrayl group, a 1,2,3,4-tetrahydronaphthalene-2,6-diyl group, a 1,2,3,4-tetrahydronaphthalene-2,5,6-triyl group, a 1,2,3,4-tetrahydronaphthalene-2,6,7-triyl group, a 1,2,3,4-tetrahydronaphthalene-2,5,6-triyl group, a decahydronaphthalene-2,6-diyl group, a decahydronaphthalene-2,5,6-triyl group, a pyridine-2,5-diyl group, a pyrimidine-2,5-diyl group, a pyrazine-2,5-diyl group, a phenanthrene-2,7-diyl group, a 9,10-dihydrophenanthrene-2,7-diyl group, a 1,2,3,4,4a,9,10a-octahydrophenanthrene 2,7-diyl group, and a fluorene 2,7-diyl group. One or two or more arbitrary hydrogen atoms in the groups each independently may be substituted with a fluorine atom, a chlorine atom, a trifluoromethyl group, a trifluoromethoxy group, a cyano group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, or an alkenoyloxy group having 2 to 8 carbon atoms.

In General Formula (MG-1), $C^2$ represents a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2) octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group. One or two or more arbitrary hydrogen atoms in the groups each independently may be substituted with a fluorine atom, a chlorine atom, a trifluoromethyl group, a trifluoromethoxy group, a cyano group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, or an alkenoyloxy group having 2 to 8 carbon atoms. In a case where a plurality of $C^2$'s are present in one molecule, those may be the same as or may be different from each other.

In General Formula (MG-1), $Y^1$ and $Y^2$ each independently represent a single bond, —O—, —OCH$_2$—, —OCH$_2$—, —C$_2$H$_4$—, —COO—, —OCO—, —CH=CH—, —CO—, —OCOO—, —NH—, —NHCOO—, —OCONH—, —OCOCH$_2$—, —CH$_2$OCO—, —COOCH$_2$—, —CH$_2$COO—, —CH=CH—COO—, —OCO—CH=CH—, —CH=CH—OCO—, —COO—CH=CH—, —CH=CCH$_3$—COO—, —COO—CCH$_3$=CH—, —COOC$_2$H$_4$—, —OCOC$_2$H$_4$—, —C$_2$H$_4$OCO—, —C$_2$H$_4$COO—, —C≡C—, —CF$_2$O—, or —OCF$_2$—. In a case where a plurality of $Y^2$'s are present in one molecule, those may be the same as or may be different from each other.

In General Formula (MG-1), $n_5$ represents an integer in a range of 0 to 5. As the compound represented by General Formula (PC1), $n_5$ is preferably an integer in a range of 0 to 3, is more preferably an integer in a range of 0 to 2, and is still more preferably 0 or 1.

Among the compounds represented by General Formula (PC1), the monofunctional polymerizable compound is preferably the compound represented by General Formula (V-a).

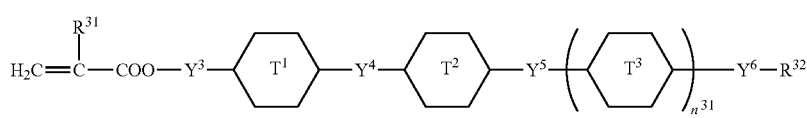
(V-a)

In General Formula (V-a), $R^{31}$ represents a hydrogen atom or a methyl group.

In General Formula (V-a), $n^{31}$ represents an integer of 0 or 1.

In General Formula (V-a), $T^1$, $T^2$, and $T^3$ each independently represent any one of the following divalent groups having 14 kinds of ring structures (here, m represents an integer in a range of 1 to 4).

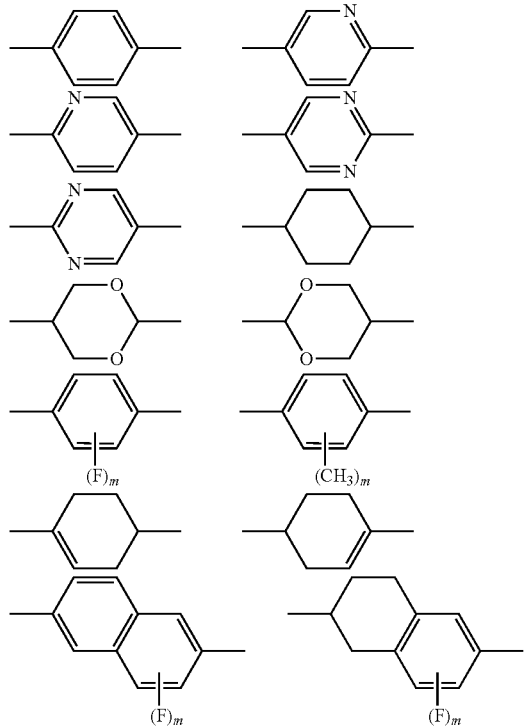

In General Formula (V-a), $Y^3$, $Y^4$, and $Y^5$ each independently represent a single bond, —O—, —OCH$_2$—, —OCH$_2$—, —CH$_4$—, —COO—, —OCO—, —CH=CH—, —CO—, —OCOO—, —NH—, —NHCOO—, —OCONH—, —OCOCH$_2$—, —CH$_2$OCO—, —COOCH$_2$—, —CH$_2$COO—, —CH=CH—COO—, —OCO—CH=CH—, —CH=CH—OCO—, —COO—CH=CH—, —CH=CCH$_3$—COO—, —COO—CCH$_3$=CH—, —COOC$_2$H$_4$—, —OCOC$_2$H$_4$—. —C$_2$H$_4$OCO—, —C$_2$H$_4$COO—, —C≡C—, —CF$_2$O—, or —OCF$_2$—.

In General Formula (V-a), $Y^6$ represents a single bond, —O—, —COO—, or —OCO—.

In General Formula (V-a), $R^{32}$ represents a hydrogen atom, a halogen atom, a cyano group, an alkoxy group having 1 to 20 carbon atoms, or a hydrocarbon group having 1 to 20 carbon atoms. The hydrocarbon group is not particularly limited as long as it is a monovalent group having 1 to 20 carbon atoms and consisting of a carbon atom and a hydrogen atom, an alkyl group having 1 to 20 carbon atoms, an alkenyl group having 1 to 20 carbon atoms, and an alkynyl group having 1 to 20 carbon atoms.

Among the compounds represented by General Formula (PC1), examples of the polyfunctional polymerizable compound include the compounds represented by General Formula (PC1-1) (in the formula, $P_1$, $P_2$, $Sp_1$, $Sp_2$, $Q_1$, $Q_2$, MG, $n_1$, and $n_2$ represent the same meaning as those in General Formula (PC1)). As the compound represented by General Formula (PC1-1), more specifically, the compounds represented by General Formulae (PC1-1) to (PC1-13) are exemplary examples.

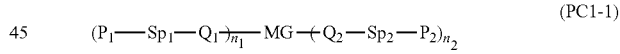
(PC1-1)

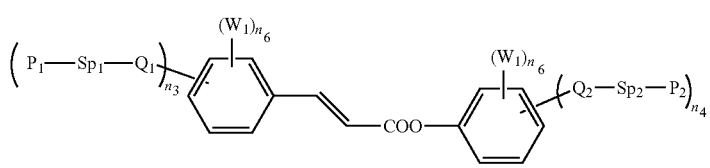
(PC1-1)

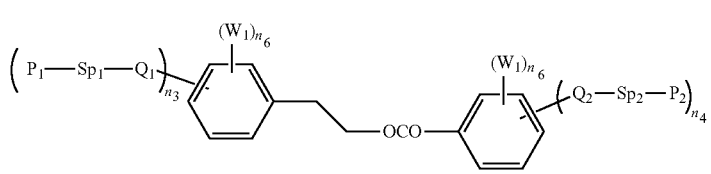
(PC1-2)

-continued
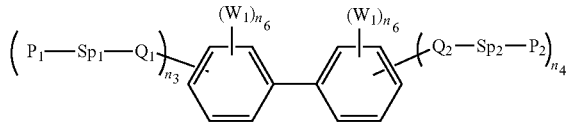 (PC1-3)
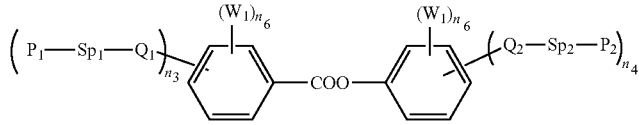 (PC1-4)
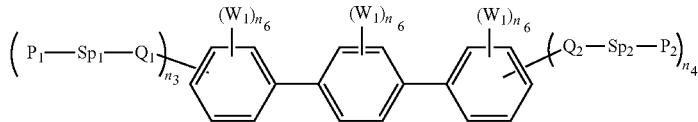 (PC1-5)
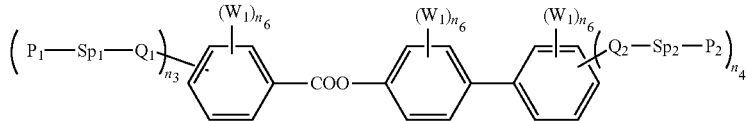 (PC1-6)
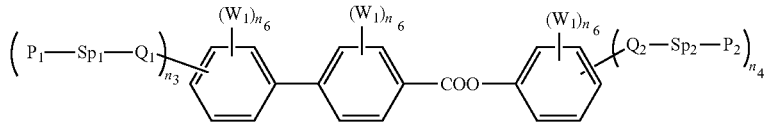 (PC1-7)
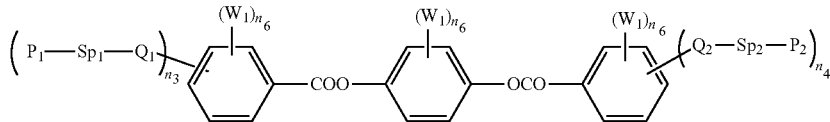 (PC1-8)
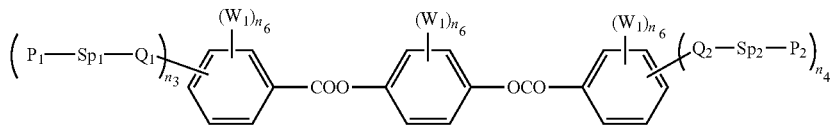 (PC1-9)
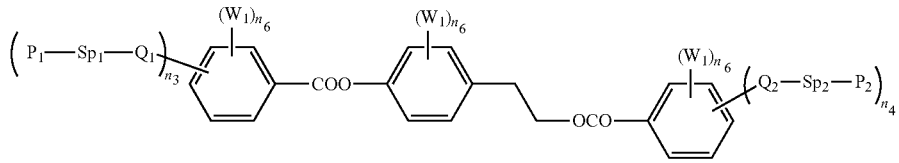 (PC1-10)
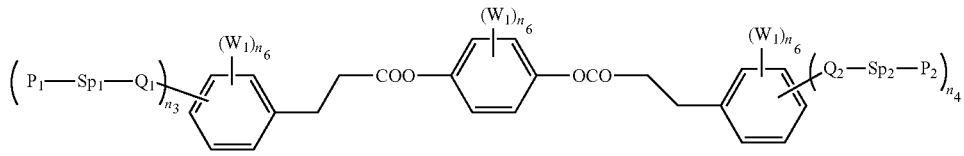 (PC1-11)
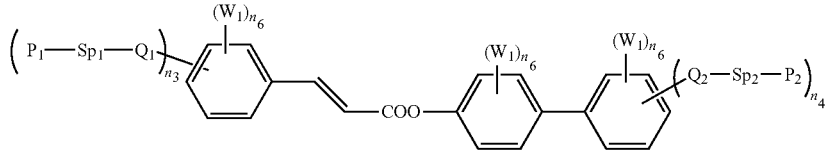 (PC1-12)

-continued

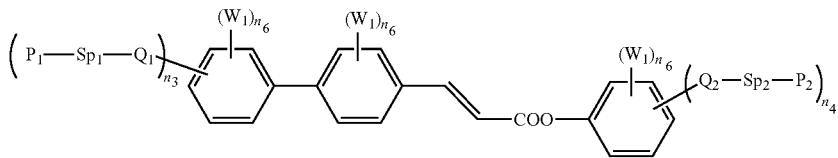
(PC1-13)

In General Formulae (PC1-1) to (PC1-13), $P_1$, $P_2$, $Sp_1$, $Sp_2$, $Q_1$ and $Q_2$ represent the same meaning as those in General Formula (PC1). In the present invention, $Sp_1$, $Sp_2$, $Q_1$, and $Q_2$ are preferably a single bond. In addition, $P_1$ and $P_2$ are each independently preferably Formula (R-1) or (R-2).

In General Formulae (PC1-1) to (PC1-13), $W_1$ each independently represents a fluorine atom, a trifluoromethyl group, a trifluoromethoxy group, an alkyl group having 1 to 5 carbon atoms, an alkoxy group having 1 to 5 carbon atoms, an alkenyl group having 2 to 5 carbon atoms, a phenyl group, —$COOW_2$, —$OCOW_2$, or —$OCOOW_2$. In —$COOW_2$, —$OCOW_2$, and —$OCOOW_2$, $W_2$ each independently represents a linear or branched alkyl group having 1 to 10 carbon atoms, or a linear or branched alkenyl group having 2 to 5 carbon atoms. In a case where a plurality of $W_1$'s are present in one molecule, those may be the same as or may be different from each other.

In the present invention, $W_1$ is each independently preferably a fluorine atom, a trifluoromethyl group, a trifluoromethoxy group, an alkyl group having 1 to 5 carbon atoms, an alkoxy group having 1 to 5 carbon atoms, and a phenyl group, and is more preferably a fluorine atom, a trifluoromethyl group, a trifluoromethoxy group, a methyl group, or a methoxy group.

In General Formulae (PC1-1) to (PC1-13), $n_3$ each independently represents 1, 2, or 3, $n_4$ each independently represents 1, 2, or 3, $n_6$ each independently represents 0, 1, 2, 3, or 4, and $n_3+n_6$ and $n_4+n_6$ on the same ring is equal to or less than 5. In the present invention, $n_3+n_4$ is preferably in a range of 2 to 4, and is more preferably 2 or 3.

As the polymerizable compound used in the present invention, among the compounds represented by General Formulae (PC1-1) to (PC1-13), a compound in which $Sp_1$, $Sp_2$, $Q_1$, and $Q_2$ are a single bond, $P_1$ and $P_2$ are each independently Formula (R-1) or (R-2), $W_1$ each independently a fluorine atom, a trifluoromethyl group, a trifluoromethoxy group, a methyl group, or a methoxy group, and $n_3+n_4$ is 2 or 3 is particularly preferable.

As the compound represented by General Formula (PC1-3), more specifically, the compounds represented by Formulae (PC1-3a) to (PC1-3i) are exemplary examples. A compound in which one or two or more hydrogen atoms on a benzene ring in Formulae (PC1-3a) to (PC1-3i) are substituted with fluorine atoms may be included. It is preferable that the polymer included in the polymer-stabilized blue phase in the embodiment is a polymer obtained by polymerizing one or two or more kinds of these compounds as a polymerizable raw material, and if necessary, other polymerizable compounds.

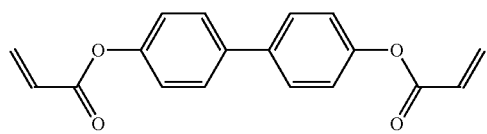
(PC1-3a)

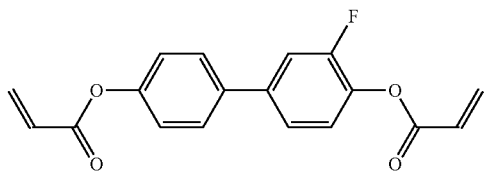
(PC1-3b)

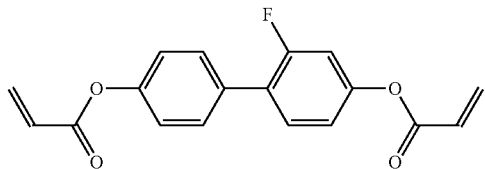
(PC1-3c)

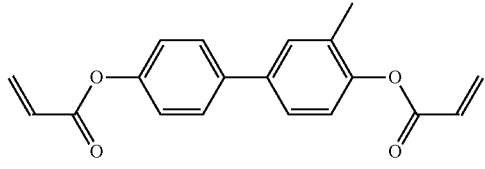
(PC1-3d)

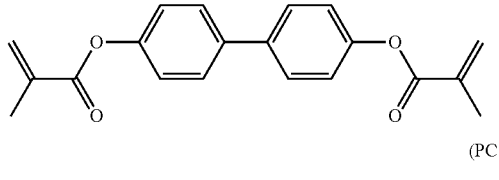
(PC1-3e)

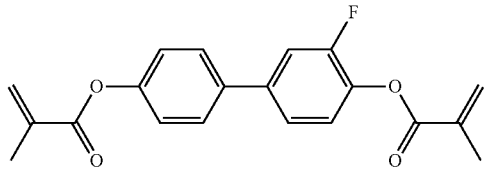
(PC1-3f)

(PC1-3g)

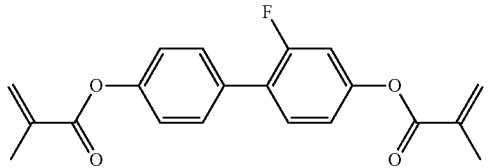

(PC1-3h)

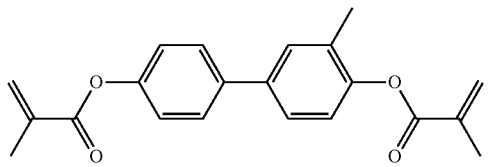

(PC1-3i)

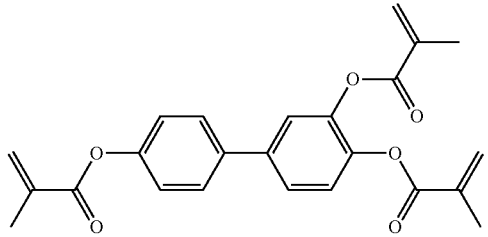

As the compound represented by any one of General Formulae (PC1-1) to (PC1-13), a compound represented by General formula (V-b) is also preferable. It is possible to obtain a polymer-stabilized blue phase excellent in mechanical strength and heat resistance by using the compound represented by General Formula (V-b) as a polymerizable raw material of the polymer contained in the polymer-stabilized blue phase in the embodiment.

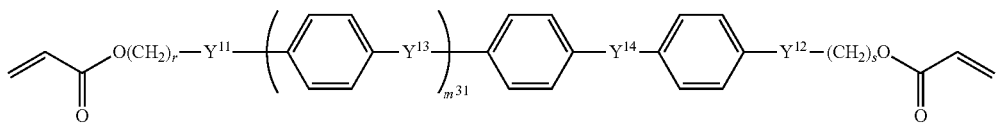

(V-b)

In General Formula (V-b), $m^{31}$ represents 0 or 1, $Y^{11}$ and $Y^{12}$ each independently represent a single bond, —O—, —COO—, or —OCO—, $Y^{23}$ and $Y^{14}$ each independently represent a single bond, —COO—, —OCO—, —CH=CH—COO—, —OCO—CH=CH—, —CH=CH—OCO—, —COO—CH=CH—, —COOC$_2$H$_4$—, —OCOC$_2$H$_4$—, —C$_2$H$_4$OCO—, or —C$_2$H$_4$COO—, and r and s each independently represent an integer in a range of 2 to 14.

A 1,4-phenylene group present in General Formula (V-b) may be unsubstituted, and one or two or more hydrogen atoms may be each independently substituted with, a fluorine atom, a chlorine atom, a methyl group, a trifluoromethyl group, a trifluoromethoxy group, or a phenyl group.

As a compound represented by General Formula (V-b), compounds represented by General Formulae (V-b1) to (V-b20) are particularly preferable. In General Formulae (V-b1) to (V-b20), t and u each independently represent an integer in a range of 2 to 14. It is preferable that the polymer included in the polymer-stabilized blue phase in the embodiment is a polymer obtained by polymerizing one or two or more kinds of these compounds as a polymerizable raw material, and if necessary, other polymerizable compounds.

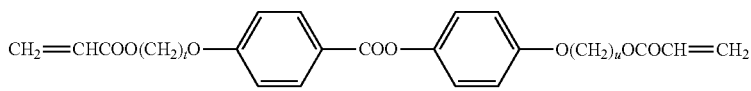

(V-b1)

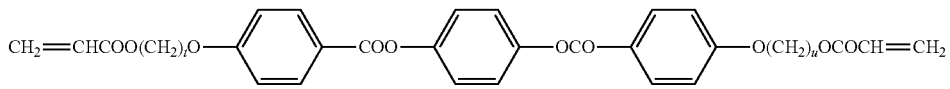

(V-b2)

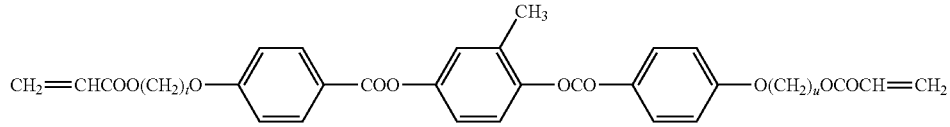
(V-b3)
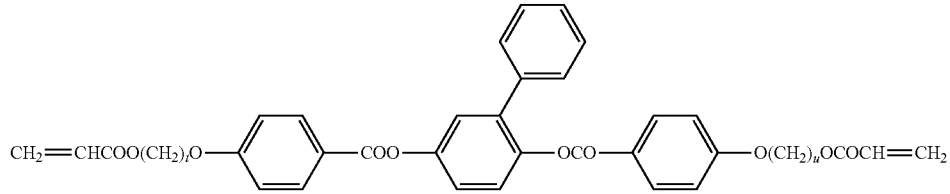
(V-b4)
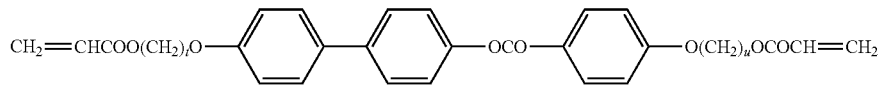
(V-b5)
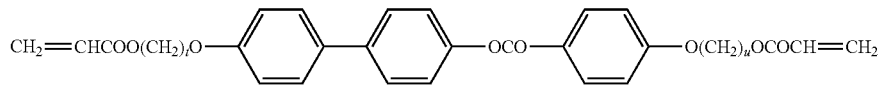
(V-b6)
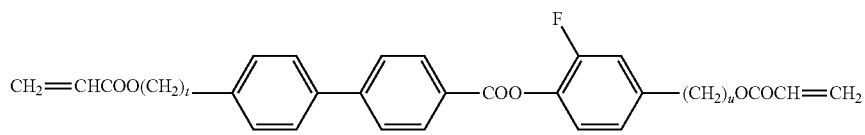
(V-b7)
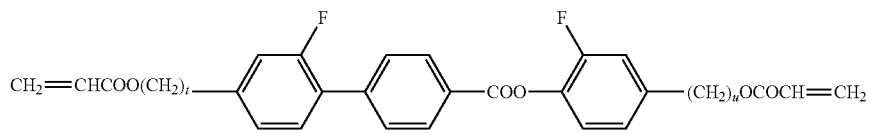
(V-b8)
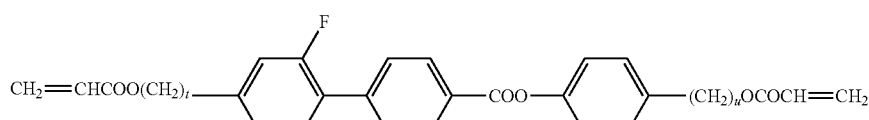
(V-b9)
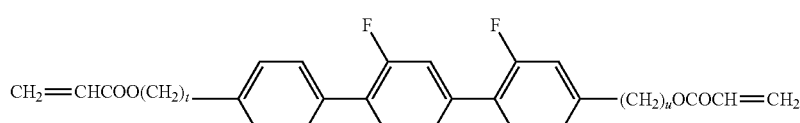
(V-b10)
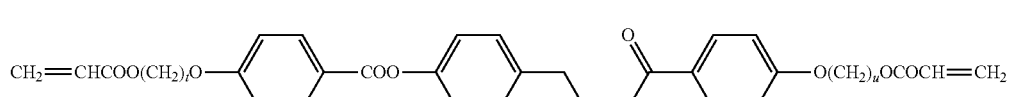
(V-b11)
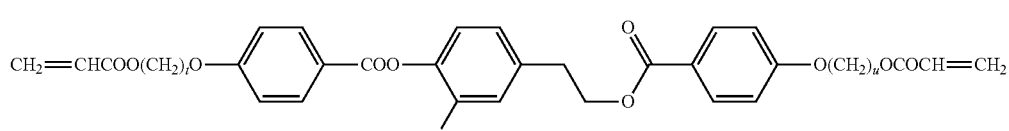
(V-b12)
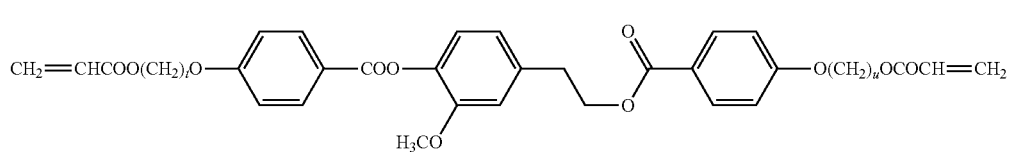
(V-b13)

-continued

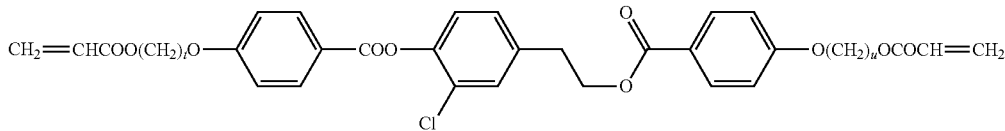
(V-b14)

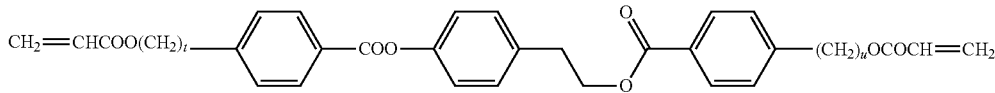
(V-b15)

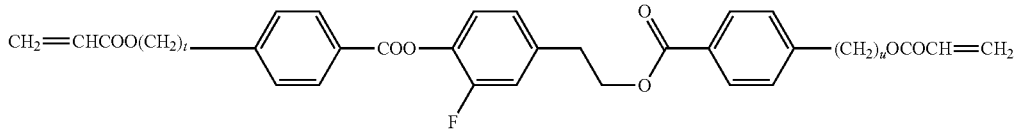
(V-b16)

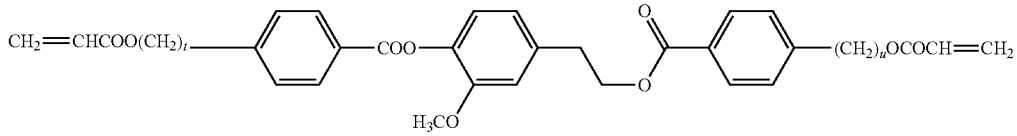
(V-b17)

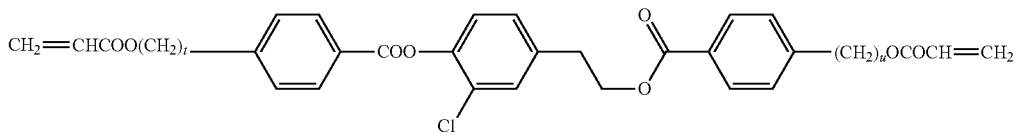
(V-b18)

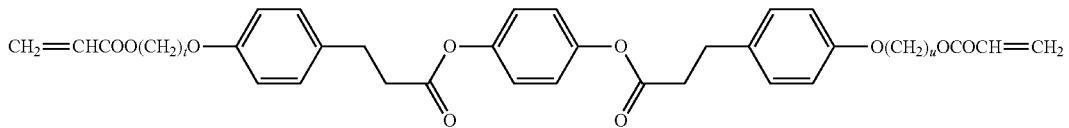
(V-b19)

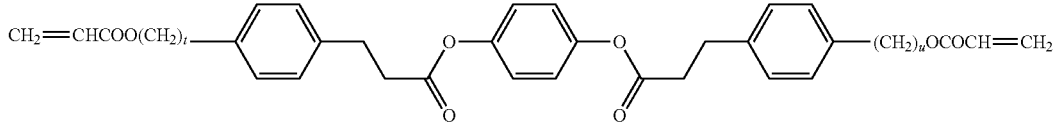
(V-b20)

<Non-Mesogenic Polymerizable Compound>

As the non-mesogenic polymerizable compound, a compound represented by General formula (PC2) is preferable.

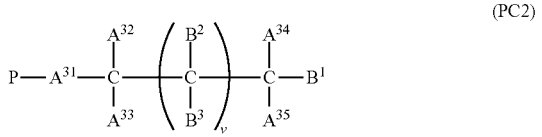
(PC2)

In General Formula (PC2), P represent a polymerizable group. As P, a group consisting of structures represented by Formulae (R-1) to (R-16) is preferable. As the compound represented by General Formula (PC2), P is preferable a group represented by Formula (R-1), Formula (R-2), Formula (R-4), Formula (R-5), Formula (R-7), Formula (R-11), Formula (R-13), or Formula (R-15), is further preferably a group represented by Formula (R-16), Formula (R-1), Formula (R-2), Formula (R-7), Formula (R-11), Formula (R-13) or Formula (R-16), and is still further preferable a group represented by Formula (R-1), Formula (R-2), or Formula (R-16).

In General Formula (PC2), $A^{31}$ represents a single bond or an alkylene group having 1 to 15 carbon atoms.

one or two or more methylene groups present in the alkylene group may be each independently substituted with —O—, —CO—, —COO—, or —OCO— such that oxygen atoms are not directly bonded to each other. In addition, one or two or more hydrogen atoms present in the alkylene group may be each independently substituted with a fluorine atom, a methyl group, or an ethyl group.

In General Formula (PC2), $A^{32}$ and $A^{34}$ each independently represent a hydrogen atom or an alkyl group having 1 to 18 carbon atoms. One or two or more methylene groups present in the alkyl group may be each independently substituted with —O—, —CO—, —COO—, or —OCO— such that oxygen atoms are not directly bonded to each other. In addition, one or two or more hydrogen atoms present in the alkyl group may be each independently substituted with a halogen atom or an alkyl group having 1 to 17 carbon atoms.

In General Formula (PC2), $A^{33}$ and $A^{35}$ each independently represent a hydrogen atom or an alkyl group having 1 to 10 carbon atoms. One or two or more methylene groups present in the alkyl group may be each independently substituted with —O—, —CO—, —COO—, or —OCO— such that oxygen atoms are not directly bonded to each other. In addition, one or two or more hydrogen atoms present in the alkyl group may be each independently substituted with a halogen atom or an alkyl group having 1 to 9 carbon atoms.

In General Formula (PC2), v represents an integer in a range of 1 to 40.

In General Formula (PC2). $B^1$, $B^2$, and $B^3$ each independently represent a group represented by a hydrogen atom, a linear or branched alkyl group having 1 to 10 carbon atoms, or -$A^{36}$-P (in the formula, $A^{36}$ represents a single bond or an alkylene group having 1 to 15 carbon atoms, and P represents a polymerizable group). In a case where $B^1$, $B^2$, or $B^3$ represents an alkyl group, one or two or more methylene groups present in the alkyl group may be each independently substituted with —O—, —CO—, —COO—, or —OCO— such that oxygen atoms are not directly bonded to each other. In a case where $B^1$, $B^2$, or $B^3$ is a group represented by -$A^{36}$-P and the $A^{36}$ represents an alkylene group having 1 to 15 carbon atoms, one or two or more methylene groups present in the alkylene group each independently may be substituted with —O—, —CO—, —COO—, or —OCO— such that oxygen atoms are not directly bonded to each other. In addition, one or two or more hydrogen atoms present in the alkylene group each independently may be substituted with a fluorine atom, a methyl group, or an ethyl group. Here, in one molecule, among (2v+1) $B^1$, $B^2$, and $B^3$, the number of the groups represented by -$A^{36}$-P is in a range of 0 to 3. In a case where a plurality of P's are present in one molecule, those may be the same as or may be different from each other.

As the polymerizable compound as a raw material of the polymer contained in the polymer-stabilized blue phase in the embodiment, one or two or more kinds of the compounds represented by General Formula (PC2) are preferably used, and among the compounds represented by General Formula (PC2), a plurality of materials having different main chain lengths or alkyl side chain lengths may be used.

As the compound represented by General Formula (PC2), specifically, preferable examples thereof the compounds represented by General Formulae (PC2-a) to (PC2-h). As the polymerizable compound as a raw material of the polymer contained in the polymer-stabilized blue phase in this embodiment, it is preferable to use one or more kinds selected from the group consisting of the compounds represented by General Formulae (PC2-a) to (PC2-h), and is more preferable to use at least one kind or more compounds selected from the group consisting of the compounds represented by General Formulae (PC2-a) to (PC2-d).

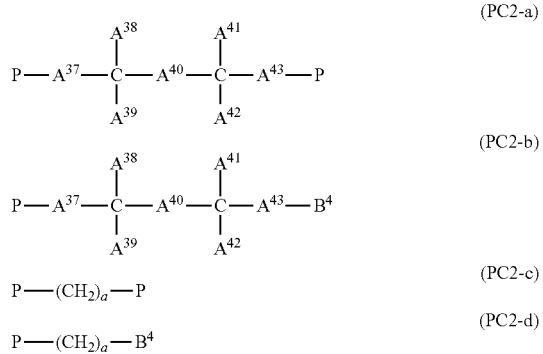

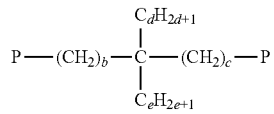

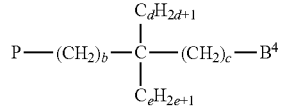

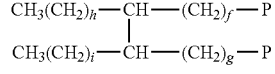

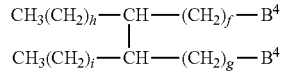

In General Formulae (PC2-a) to (PC2-h), P represents a polymerizable group, and $B^4$ represents a hydrogen atom or a methyl group. As P, a group consisting of structures represented by Formulae (R-1) to (R-16) is preferable, a group represented by Formula (R-1), Formula (R-2), or Formula (R-16) is more preferable, and a group represented by Formula (R-1) is still more preferable from the viewpoint that the polymerization rate is fast. In the compounds represented by General Formulae (PC2-a), (PC2-c), (PC2-e), and (PC2-g), two P's included in one molecule may be the same as and different from each other.

In General Formula (PC2-a) or (PC2-b), $A^{37}$ and $A^{42}$ each independently represent a single bond or an alkylene group having 1 to 15 carbon atoms. One or two or more methylene groups present in the alkylene group each independently may be substituted with —O—, —CO—, —COO—, or —OCO— such that oxygen atoms are not directly bonded to each other. Further, one or two or more hydrogen atoms present in the alkylene group each independently may be substituted with a fluorine atom, a methyl group, or an ethyl group.

In General Formula (PC2-a) or (PC2-b), $A^{38}$ and $A^{41}$ each independently represent a straight-chain alkyl group having 2 to 20 carbon atoms. One or two more methylene groups present in the alkyl group each independently may be substituted with —O—, —CO—, —COO—, or —OCO— such that oxygen atoms are not directly bonded to each other.

In General Formula (PC2-a) or (PC2-b), $A^{39}$ and $A^{42}$ each independently represent a hydrogen atom or an alkyl group having 1 to 10 carbon atoms. One or two or more methylene groups present in the alkyl group each independently may be substituted with —O—, —CO—, —COO—, or —OCO— such that oxygen atoms are not directly bonded to each other. In addition, one or two or more hydrogen atoms present in the alkyl group each independently may be substituted with a halogen atom or an alkyl group having 1 to 9 carbon atoms.

In General Formulae (PC2-a) or (PC2-b), $A^{40}$ represents an alkylene group having 9 to 16 carbon atoms. In at least one and not more than five methylene groups present in the alkylene group, any one of the hydrogen atoms in the methylene group is substituted with a linear or branched alkyl group having 1 to 10 carbon atoms. In addition, one or two or more methylene groups present in the alkylene group each independently may be substituted with —O—, —CO—, —COO—, or —OCO— such that oxygen atoms are not directly bonded to each other.

In the compound represented by General Formula (PC2-a), the distance between two polymerizable groups (distance between cross-linking points) can be adjusted by independently changing the length of the number of carbon atoms of each of $A^{37}$, $A^{40}$, and $A^{43}$. One of the features of the compound represented by General Formula (PC2-a) is that the polymerizable group distance is long. Here, in a case where the length is excessively long, the polymerization rate is very low, and there is a risk of adversely affecting phase separation. For this reason, the polymerizable group distance has an upper limit. On the other hand, the distance between two side chains of $A^{38}$ and $A^{41}$ also affects the mobility of the main chain. That is, in a case where the distance between $A^{38}$ and $A^{41}$ is short, the side chains $A^{38}$ and $A^{41}$ interfere with each other, thereby causing deterioration of the mobility of the entire compounds. In this regard, in a case where the distance between polymerizable groups is about the same, a case where the number of carbon atoms of $A^{40}$ is preferable rather than a case where the number of carbon atoms of $A^{38}$ and $A^{41}$ is long.

In General Formula (PC2-a) or (PC2-b), the number of carbon atoms of $A^4$ is preferably long from the viewpoint of adjusting the distance between side chains (distance between $A^{38}$ and $A^{41}$, distance between $A^{39}$ and $A^{42}$), and of decreasing the glass transition temperature by widening the distance between crosslinking points. However, in a case where the number of carbon atoms of $A^{40}$ is excessively long, from the reasons such as a tendency that the molecular weight of the compound represented by General Formula (PC2-a) or (PC2-b) becomes excessively large, and the compatibility with the liquid crystal composition is deteriorated, and an adverse effect caused in the phase separation by excessively low polymerization rate, the upper limit is naturally set for the length of $A^4$.

Thus, in the compound represented by General Formula (PC2-a) or (PC2-b), $A^4$ is preferably an alkylene group having 9 to 16 carbon atoms (in at least 1 to 5 methylene groups present in the alkylene group, one arbitrary hydrogen atom in the methylene group is substituted with a linear or branched alkyl group having 1 to 10 carbon atoms. One or two or more methylene groups present in the alkylene group each independently may be substituted with —O—, —CO—, —COO—, or —OCO— such that oxygen atoms are not directly bonded to each other).

As a feature on the structure $A^{40}$ has a structure in which a hydrogen atom in an alkylene group is substituted with an alkyl group having 1 to 10 carbon atoms. The number of the hydrogen atoms which are substituted with an alkyl group in one alkylene group is in a range of 1 to 5, is preferably in a range of 1 to 3, and is more preferably 2 or 3. The number of carbon atoms of the alkyl group which is a substituent is preferably in a range of 1 to 5, and is more preferably in a range of 1 to 3.

On the other hand, in $A^{38}$, $A^{39}$, $A^{41}$, and $A^{42}$ which are side chains, it is preferable that the lengths of these side chains have the following aspects. Note that, in General Formula (PC2-a) or (PC2-b), $A^{38}$ and $A^{39}$ are bonded to the carbon atom which is the same as the main chain, and when the lengths of $A^{38}$ and $A^{39}$ are different from each other, the longer side chain is referred to as $A^3S$ (in a case where the length of $A^3$ and the length of $A^3$ are the same as each other, anyone can be set as $A^{38}$). Similarly, when the length of $A^{41}$ and the length of $A^{42}$ are different from each other, the longer side chain is referred to as $A^{41}$ (in a case where the length of $A^{41}$ and the length of $A^{42}$ are the same as each other, anyone can be set as $A^{41}$).

The side chain has high mobility as compared with the main chain. For this reason, generally, the presence of the side chain contributes the improvement of the mobility of the polymer chain at a low temperature, but in a state where spatial interference occurs between the side chains, reversely, the mobility is deteriorated. In order to prevent such a spatial interference between side chains, it is effective to shorten the side chain length within a necessary range.

Here, in General Formula (PC2-a) or (PC2-b), $A^{38}$ and $A^{41}$ are each independently preferably a linear alkyl group having 2 to 18 carbon atoms (one or two or more methylene groups present in the alkyl group each independently may be substituted with —O—, —CO—, —COO—, or —OCO— such that oxygen atoms are not directly bonded to each other), are each independently more preferably a linear alkyl group having 3 to 15 carbon atoms (one or two or more methylene groups present in the alkyl group each independently may be substituted with —O—, —CO—, —COO—, or —OCO— such that oxygen atoms are not directly bonded to each other).

In addition, also in a case of $A^{38}$ and $A^{42}$, if the number of the carbon atoms thereof is excessively long, the spatial interference is induced the between the side chains, which is not preferable. On the other hand, the shorter side chain has high mobility and an action of inhibiting the proximity of adjacent main chains, preventing interference between polymer main chains, and enhancing the mobility of the main chain. For this reason, in the compound represented by General Formula (PC2-a) or (PC2-b), it is possible to prevent the anchor ring energy from being increased at a low temperature by shortening the length of $A^{39}$ and $A^{42}$, and it is effective to improve the properties in a low temperature region of the liquid crystal optical element using the obtained polymer-stabilized blue phase.

In this regard, in General Formula (PC2-a) or (PC2-b), $A^{39}$ and $A^{42}$ are each independently preferably a hydrogen atom or an alkyl group having 1 to 7 carbon atoms (one or two or more methylene groups present in the alkyl group each independently may be substituted with —O—, —CO—, —COO—, or —OCO— such that oxygen atoms are not directly bonded to each other), each independently more preferably a hydrogen atom or an alkyl group having 1 to 5 carbon atoms (one or two or more methylene groups present in the alkyl group each independently may be substituted with —O—, —CO—, —COO—, or —OCO— such that oxygen atoms are not directly bonded to each other), and each independently still more preferably a hydrogen atom or an alkyl group having 1 to 3 carbon atoms (one or two or more methylene groups present in the alkyl group each independently may be substituted with —O—, —CO—, —COO—, or —OCO— such that oxygen atoms are not directly bonded to each other).

In General Formula (PC2-c) or (PC2-d), a represents an integer in a range of 6 to 22. Among the compounds represented by General Formula (PC2-d), examples of the compound in which $B^4$ is a hydrogen atom include alkyl acrylate such as dodecyl acrylate.

In General Formula (PC2-e) or (PC2-f), b and c each independently represent an integer in a range of 1 to 10, d represents an integer in a range of 1 to 10, and e represents an integer in a range of 0 to 6. From the viewpoint of suppressing the spatial interference between the side chains, at least one of d and e is preferably an integer in a range of 1 to 5, and is more preferably an integer in a range of 1 to 3.

In General Formula (PC2-g) or (PC2-h), f, g, h, and i each independently represent an integer in a range of 1 to 10. From the viewpoint of suppressing the spatial interference between the side chains, at least one of h and i is preferably an integer in a range of 1 to 5, and is more preferably an integer in a range of 1 to 3.

The compound represented by the General Formula (PC2) including the compounds represented by General Formulae (PC2-a) to (PC2-h) can be synthesized by using known compounds as starting materials and appropriately combining known organic synthesis reactions.

For example, in General Formula (PC2-a), the compound in which $A^{38}$ and $A^{42}$ are hydrogen atoms can be obtained by causing a compound having a plurality of epoxy groups to react with a polymerizable compound such as acrylic acid or methacrylic acid having active hydrogen capable of reacting with an epoxy group, synthesizing a polymerizable compound having a hydroxyl group, and then reacting with a saturated fatty acid.

In addition, it is possible to obtain the compound by reacting a compound having a plurality of epoxy groups with a saturated fatty acid so as to synthesize a compound having a hydroxyl group, and then reacting a polymerizable compound such as an acrylic acid chloride having a group capable of reacting with a hydroxyl group.

In addition, the compound in which $A^{39}$ and $A^{42}$ in General Formula (PC2-a) are alkyl groups, and $A^{37}$ and $A^{43}$ are methylene groups can be obtained by using, for example, a method of causing a compound having a plurality of oxetane groups to react with fatty acid chloride or a fatty acid which can react with an oxetane group, and then further react with a polymerizable compound having active hydrogen such as an acrylic acid, or a method of causing a compound having one oxetane group to react with a polyvalent fatty acid chloride or a fatty acid which can react with an oxetane group, and then further react with a polymerizable compound having active hydrogen such as an acrylic acid.

Further, the compound in which $A^{37}$ and $A^{43}$ in General Formula (PC2-a) is an alkylene group having 3 carbon atoms (a propylene group; —$CH_2CH_2CH_2$—) can be obtained in the same manner as described above by using a compound having a plurality of furan groups instead of an oxetane group.

Further, the compound in which $A^{37}$ and $A^{43}$ in General Formula (PC2-a) is an alkylene group having 4 carbon atoms (a butylene group; —$CH_2CH_2CH_2CH_2$—) can be obtained by using a compound having a plurality of pyran groups instead of an oxetane group.

<Polymerizable Compound Having Chirality>

As the polymerizable compound which is a raw material of the polymer included in the polymer-stabilized blue phase in this embodiment, an achiral compound or a substantially racemic compound is preferable, and a chiral polymerizable compound may be used as well. As the chiral polymerizable compound, for example, it is possible to use a polymerizable compound represented General Formula (VI-a) or (VI-b).

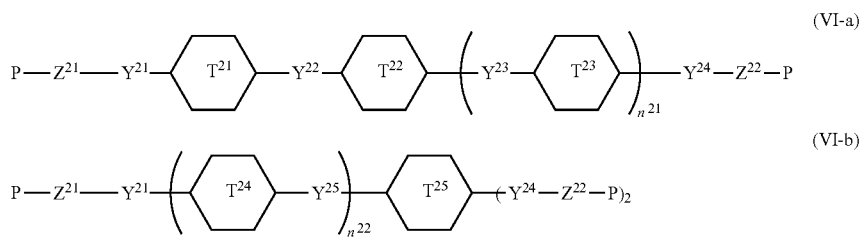

In General Formulae (VI-a) and (VI-b). P represents a polymerizable group. As P, a group consisting of structures represented by Formulae (R-1) to (R-16) is preferable, a group represented by Formula (R-1) or Formula (R-2) is more preferable, and a group represented by Formula (R-1), Formula (R-2), or Formula (R-16) is still more preferable, and a group represented by Formula (R-1) is even still more preferable from the viewpoint that the polymerization rate is fast.

In General Formula (VI-a), $n^{21}$ represents an integer of 0 or 1. In addition, in General Formula (VI-b), $n^{22}$ represents an integer of 0, 1, or 2. In a case where $n^{22}$ is an integer of 2 or more, and a plurality of $T^{24}$'s and $Y^{25}$'s are present in one molecule, those may be the same as or may be different from each other.

In General Formulae (VI-a) and (VI-b), $T^{21}$, $T^{22}$, $T^3$, and $T^{24}$ each independently represent a divalent group having a six-membered ring structure (six-membered cyclic divalent group). Examples of the six-membered cyclic divalent group include 12 kinds of six-membered cyclic divalent groups. Note that, in General Formula, m represents an integer in a range of 1 to 4. As the compound represented by General Formula (VI-a) or (VI-b), $T^{21}$, $T^{22}$, $T^{23}$, and $T^{24}$ are each independently preferably any one of 12 kinds of the six-membered cyclic divalent groups, and are more preferably a 1,4-phenylene group, or a trans-1,4-cyclohexylene group.

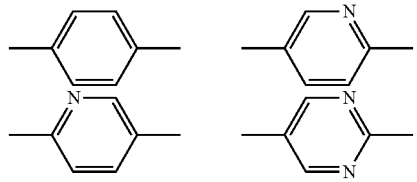

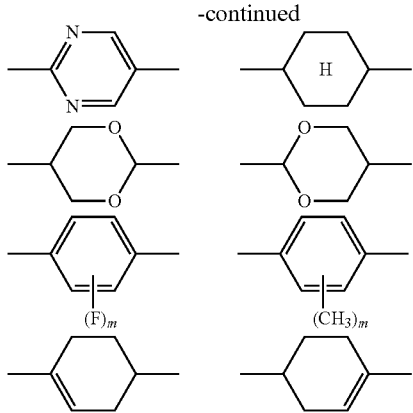

In General Formula (VI-b), $T^{25}$ represents a trivalent group having a six-membered ring structure (six-membered cyclic trivalent group). Examples of the six-membered cyclic trivalent group include a benzene-1,2,4-triyl group, a benzene-1,3,4-triyl group, a benzene-1,3,5-triyl group, a cyclohexane-1,2,4-triyl group, a cyclohexane-1,3,4-triyl group, and a cyclohexane-1,3,5-triyl group.

In General Formulae (VI-a) and (VI-b), $Y^{22}$, $Y^{23}$, and $Y^{25}$ each independently represent a single bond or a linear or branched alkylene group having 1 to 10 carbon atoms. One methylene group or two non-adjacent methylene groups present in the alkylene group each independently may be substituted with —O—, —S—, —CO—O—, or —O—CO— such that an oxygen atom and a sulfur atom are not directly bonded to each other). In addition, one or two or more hydrogen atoms present in the alkylene group each independently may be substituted with a fluorine atom or a chlorine atom. Further, the alkylene group may or may not include an asymmetric carbon atom. Examples of the alkylene group include —CH$_2$CH$_2$—, —CH$_2$O—, —OCH$_2$—, —COO—, —OCO—, —C≡C—, —CH═CH—, —CF═CF—, —(CH$_2$)$_4$—, —CH$_2$CH$_2$CH$_2$O—, —OCH$_2$CH$_2$CH$_2$—, —CH═CHCH$_2$CH$_2$—, and —CH$_2$CH$_2$CH═CH—.

In General Formulae (VI-a) and (II-y), $Y^{23}$ and $Y^{24}$ each independently represent a single bond, —O—, —OCO—, or —COO—.

In General Formulae (VI-a) and (VI-b), $Z^{21}$ has an asymmetric carbon atom, and represents an alkylene group having 3 to 20 carbon atoms which includes a branched chain structure.

In General Formulae (VI-a) and (VI-b), $Z^{22}$ represents an alkylene group having 1 to 20 carbon atoms. The alkylene group may or may not include an asymmetric carbon atom.

As the raw material of the polymer included in the polymer-stabilized blue phase in the embodiment, at least one kind of polymerizable compound may be used, and it is preferable that a various kinds of polymerizable compounds are appropriately combined to be used such that the physical properties of the polymer obtained after the polymerizing reaction are within a desired range. In a case where various kinds of the polymerizable compounds are used, at least one kind of monofunctional polymerizable compound and at least one kind of polyfunctional polymerizable compound are preferably used. When the polyfunctional polymerizable compound is set as a raw material, it is possible to a polymer-stabilized blue phase including a polymer having a crosslinked structure by the polymerizing reaction.

In addition, the glass transition temperature of the polymer included in the polymer-stabilized blue phase in the embodiment is preferably in a range of −100° C. to 25° C. Here, it is preferable to appropriately adjust the kinds and compositions of the polymerizable compound used as a raw material such that the glass transition temperature of the polymer after the polymerizing reaction is within the range.

Further, as the raw material of the polymer included in the polymer-stabilized blue phase in the embodiment, at least one kind of mesogenic polymerizable compound and at least one kind of non-mesogenic polymerizable compound are preferably used. When both of the mesogenic polymerizable compound and the non-mesogenic polymerizable compound are used as a raw material of the polymer, it is possible to widen a temperature range where the polymer-stabilized blue phase obtained by the polymerizing reaction develop the optically isotropic phase.

In a case where a development temperature range of the blue phase III is to be widened, as the raw material of the polymer included in the polymer-stabilized blue phase in the embodiment, it is preferable to include at least one polyfunctional mesogenic polymerizable compound and at least one monofunctional or polyfunctional non-mesogenic polymerizable compound, is more preferable to include at least one compound selected from the group consisting of the compounds represented by Formulae (PC1-3a) to (PC1-3i) and the compounds represented by General Formulae (V-b1) to (V-b20), and at least one compound selected from the group consisting of the compounds represented by General Formula (PC2-a) to (PC2-h), and is still more preferable to include at least one compound selected from the group consisting of the compounds represented by Formulae (PC1-3a) to (PC1-3i) and the compounds represented by General Formulae (V-b1) to (V-b20), and at least one compound selected from the group consisting of the compounds represented by General Formulae (PC2-a) to (PC2-d).

<Polymerization Initiator>

A mixed material including the liquid crystal composition and the polymerizable compound in the present invention may include a polymerization initiator as necessary. For example, in a case where the polymerizable compound is polymerized by radical polymerization, it is possible to add a thermal polymerization initiator and a photopolymerization initiator as a radical polymerization initiator.

Specifically, the following compounds are preferably used:

acetophenone-based compound such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy) phenyl-(2-hydroxy-2-propyl) ketone, 1-hydroxycyclohexyl-phenyl ketone, 2-methyl-2-morpholino(4-thiomethyl phenyl) propan-1-one, and 2-benzyl-2-dimethylamino-1-(4-morpholinophenyl)-butanone;

benzoin-based compound such as benzoin, benzoin isopropyl ether, and benzoin isobutyl ether;

acylphosphine oxide-based compound such as 2,4,6-trimethyl benzoyldiphenyl phosphine oxide;

benzyl, methyl phenyl glyoxy ester-based compound;

benzophenone-based compound such as benzophenone, methyl o-benzoyl benzoate, 4-phenyl benzophenone, 4,4'-dichlorobenzophenone, hydroxybenzophenone, 4-benzoyl-4'-methyl-diphenyl sulfide, acrylated benzophenone, 3,3',4,4'-tetra (t-butyl peroxycarbonyl) benzophenone, and 3,3'-dimethyl-4-methoxybenzophenone; thioxanthone-based compound such as 2-isopropyl thioxanthone, 2,4-dimethyl thioxanthone, 2,4-diethyl thioxanthone, and 2,4-dichlorothioxanthone; aminobenzophenone-based compound such as Michler's ketone and 4,4'-diethyl aminobenzophenone; and 10-butyl-2-chloroacridone, 2-ethylanthraquinone, 9,10-phenanthrenequinone, and camphorquinone.

As the radical polymerization initiator contained in the mixed material, benzyl dimethyl ketal is preferable among these compounds.

The optical element of the second embodiment develops a phase separation structure by filling a space between a pair of substrates having an electrode on at least one substrate with a mixed material obtained by mixing a nematic liquid crystal composition, all chiral compounds, all polymerizable compounds as raw materials of the polymer compound component, and a lubricating interface deriving agent, and by gradually raising the temperature from a state where the entire cell is in a liquid crystal phase. Then, the optical element can be manufactured by polymerizing a compound having a polymerizable group in the polymerizable compound-containing liquid crystal composition.

The space between the pair of substrates is filled with a mixed material, cooling is performed such that the entire cell becomes a liquid crystal phase, and then the temperature is gradually raised so as to develop the liquid phase on the interface. In addition, the optical element can be manufactured by filling the space between the pair of substrates with the mixed material, heating to an isotropic phase, then lowering the temperature to develop a blue phase, and polymerizing the polymerizable compound by ultraviolet irradiation.

As the liquid crystal component which can be used in the optical element of the second embodiment, the nematic liquid crystal composition or the liquid crystal compound, the above-described chiral compound, the polymerizable compound, and the polymerization initiator which are described in the optical element of the first embodiment can be used. In addition, as the lubricating interface deriving agent which can be used in the optical element of the second embodiment, the lubricating interface deriving agent described in the optical element of the first embodiment can be used. When the mixed material of the liquid crystal components and the lubricating interface deriving agent is polymerized with a monomer in a state of the blue phase (monomer-containing blue phase), the polymer-stabilized blue phase (the monomer present in the blue phase is polymerized to be a polymer, and as a result, the temperature range of the blue phase is extended) is obtained.

The order of mixing the nematic liquid crystal composition, the chiral compound, the polymerizable compound, and the lubricating interface deriving agent is not particularly limited. For example all of the raw materials may be mixed with each other substantially at the same time, and all of the polymerizable compounds which are raw materials of the polymer compound component and the lubricating interface deriving agent may be mixed into the liquid crystal composition in which the nematic liquid crystal composition and the chiral compound are mixed in advance, and the lubricating interface deriving agent may be mixed into to a polymerizable compound-containing liquid crystal composition in which the nematic liquid crystal composition, the chiral compound, and the polymerizable compound are mixed in advance.

The total amount of the entire polymerizable compounds in the polymerizable compound-containing liquid crystal composition can be appropriately determined in consideration of the kinds of the polymerizable compounds, the kinds of the nematic liquid crystal compositions, and the kinds of chiral compounds to be used, and it is preferably in a range of 0.1% to 40% by mass, is more preferably in a range of 1% to 40% by mass, and is still more preferably in a range of 1% to 25% by mass.

In addition, the amount of a mixed material of the nematic liquid crystal composition in the polymerizable compound-containing liquid crystal composition and the chiral compound is preferably in a range of 60% to 98% by mass, is more preferably in a range of 70% to 96% by mass, and is still more preferably in a range of 80% to 94% by mass.

The amount of a lubricating interface deriving agent in a mixed material of the polymerizable compound-containing liquid crystal composition and the lubricating interface deriving agent is preferably in a range of 0.5% to 15% by mass, is more preferably in a range of 0.8% to 10% by mass, and is still more preferably in a range of 1.0% to 8% by mass.

In the embodiment, the liquid crystal component 23 can be set as a component including an achiral liquid crystalline compound and a chiral compound. As the achiral liquid crystalline compound, it is possible to use an achiral liquid crystalline compound can be appropriately selected from the above-described liquid crystalline compounds. As the liquid crystal component 23, it is preferable to include a nematic liquid crystal composition including at least two kinds of achiral liquid crystalline compounds, and at least one kind of chiral compound.

In any of the first embodiment and the second embodiment, the voltage application can also be performed via a thin film transistor (TFT) so as to form pixels, and thereby the optical element of the present invention can be applied to a spatial modulation element and a liquid crystal display device.

Figure 7:
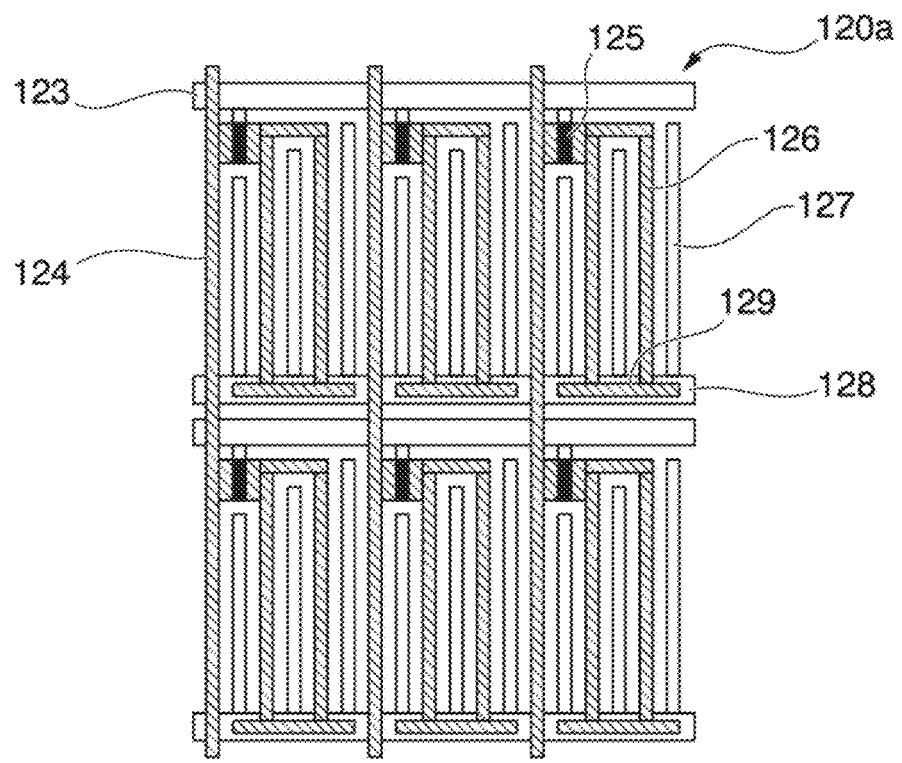
FIG. 7 is a schematic plan view schematically showing an example of an active matrix substrate 120a of a transverse electric field type liquid crystal panel.

For example, the optical element of the present invention can be applied to a transverse electric field type liquid crystal display device. FIG. 7 schematically shows an active matrix substrate 120a of a transverse electric field type liquid crystal panel.

On the active matrix substrate 120a, a plurality of scanning wirings 123 which extend substantially in parallel with each other, a plurality of signal wirings 124 which extend in the direction intersecting with the scanning wiring 123, a thin film transistor (TFT) 125 electrically connected to the facing scanning wiring 123 and the signal wiring 124, and a pixel electrode 126 electrically connected to the TFT 125 are formed. The pixel electrode 126 is formed into a comb tooth substantially extending in parallel with the signal wiring 124.

Further, a common electrode 127 which is formed into a comb tooth substantially extending in parallel with the pixel electrode 126 is provided on the active matrix substrate 120a. The common electrode 127 is provided extended from a common wiring 128 formed substantially extending in parallel with the scanning wiring 123. The common wiring 128 faces an auxiliary capacity electrode 129 which is formed of the same conductive layer as that of the pixel electrode 126 via an insulating film (not shown), and constitutes auxiliary capacity.

An alignment film having the horizontal alignment property is formed on the surface of the active matrix substrate 120a as shown in FIG. 7. Further, the alignment film having the horizontal alignment property is also formed on the surface of a color filter substrate 120b facing the active matrix substrate 120a.

As the pixel electrode 126 and the common wiring 128, opaque metal electrodes (for example, aluminum, titanium, and copper) and transparent electrodes (ITO, IZO) can be used.

Figure 15:
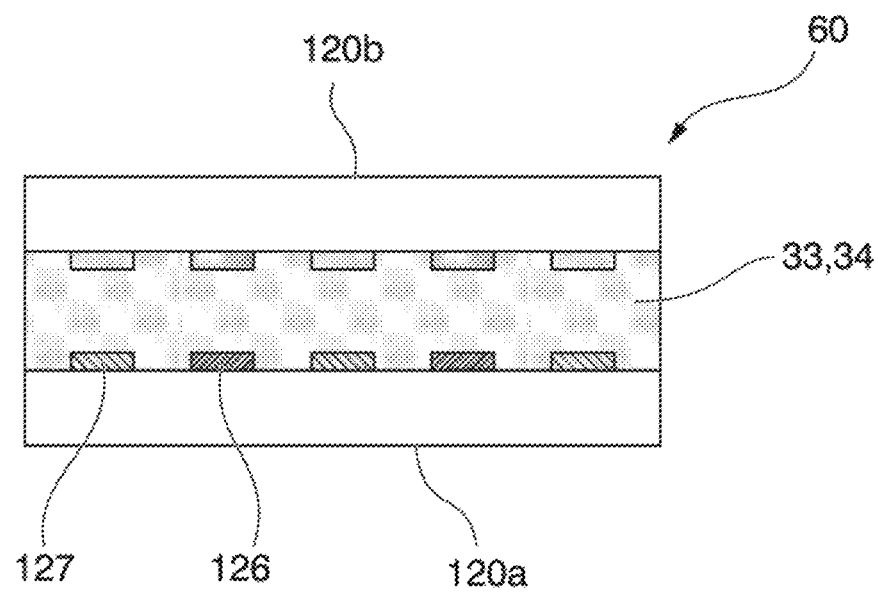
FIG. 15 is a schematic sectional view showing an example of applying the optical element of the present invention to a liquid crystal display device.

A liquid crystal component 33 and a lubricating interface deriving agent 34 are sealed between the active matrix substrate 120a and the color filter substrate 120b so as to constitute a liquid crystal display device 60 (FIG. 15).

In the transverse electric field type liquid crystal display device, for example, the liquid crystal molecule among the liquid crystal components has the positive dielectric anisotropy, and at the time of the voltage application, the alignment direction is changed by a transverse electric field (an electric field parallel to the surfaces of the active matrix substrate 120a and the color filter substrate 120b) generated between the pixel electrode 126 and the common electrode 127. In this transverse electric field type display device, the alignment direction of the liquid crystal molecules changes in a plane parallel to the surfaces of the active matrix substrate 120a and the color filter substrate 120b, and thus the excellent viewing angle properties are realized.

Note that, it is also possible to use a liquid crystal having negative dielectric anisotropy. In this case, it is necessary to rotate an initial alignment direction by 90 degrees. In a case of using the liquid crystal having the negative dielectric anisotropy, generally, there is a tendency that the responsiveness properties are deteriorated as compared with the liquid crystal having the positive dielectric anisotropy, but the liquid crystal having the negative dielectric anisotropy has a feature of further improving the viewing angle properties due to a small out-of-plane substrate component which is alignment-deformed by the electric field of the liquid crystal. Thus, it is desirable to appropriately select the liquid crystal.

Figure 8:
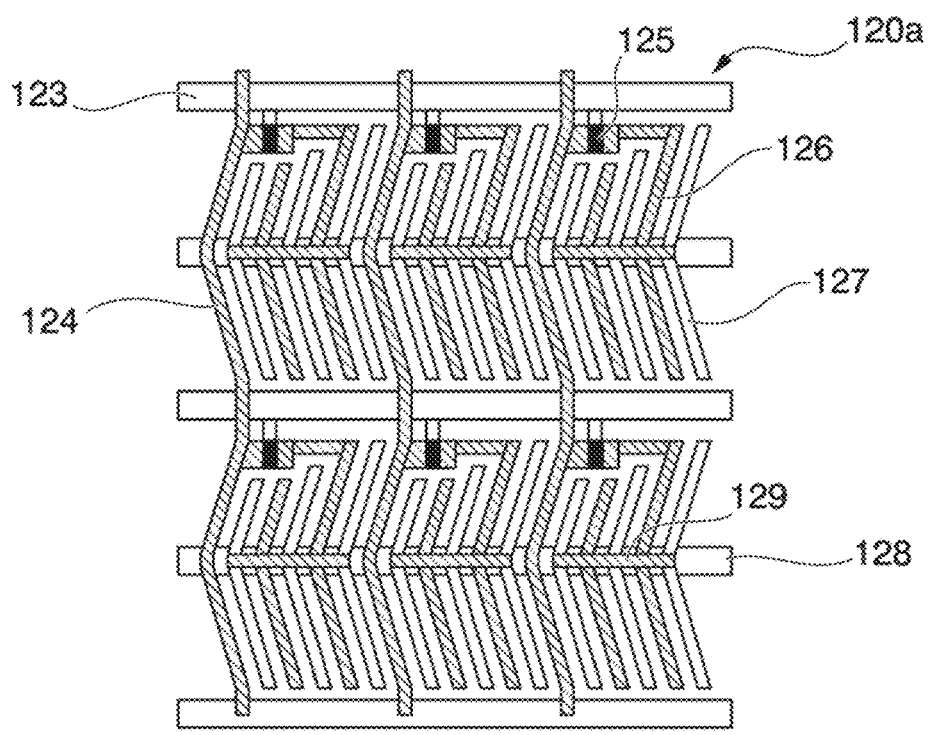
FIG. 8 is a schematic plan view schematically showing another example of the active matrix substrate 120a of the transverse electric field type liquid crystal panel.

Note that, similar to the active matrix substrate 120a shown in FIG. 8, when the pixel electrode 126 and the common electrode 127 are bent, coloring phenomenon at an oblique viewing angle can be suppressed.

Figure 9:
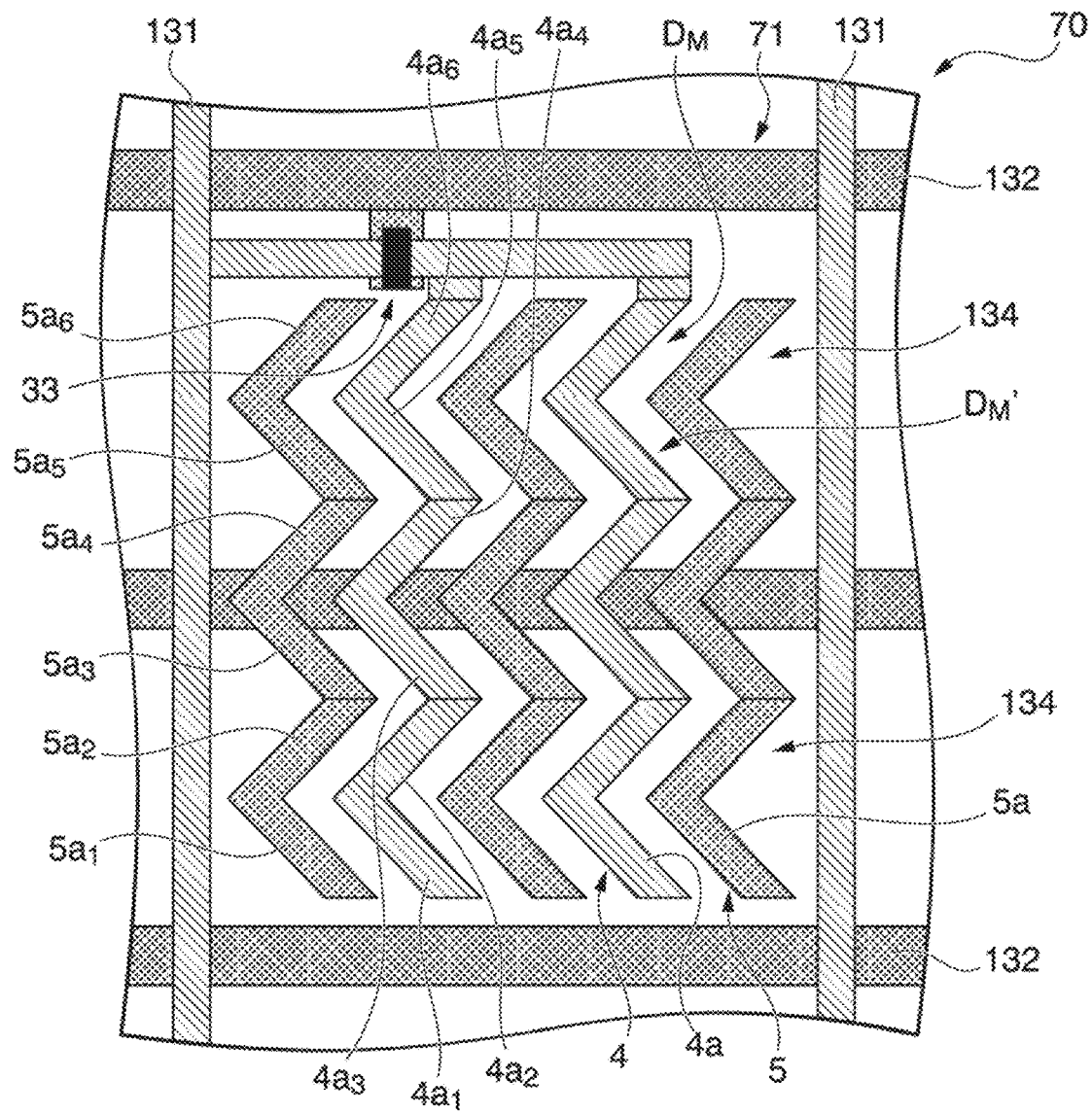
FIG. 9 is a schematic plan view schematically showing an example of an active matrix substrate 70 having a bending angle of 90 degrees.

In addition, similar to the case of the transverse electric field type display device of the active matrix substrate 120a as shown in FIG. 7, it is possible to the liquid crystal having the negative dielectric anisotropy, and to have the same feature. In a case of the blue phase liquid crystal, it is desirable that the bending angle is 90 degrees as in the transverse electric field type display device of the active matrix substrate 70 as shown in FIG. 9.

Figure 10:
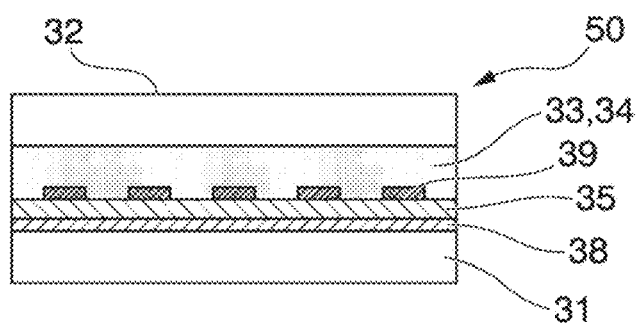
FIG. 10 is a schematic sectional view showing an example of a fringe field type optical element.

In the optical element of the present invention, in either the first embodiment or the second embodiment, a first electrode 38 and a second electrode 39 can be set as a fringe field type electrode (FIG. 10) that generates a fringe electric field between the pair of substrates 31 and 32, and with this it is possible to realize the low-voltage drivability, the high-speed responsiveness, and the wide viewing angle properties.

In the fringe field type electrode (FIG. 10), the first electrode 38 (common electrode) is provided on a lower layer, and the second electrode 39 (pixel electrode) is provided on an upper layer via the insulating film 35 (SiNX and SiOX). It is also possible to change the vertical relationship between common electrode and pixel electrode depending on the way of wiring.

In order to ensure at least translucency, it is necessary for a lower layer electrode to be a transparent electrode such as ITO or IZO.

Even in this case, similar to the active matrix substrate 120a shown in FIG. 8, when the pixel electrode 126 and the common electrode 127 are bent, coloring phenomenon at an oblique viewing angle can be suppressed.

In any of the first embodiment and the second embodiment, the optical element of the present invention can be set as an optical element (FIGS. 19 and 20) further including a third electrode and generating an electric field in a plurality of directions.

Figure 19:
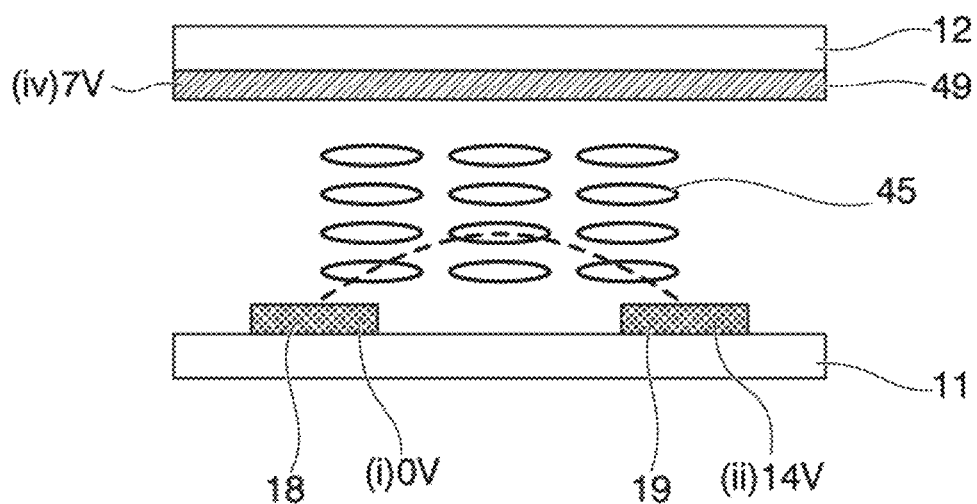
FIG. 19 is a schematic sectional view when a transverse electric field is generated.
Figure 20:
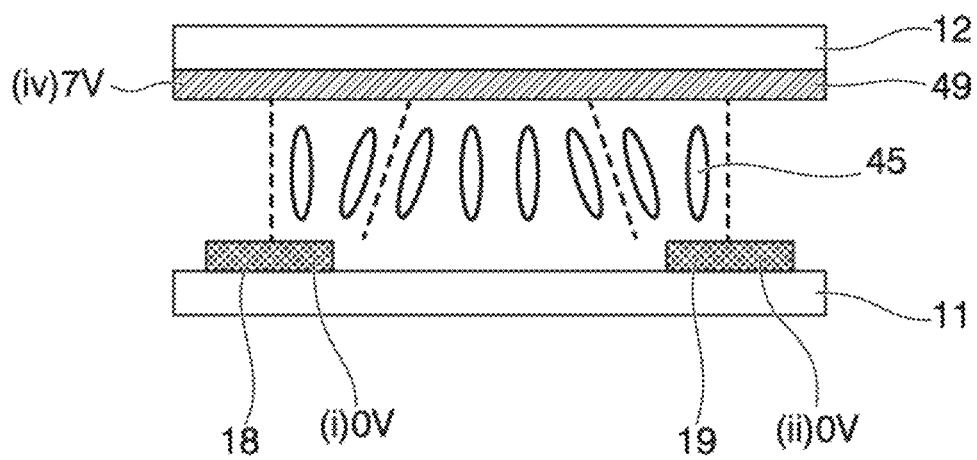
FIG. 20 is a schematic sectional view when a longitudinal electric field is generated.

FIG. 19 is a schematic sectional view of the aforementioned type optical element when a transverse electric field is generated. FIG. 20 is a schematic sectional view when a longitudinal electric field is generated. In the optical element in FIGS. 19 and 20, a facing electrode 49 is further provided in addition to the pair of the electrodes 18 and 19. In FIGS. 19 and 20, the dotted line indicates the direction of the generated electric field.

A polarizing plate is disposed on the outside of both substrates (not shown), and polarization axes thereof are orthogonal to each other.

That is, by forming the slippery interface, voltage rotation of the liquid crystal molecule 45 from the black state to the white state is realized by voltage application. In addition to this, when the birefringence forcibly viewed from the front due to the voltage application by the counter electrode 49 is set to be zero, it is possible to make the response faster and lower the voltage from white to black in reverse. With this, in the responsiveness of both directions of white to black and black to white, it is possible to maximize the feature (low voltage) that the slippery interface is formed.

A liquid crystal display panel has a vertical alignment type two-layer electrode structure using the liquid crystal molecule 45 which is a positive type liquid crystal. At a rising time, as shown in FIG. 19, the liquid crystal molecule 45 is rotated by a lateral electric field generated between the pair of electrodes 18 and 19 (for example, composed of a comb tooth electrode 18 having a potential of 0 V and a comb tooth electrode 19 having a potential of 14 V) at a potential difference of 14 V. At this time, the potential difference is not substantially generated between the substrates (between the substrate and the facing electrode 49 at a potential of 7 V). In FIG. 19, the alignment orientation of the liquid crystal forms an angle of 45 degrees together with the polarization axes of one polarizing plate, and the light is transmitted by the birefringence. That is, white display is realized.

In addition, first, as shown in FIG. 20, due to the vertical electric field generated between the substrates (for example, the comb tooth electrode 18 and the comb tooth electrode 19 at a potential of 0 V, and the facing electrode 49 at a potential of 7 V) at a potential difference of 7 V liquid crystal molecule 45 is instantly rotated so as to be vertically aligned. In this case, the potential difference between a pair of comb tooth electrodes (for example, formed of the comb tooth electrode 18 at a potential of 0 V and the comb tooth electrode 19 at a potential of 0 V) is not substantially generated. In FIG. 20, the alignment orientation of the liquid crystal forms an angle of zero together with the polarization axes of one polarizing plate, there is little birefringence and light is hardly transmitted. That is, forced black display by voltage application is realized.

Here, since the electric field direction occurs somewhat diagonally with respect to the normal to the substrate, light leakage due to slight birefringence occurs. That is, the optical element has low contrast. In order to improve this point, it is desirable to further include a fourth electrode.

In any of the first embodiment and the second embodiment, the optical element of the present invention can be set as an optical element (FIGS. 11 and 12) further including the third and fourth electrodes and generating an electric field in a plurality of directions.

Figure 11:
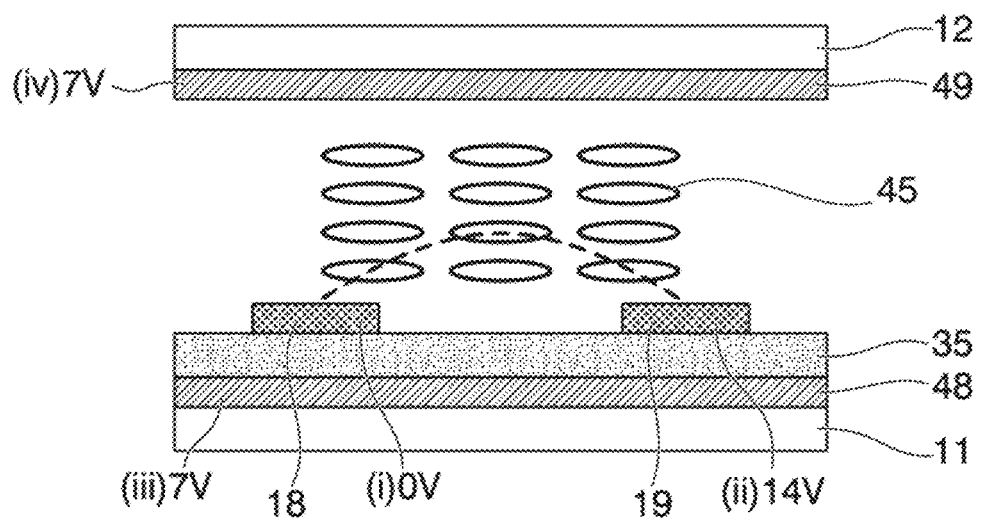
FIG. 11 is a schematic sectional view when a transverse electric field is generated.
Figure 12:
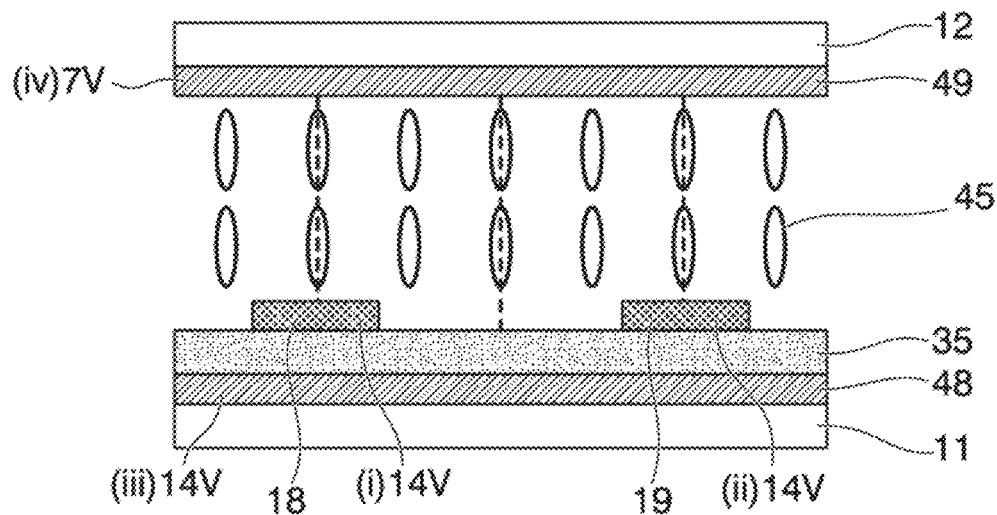
FIG. 12 is a schematic sectional view when a longitudinal electric field is generated.

FIG. 11 is a schematic sectional view of the aforementioned type optical element when a transverse electric field is generated. FIG. 12 is a schematic sectional view when a longitudinal electric field is generated. In the optical element in FIGS. 11 and 12, the facing electrodes 48 and 49, and the insulating film 35 are further provided in addition to the pair of the electrodes 18 and 19. In FIGS. 11 and 12, the dotted line indicates the direction of the generated electric field.

A polarizing plate is disposed on the outside of both substrates (not shown), and polarization axes thereof are orthogonal to each other.

That is, by forming the slippery interface, voltage rotation of the liquid crystal molecule 45 from the black state to the white state is realized by voltage application. In addition to this, when the birefringence forcibly viewed from the front due to the voltage application by the facing electrodes 48 and 49 is set to be zero, it is possible to make the response faster and lower the voltage from white to black in reverse. With this, in the responsiveness of both directions of white to black and black to white, it is possible to maximize the feature (low voltage) that the slippery interface is formed.

The liquid crystal display panel has a vertical alignment type three-layer electrode structure using the liquid crystal molecule 45 which is a positive type liquid crystal. At a rising time, as shown in FIG. 11, the liquid crystal molecule 45 is rotated by a lateral electric field generated between the pair of electrodes 18 and 19 (for example, composed of a comb tooth electrode 18 having a potential of 0 V and a comb tooth electrode 19 having a potential of 14 V) at a potential difference of 14 V. At this time, the potential difference is not substantially generated between the substrates (between the facing electrode 48 at a potential of 7 and the facing electrode 49 at a potential of 7 V). In FIG. 11, the alignment orientation of the liquid crystal forms an angle of 45 degrees together with the polarization axes of one polarizing plate, and the light is transmitted by the birefringence. That is, white display is realized.

In addition, first, as shown in FIG. 12, due to the vertical electric field generated between the substrates (for example, facing electrode 48 at a potential of 14 V, the comb tooth electrode 18, and the comb tooth electrode 19 each of which is at a potential of 0 V, and the facing electrode 49 at a potential of 7 V) at a potential difference of 7 V liquid crystal molecule 45 is instantly rotated so as to be vertically aligned. In this case, the potential difference between a pair of comb tooth electrodes (for example, formed of the comb tooth electrode 18 at a potential of 14 V and the comb tooth electrode 19 at a potential of 14 V) is not substantially generated. In FIG. 12, the alignment orientation of the liquid crystal forms an angle of zero together with the polarization axes of one polarizing plate, and the light is not transmitted by the birefringence. That is, forced black display by voltage application is realized.

Figure 13:
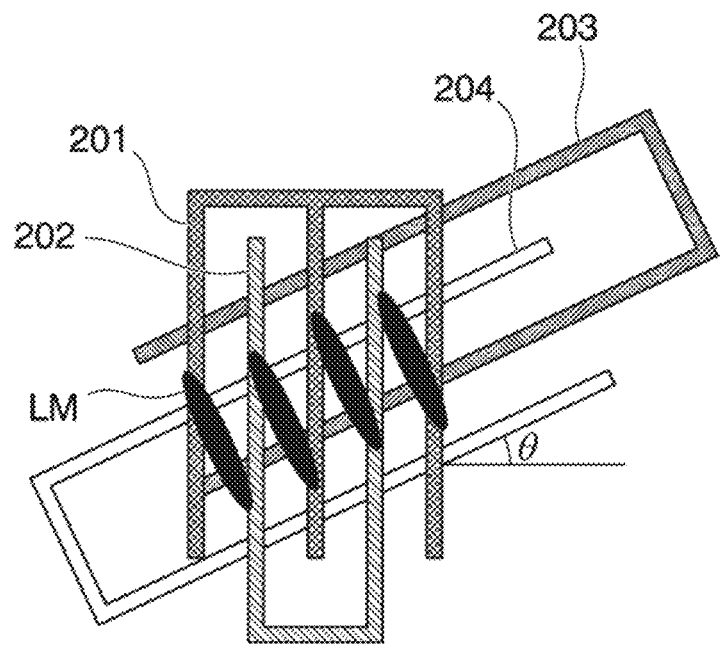
FIG. 13 is a schematic plan view showing an example of the optical element.
Figure 14:
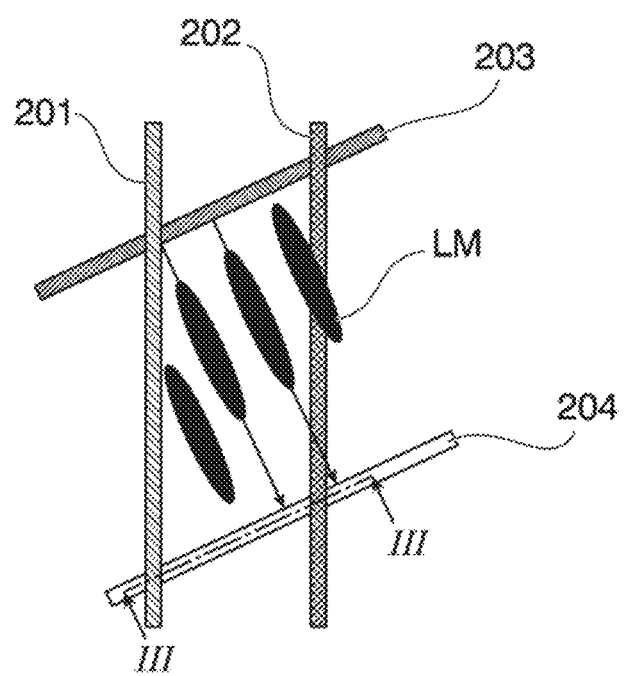
FIG. 14 is an enlarged schematic plan view showing a main portion of FIG. 13.

In any of the first embodiment and the second embodiment, as shown in FIG. 13, the optical element of the present invention further includes the third and fourth electrodes such that the comb tooth electrodes are present on both substrates. That is, a first common electrode 201 and a first pixel electrode 202 are provided on one substrate, and a second common electrode 203 and a second pixel electrode 204 are provided on the other substrate so as to constitute an optical element which generates electric field in a plurality of directions. FIG. 14 is an enlarged schematic plan view showing a main portion of FIG. 13.

In the optical element of this embodiment, the low voltage rotation of the liquid crystal molecule is realized by the effect that a slippery interface is formed from a black state to a white state by the voltage application. In addition to this, when a potential difference is generated between the first common electrode 201 and the first pixel electrode 202, and the second common electrode 203 and the second pixel electrode 204 have the same potential, or a potential difference is generated between the second common electrode 203 and the second pixel electrode 204, and the first common electrode 201 and the first pixel electrode 202 have the same potential, in the responsiveness of both directions of white to black and black to white, it is possible to maximize the feature (low voltage) that the slippery interface is formed.

EXAMPLES

Hereinafter, the present invention will be described in further detail with reference to examples, but the scope of the present invention is not limited to these examples.

In addition, "%" in the compositions of the following Examples and Comparative Examples refers to "mass %".

Example 1

Two washed glass substrates were prepared, and were coated with PMMA (polymethyl methacrylate, Mw=120,000) by using a spin casting method so as to film on both glass substrates. Then, plastic beads having a diameter of 5 μm were dispersed on one of the glass substrates, and then the one glass substrate was attached to the other glass substrate. A mixed material obtained by containing 4.8% by mass of 12A (dodecyl acrylate) in 7CB (4-cyano-4'-heptyl biphenyl) was injected into a gap of 5 μm obtained as described above by a capillary phenomenon.

FIG. 3 shows a state of observing a change in alignment when an external magnetic field was applied at two temperatures of low temperature (a, b) and high temperature (c, d) under Cross Nicole's polarizing microscope. It was found that in the sufficiently low temperature from the phase transition temperature, an N-phase in horizontal alignment exhibits, and the liquid crystal molecule is anchored with a PMMA substrate without no change in the Schlieren structure observed before magnetic field application (a) and during magnetic field application (b). On the other hand, as the temperature was raised, the Schlieren structure began to change greatly at a certain temperature and a wetting transition where only the vicinity of the substrate surface became a liquid phase was confirmed (c). When a weak external magnetic field (0.1 T) was applied into the substrate plane in this state, the structure greatly changed, and most of the liquid crystal molecules were aligned in the magnetic field direction (d). From the above results, it was confirmed that a I phase wetting thin film was formed on the glass substrate, the anchoring became weak, and thus liquid crystal cells were freely rotated by the external field of the liquid crystal molecule.

As described above, it was found that a slippery interface was formed and an element capable of changing the direction of the liquid crystal molecule with a weak external force (in this case, a magnetic field) was obtained.

Next, the temperature was raised to 45° C. by a temperature controller to form an isotropic phase, and then the temperature was lowered to 25° C. while applying a magnetic field of 0.44 T in a direction parallel to the glass substrate plane so as to obtain uniformly aligned liquid crystal cells.

Figure 5:
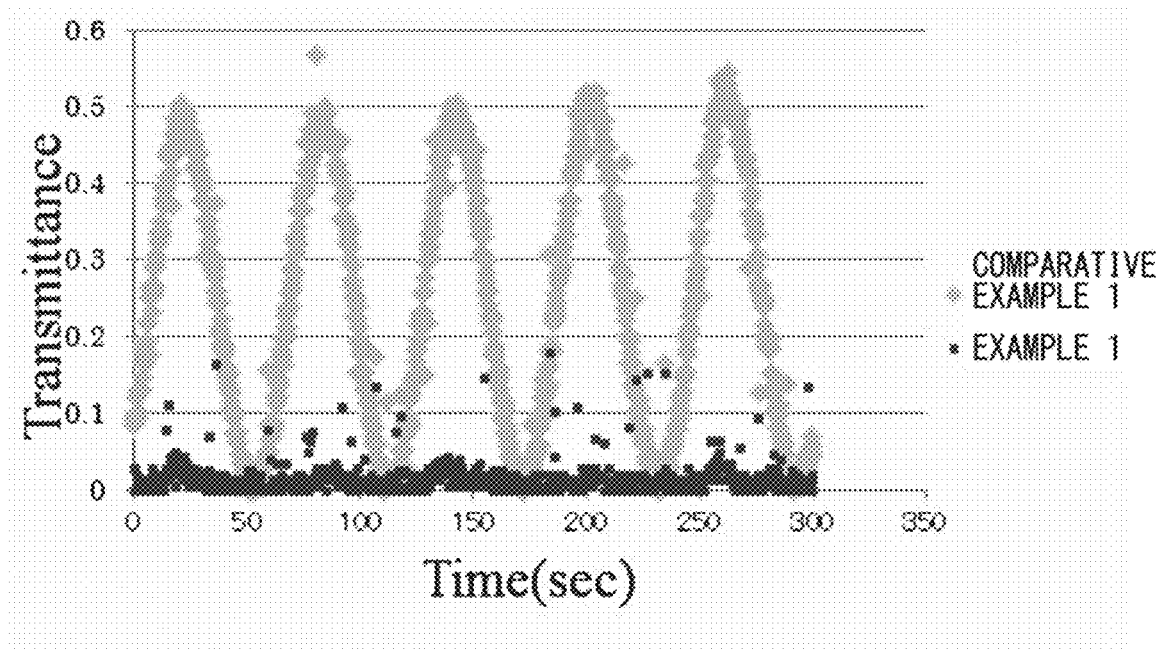
FIG. 5 is a graph showing an observation result of birefringence transmitted light when a liquid crystal cell is rotated.

The temperature of this liquid crystal cell was adjusted to 36.0° C., and the birefringence observation was performed with a laser beam after the two transmission axes were sandwiched between the polarizing plates whose transmission axes were orthogonal to each other. Note that, the magnetic field was applied and the direction of the magnetic field was made to coincide with the transmission axis of one of the polarizing plates. In this state, when the liquid crystal cell was rotated around the normal of the glass substrate, birefringence light dependent on the rotation angle was not confirmed. It seemed that the liquid crystal alignment orientation did not follow the rotation of the liquid crystal cells, but was fixed in the direction of the magnetic field application. That is, it was confirmed that a dodecyl acrylate liquid phase (isotropic phase) forms a lubricating interface derivation region between the nematic liquid crystal and the glass substrate, and the interface between the liquid crystal component and the lubricating interface derivation region forms a slippery interface (black square plot data in FIG. 5).

Comparative Example 1

Uniformly aligned liquid crystal cells were prepared by using the same method as that used in Example 1 except that 12A (dodecyl acrylate) is not contained. Further, the birefringence under the magnetic field application was observed by using the same method as that used in Example 1. In a case of the liquid crystal cell in Comparative Example 1, an increase and decrease in the birefringence light was confirmed such that the liquid crystal alignment direction coincided and rotated in accordance with the rotation of the liquid crystal cell. That is, it was confirmed that in a case where 12A (dodecyl acrylate) is not contained, the slippery interface is not formed (gray diamond plot data in FIG. 5).

Example 2

Uniformly aligned liquid crystal cells were prepared by using the same method as that used in Example 1 except that a gap of 12 pun was filled with 7CB and 12A by using plastic beads having a diameter of 12 μm instead of the plastic beads having a diameter of 5 μm.

It was confirmed that a lubricating interface derivation region formed of a liquid phase (isotropic phase) is formed between the nematic liquid crystal and the glass substrate, and the interface between the liquid crystal component and the lubricating interface derivation region forms a slippery interface.

Example 3

Uniformly aligned liquid crystal cells were prepared by using the same method as that used in Example 1 except that a gap of 25 μm was filled with 7CB and 12A by using plastic beads having a diameter of 25 μm instead of the plastic beads having a diameter of 5 μm.

Figure 4:
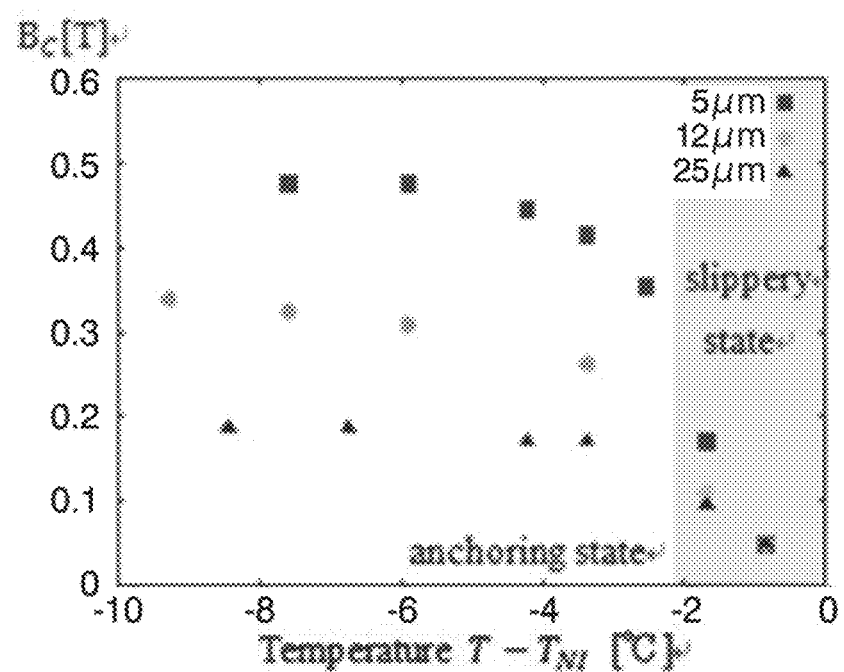
FIG. 4 is a graph showing temperature dependency of a threshold magnetic field in samples having a plurality of cell thicknesses.

For each of the liquid crystal cells of Example 1, Example 2, and Example 3, a magnetic field was applied in a direction orthogonal to the alignment direction of liquid crystal molecules, and threshold magnetic field strength of Fredericks transition was measured from the dependency of applied magnetic field strength of the transmitted light intensity. FIG. 4 shows temperature dependency of a threshold magnetic field in a sample having a plurality of cell thicknesses.

Regarding the liquid crystal cell of any cell thickness, the threshold magnetic field strength greatly decreases when the wetting transition temperature is exceeded. At low temperatures where wetting transition does not occur, the thinner the sample is, the greater the influence of anchoring on the substrate and the greater the field strength required for Fredericks transition. On the other hand, it was confirmed that at the temperature at which wetting transition occurs ($T_{n1}-3°$ C. to $T_{n1}$), the dependency of the cell thickness is small, and the anchoring power at the substrate plane becomes very small at the same time, the lubricating interface derivation region formed of the liquid phase (isotropic phase) is formed between the nematic liquid crystal and the glass substrate, and the interface between the liquid crystal component and the lubricating interface derivation region forms a slippery interface.

Example 4

Figure 6:
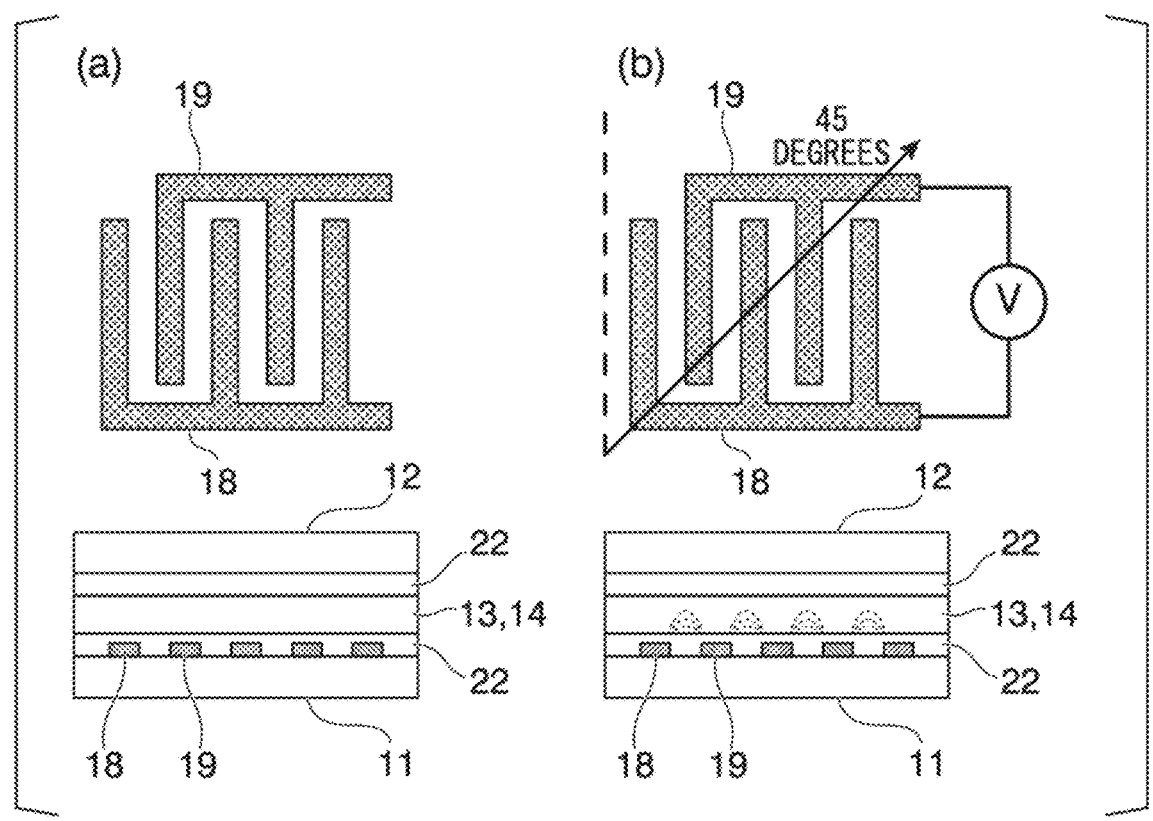
FIG. 6 is a schematic view (a) showing an example of an optical element according to one embodiment of the present invention and a schematic view (b) showing a state in which an electric field is applied to the optical element.

FIG. 6(a) is a schematic view showing an optical element which uses the glass substrate 11 including the comb tooth electrodes 18 and 19 on the surface, and the glass substrate 12 having no electrode. FIG. 6(b) is a schematic view showing a state where an electric field is applied to the optical element.

The comb tooth electrodes 18 and 19 were formed of chromium, the electrode width was 10 μm, the distance between the electrodes was 10 μm, and an electric field substantially parallel to the substrate was applied between the electrodes.

After washing these two kinds of glass substrates, and these were coated with a 5% by mass toluene solution of PMMA (polymethyl methacrylate) by using a spin casting method so as to film a coating film 22 on both glass substrates. Then, the obtained coating film was heated at 120° C. for 90 minutes. Further, rubbing was performed in a direction of 45 degrees with respect to the longitudinal direction of the comb tooth electrode.

Then, silica beads having a diameter of 2 μm were dispersed on one of the glass substrates, and then both glass substrates were attached to each other. A mixed material obtained by containing 5.17% by mass of 12A (dodecyl acrylate) as a lubricating interface deriving agent 14 in 7CB (4-cyano-4'-heptyl biphenyl) as a liquid crystal component 13 was injected into a gap of 2 μm obtained as described above by a capillary phenomenon.

Figure 16:
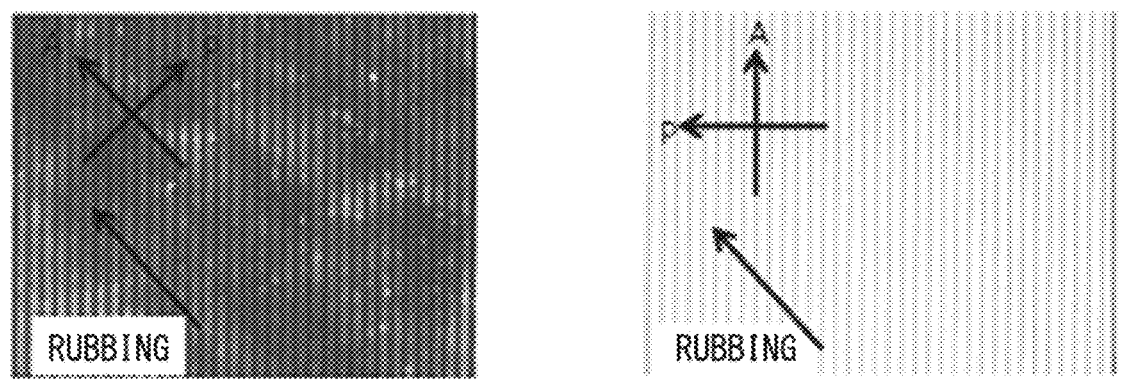
FIG. 16 is a polarizing microscopic photograph showing a state in which liquid crystal molecules are uniformly aligned in a direction orthogonal to the longitudinal direction of a comb tooth electrode.

It was confirmed that the alignment direction of the liquid crystal molecules when the voltage was not applied is the rubbing direction as an observation with a polarizing microscope. In this state, a pulse voltage at 2 Vpp and 10 Hz was applied. In FIG. 6(b), the dotted line indicates the direction of the generated electric field. As a result of observation with a polarizing microscope, it was observed that the direction was rotated by 45 degrees from the rubbing direction, and the liquid crystal molecules were uniformly aligned in the direction orthogonal to the longitudinal direction of the comb tooth electrode (FIG. 16). That is, the lubricating interface derivation region formed of the liquid phase (isotropic phase) is formed between the nematic liquid crystal and the glass substrate, and the rotation of the alignment of uniform liquid crystal molecules due to the slippery interface was confirmed at the interface between the liquid crystal component and the lubricating interface derivation region.

Comparative Example 2

Uniformly aligned liquid crystal cells were prepared by using the same method as that used in Example 4 except that 12A (dodecyl acrylate) is not contained. When the observation with a polarizing microscope was performed by using the method as that used in Example 4, it was not possible to confirm the response of the liquid crystal molecule at pulse voltage application of 2 Vpp and 10 Hz. In the liquid crystal cell of Comparative Example 2, it was confirmed that the slippery interface is not formed.

Example 5

A <mixed material X> of 94.5% by mass of 4-4'-azoxydianisole (PAA) liquid crystalline compound represented by Formula (1) and 5.5% by mass of PEG (polyethylene glycol, molecular weight of 10,000).

Formula (1)

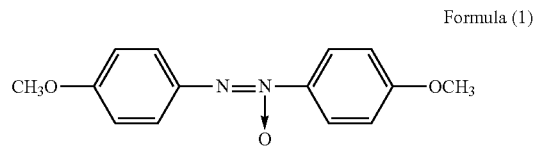

Two washed glass substrates were prepared, and plastic beads having a diameter of 5 μm were dispersed on one of the glass substrates, and then the one glass substrate was attached to the other glass substrate. The <mixed material X> was injected into a gap of 5 μm obtained as described above by a capillary phenomenon. No polymer film for improving the substrate surface was formed on these substrates in advance.

The temperature was raised to 150° C. by a temperature controller to form an isotropic phase, and then the temperature was lowered to 80° C. while applying a magnetic field of 0.44 T in a direction parallel to the glass substrate plane so as to obtain uniformly aligned liquid crystal cells.

The temperature of this liquid crystal cell was adjusted from 137° C. which is the nematic-liquid transition point to 136° C. slightly lower than 1° C., and the birefringence observation was performed with a laser beam after the two transmission axes were sandwiched between the polarizing plates whose transmission axes were orthogonal to each other. Note that, the magnetic field was applied and the direction of the magnetic field was made to coincide with the transmission axis of one of the polarizing plates. In this state, when the liquid crystal cell was rotated around the normal of the glass substrate, birefringence light dependent on the rotation angle was not confirmed. It seemed that the liquid crystal alignment orientation did not follow the rotation of the liquid crystal cells, but was fixed in the direction of the magnetic field application. That is, by mixing PEG to PAA, it was confirmed that a liquid phase (isotropic phase) forms a lubricating interface derivation region between the nematic liquid crystal and the glass substrate, and the interface between the liquid crystal component and the lubricating interface derivation region forms a slippery interface.

Comparative Example 3

Uniformly aligned liquid crystal cells were prepared by using the same order as that used in Example 5 except that 100% by mass of PAA 100 of <comparative material> was injected without using PEG by a capillary phenomenon.

Further, in the same manner, the birefringence under the magnetic field application was observed. In a case of Comparative Example 3, an increase and decrease in the birefringence light was confirmed such that the liquid crystal alignment direction coincided and rotated in accordance with the rotation of the liquid crystal cell. That is, in the <comparative material>, it was confirmed that no slippery interface was formed.

Example 6

A glass substrate having a comb tooth electrode on the surface thereof and a glass substrate having no electrode were prepared.

The comb tooth electrode was formed of chromium, the electrode width was 10 μm, the distance between the electrodes was 10 μm, and an electric field substantially parallel to the substrate can be applied between adjacent comb tooth electrodes. No polymer film for improving the substrate surface was formed on these substrates in advance.

After washing two glass substrates, silica beads having a diameter of 2 μm were dispersed on one of the glass substrates, and then both glass substrates were attached to each other. The <mixed material X> used in Example 5 was injected into a gap of 2 μm obtained as described above by a capillary phenomenon.

The temperature was raised to 150° C. by a temperature controller to form an isotropic phase, and then the temperature was lowered to 80° C. while applying a magnetic field of 0.44 T in a direction which is parallel to the glass substrate plane and is 45 degrees with respect to the comb tooth electrode so as to obtain uniformly aligned liquid crystal cells.

When a pulse voltage at 2 Vpp and 10 Hz was applied to this liquid crystal cell under the condition that the magnetic field is not applied with the polarizing microscope, a response (black→white) was confirmed in which the liquid crystal alignment orientation rotated by 45 degrees and was oriented in a direction parallel to the electric field direction. Next, when the magnetic field is applied again under the condition that the voltage is not applied, a response (white→black) was confirmed in which the liquid crystal alignment orientation oriented in an original direction.

Further, when the same pulse voltage is applied with the polarizing microscope under the condition that the magnetic field was applied, a response (black→white) of the liquid crystal alignment orientation was confirmed, and then when the magnetic field was not applied, a response of black→white was confirmed. That is, it was confirmed that a liquid phase (isotropic phase) forms a lubricating interface derivation region between the nematic liquid crystal and the glass substrate, and the interface between the liquid crystal component and the lubricating interface derivation region forms a slippery interface.

Comparative Example 4

Uniformly aligned liquid crystal cells were prepared by using the same order as that used in Example 6 by using <comparative material> in which PEG is not mixed. Further, in the same manner, the birefringence under the magnetic field application was observed. In a case of Comparative Example 4, an increase and decrease in the birefringence light was confirmed such that the liquid crystal alignment direction coincided and rotated in accordance with the rotation of the liquid crystal cell. That is, in the <comparative material>, it was confirmed that no slippery interface was formed.

Example 7

As shown in FIG. 13, the first common electrode 201 and the first pixel electrode 202 are provided on one substrate, and the second common electrode 203 and the second pixel electrode 204 are provided on the other substrate in a direction of θ=45° with the first electrode so as to constitute an optical element which generates electric field in a plurality of directions. The first common electrode 201 and the first pixel electrode 202 are comb tooth electrodes, and the second common electrode 203 and the second pixel electrode 204 are also comb tooth electrodes.

The first common electrode 201 and the first pixel electrode 202 were parallel with each other, the electrode width was 10 μm, and the distance between the adjacent electrodes was 10 μm such that a voltage was applied between the adjacent electrodes. The second common electrode 203 and the second pixel electrode 204 were parallel with each other, the electrode width was 10 μm, and the distance between the adjacent electrodes was 10 μm such that a voltage was applied between the adjacent electrodes.

The plastic beads having a diameter of 2 μm were dispersed one substrate on which the first common electrode 201 and the first pixel electrode 202 were provided, and then the one substrate was attached to the other substrate on which the second common electrode 203 and the second pixel electrode 204. The <mixed material X> used in Example 5 was injected into a gap of 2 m obtained as described above by a capillary phenomenon. No polymer film for improving the substrate surface was formed on these substrates in advance.

Uniformly aligned liquid crystal cells were prepared by using the same order as that used in Example 5, and the birefringence observation was performed with a laser beam after the two transmission axes were sandwiched between the polarizing plates whose transmission axes were orthogonal to each other. When a potential difference of 2 V was provided between the first common electrode 201 and the first pixel electrode 202, and the second common electrode 203 and the second pixel electrode 204 had the same potential, white was given, and then when a potential difference of 2 V was provided between the second common electrode 203 and the second pixel electrode 204, and the first common electrode 201 and the first pixel electrode 202 had the same potential, black was given. Further, when a potential difference of 2 V is provided between the first common electrode 201 and the first pixel electrode 202, and the second common electrode 203 and the second pixel electrode 204 have the same potential, white is given, and with this, it was confirmed that in the response of both directions of white→black and black→white, the liquid phase (isotropic phase) forms a lubricating interface derivation region between the nematic liquid crystal and the glass substrate, and the interface between the liquid crystal component and the lubricating interface derivation region forms a slippery interface.

Example 8

A <mixed material Y> of 94.5% by mass of 4-4'-azoxydianisole (PAA) of liquid crystalline compound represented by Formula (1), and 5.5% by mass of (poly(ethylene oxide-b-6-(4'-cyanobiphenyl-4-yloxy)hexyl methacrylate) (LC_PEG) which is a block copolymer of polyethylene oxide (molecular weight of 3,500) and cyano biphenyl side chain type polymer (molecular weight of 2,500) represented by Formula (2).

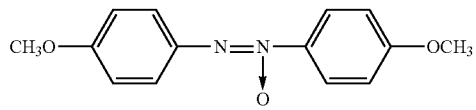

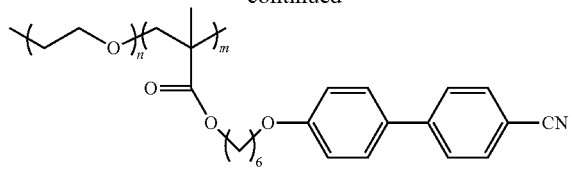

Two washed glass substrates were prepared, and plastic beads having a diameter of 2 μm were dispersed on one glass substrate, and then the one glass substrate was attached to the other glass substrate. The <mixed material Y> was injected into a gap of 2 μm obtained as described above by a capillary phenomenon. No polymer film for improving the substrate surface was formed on these substrates in advance.

The temperature was raised to 150° C. by a temperature controller to form an isotropic phase, and then the temperature was lowered to 80° C. while applying a magnetic field of 0.44 T in a direction parallel to the glass substrate plane so as to obtain uniformly aligned liquid crystal cells.

The temperature of this liquid crystal cell was adjusted from 133° C. which is the nematic-liquid transition point to 134° C. slightly lower than 1° C., and the birefringence observation was performed with a laser beam after the two transmission axes were sandwiched between the polarizing plates whose transmission axes were orthogonal to each other. Note that, the magnetic field was applied and the direction of the magnetic field was made to coincide with the transmission axis of one of the polarizing plates. In this state, when the liquid crystal cell was rotated around the normal of the glass substrate, birefringence light dependent on the rotation angle was not confirmed. It seemed that the liquid crystal alignment orientation did not follow the rotation of the liquid crystal cells, but was fixed in the direction of the magnetic field application. That is, it was confirmed that a lubricating interface derivation region formed of a liquid phase (isotropic phase) is formed between the nematic liquid crystal and the glass substrate, and the interface between the liquid crystal component and the lubricating interface derivation region forms a slippery interface.

Example 9

A glass substrate having a comb tooth electrode on the surface thereof and a glass substrate having no electrode were prepared.

The comb tooth electrode was formed of chromium, the electrode width was 10 μm, the distance between the electrodes was 10 μm, and an electric field substantially parallel to the substrate can be applied between adjacent comb tooth electrodes. No polymer film for improving the substrate surface was formed on these substrates in advance.

After washing two glass substrates, silica beads having a diameter of 2 μm were dispersed on one of the glass substrates, and then both glass substrates were attached to each other. The <mixed material Y> used in Example 8 was injected into a gap of 2 μm obtained as described above by a capillary phenomenon.

The temperature was raised to 150° C. by a temperature controller to form an isotropic phase, and then the temperature was lowered to 80° C. while applying a magnetic field of 0.44 T in a direction which is parallel to the glass substrate plane and is 45 degrees with respect to the comb tooth electrode so as to obtain uniformly aligned liquid crystal cells.

When a pulse voltage at 2 Vpp and 10 Hz was applied to this liquid crystal cell under the condition that the magnetic field is not applied with the polarizing microscope, a response (black→white) was confirmed in which the liquid crystal alignment orientation rotated by 45 degrees and was oriented in a direction parallel to the electric field direction. Next, when the magnetic field is applied again under the condition that the voltage is not applied, a response (white→black) was confirmed in which the liquid crystal alignment orientation oriented in an original direction.

Further, when the same pulse voltage is applied with the polarizing microscope under the condition that the magnetic field was applied, a response (black→white) of the liquid crystal alignment orientation was confirmed, and then when the magnetic field was not applied, a response of black→white was confirmed. That is, it was confirmed that a liquid phase (isotropic phase) forms a lubricating interface derivation region, and the interface between the liquid crystal component and the lubricating interface derivation region forms a slippery interface.

Example 10

As shown in FIG. 13, the first common electrode 201 and the first pixel electrode 202 are provided on one substrate, and the second common electrode 203 and the second pixel electrode 204 are provided on the other substrate so as to constitute an optical element which generates electric field in a plurality of directions.

The plastic beads having a diameter of 2 μm were dispersed one substrate on which the first common electrode 201 and the first pixel electrode 202 were provided, and then the one substrate was attached to the other substrate on which the second common electrode 203 and the second pixel electrode 204. The <mixed material Y> used in Example 8 was injected into a gap of 2 μm obtained as described above by a capillary phenomenon. No polymer film for improving the substrate surface was formed on these substrates in advance.

Uniformly aligned liquid crystal cells were prepared by using the same order as that used in Example 8, and the birefringence observation was performed with a laser beam after the two transmission axes were sandwiched between the polarizing plates whose transmission axes were orthogonal to each other. When a potential difference of 2 V was provided between the first common electrode 201 and the first pixel electrode 202, and the second common electrode 203 and the second pixel electrode 204 had the same potential, white was given, and then when a potential difference of 2 V was provided between the second common electrode 203 and the second pixel electrode 204, and the first common electrode 201 and the first pixel electrode 202 had the same potential, black was given. Further, when a potential difference of 2 V is provided between the first common electrode 201 and the first pixel electrode 202, and the second common electrode 203 and the second pixel electrode 204 have the same potential, white is given, and with this, it was confirmed that in the response of both directions of white→black and black→white, a lubricating interface derivation region formed of the liquid phase (isotropic phase) is formed and the interface between the liquid crystal component and the lubricating interface derivation region forms a slippery interface.

Example 11

As described below, a sample 9A was formed by mixing 1.60% by mass of ethyl laurate to 98.40% by mass of a liquid crystal composition (LC-9) formed of 85.3% by mass of a nematic liquid crystal composition (9-I), 6.9% by mass of a chiral compound (9-I), 3.7% by mass of the monomer (9-III), 3.7% by mass of a monomer (9-1V), and 0.4% by mass of a photopolymerization initiator (9-V).

Figure 18:
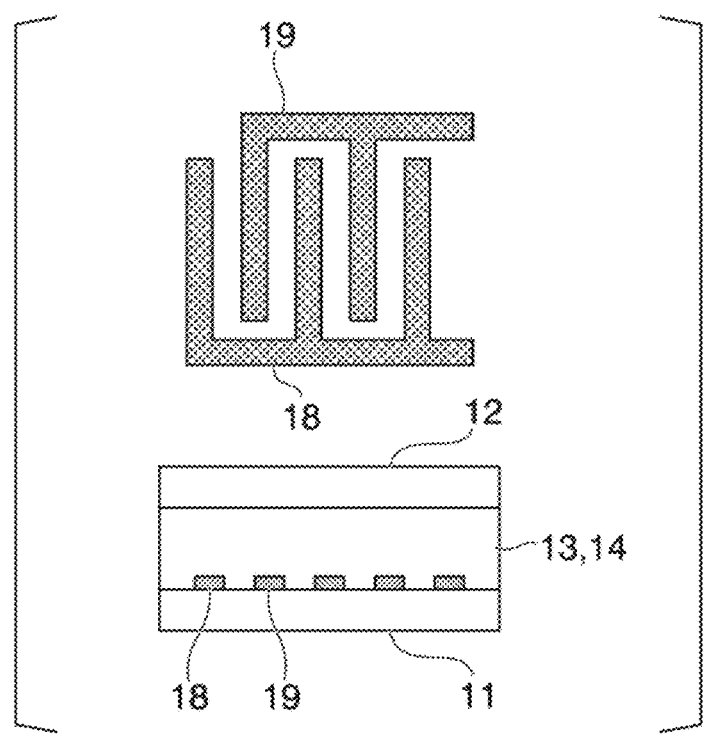
FIG. 18 is a schematic view showing an example of an optical element in one embodiment of the present invention.

FIG. 18 is a schematic view showing an optical element which uses the glass substrate 11 including the comb tooth electrodes 18 and 19 on the surface, and the glass substrate 12 having no electrode. The comb tooth electrode 18 was formed of chromium, the electrode width was 10 μm, the distance between the electrodes was 10 μm, and an electric field substantially parallel to the substrate was applied between the electrodes. These glass substrates were not treated with an alignment film.

After washing two glass substrates, silica beads having a diameter of 7 μm were dispersed on one of the glass substrates, and then both glass substrates were attached to each other. The sample 9A was injected into a gap of 7 μm obtained as described above by a capillary phenomenon.

Nematic Liquid Crystal Composition (9-I)

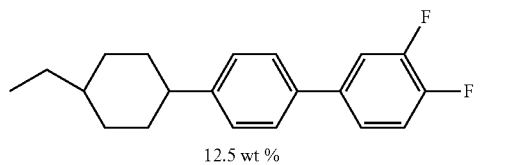

12.5 wt %

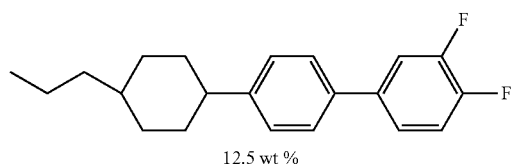

12.5 wt %

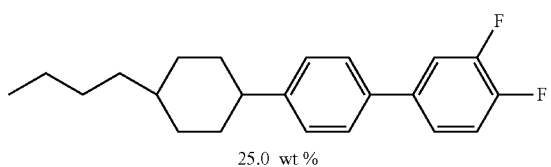

25.0 wt %

4-cyano-4'-pentyl biphenyl 50.0 wt %

Chiral Computer (9-II)

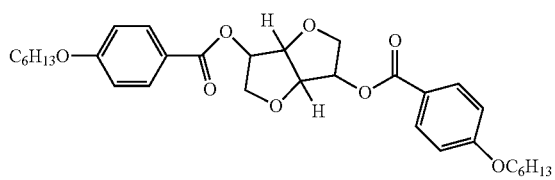

Monomer (9-III)

Dodecyl acrylate

Monomer (9-IV)

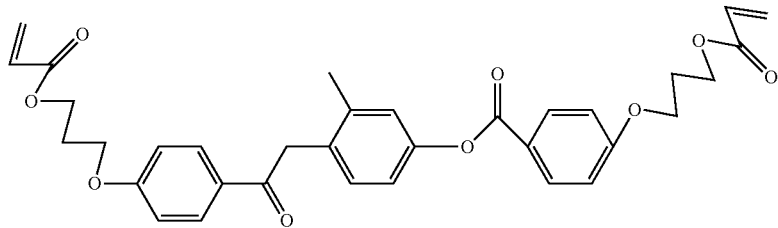 [SMILES: C=CC(=O)OCCCOc1ccc(C(=O)Cc2ccc(OC(=O)c3ccc(OCCCOC(=O)C=C)cc3)cc2C)cc1]

Photopolymerization Initiator (9-V)

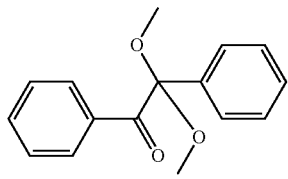 [SMILES: COC(OC)(C(=O)c1ccccc1)c1ccccc1]

Next, this liquid crystal cell was once heated to 44° C. of the isotropic phase, and then cooled to 38° C. to develop a blue phase. In this state, the blue phase was irradiated with ultraviolet rays so as to be stabilized. The UV irradiation condition was performed by gradually raising illuminance in total of 45 minutes, that is, for 10 minutes at 12 μW/cm², for 10 minutes at 20 μW/cm², for 10 minutes at 30 μW/cm², for 10 minutes at 63 μW/cm², and for five minutes at 310 μW/cm².

Figure 17:
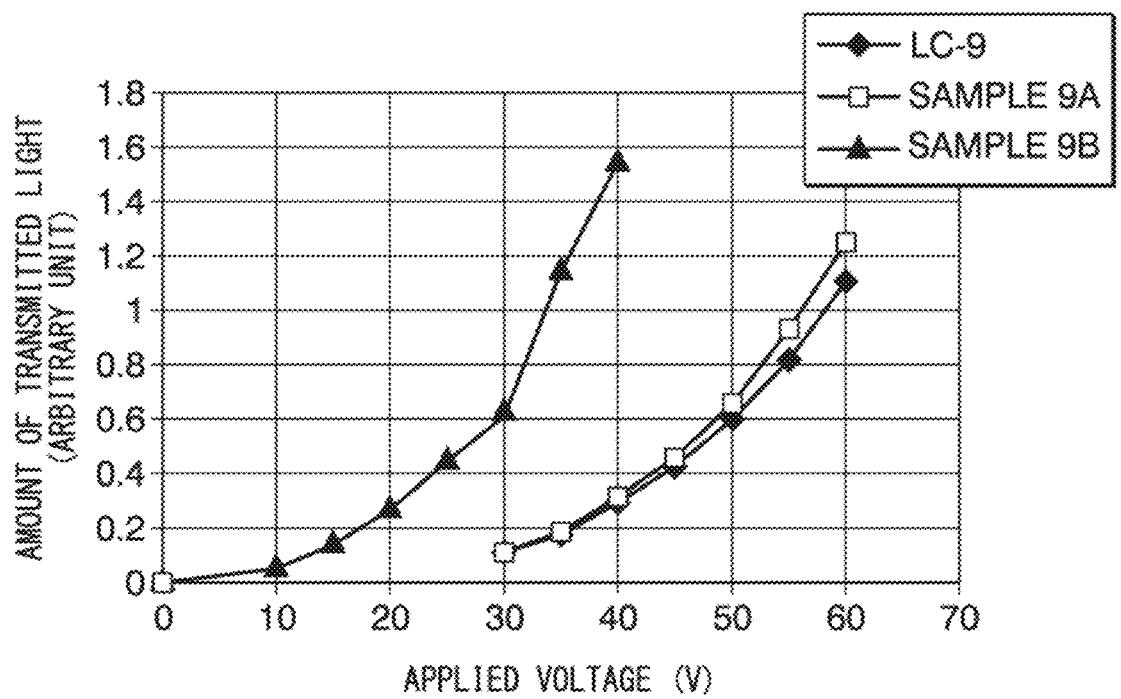
FIG. 17 is a graph showing a result of observing the amount of transmitted light while applying a voltage under a polarizing microscope.

The transmitted light amount was observed while applying a voltage in a range of 0 to 60 V with the polarizing microscope. The results are indicated in FIG. 17.

It is considered that by mixing ethyl laurate, the lubricating interface derivation region having a lower order than the liquid crystal phase was formed, and the interface between the liquid crystal component and the lubricating interface derivation region formed the slippery interface.

Example 12

A sample 9B was obtained by mixing 98.13% by mass of liquid crystal composition (LC-9) to 1.87% by mass tridecyl acetate.

A liquid crystal cell was prepared by using the same method as that used in Example 11 except that the sample 9A is changed to the sample 9B, heating to an isotropic phase, then lowering the temperature to develop a blue phase, and in this state, the irradiation of the ultraviolet rays under the same conditions as those in Example 11 so as to stabilize the blue phase. Similar to Example 11, the transmitted light amount was observed while applying a voltage in a range of 0 to 40 V with the polarizing microscope. The results are indicated in FIG. 17.

It is considered that by mixing tridecyl acetate, the lubricating interface derivation region having a lower order than the liquid crystal phase was formed, and the interface between the liquid crystal component and the lubricating interface derivation region formed the slippery interface.

Comparative Example 5

A liquid crystal cell was prepared by using the same method as that used in Example 11 except that the sample 9A is changed to the liquid crystal composition (LC-9), heating to an isotropic phase, then lowering the temperature to develop a blue phase, and in this state, the irradiation of the ultraviolet rays under the same conditions as those in Example 11 so as to stabilize the blue phase. Similar to Example 11, the transmitted light amount was observed while applying a voltage in a range of 30 to 60 V with the polarizing microscope. The results are indicated in FIG. 17. In the liquid crystal cell of Comparative Example 5, it was confirmed that the slippery interface is not formed.

As apparent from the result of FIG. 17, in the optical element of Example 11 using the sample 9A and the optical element of Example 12 using the sample 9B, it was possible to confirm a reduction effect of the driving voltage compared with the optical element of Comparative Example 5. Particularly, in the optical element of Example 11 using the sample 9A, a significant reduction effect was recognized.

In addition, when the response time at falling time was measured at 40 V, 48 μs was obtained in the optical element of Example 11 using the sample 9A, 65 μs was obtained in the optical element of Example 11 using the sample 9B, 78 μs was obtained in the optical element of Example 11, and with this, it was confirmed that the response speed was excellent in Example 11 and the optical element Example 11. In particular, it was possible to observe the remarkable speeding effect in the optical element of Example 11 using the sample 9A.

In addition, for sure, when the response time (20V→0V) at falling time was measured at 20 V at which the sample 9B has the same transmitted light amount as that of the other sample, the value was 70 μs, and the speeding effect was recognized as compared with Comparative Example 5.

A mechanism in which the low voltage is developed in Examples 11 and 12 is considered as follows.

That is, it is considered that the volume of the defective liquid crystals present in a defective part of the blue phase is decreased so as to stabilize the defect, and as a result, a phase behaving like liquid phase with high concentration of the above additives (ethyl laurate and tridecyl acetate) was inserted between the polymer portion contributing to the stability of the structure of the entire blue phase including a double cylinder structure and the blue phase liquid crystal, and thereby the interface between the blue phase liquid crystal phase and the liquid phase forms the slippery interface. It is considered that the low voltage was achieved by the effect of this slippery interface.

Further, it is considered that in the blue phase, the double cylinder and the defect spontaneously coexist to be formed, and thus when the voltage is turned off from the state where the voltage is applied by forming the slippery interface, it becomes easy to return to an aggregate state of molecules of spontaneously formed blue phase. For this reason, it is considered that the response at the falling time becomes faster by forming the slippery interface.

In this way, it is considered that the formation of the slippery interface in the blue phase develops the effect of reducing the driving voltage and speeding up the response.

Even in a case of using a blue phase liquid crystal is used, as in the case of using the nematic liquid crystal, a coloring phenomenon at an oblique viewing angle occurs, and thus a bent type electrode shape as shown in FIG. 9 is effective for suppressing coloring. Note that, in the case of the blue phase liquid crystal, the angle of bending is desired to be 90 degrees.

Example 13

Two washed glass substrates (2.5 cm×2.5 cm) were prepared, coated with 150 µl of a 5% chloroform solution of the following polymer (A6CN-MA, Mw: 6321, Mw/Mn: 2.7, and a molar ratio of A6CN:MA is 1:4) by using a spin coating method under the condition of 500 rpm-10 s and 3000 rpm-1 min, dried at 100° C. under reduced pressure for one hour, and air-cooled so as to form a film on both glass substrate.

Then, both substrates were bonded together with a spacer interposed therebetween so that the surface coated with the polymer faced inward, and thereby a cell having a cell gap of 10.4 µm was prepared. The nematic liquid crystal composition (9-I) was heated to a liquid state and injected into this cell by a capillary phenomenon.

The temperature of this liquid crystal cell was adjusted to be in a range of 57.03° C. to 57.53° C., and the birefringence observation was performed with a laser beam after the two transmission axes were sandwiched between the polarizing plates whose transmission axes were orthogonal to each other. The magnetic field was applied so as to coincide with the transmission axis of one polarizing plate. In this state, when the liquid crystal cell was rotated around the normal of the glass substrate, a region in which the birefringence light dependent on the rotation angle was not confirmed was observed. It seemed that the liquid crystal alignment orientation did not follow the rotation of the liquid crystal cells, but was fixed in the direction of the magnetic field application. That is, it was confirmed that the lubricating interface derivation region having a lower order than the liquid crystal phase is formed between the nematic liquid crystal and the following polymer film, and the interface between the liquid crystal component and the lubricating interface derivation region formed the slippery interface.

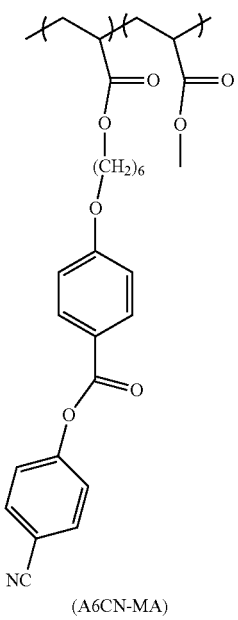

(A6CN-MA)

Example 14

Two ozone-washed glass substrate surfaces were coated with 20 wt % ethanol solution of 3-(trimethoxysilyl) propyl acrylate by using a spin coating method, dried under reduced pressure, and then washed with ethanol and dried so as to prepare an acrylate-modified glass substrate.

Next, the plastic beads having a diameter of 10 µm were dispersed on one glass substrate, and the one glass substrate was attached to the other glass substrate so that the acrylate-modified surface faced inward, and thereby a cell was prepared. A mixed material of 97.5% by mass of the nematic liquid crystal composition (9-I), 3% by mass of ethyl laurate, 0.24% by mass of the monomer (9-IV), 0.24% by mass of a monomer (9-III), and 0.02% by mass of a photopolymerization initiator (9-V) was injected into this cell by a capillary phenomenon. When this cell was evaluated by using the method described in Example 13, it was confirmed that at a temperature range of 69.31° C. to 69.52° C., the lubricating interface derivation region having a lower order than the liquid crystal phase is formed, and the interface between the liquid crystal component and the lubricating interface derivation region formed the slippery interface.

Example 15

The cell prepared in Example 14 was irradiated with UV light (intensity: 0.5 mW/cm$^2$) at 70° C. for one hour for polymerization. After that, when the evaluation was performed by using the method described in Example 14, it was confirmed that at a temperature range of 69.26° C. to 69.71° C., the lubricating interface derivation region having a lower order than the liquid crystal phase is formed, and the interface between the liquid crystal component and the lubricating interface derivation region formed the slippery interface, and a development temperature range of the slippery interface extends by polymerization.

Example 16

By using the substrate described in Example 6, after washing two glass substrates, silica beads having a diameter of 2 μm were dispersed on one of the glass substrates, and then both glass substrates were attached to each other. The mixed material of 96.9% by mass of the ferroelectric liquid crystal composition (FLC-07), 1.5% by mass of methacrylic acid 11-[4-(4-butylphenylazo) phenoxy] undecyl (Azo), 1.5% by mass of the monomer (9-IV), and 0.1% by mass of a photopolymerization initiator (9-V) was injected into a gap of 2 μm by a capillary phenomenon.

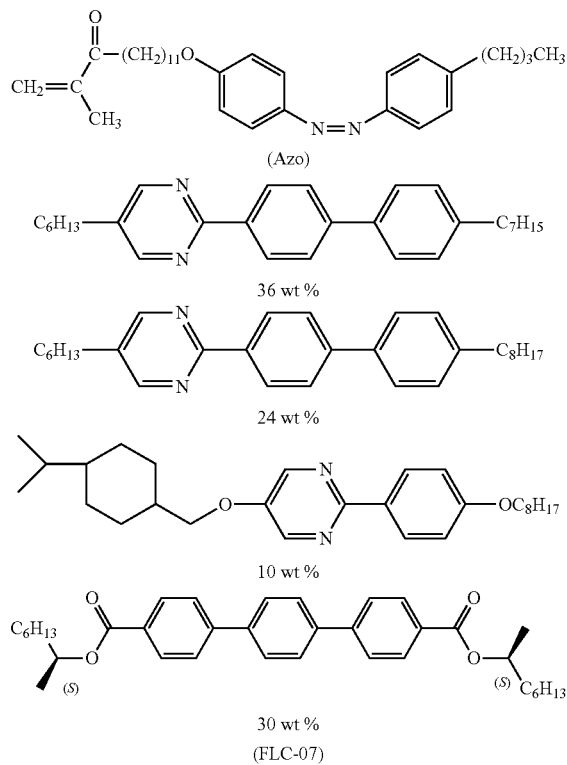

Thereafter, the temperature was raised to about 130° C. to make it an isotropic phase, then cooling was performed to 90° C. and a stepwise electric field such as 0→V→0→-V was applied for 5 seconds before UV irradiation. At this time, the frequency of the stepwise electric field was 10 Hz and the magnitude V was 10 V/10 μm.

After that, irradiation with ultraviolet light (central wavelength 365 nm) was started and then the stepwise electric field was applied for 10 seconds at 10 Hz and 10 V/10 μm in the same manner as described above in order to sufficiently obtain the effect of the slippery interface. Thereafter, the stepwise electric field at frequencies of 5 Hz and 10 Hz and at a magnitude of 15 V/10 μm was applied so as to perform the measurement of electrooptic response. When observing the state of the optical response with a polarizing microscope, the development of the liquid phase was observed in the vicinity of the comb tooth electrode, and the transmittance was as large as 35%. It was found that since the lubricating interface derivation region formed of a gel layer having a lower order than the liquid crystal phase was formed in the vicinity of the electrode, and the interface between the liquid crystal component and the lubricating interface derivation region formed the slippery interface such that the response at a low voltage was possible, the transmittance was increased.

Example 17

With respect to the cell of Example 16, UV irradiation was stopped and then the temperature was gradually decreased to be equal to or lower than 50° C. After that, the cell was heated to 90° C. and then the stepwise electric field was applied for five seconds at 10 Hz and 10 V/10 μm in the same manner as described in Example 16 in order to sufficiently obtain the effect of the slippery interface. Thereafter, the stepwise electric field at frequencies of 5 Hz and 10 Hz and at a magnitude of 15 V/10 μm was applied so as to perform the measurement of electrooptic response. It was found that the transmittance was as high as 30% even after the UV irradiation was stopped, and the slippery interface was retained even after the UV irradiation was stopped. It was confirmed that even in the liquid crystal cell of Example 17, the lubricating interface derivation region formed of a gel layer having a lower order than the liquid crystal phase was formed, and the interface between the liquid crystal component and the lubricating interface derivation region formed the slippery interface.

Comparative Example 6

It was found that in the same cell as that of Example 16, if UV irradiation was not performed, it was found that the transmittance was as low as 5%, and no slippery interface was formed under the same measurement conditions as in Example 16.

In Example 16, Azo underwent trans-cis isomerization due to the UV irradiation, thus was formed into a bent shape, and functioned as a lubricating interface deriving agent by lowering the liquid crystallinity in the vicinity; whereas in Comparative Example 6, a transform of Azo did not form a phase separation structure between the Azo and the liquid crystal composition (FLC-07), and did not function as a lubricating interface deriving agent. That is, in the liquid crystal cell of Comparative Example 6, it was confirmed that the slippery interface is not formed.

Example 18

Similar to Example 11, a sample 18A was formed by mixing 1.49% by mass of Azo to 98.51% by mass of a liquid crystal composition (LC-9) formed of 85.4% by mass of the nematic liquid crystal composition (9-I), 6.8% by mass of the chiral compound (9-II), 3.7% by mass of the monomer (9-III), 3.7% by mass of the monomer (9-IV), and 0.4% by mass of the photopolymerization initiator (9-V).

FIG. 18 is a schematic view showing an optical element which uses the glass substrate 11 including the comb tooth electrodes 18 and 19 on the surface, and the glass substrate 12 having no electrode. The comb tooth electrode 18 was formed of chromium, the electrode width was 10 μm, the distance between the electrodes was 10 μm, and an electric field substantially parallel to the substrate was applied between the electrodes. These glass substrates were not treated with an alignment film.

After washing two glass substrates, silica beads having a diameter of 7 μm were dispersed on one of the glass substrates, and then both glass substrates were attached to each other. The sample 18A was injected into a gap of 7 μm obtained as described above by a capillary phenomenon.

Next, this liquid crystal cell was once heated to 44° C. of the isotropic phase, and then cooled to 40° C. to develop a blue phase. In this state, the blue phase was irradiated with ultraviolet rays so as to be stabilized. The UV irradiation condition was performed by gradually raising illuminance in total of 90 minutes, that is, for 20 minutes at 12 µW/cm², for 20 minutes at 20 µW/cm², for 20 minutes at 30 µW/cm², for 20 minutes at 63 µW/cm², and for 10 minutes at 310 µW/cm².

Figure 24:
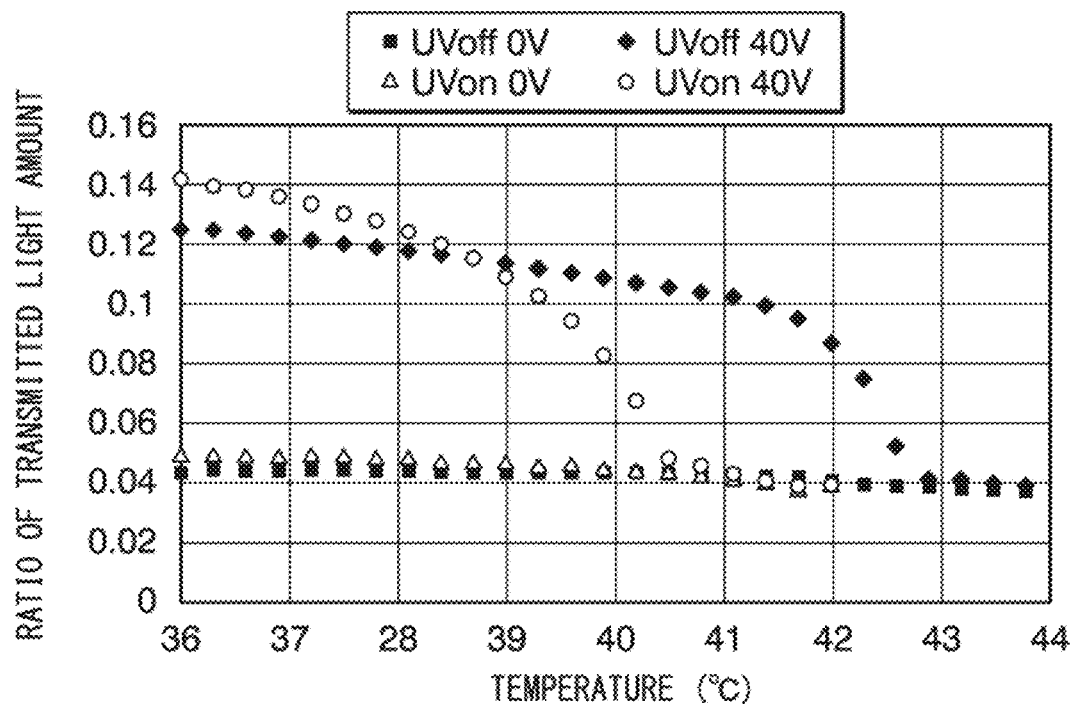
FIG. 24 is a graph showing a result of observing a ratio of transmitted light amount in the vicinity of a transition point of an isotropic phase-blue phase.

The transmitted light amount was observed while applying the voltage in a range of 0 to 40 V with irradiation of ultraviolet rays (irradiation condition: 310 µW/cm²) by using the polarizing microscope. FIG. 24 shows the ratio of the transmitted light amount at a temperature in a range of 36° C. to 44° C. (the ratio $(I_1/I_0)$ of transmitted light amount $(I_1)$ in a case of Cross Nicole (when two polarizing plates are orthogonal to each other) to transmitted light amount $(I_0)$ in a case where two polarizing plates are placed in a parallel state) when ultraviolet rays are irradiated and when ultraviolet rays are not irradiated, and when the voltage is not applied and when a voltage is applied. After the polymerization, Azo dye molecules concentrate on the defect, and thus the development temperature of the blue phase (transition point with isotropic phase) shifts to the high temperature side. In the case of Example 18, the temperature rose from around 41° C. to around 43° C.

Figure 25:
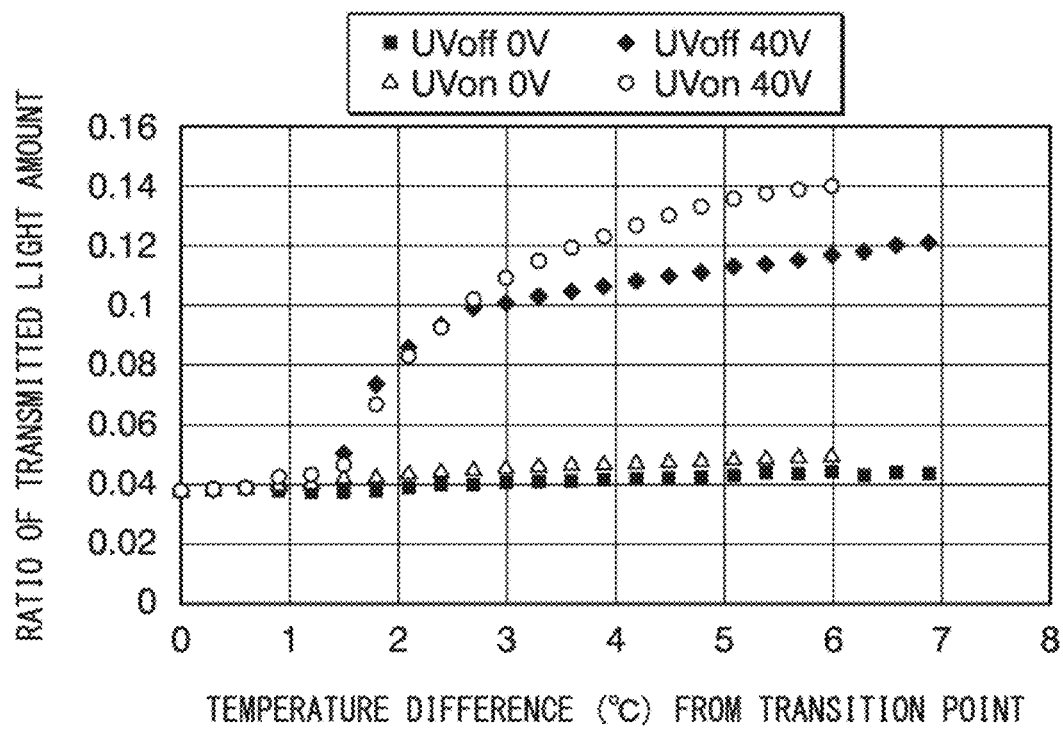
FIG. 25 is a graph showing that the result of FIG. 24 is normalized at a temperature from the transition point of the isotropic phase-blue phase.

Since the refractive index anisotropy in the blue phase liquid crystal increases depending on the temperature difference from the transition point with the isotropic phase, it is more realistic to standardize the performance comparison with the distance from the transition point. In this regard, FIG. 25 shows that the results are standardized at a temperature from the transition point of the isotropic phase-blue phase. The horizontal axis is the temperature difference (° C.) from the transition point of the isotropic phase-blue phase, and the low temperature side is positive. It was confirmed that in the blue phase at a temperature lower than 5 to 6° C. from the transition point, at the same driving voltage (40 V), the transmitted light amount at the time of ultraviolet irradiation was increased by 10 to 15% as compared with that at the time of no irradiation with ultraviolet light.

It is considered that the lubricating interface derivation region having a lower order than the liquid crystal phase was formed, and the interface between the liquid crystal component and the lubricating interface derivation region formed the slippery interface.

Example 19

Figure 21:
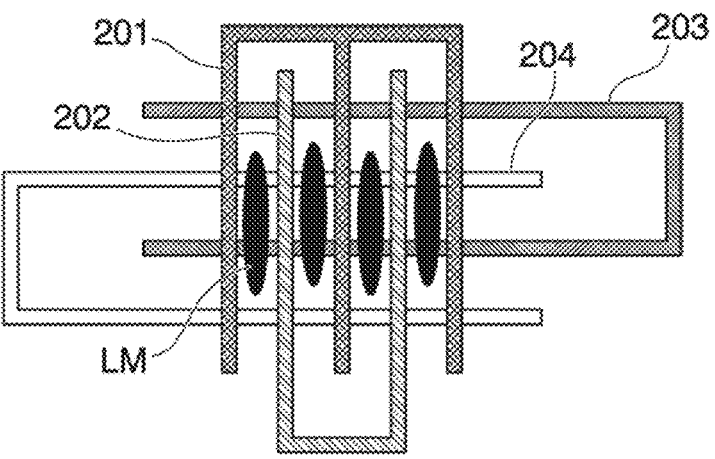
FIG. 21 is a schematic plan view showing another example of the optical element.

As shown in FIG. 21, the first common electrode 201 and the first pixel electrode 202 are provided on one substrate, and the second common electrode 203 and the second pixel electrode 204 are provided on the other substrate in the direction orthogonal to the first electrode so as to constitute an optical element which generates electric field in a plurality of directions. The first common electrode 201 and the first pixel electrode 202 are comb tooth electrodes, and the second common electrode 203 and the second pixel electrode 204 are also comb tooth electrodes. An interlayer insulating film is provided so that the first pixel electrode 202 and the second pixel electrode 204 or the common electrode 203, and the second pixel electrode 204 and the first pixel electrode 202 or the common electrode 201 are not conducted.

The first common electrode 201 and the first pixel electrode 202 were parallel with each other, the electrode width was 10 µm, and the distance between the adjacent electrodes was 10 µm such that a voltage was applied between the adjacent electrodes.

The second common electrode 203 and the second pixel electrode 204 were parallel with each other, the electrode width was 10 µm, and the distance between the adjacent electrodes was 10 µm such that a voltage was applied between the adjacent electrodes.

The plastic beads having a diameter of 2 µm were dispersed on one substrate (electrode substrate) on which the electrode was disposed, and then the one substrate was attached to the other substrate (facing substrate) on which the electrode was not disposed. The <mixed material X> used in Example 5 was injected into a gap of 2 µm obtained as described above by a capillary phenomenon. The substrate (counter substrate) on which the electrode was not disposed was coated with a horizontal alignment film, and was subjected to a parallel rubbing aligning treatment with the second common electrode 203 or the pixel electrode 204. No polymer film for improving the substrate surface was formed on the substrate on which the electrode was disposed in advance. Regarding the gap described above, the retardation value giving the maximum transmittance in the twisted nematic cell is around 484 nm. In consideration that the refractive index anisotropy of the liquid crystal is in a range of 0.33 to 0.34, a gap value of 1.4 µm gives the maximum transmittance. However, not only the liquid crystal at the interface but also the bulk liquid crystal moves at the time of the voltage application, and thus the thickness of the liquid crystal is preferably set to be larger than 1.4 µm.

Uniformly aligned liquid crystal cells were prepared by using the same order as that used in Example 5, and the birefringence observation was performed with a laser beam by disposing the substrate in which one of the transmission axes thereof is parallel to the first common electrode 201 after the two transmission axes were sandwiched between the polarizing plates whose transmission axes were orthogonal to each other. When a potential difference of 5 V was provided between the first common electrode 201 and the first pixel electrode 202, and the second common electrode 203 and the second pixel electrode 204 had the same potential, black was given, and then when a potential difference of 5 V was provided between the second common electrode 203 and the second pixel electrode 204, and the first common electrode 201 and the first pixel electrode 202 had the same potential, white was given. Further, when the potential difference of 5V was provided between the first common electrode 201 and the first pixel electrode 202, and the second common electrode 203 and the second pixel electrode 204 had the same potential, black was given.

Figure 22:
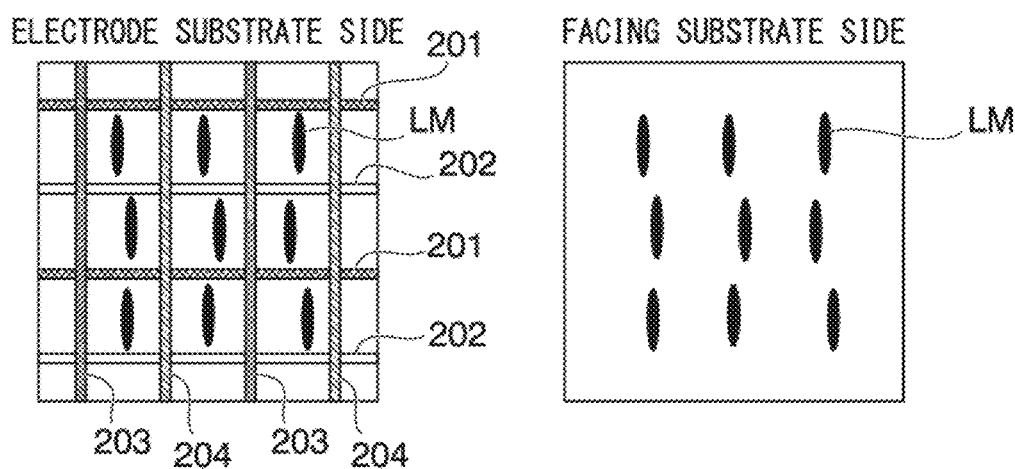
FIG. 22 is a schematic plan view showing a state of liquid crystal alignment in a black display of the optical element of FIG. 21.

The state of the liquid crystal alignment on the electrode substrate side and the facing substrate side in the black display is shown in FIG. 22. The slippery interface is formed on the electrode substrate side, and the facing substrate side is subjected to the parallel rubbing aligning treatment so as to form an anchor ring interface, and the liquid crystal molecules are all aligned in parallel with the second common electrode 203 or the pixel electrode 204.

Figure 23:
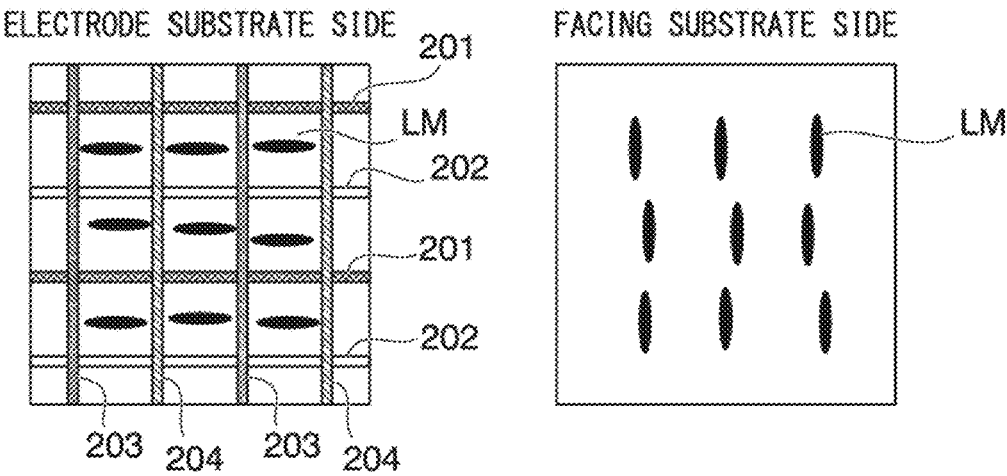
FIG. 23 is a schematic plan view showing a state of liquid crystal alignment in a white display of the optical element of FIG. 21.

The state of the liquid crystal alignment on the electrode substrate side and the facing substrate side in the white display is shown in FIG. 23. The slippery interface is formed on the electrode substrate side, and the facing substrate side is subjected to the parallel rubbing aligning treatment so as to form an anchor ring interface, and the liquid crystal molecules are twisted-aligned by being rotated by 900 in the cell thickness direction.

It is considered that the lubricating interface derivation region having a lower order than the liquid crystal phase was formed, and the interface between the liquid crystal component and the lubricating interface derivation region formed the slippery interface.

Example 20

Two washed glass substrates (2.5 cm×2.5 cm) were prepared, coated with 150 μl of a 5% chloroform solution of the following polymer (A6OC6H13-MA, Mw: 7168, Mw/Mn: 2.43, and a molar ratio of A6OC6H13:MA is A6OC6H13:MA=1:4) by using a spin coating method under the condition of 500 rpm-10 s and 3000 rpm-1 min, dried at 100° C. under reduced pressure for one hour, and air-cooled so as to form a film on both glass substrates.

Then, both substrates were bonded together with a spacer interposed therebetween so that the surface coated with the polymer faced inward, and thereby a cell having a cell gap of 10.4 μm was prepared. The nematic liquid crystal composition (9-I) was heated to a liquid state and injected into this cell by a capillary phenomenon.

The temperature of this liquid crystal cell was adjusted to be in a range of 58.3° C. to 59.10° C., and the birefringence observation was performed with a laser beam after the two transmission axes were sandwiched between the polarizing plates whose transmission axes were orthogonal to each other. The magnetic field was applied so as to coincide with the transmission axis of one polarizing plate. In this state, when the liquid crystal cell was rotated around the normal of the glass substrate, a region in which the birefringence light dependent on the rotation angle was not confirmed was observed. It seemed that the liquid crystal alignment orientation did not follow the rotation of the liquid crystal cells, but was fixed in the direction of the magnetic field application. That is, it was confirmed that the lubricating interface derivation region having a lower order than the liquid crystal phase was formed between the liquid crystal and the glass substrate, and the interface between the liquid crystal component and the lubricating interface derivation region formed the slippery interface.

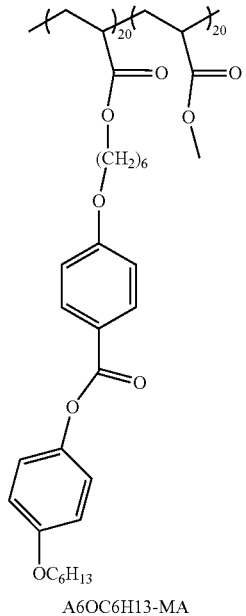

A6OC6H13-MA

Example 21

Two washed glass substrates (2.5 cm×2.5 cm) were prepared, coated with 150 μl of a 5% chloroform solution of the following polymer (A6CN-C6H13-MA, Mw: 6801, Mw/Mn: 1.7, and a molar ratio of A6CN:C6H13:MA is 1:1:2) by using a spin coating method under the condition of 500 rpm-10 s and 3000 rpm-1 min, dried at 100° C. under reduced pressure for one hour, and air-cooled so as to form a film on both glass substrate.

Then, both substrates were bonded together with a spacer interposed therebetween so that the surface coated with the polymer faced inward, and thereby a cell having a cell gap of 10.4 μm was prepared. The nematic liquid crystal composition (9-I) was heated to a liquid state and injected into this cell by a capillary phenomenon.

The temperature of this liquid crystal cell was adjusted to be in a range of 58.2° C. to 59.0° C., and the birefringence observation was performed with a laser beam after the two transmission axes were sandwiched between the polarizing plates whose transmission axes were orthogonal to each other. The magnetic field was applied so as to coincide with the transmission axis of one polarizing plate. In this state, when the liquid crystal cell was rotated around the normal of the glass substrate, a region in which the birefringence light dependent on the rotation angle was not confirmed was observed. It seemed that the liquid crystal alignment orientation did not follow the rotation of the liquid crystal cells, but was fixed in the direction of the magnetic field application. That is, it was confirmed that the lubricating interface derivation region having a lower order than the liquid crystal phase was formed between the liquid crystal and the glass substrate, and the interface between the liquid crystal component and the lubricating interface derivation region formed the slippery interface.

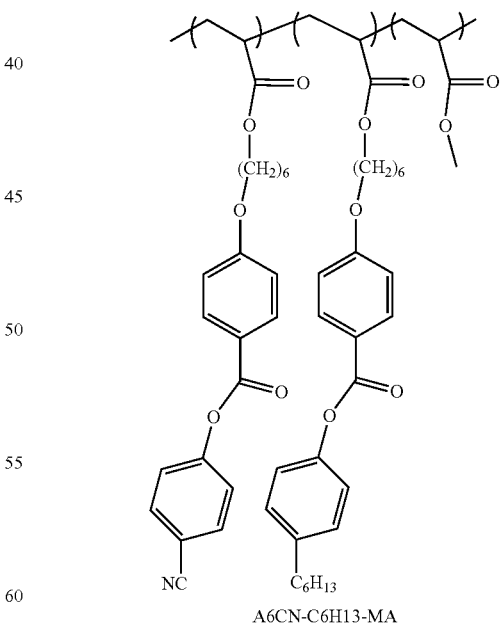

A6CN-C6H13-MA

Example 22

Two washed glass substrates (2.5 cm×2.5 cm) were prepared, coated with 150 μl of a 5% chloroform solution of the following polymer (A6CCN-OC6H13-MA, Mw: 6437, Mw/Mn: 1.3, and a molar ratio of A6CN:OC6H13:MA is 1:1:2) by using a spin coating method under the condition of 500 rpm-10 s and 3000 rpm-1 min, dried at 100° C. under reduced pressure for one hour, and air-cooled so as to form a film on both glass substrate.

Then, both substrates were bonded together with a spacer interposed therebetween so that the surface coated with the polymer faced inward, and thereby a cell having a cell gap of 10.4 µm was prepared. The nematic liquid crystal composition (9-I) was heated to a liquid state and injected into this cell by a capillary phenomenon.

The temperature of this liquid crystal cell was adjusted to be in a range of 57.93° C. to 57.63° C. in a cooling step, and the birefringence observation was performed with a laser beam after the two transmission axes were sandwiched between the polarizing plates whose transmission axes were orthogonal to each other. The magnetic field was applied so as to coincide with the transmission axis of one polarizing plate. In this state, when the liquid crystal cell was rotated around the normal of the glass substrate, a region in which the birefringence light dependent on the rotation angle was not confirmed was observed. It seemed that the liquid crystal alignment orientation did not follow the rotation of the liquid crystal cells, but was fixed in the direction of the magnetic field application. That is, it was confirmed that the lubricating interface derivation region having a lower order than the liquid crystal phase was formed between the liquid crystal and the glass substrate, and the interface between the liquid crystal component and the lubricating interface derivation region formed the slippery interface.

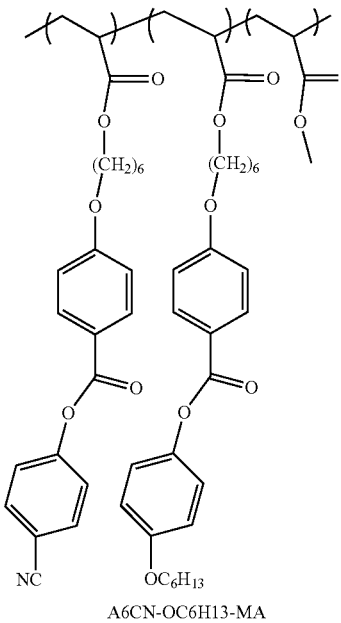

A6CN-OC6H13-MA

Example 23

Two washed glass substrates (2.5 cm×2.5 cm) were prepared, coated with 150 µl of a 5% chloroform solution of the following polymer (A3CN-DA, Mw: 2392, Mw/Mn: 2.4, and a molar ratio of A3CN:DA is 2:3) by using a spin coating method under the condition of 500 rpm-10 s and 3000 rpm-1 min, dried at 100° C. under reduced pressure for one hour, and air-cooled so as to form a film on both glass substrates.

Then, both substrates were bonded together with a spacer interposed therebetween so that the surface coated with the polymer faced inward, and thereby a cell having a cell gap of 10.4 µm was prepared. The nematic liquid crystal composition (9-I) was heated to a liquid state and injected into this cell by a capillary phenomenon.

The temperature of this liquid crystal cell was adjusted to be in a range of 60.17° C. to 60.65° C., and the birefringence observation was performed with a laser beam after the two transmission axes were sandwiched between the polarizing plates whose transmission axes were orthogonal to each other. The magnetic field was applied so as to coincide with the transmission axis of one polarizing plate. In this state, when the liquid crystal cell was rotated around the normal of the glass substrate, a region in which the birefringence light dependent on the rotation angle was not confirmed was observed. It seemed that the liquid crystal alignment orientation did not follow the rotation of the liquid crystal cells, but was fixed in the direction of the magnetic field application. That is, it was confirmed that the lubricating interface derivation region having a lower order than the liquid crystal phase was formed between the liquid crystal and the glass substrate, and the interface between the liquid crystal component and the lubricating interface derivation region formed the slippery interface.

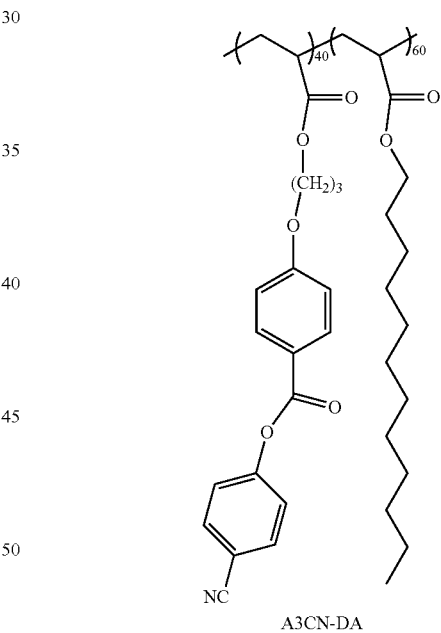

A3CN-DA

Example 24

Two washed glass substrates (2.5 cm×2.5 cm) were prepared, coated with 150 µl of a 5% chloroform solution of the following polymer (A6CN-IBA, Mw: 4562, Mw/Mn: 1.87, and a molar ratio of A6CN:IBA is 3:7) by using a spin coating method under the condition of 500 rpm-10 s and 3000 rpm-1 min, dried at 100° C. under reduced pressure for one hour, and air-cooled so as to form a film on both glass substrate.

Then, both substrates were bonded together with a spacer interposed therebetween so that the surface coated with the polymer faced inward, and thereby a cell having a cell gap of 10.4 μm was prepared. The nematic liquid crystal composition (9-I) was heated to a liquid state and injected into this cell by a capillary phenomenon.

The temperature of this liquid crystal cell was adjusted to be in a range of 52.7° C. to 53.5° C., and the birefringence observation was performed with a laser beam after the two transmission axes were sandwiched between the polarizing plates whose transmission axes were orthogonal to each other. The magnetic field was applied so as to coincide with the transmission axis of one polarizing plate. In this state, when the liquid crystal cell was rotated around the normal of the glass substrate, a region in which the birefringence light dependent on the rotation angle was not confirmed was observed. It seemed that the liquid crystal alignment orientation did not follow the rotation of the liquid crystal cells, but was fixed in the direction of the magnetic field application. That is, it was confirmed that the lubricating interface derivation region having a lower order than the liquid crystal phase was formed between the liquid crystal and the glass substrate, and the interface between the liquid crystal component and the lubricating interface derivation region formed the slippery interface.

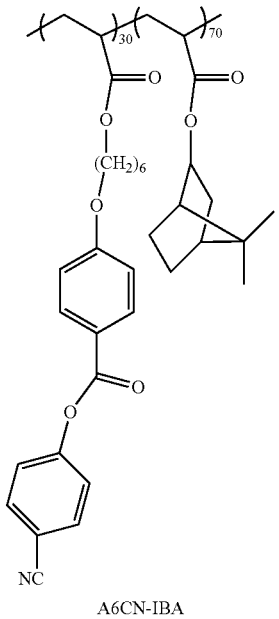

A6CN-IBA

Example 25

100 mg of a nematic liquid crystal composition (10-1) (prepared by substituting 4-cyano-4'-pentyl biphenyl of the nematic liquid crystal composition (9-I) with 4-cyano-4'-pentyloxybiphenyl), 3.08 mg of ethyl laurate, 0.25 mg of 4-(3-acryloyloxypropyloxy)benzoic acid 2-methyl-1,4-phenylene ester; and 2-methyl-1,4-phenylene-bis[4[3(acryloyloxy)propyloxy]benzoate] (the monomer (9-IV)), 0.25 mg of dodecyl acrylate, and 0.02 mg of 2,2-dimethoxy-2-phenylacetophenone (DMPAP, photopolymerization initiator (9-V)) were mixed so as to prepare a sample K1.

Acetic acid was added dropwise to a 10 wt % ethanol solution of 3-(trimethoxysilyl) propyl acrylate which is a silane coupling agent having an acryloyl group, and the pH was adjusted to 4.03. This solution was stirred for 4 hours and used to spin coating for the washed glass substrate. The glass substrate was vacuum-dried at room temperature for one hour, immersed in ethanol for 10 minutes, rinsed with pure water, and vacuum-dried for 12 hours so as to obtain a glass substrate having an acryloyl group. Using these two glass substrates, a cell having a distance between the substrates of 10 μm was prepared. The sample K1 was injected into this cell at 50° C. so as to obtain a cell K1.

The cell K1 was irradiated with ultraviolet rays having a wavelength of 365 nm and irradiation intensity of 1.5 mW/cm$^2$ for 20 minutes so as to progress polymerization of the monomer, thereby forming a polymer film on the surface of the cell modified with acryloyl group.

As a result of an observation with a polarizing microscope while applying a magnetic field perpendicularly to the normal of the prepared cell surface, it was confirmed that in the cell K1, the alignment vector of the liquid crystal rotated with respect to the magnetic field of 28.03 mT or more at a temperature range of 69.26° C. to 69.71° C. in the temperature rising process, that is, anchoring to the cell of liquid crystal was weak, and the lubricating interface derivation region having a lower order than the liquid crystal phase was formed between the liquid crystal and the glass substrate, and the interface between the liquid crystal component and the lubricating interface derivation region formed the slippery interface.

Example 26

84.5 mg of the nematic liquid crystal composition (10-I), 15.0 mg of ethyl laurate, 0.24 mg of the monomer (9-IV), 0.24 mg of dodecyl acrylate, and 0.02 mg of DMPAP were mixed so as to obtain a sample K2.

Acetic acid was added dropwise to a 10 wt % ethanol solution of 3-(trimethoxysilyl) propyl acrylate which is a silane coupling agent having an acryloyl group, and the pH was adjusted to 4.03. This solution was stirred for 4 hours and used to spin coating for the washed glass substrate. The glass substrate was vacuum-dried at room temperature for one hour, immersed in ethanol for 10 minutes, rinsed with pure water, and vacuum-dried for 12 hours so as to obtain a glass substrate having an acryloyl group. Using these two glass substrates, a cell having a distance between the substrates of 10 μm was prepared. The sample K2 was injected into this cell at 50° C. so as to obtain a cell K2.

As a result of an observation with a polarizing microscope while applying a magnetic field perpendicularly to the normal of the prepared cell surface, it was confirmed that in the cell K2, the alignment vector of the liquid crystal rotated with respect to the magnetic field of 61.55 mT or more at a temperature range of 0° C. to 32.98° C. in the temperature rising process, that is, anchoring to the cell of liquid crystal was weak, and the lubricating interface derivation region having a lower order than the liquid crystal phase was formed between the liquid crystal and the glass substrate, and the interface between the liquid crystal component and the lubricating interface derivation region formed the slippery interface.

Example 27

The cell K2 obtained in Example 26 was irradiated with ultraviolet rays having a wavelength of 365 nm and irradiation intensity of 1.5 mW/cm$^2$ for 20 minutes so as to progress polymerization of the monomer, thereby forming a polymer film on the surface of the cell modified with acryloyl group.

As a result of an observation with a polarizing microscope while applying a magnetic field perpendicularly to the normal of the prepared cell surface, it was confirmed that in the cell K2 after the polymerization treatment, the alignment vector of the liquid crystal rotated with respect to the magnetic field of 56.75 mT or more at a temperature range of 31.7° C. to 34.5° C. in the temperature rising process, that is, anchoring to the cell of liquid crystal was weak, and the lubricating interface derivation region having a lower order than the liquid crystal phase was formed between the liquid crystal and the glass substrate, and the interface between the liquid crystal component and the lubricating interface derivation region formed the slippery interface.

Example 28

100 mg of the nematic liquid crystal composition (10-I), and 18.34 mg of ethyl laurate were mixed so as to obtain a sample K5. The cell was prepared by using the same method as that used in Example 26, and as a result of an observation with a polarizing microscope while applying a magnetic field perpendicularly to the normal of the prepared cell surface, it was confirmed that in the cell K5, the alignment vector of the liquid crystal rotated with respect to the magnetic field of 61.55 mT or more at a temperature range of 31.8° C. to 33.9° C. in the temperature rising process, that is, anchoring to the cell of liquid crystal was weak, and the lubricating interface derivation region having a lower order than the liquid crystal phase was formed between the liquid crystal and the glass substrate, and the interface between the liquid crystal component and the lubricating interface derivation region formed the slippery interface.

Example 29

100 mg of the nematic liquid crystal composition (10-1), and 18.34 mg of dodecyl acrylate were mixed so as to obtain a sample K6. The cell was prepared by using the same method as that used in Example 26, and as a result of an observation with a polarizing microscope while applying a magnetic field perpendicularly to the normal of the prepared cell surface, it was confirmed that in the cell K6, the alignment vector of the liquid crystal rotated with respect to the magnetic field of 61.55 mT or more at a temperature range of 28.9° C. to 37.4° C. in the temperature rising process, that is, anchoring to the cell of liquid crystal was weak and the lubricating interface derivation region having a lower order than the liquid crystal phase was formed, and the interface between the liquid crystal component and the lubricating interface derivation region formed the slippery interface.

Example 30

100 mg of the nematic liquid crystal composition (10-I), and 17.65 mg of ethyl laurate were mixed so as to obtain a sample K3.
The washed glass substrates were spin-coated with a solution prepared by dissolving 449.19 mg of dodecyl acrylate, 449.20 mg of the monomer (9-1V), 37.43 mg of DMPAP in 449.19 mg of N-methylpyrrolidone at room temperature, polymerized by being irradiated with ultraviolet rays at an irradiation intensity of 1.5 mW/cm² in vacuum for 20 minutes, and then vacuum dried at room temperature for 12 hours so as to form a polymer film on the entire surface of the glass substrate. Using these two glass substrates, a cell having a distance between substrates of 10 μm was prepared, and the sample K3 was injected into this cell at 50° C. so as to obtain a liquid crystal cell K3.

As a result of an observation with a polarizing microscope while applying a magnetic field perpendicularly to the normal of the liquid crystal cell K3, it was confirmed that the alignment vector of the liquid crystal rotated with respect to the magnetic field of 61.55 mT or more at a temperature range of 54.00° C. to 56.20° C. in the temperature rising process and 51.78° C. to 55.40° C. in the temperature lowering process, that is, anchoring to the cell of liquid crystal was weak, and the lubricating interface derivation region having a lower order than the liquid crystal phase was formed, and the interface between the liquid crystal component and the lubricating interface derivation region formed the slippery interface.

Example 31

177.41 mg of the nematic liquid crystal composition (10-1), and 10.15 mg of N-methyl-2-pyrrolidone were mixed so as to obtain a sample K4-1. The washed glass substrates were spin-coated with 2.5 wt % N-methyl-2-pyrrolidone solution of Polyvinylpyrrolidone K90, (average molecular weight of 360,000, TCI) at room temperature and vacuum dried at 130° C. for 12 hours so as to form a polyvinylpyrrolidone film on the entire surface of the glass substrate. Using these two glass substrates, a cell having a distance between substrates of 10 m was prepared, and the sample K4-1 was injected into this cell at 60° C. so as to obtain a liquid crystal cell K4-1.

As a result of an observation with a polarizing microscope while applying a magnetic field perpendicularly to the normal of the liquid crystal cell K4-1, it was confirmed that the alignment vector of the liquid crystal rotated with respect to the magnetic field of 61.55 mT or more at a temperature range of 20° C. to 50° C. in the temperature rising process, that is, anchoring to the cell of liquid crystal was weak, and the lubricating interface derivation region having a lower order than the liquid crystal phase was formed, and the interface between the liquid crystal component and the lubricating interface derivation region formed the slippery interface.

Example 32

147.46 mg of the nematic liquid crystal composition (10-1), and 16.57 mg of N-methyl-2-pyrrolidone were mixed so as to obtain a sample K4-2. The washed glass substrates were spin-coated with 2.5 wt % N-methyl-2-pyrrolidone solution of Polyvinylpyrrolidone K90 at room temperature and vacuum dried at 130° C. for 12 hours so as to form a polyvinylpyrrolidone film on the entire surface of the glass substrate. Using these two glass substrates, a cell having a distance between substrates of 10 μm was prepared, and the sample K4-2 was injected into this cell at 60° C. so as to obtain a liquid crystal cell K4-2.

As a result of an observation with a polarizing microscope while applying a magnetic field perpendicularly to the normal of the liquid crystal cell K4-2, it was confirmed that the alignment vector of the liquid crystal rotated with respect to the magnetic field of 61.55 mT or more at a temperature range of 20° C. to 31° C. in the temperature rising process, that is, anchoring to the cell of liquid crystal was weak, and the lubricating interface derivation region having a lower order than the liquid crystal phase was formed, and the interface between the liquid crystal component and the lubricating interface derivation region formed the slippery interface.

Example 33

Figure 26:
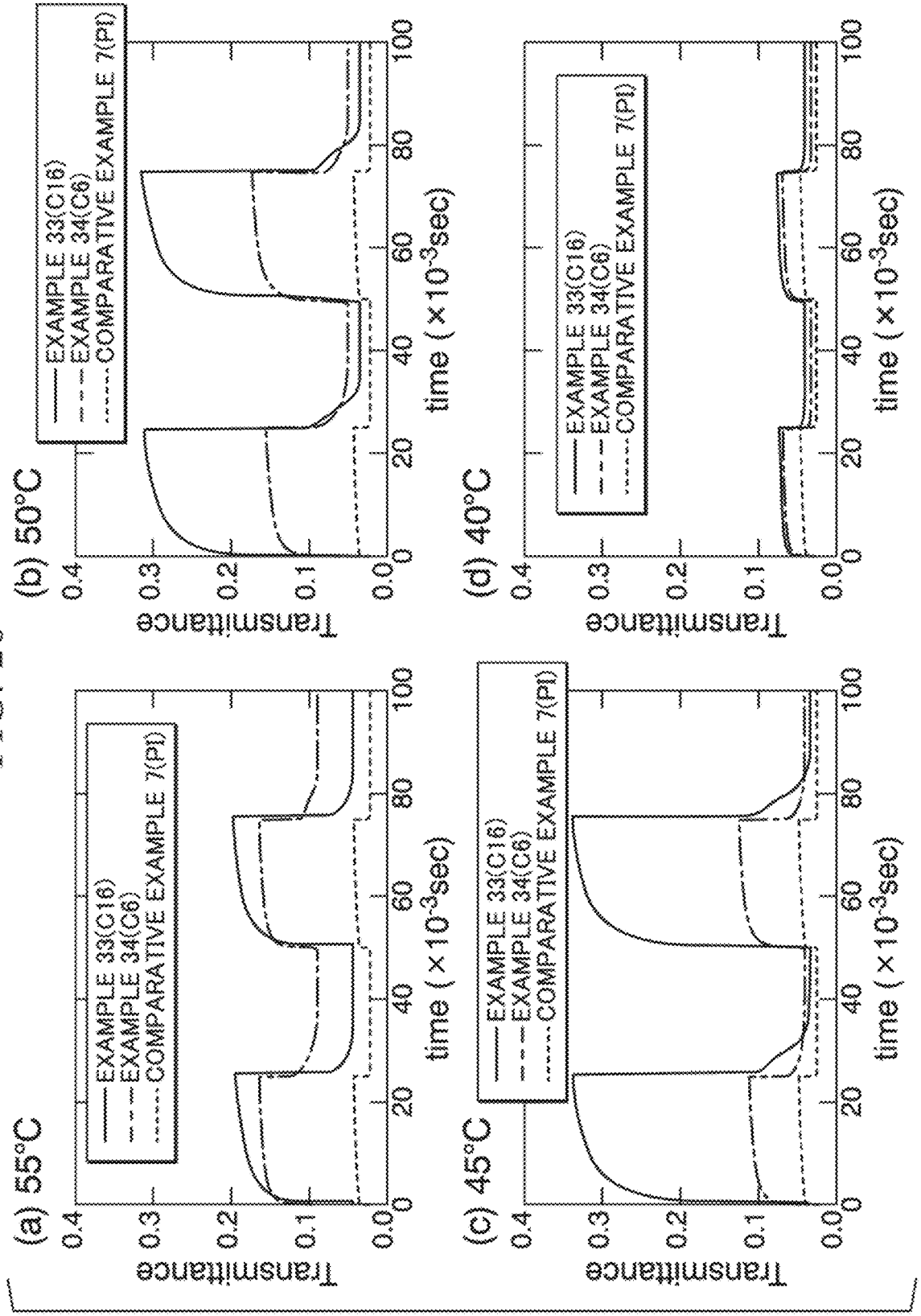
FIG. 26 shows a result of an electro-optical measurement at the time of applying a stepwise waveform.

The substrate was spin coated with 1 wt % aqueous solution of 1-hexadecyl-3-methylimidazolium chloride (hereinafter referred to as C16) which also exhibits liquid crystallinity as an ionic liquid so as to prepare a glass sandwich cell (cell thickness of 6.0 μm), and the following ferroelectric liquid crystal (FLC-04) was injected so as to perform the electro-optical measurement at the time of applying a stepwise waveform (±2.0 μm, 10 Hz) of V→0→−V→0. The results are indicated in FIG. 26. It was found that the transmittance was improved with the same applied voltage. The rate of increase is up to 7 times at maximum in the C16 substrate cell as compared with the vertically aligned polyimide cell of Comparative Example 7. It was confirmed that the anchoring of the interface is weaken due to the improvement of the transmittance, a liquid phase (isotropic phase) formed an ionic liquid forms a lubricating interface derivation region between the nematic liquid crystal and the glass substrate, and the interface between the liquid crystal component and the lubricating interface derivation region forms a slippery interface.

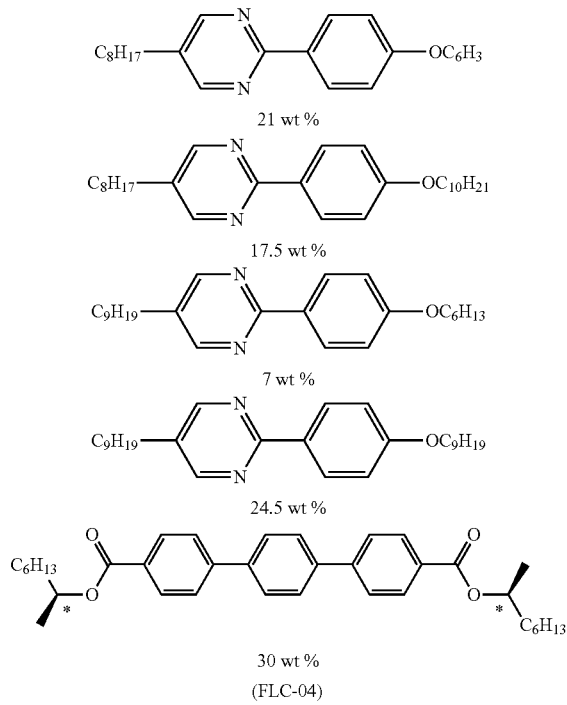

Example 34

A cell was prepared by using the same method as that used in Example 33 except that 1-hexyl-3-methyl imidazolium chloride liquid at room temperature was used as the ionic liquid, and the above-described ferroelectric liquid crystal (FLC-04) was injected so as to perform the electro-optical measurement at the time of applying a stepwise waveform. The results are indicated in FIG. 26. It was found that the transmittance was improved with the same applied voltage. It was confirmed that the anchoring of the interface is weaken due to the improvement of the transmittance, a liquid phase (isotropic phase) formed an ionic liquid forms a lubricating interface derivation region between the nematic liquid crystal and the glass substrate, and the interface between the liquid crystal component and the lubricating interface derivation region forms a slippery interface.

Comparative Example 7

The substrate was coated with a vertical alignment agent (SE1211 prepared by Nissan Chemical Industries, Limited) so as to prepare a glass sandwich cell by using the same method as that used in Examples 33 and 34, and the above-described ferroelectric liquid crystal (FLC-04) was injected so as to perform the electro-optical measurement at the time of applying a stepwise waveform. The transmittance was low. In the liquid crystal cell of Comparative Example 7, it was confirmed that the slippery interface is not formed.

Example 35

First, the washed glass was spin-coated with PMMA/toluene (about 5%) and annealed at 110° C. for one hour so as to prepare a substrate. Then, the substrate was spin coated with a solution in which 20 parts by weight of mixed material of 1.05 mg (7.5% by weight) of methacrylic acid 11-[4-(4-butylphenylazo) phenoxy] undecyl (Azo), 1.05 mg (7.5% by weight) of the monomer (9-IV), 11.76 mg (84% by weight) of 7CB (4-cyano-4'-heptyl biphenyl), and 0.14 mg (1% by weight) of polymerization initiator DMAP (4-dimethyl aminopyridine) was dissolved into 80 parts by weight of toluene, while being kept at 50° C. by a heater, and after that the substrate was immediately irradiated with the UV light (intensity=8.3 mW/cm$^2$) for 30 minutes while being kept at 50° C. A spacer (25 μm) is sandwiched between two substrates and fixed with an epoxy-based adhesive Araldite (registered trademark). After drying overnight or more, 7CB (4-cyano-4'-heptyl biphenyl) was injected. It was confirmed that when a magnetic field of 440 mT is applied at 48.9° C., the liquid crystal molecules are aligned in the direction of the magnetic field, and the anchoring of the interface is weaken, and with this, the lubricating interface derivation region having a lower order than the liquid crystal phase is formed, and the interface between the liquid crystal component and the lubricating interface derivation region formed the slippery interface.

Example 36

Two kinds of silane coupling agents of ethyl trimethoxysilane (C2) and n-octadecyl trimethoxysilane (C18) were dissolved into a heptane-acetic acid mixed solution (pH=3.41) in a volume ratio of $V_{C18}(V_{C2}+V_{C18})$=0.03 such that the concentration is 0.02% by volume, and the mixed material was stirred at room temperature for five hours so as to prepare a sample. The ozone-washed glass substrate was coated with the prepared sample by using a spin coating method (3000 rpm, 1 min), and the substrate was dried in a vacuum oven at 130° C. for three hours. After that, the cell was assembled by using the prepared substrate and a PET film having a thickness of 10 μm as a spacer, and nematic liquid crystal composition (9-I) in a state of an isotropic phase was injected to the cell. As a result of an observation with a polarizing microscope while applying a magnetic field perpendicularly to the normal of the prepared cell, it was confirmed that the alignment vector of the liquid crystal rotated with respect to the magnetic field of 61.55 mT or more at a temperature range of 57.50° C. to 58.89° C. in the temperature rising process, which exhibits the horizontal alignment of the weak anchor ring, and the lubricating interface derivation region having a lower order than the liquid crystal phase was formed, and the interface between the liquid crystal component and the lubricating interface derivation region formed the slippery interface.

Example 37

A cell into which the liquid crystal is injected was prepared by using the same method as that used in Example 36 except for setting the volume ratio of $V_{C18}/(V_{C2}+V_{C18})=0.04$, and as a result of an observation with a polarizing microscope while applying a magnetic field perpendicularly to the normal of the prepared cell surface, it was confirmed that the alignment vector of the liquid crystal rotated with respect to the magnetic field of 61.55 mT or more at a temperature range of 57.43° C. to 58.79° C. in the temperature rising process, which exhibits the horizontal alignment of the weak anchor ring, and the lubricating interface derivation region having a lower order than the liquid crystal phase was formed, and the interface between the liquid crystal component and the lubricating interface derivation region formed the slippery interface.

Example 38

A cell into which the liquid crystal is injected was prepared by using the same method as that used in Example 36 except for setting the volume ratio of $V_{C18}/(V_{C2}+V_{C18})=0.05$, and as a result of an observation with a polarizing microscope while applying a magnetic field perpendicularly to the normal of the prepared cell surface, it was confirmed that the alignment vector of the liquid crystal rotated with respect to the magnetic field of 61.55 mT or more at a temperature range of 57.36° C. to 57.83° C. in the temperature rising process, which exhibits the horizontal alignment of the weak anchor ring, and the lubricating interface derivation region having a lower order than the liquid crystal phase was formed, and the interface between the liquid crystal component and the lubricating interface derivation region formed the slippery interface.

Example 39

A cell into which the liquid crystal is injected was prepared by using the same method as that used in Example 36 except for setting the volume ratio of $V_{C18}/(V_{C2}+V_{C18})=0.06$, and as a result of an observation with a polarizing microscope while applying a magnetic field perpendicularly to the normal of the prepared cell surface, it was confirmed that the alignment vector of the liquid crystal rotated with respect to the magnetic field of 61.55 mT or more at a temperature range of 57.03° C. to 57.27° C. in the temperature rising process, which exhibits the horizontal alignment of the weak anchor ring, and the lubricating interface derivation region having a lower order than the liquid crystal phase was formed, and the interface between the liquid crystal component and the lubricating interface derivation region formed the slippery interface.

Example 40

The substrate with comb tooth electrode was spin coated with a solution in which 20 parts by weight of mixed material of 1.05 mg (7.5% by weight) of methacrylic acid 11-[4-(4-butylphenylazo) phenoxy] undecyl (Azo), 1.05 mg (7.5% by weight) of the monomer (9-IV), 11.76 mg (84% by weight) of the ferroelectric liquid crystal composition (FLC-07), 0.14 mg (1% by weight) of polymerization initiator DMAP (4-dimethyl aminopyridine) was dissolved into 80 parts by weight of toluene. Thereafter, the irradiation with UV light (intensity=8.3 mW/cm$^2$) was performed for 30 minutes. A cell was prepared by using another substrate subjected to vertical alignment treatment and a spacer of 5 µm, and the ferroelectric liquid crystal composition (FLC-07) was injected into the cell. After that, it was confirmed that when the driving voltage was significantly reduced in the electrooptical response experiment in a state where the cell was irradiated with UV light so as to induce trans-cis transition of the azo group on the substrate surface, the lubricating interface derivation region having a lower order than the liquid crystal phase was formed, and the interface between the liquid crystal component and the lubricating interface derivation region formed the slippery interface.

Example 41

A solution (70 mg) obtained by dissolving 14 mg of mixed material of 1.05 mg (7.5% by weight) of methacrylic acid 11-[4-(4-butylphenylazo) phenoxy] undecyl (Azo), 1.05 mg (7.5% by weight) of the monomer (9-IV) 11.76 mg (84% by weight) of the following liquid crystal composition (FY8007), and 0.14 mg (1% by weight) of polymerization initiator DMAP (4-dimethyl aminopyridine) into 56 mg of toluene was added dropwise to an IPS glass substrate having an electrode width of 10 µm and an inter-electrode width of 10 µm so as to perform spin coating. Thereafter, the spin coated substrate was put into a case filled with $N_2$ gas, and was irradiated with UV light of 10 mW/cm$^2$ through a quartz glass window frame for one hour to form a liquid crystal gel film.

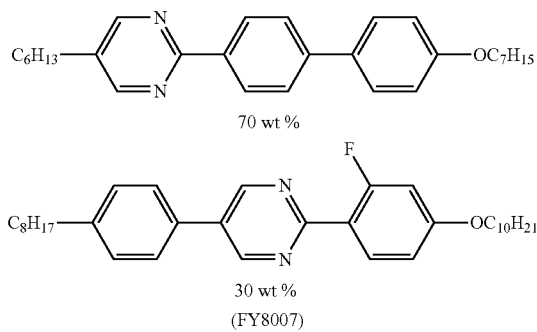

A cell was prepared by using another substrate subjected to a vertical alignment treatment and a spacer of 7 µm, and the liquid crystal composition (FY8007) was injected into the cell.

After assembling the liquid crystal display element, heating to the isotropic phase and gradual cooling (2.0° C./min) were performed so as to form a uniform SmC® liquid crystal phase in which a helical axis was perpendicular to the glass substrate in the vertically aligned state.

Here, a C director in each layer of the SmC® liquid crystal phase rotates along the helical structure, and thus no birefringence exhibited (quasi-isotropic state) with respect to light incident in the direction perpendicular to the glass substrate. However, when an electric field is applied in the direction parallel to the glass substrate by the IPS electrode, with the spontaneous polarization of SmC® liquid crystal and the interaction with the electric field, which are perpendicular to the molecular axis and in the direction parallel to the layer, the force to align the C director in the direction perpendicular to the electric field works, the bias of the C director in the helix (mode in the helix) and the deformation of the helix itself (mode between the helices) occur, and thereby the birefringence appears. A driving method for electrically modulating the transmitted light intensity by utilizing this electric field induced birefringence is called Deformed Helix FLC mode (DH-FLC mode). In general, the mode in the helix is fast (<100 μsec), but the mode between the helices is slow (>1 msec) and difficult to excite.

The electro-optical measurement at the time of applying a stepwise waveform (0 to 2 V/μm, 2.5 Hz (pulse width of 100 msec) to 2.5 kHz (pulse width of 100 μsec)) of 0→V→0→-V was performed at 85° C. by using the liquid crystal display element. As the measurement result, in a practical standard of 1.0 V/μm the transmittance was 0.5 or more at 10 Hz (pulse width of 25 msec), 0.4 at 25 Hz (pulse width of 10 msec), and 0.3 at 100 Hz (pulse width of 2.5 msec), and when the slippery interface was formed, the mode between the helices moves at a low frequency, and if the pulse width is 1 msec or more, a large rise effect of transmitted light intensity can be obtained even at a low voltage. In addition, at 2.5 kHz (pulse width of 100 μsec), the mode in the helix became easy to move as well, and thereby transmittance in a range of 0.10 to 0.15 was obtained at 1.0 V/μm.

In the liquid crystal cell of Example 41, it is considered that the lubricating interface derivation region having a lower order than the liquid crystal phase was formed, and the interface between the liquid crystal component and the lubricating interface derivation region formed the slippery interface.

Comparative Example 8

A cell was prepared by using an IPS glass substrate having an electrode width of 10 μm and an inter-electrode width of 10 μm, which was subjected to the vertical alignment treatment and another substrate subjected to the vertical alignment treatment with a spacer of 3 μm, and then the liquid crystal composition (FY8007) was injected into the cell.

The electro-optical measurement at the time of applying a stepwise waveform (0 to 2 V/μm, 2.5 Hz (pulse width of 100 msec) to 2.5 kHz (pulse width of 100 μsec)) of 0→V→0→-V was performed at 90° C. by using the liquid crystal display element. As a result, in the practical voltage of 1.0 V/μm, the transmittance was 2% even at a low frequency (2.5 Hz), and was only about 10% even when 2.0 V was applied.

It was found that the mode in the helix, the response time was several tens of microseconds, which is a typical SmC® (FLC) high-speed responsiveness. In addition, from that fact there was no change in the transmitted light intensity at 1 kHz (pulse width of 250 μsec), and the transmitted light intensity at 10 Hz (pulse width of 25 msec), it was found that the mode between the helices did not move at low speed. In the liquid crystal cell of Comparative Example 8, it was confirmed that the slippery interface was not formed.

Example 42

100 mg of the nematic liquid crystal composition (10-1), 8.11 mg of the chiral molecule compound (9-II), 10.30 mg of tridecyl acetate, 4.94 mg of the monomer (9-IV), 4.94 mg of 9-(1,1,3,3,3-pentamethyl disiloxanyl) nonyl acrylate (Si2A), and 0.41 mg of 2,2-dimethoxy-2-phenyl acetophenone (DMPAPP, photopolymerization initiator (9-V)) were mixed so as to obtain a sample K (temporary 1).

A PET film having a thickness of 10 μm was sandwiched between a cell substrate with a comb tooth electrode with an electrode distance of 10 μm and an electrode thickness of 3 μm, and a cover glass substrate of 18 mm square, and then both substrates were fixed with a UV curing resin so as to prepare a cell having a thickness of about 10 μm. After stirring the sample K (temporary 1) at 80° C. for 20 minutes, the sample K was injected into this cell in an isotropic phase state so as to obtain a liquid crystal cell K (temporary 1).

The cell K (temporary 1) was heated to 30.9° C. in the blue phase I development temperature range, and left to stand at that temperature for 30 minutes. After that, a polymer-stabilized blue phase was prepared by performing irradiation with ultraviolet rays having a wavelength of 365 nm and an irradiation intensity of 1.5 mW-cm$^2$ for 20 minutes to progress the polymerization of monomers.

The liquid crystal cell K (temporary 1) was placed on a hot stage to which a temperature gradient can be applied in-plane, an execution voltage of a sine wave at 1 kHz was applied in the range of 0 to 200 V, and transmitted light of the cell under Cross Nicole condition in which two polarizing plates sandwiching the cell were each rotated ±45 degrees from the electric field direction was captured with a high speed camera.

As a result of applying an electric field respectively in a state where the temperature gradient at a temperature range of 30° C. to 34° C. or 34° C. to 39° C. was applied to the liquid crystal cell K (temporary 1), a tendency of the low voltage in the high temperature region is confirmed, and when comparing the driving voltages at around 30° C. on the low temperature region and 39° C. on the high temperature region side, It was confirmed that there was a difference of 10 V between 148 V at around 30° C., and 138 V at around 39° C. Particularly, the driving voltage at around 34° C. was the lowest and was 131 V.

The residual transmittance was 0% over substantially the entire temperature range. Hysteresis was the lowest at around 31° C. and 35° C., and was 7.5%. The Kerr coefficient was the largest at around 34° C. and was 21 m$^{-1}$V$^{-2}$.

When the response time at a rising time was 30 μs at the temperature range of 30° C. to 31° C., the response speed was the fastest, and the response speed was decreased at high temperature, when the response time was 620 μs at the temperature range of 38° C., the response speed was the slowest. On the other hand, the response time at falling was faster as the temperature increased and the response time was around 20 μs at around 38° C. The slowest response speed was at around temperature of 30° C. and the response time was 300 μs.

Comparative Example 9

A sample L (temporary 2) was prepared by using the same method as that used in the sample K (temporary 1) of Example 42 except that tridecyl acetate was not contained, and a liquid crystal cell L (temporary 2) was prepared by using the same method as that used in the liquid crystal cell K (temporary 1) of Example 42 except that the sample K (temporary 1) of Example 42 was changed to the sample L (temporary 2).

The liquid crystal cell L (temporary 2) was heated to 30.9° C. in the blue phase I development temperature range, and left to stand at that temperature for 30 minutes. After that, a polymer-stabilized blue phase was prepared by performing irradiation with ultraviolet rays having a wavelength of 365 nm and an irradiation intensity of 1.5 mW·cm² for 20 minutes to progress the polymerization of monomers.

The liquid crystal cell L (temporary 2) was placed on a hot stage to which a temperature gradient can be applied in-plane, an execution voltage of a sine wave at 1 kHz was applied in the range of 0 to 200 V, and transmitted light of the cell under Cross Nicole condition in which two polarizing plates sandwiching the cell were each rotated ±45 degrees from the electric field direction was captured with a high speed camera.

As a result of applying an electric field respectively in a state where the temperature gradient at a temperature range of 30° C. to 34° C. or 34° C. to 39° C. was applied to the liquid crystal cell L (temporary 2), a tendency of the low voltage in the high temperature region is confirmed, and when comparing the driving voltages at around 30° C. on the low temperature region and 39° C. on the high temperature region side, It was confirmed that there was a difference of 10 V between 148 V at around 30° C., and 138 V at around 39° C. Particularly, the driving voltage at around 34° C. was the lowest and was 141 V.

The residual transmittance was 0% at a temperature range of 30° C. to 310° C., and 34° C. to 36° C. Hysteresis was the lowest at around 38° C., and was 2.4%. The Kerr coefficient was the largest at around 34° C. and was 21 m$^{-1}$V$^2$.

When the response time at a rising time was 30 μs at the temperature range of 30° C. to 31° C., the response speed was the fastest, and the response speed was decreased at high temperature, when the response time was 2990 μs at the temperature range of 38° C., the response speed was the slowest. On the other hand, the response time at falling was faster as the temperature increased and the response time was around 20 μs at around 38° C. The slowest response speed was at around temperature of 30° C. and the response time was 300 its.

When comparing a measurement value having the lowest driving voltage of the liquid crystal cell K (temporary 1) of Example 42 with a measurement value having the lowest driving voltage of the liquid crystal cell L (temporary 2) of Comparative Example 9, reduction of 10 V was found when the liquid crystal cell K (tentative 1) of Example 42 was 131 V and the liquid crystal cell L (temporary 2) was 141 V and it was confirmed that reduction by 7% was achieved by addition of tridecyl acetate.

In the liquid crystal cell K (temporary 1) of Example 42, tridecyl acetate forms the lubricating interface derivation region having a lower order than the liquid crystal phase was formed, and the interface between the liquid crystal component and the lubricating interface derivation region formed the slippery interface. In the liquid crystal cell L (temporary 2) of Comparative Example 9, it was confirmed that the slippery interface is not formed.

The configurations and combinations thereof in the embodiments described above are merely examples, and additions, omissions, substitutions, and other modifications of the configurations are possible without departing from the spirit of the present invention. Also, the present invention is not limited by each embodiment, and is limited only by the scope of the claims (claims).

REFERENCE SIGNS LIST 10, 40 . . . complex (optical element), 11, 12, 31, 32, substrate, 13, 23, 33 . . . liquid crystal component, 14, 24, 34 . . . lubricating interface deriving agent, 15, 25 . . . liquid crystal phase, 45 . . . liquid crystal molecule, 16,26 . . . lubricating interface derivation region (liquid phase), 17, 27 . . . slippery interface, 18, 19, 28, 29, 38, 39, 48, 49 electrode, 20 . . . one surface on inside of substrate, 21 . . . polymer compound component, 22 . . . coating film, 35 . . . insulating film, 60 . . . liquid crystal display device, 201 . . . first common electrode, 202 . . . first pixel electrode, 203 . . . second common electrode, 204 . . . second pixel electrode

What is claimed is:

1. A complex comprising:
a liquid crystal component; and
a support of the liquid crystal component,
wherein a lubricating interface derivation region is formed between the liquid crystal component and the support,
wherein the complex further comprises a lubricating interface deriving agent in the lubricating interface derivation region,
wherein the liquid crystal component and the lubricating interface deriving agent develop a phase separation structure, the liquid crystal component forms a liquid crystal phase, and the lubricating interface deriving agent forms a liquid phase.

2. The complex according to claim 1,
wherein the support is a pair of substrates having an electrode on at least one substrate, a polymer structure present in the liquid crystal component, and at least one of the group consisting of a polymer structure and a polymer thin film which complements a defective region of the liquid crystal.

3. The complex according to claim 1,
wherein an interface between the liquid crystal component and the lubricating interface derivation region forms a slippery interface.

4. The complex according to claim 1, further comprising:
a lubricating interface deriving agent in the lubricating interface derivation region.

5. The complex according to claim 4,
wherein the lubricating interface deriving agent is a compound having one of the group consisting of a polar group, a polymerizable compound, a polymer compound, and an ionic liquid.

6. The complex according to claim 5,
wherein the lubricating interface deriving agent is the polymer compound, and the polymer compound has at least one of two or three or more kinds of alkyl groups having different chain lengths, a mesogenic group, and a photoisomerizable group.

7. An optical element comprising:
a pair of substrates having an electrode on at least one substrate; and
a liquid crystal component with which a space between the pair of substrates is filled,
wherein a lubricating interface derivation region is formed between the pair of substrates and the liquid crystal component,
wherein the lubricating interface derivation region comprises a lubricating interface deriving agent,
wherein the liquid crystal component and the lubricating interface deriving agent develop a phase separation structure, the liquid crystal component forms a liquid crystal phase, and the lubricating interface deriving agent forms a liquid phase.

8. The optical element according to claim 7,
wherein an interface between the liquid crystal component and the lubricating interface derivation region forms a slippery interface.

9. The optical element according to claim 8,
wherein the lubricating interface deriving agent is a compound having one of the group consisting of a polar group, a polymerizable compound, a polymer compound, and an ionic liquid.

10. The optical element according to claim 9,
wherein the polymer compound has at least one of two or three or more kinds of alkyl groups having different chain lengths, a mesogenic group, and a photoisomerizable group.

11. The optical element according to claim 7,
wherein the liquid crystal phase is a nematic liquid crystal phase.

12. The optical element according to claim 7,
wherein the liquid crystal component forms an optically isotropic liquid crystal phase stabilized by a network formed of a polymer compound component and the lubricating interface deriving agent is unevenly distributed in the vicinity of the surface of the network so as to form a liquid phase.

13. The optical element according to claim 7,
wherein the liquid crystal component forms an optically isotropic liquid crystal phase having a double twist cylinder structure, and the lubricating interface deriving agent is unevenly distributed in a disclination between the double twist cylinder structures to form a liquid phase.

14. The optical element according to claim 12,
wherein the liquid crystal component exhibits optical isotropy when no electric field is applied and exhibits optical anisotropy when an electric field is applied.

15. The optical element according to claim 12,
wherein the liquid crystal component exhibits a cholesteric blue phase.

16. The optical element according to claim 7,
wherein the liquid crystal component and the lubricating interface deriving agent self-organize so as to develop a phase separation structure.

17. The optical element according to claim 7, further comprising:
a first electrode and a second electrode which are provided on a substrate side facing the one substrate,
wherein an electric field is generated between the first electrode and the second electrode.

18. The optical element according to claim 17,
wherein the first electrode and the second electrode generate an in-plane electric field between the pair of substrates.

19. The optical element according to claim 17,
wherein the first electrode and the second electrode generate a fringe electric field between the pair of substrates.

20. The optical element according to claim 17, further comprising:
a third electrode,
wherein electric fields are generated in a plurality of directions.

21. The optical element according to claim 20, further comprising:
a fourth electrode,
wherein electric fields are generated in a plurality of directions.

22. A complex comprising:
a liquid crystal component; and
a support of the liquid crystal component,
wherein a lubricating interface derivation region is formed between the liquid crystal component and the support,
wherein the complex further comprises a lubricating interface deriving agent in the lubricating interface derivation region,
wherein the lubricating interface deriving agent is unevenly distributed in the vicinity of a surface of an inside of the support so as to form a liquid phase.

23. A complex comprising:
a liquid crystal component; and
a support of the liquid crystal component,
wherein a lubricating interface derivation region is formed between the liquid crystal component and the support,
wherein the complex further comprises a lubricating interface deriving agent in the lubricating interface derivation region,
wherein an inside of the support is covered with a coating film formed of a polymer compound component having good affinity with respect to the lubricating interface deriving agent, and the lubricating interface deriving agent is unevenly distributed in the vicinity of the coating film so as to form a liquid phase.

24. An optical element comprising:
a pair of substrates having an electrode on at least one substrate; and
a liquid crystal component with which a space between the pair of substrates is filled,
wherein a lubricating interface derivation region is formed between the pair of substrates and the liquid crystal component,
wherein the lubricating interface derivation region comprises a lubricating interface deriving agent,
wherein the lubricating interface deriving agent is unevenly distributed in the vicinity of at least one surface of insides of the pair of substrates so as to form a liquid phase.

25. An optical element comprising:
a pair of substrates having an electrode on at least one substrate; and
a liquid crystal component with which a space between the pair of substrates is filled,
wherein a lubricating interface derivation region is formed between the pair of substrates and the liquid crystal component,
wherein the lubricating interface derivation region comprises a lubricating interface deriving agent,
wherein an inside of at least one of the pair of substrates is covered with a coating film formed of a polymer compound component having good affinity with respect to the lubricating interface deriving agent, and the lubricating interface deriving agent is unevenly distributed in the vicinity of the coating film so as to form a liquid phase.

* * * * *